(12) United States Patent
Tripathi et al.

(10) Patent No.: US 8,402,942 B2
(45) Date of Patent: Mar. 26, 2013

(54) SYSTEM AND METHODS FOR IMPROVING EFFICIENCY IN INTERNAL COMBUSTION ENGINES

(75) Inventors: Adya S. Tripathi, San Jose, CA (US); Chester J. Silvestri, Los Gatos, CA (US)

(73) Assignee: Tula Technology, Inc., Santa Clara, CA (US)

( * ) Notice: Subject to any disclaimer, the term of this patent is extended or adjusted under 35 U.S.C. 154(b) by 810 days.

(21) Appl. No.: 12/501,392

(22) Filed: Jul. 10, 2009

(65) Prior Publication Data

US 2010/0100299 A1 Apr. 22, 2010

Related U.S. Application Data

(63) Continuation-in-part of application No. 12/501,345, filed on Jul. 10, 2009, which is a continuation-in-part of application No. 12/355,725, filed on Jan. 16, 2009, now Pat. No. 8,131,447.

(60) Provisional application No. 61/080,192, filed on Jul. 11, 2008, provisional application No. 61/104,222, filed on Oct. 9, 2008, provisional application No. 61/224,817, filed on Jul. 10, 2009.

(51) Int. Cl.
*F02D 43/00* (2006.01)
*F02D 17/00* (2006.01)
*F02D 45/00* (2006.01)
*G06F 19/00* (2011.01)

(52) U.S. Cl. ...... 123/350; 701/103; 701/115; 123/198 F

(58) Field of Classification Search .................. 123/350, 123/352, 305, 198 F, 478, 480, 481; 701/103–105, 701/101, 102, 115
See application file for complete search history.

(56) References Cited

U.S. PATENT DOCUMENTS 3,996,915 A 12/1976 Demetrescu
4,040,395 A 8/1977 Demetrescu
(Continued)

FOREIGN PATENT DOCUMENTS

JP 7-145745 6/1995
JP 2004-324506 11/2004
(Continued)

OTHER PUBLICATIONS

Korean Intellectual Property Office, ISA, "International Search Report and Written Opinion" in PCT Application No. PCT/US2009/050337, Feb. 16, 2010, 10 pages.
(Continued)

*Primary Examiner* — Hieu T Vo
(74) *Attorney, Agent, or Firm* — Kang S. Lim

(57) ABSTRACT

The present invention relates to system and methods for improving efficiency of an internal combustion engine. This system may include a fuel processor. The system receives instructions for a desired engine output and operating conditions. The system may then determine an operational state corresponding to the desired output. The operational state includes designating the cylinders into one of three categories: working, deactivated and passive. The number of working cylinders is calculated by dividing the desired output by the power provided by one cylinder operating at substantially optimal efficiency. Then the system substantially disables fuel flow to and air flow to the deactivated cylinders, substantially disables fuel flow to and firing of the passive cylinders, and substantially regulates fuel flow to, air flow to and firing of the working cylinders. Firing of the working cylinders is synchronized with engine speed to reduce unwanted engine vibrations. The number of working, passive and deactivated cylinders may be continually altered in response to changes in desired output or operating conditions.

28 Claims, 81 Drawing Sheets

U.S. PATENT DOCUMENTS

| | | | |
|---|---|---|---|
| 4,064,844 A | 12/1977 | Matsumoto et al. |
| 4,100,891 A | 7/1978 | Williams |
| 4,161,166 A | 7/1979 | Roznovsky |
| 4,306,529 A | 12/1981 | Chiesa et al. |
| 4,434,767 A | 3/1984 | Kohama et al. |
| 4,489,695 A | 12/1984 | Kohama et al. |
| 4,509,488 A | 4/1985 | Förster et al. |
| 4,528,960 A | 7/1985 | Mizuno et al. |
| 4,590,907 A | 5/1986 | Tsukamoto et al. |
| 4,841,933 A | 6/1989 | McHale et al. |
| 4,854,283 A | 8/1989 | Kiyono et al. |
| 5,058,550 A | 10/1991 | Nagano et al. |
| 5,079,691 A | 1/1992 | Heck et al. |
| 5,117,790 A | 6/1992 | Clarke et al. |
| 5,275,143 A | 1/1994 | Lembke et al. |
| 5,377,631 A | 1/1995 | Schechter |
| 5,404,857 A | 4/1995 | Schommers |
| 5,408,974 A | 4/1995 | Lipinski et al. |
| 5,431,139 A | 7/1995 | Grutter et al. |
| 5,437,253 A | 8/1995 | Huffmaster et al. |
| 5,464,000 A | 11/1995 | Pursifull et al. |
| 5,483,941 A | 1/1996 | Cullen et al. |
| 5,540,633 A | 7/1996 | Yamanaka et al. |
| 5,553,575 A | 9/1996 | Beck et al. |
| 5,555,871 A | 9/1996 | Gopp et al. |
| 5,669,357 A | 9/1997 | Denz et al. |
| 5,692,471 A | 12/1997 | Zhang |
| 5,752,485 A | 5/1998 | Minowa et al. |
| 5,775,296 A | 7/1998 | Goras et al. |
| 5,778,858 A | 7/1998 | Garabedian |
| 5,791,314 A | 8/1998 | Ito |
| 5,797,384 A | 8/1998 | Kitagawa et al. |
| 5,806,488 A | 9/1998 | Imberg |
| 5,826,563 A | 10/1998 | Patel et al. |
| 5,945,597 A | 8/1999 | Poublon et al. |
| 5,947,095 A | 9/1999 | Kato |
| 6,032,650 A | 3/2000 | Rask |
| 6,158,411 A | 12/2000 | Morikawa |
| 6,244,241 B1 | 6/2001 | Mamiya et al. |
| 6,244,242 B1 | 6/2001 | Grizzle et al. |
| 6,247,449 B1 | 6/2001 | Persson |
| 6,354,268 B1 | 3/2002 | Beck et al. |
| 6,360,724 B1 | 3/2002 | Suhre et al. |
| 6,367,443 B1 | 4/2002 | Bassi et al. |
| 6,405,705 B1 | 6/2002 | Dunsworth et al. |
| 6,415,601 B1 | 7/2002 | Glugla et al. |
| 6,497,221 B1 | 12/2002 | French et al. |
| 6,619,258 B2 | 9/2003 | McKay et al. |
| 6,619,267 B1 | 9/2003 | Pao |
| 6,687,602 B2 | 2/2004 | Ament |
| 6,688,281 B1 | 2/2004 | Woolford et al. |
| 6,728,626 B2 | 4/2004 | Maira et al. |
| 6,769,398 B2 | 8/2004 | Surnilla et al. |
| 6,823,830 B2 | 11/2004 | Azuma |
| 6,823,835 B2 | 11/2004 | Dunsworth et al. |
| 6,868,326 B2 | 3/2005 | Yasui |
| 6,874,462 B2 | 4/2005 | Matthews |
| 6,876,097 B2 | 4/2005 | Thomas et al. |
| 6,937,933 B1 | 8/2005 | Jautelat et al. |
| 6,978,204 B2 | 12/2005 | Surnilla et al. |
| 7,000,602 B2 | 2/2006 | Cullen et al. |
| 7,021,287 B2 | 4/2006 | Zhu et al. |
| 7,028,661 B1 | 4/2006 | Bonne et al. |
| 7,028,670 B2 | 4/2006 | Doering |
| 7,058,501 B2 | 6/2006 | Yasui et al. |
| 7,063,062 B2 | 6/2006 | Lewis et al. |
| 7,069,910 B2 | 7/2006 | Surnilla et al. |
| 7,085,647 B1 * | 8/2006 | Prucka et al. ............ 701/114 |
| 7,086,386 B2 | 8/2006 | Doering |
| 7,111,593 B2 | 9/2006 | Song et al. |
| 7,133,763 B2 | 11/2006 | Yasui |
| 7,225,783 B2 | 6/2007 | Hohnstadt et al. |
| 7,249,583 B2 | 7/2007 | Bidner et al. |
| 7,249,584 B2 * | 7/2007 | Rozario et al. ............ 123/198 F |
| 7,275,511 B1 * | 10/2007 | Wright et al. ............ 123/184.48 |
| 7,311,079 B2 | 12/2007 | Surnilla et al. |
| 7,350,499 B2 | 4/2008 | Takaoka et al. |
| 7,426,915 B2 | 9/2008 | Gibson et al. |
| 7,503,312 B2 | 3/2009 | Surnilla et al. |
| 7,509,201 B2 | 3/2009 | Bolander et al. |
| 7,516,730 B2 | 4/2009 | Ukai et al. |
| 7,532,972 B2 | 5/2009 | Kolmanovsky et al. |
| 7,577,511 B1 | 8/2009 | Tripathi et al. |
| 7,891,336 B2 | 2/2011 | Surnilla et al. |
| 7,900,596 B2 | 3/2011 | Hartmann et al. |
| 7,930,087 B2 | 4/2011 | Gibson et al. |
| 8,131,447 B2 * | 3/2012 | Tripathi et al. ............ 701/103 |
| 2003/0131820 A1 | 7/2003 | Mekay et al. |
| 2003/0139872 A1 | 7/2003 | Miki |
| 2007/0051092 A1 | 3/2007 | Pallett et al. |
| 2007/0051350 A1 | 3/2007 | Pallet et al. |
| 2007/0051351 A1 | 3/2007 | Pallett et al. |
| 2007/0162215 A1 | 7/2007 | Dietl et al. |
| 2007/0272202 A1 | 11/2007 | Kuo et al. |
| 2008/0066450 A1 | 3/2008 | Surnilla et al. |
| 2008/0135021 A1 | 6/2008 | Michelini et al. |
| 2008/0262712 A1 | 10/2008 | Duty et al. |
| 2009/0177371 A1 | 7/2009 | Reinke |
| 2009/0182484 A1 | 7/2009 | Loeffler et al. |
| 2009/0182485 A1 | 7/2009 | Loeffler et al. |
| 2009/0320787 A1 | 12/2009 | Wagner et al. |
| 2010/0010724 A1 | 1/2010 | Tripathi et al. |
| 2010/0050985 A1 | 3/2010 | Tripathi et al. |
| 2010/0050986 A1 | 3/2010 | Tripathi et al. |
| 2010/0050993 A1 | 3/2010 | Zhao et al. |
| 2011/0000459 A1 | 1/2011 | Elsäber |
| 2011/0048372 A1 | 3/2011 | Dibble et al. |

FOREIGN PATENT DOCUMENTS

| | | |
|---|---|---|
| JP | 2005-325781 | 11/2005 |
| JP | 2006-083762 | 3/2006 |
| JP | 2006-118428 | 5/2006 |
| JP | 2009013922 A * | 1/2009 |
| WO | 91/02892 | 3/1991 |
| WO | 2010/006321 A2 | 1/2010 |
| WO | 2010/006321 A3 | 1/2010 |
| WO | 2010/006323 A2 | 1/2010 |
| WO | 2010/006323 A3 | 1/2010 |

OTHER PUBLICATIONS

Korean Intellectual Property Office, ISA, "International Search Report and Written Opinion" in PCT Application No. PCT/US2009/050339, Feb. 17, 2010, 7 pages.

European Patent Office, ISA, "International Search Report and Written Opinion", in PCT Application No. PCT/US2009/050322 Nov. 3, 2009, 18 pages.

Pulkrabek, "Engineering Fundamentals of the Internal Combustion Engine", Second Edition, 2004, 10 pages.

Stone, "Introduction to Internal Combustion Engines", Third Edition, 1999, 14 pages.

WIPO, International Preliminary Report and Written Opinion, in PCT Application No. PCT/US2009/050337, Jan. 20, 2011, 8 pages.

WIPO, International Preliminary Report and Written Opinion, in PCT Application No. PCT/US2009/050339, Jan. 20, 2011, 5 pages.

* cited by examiner

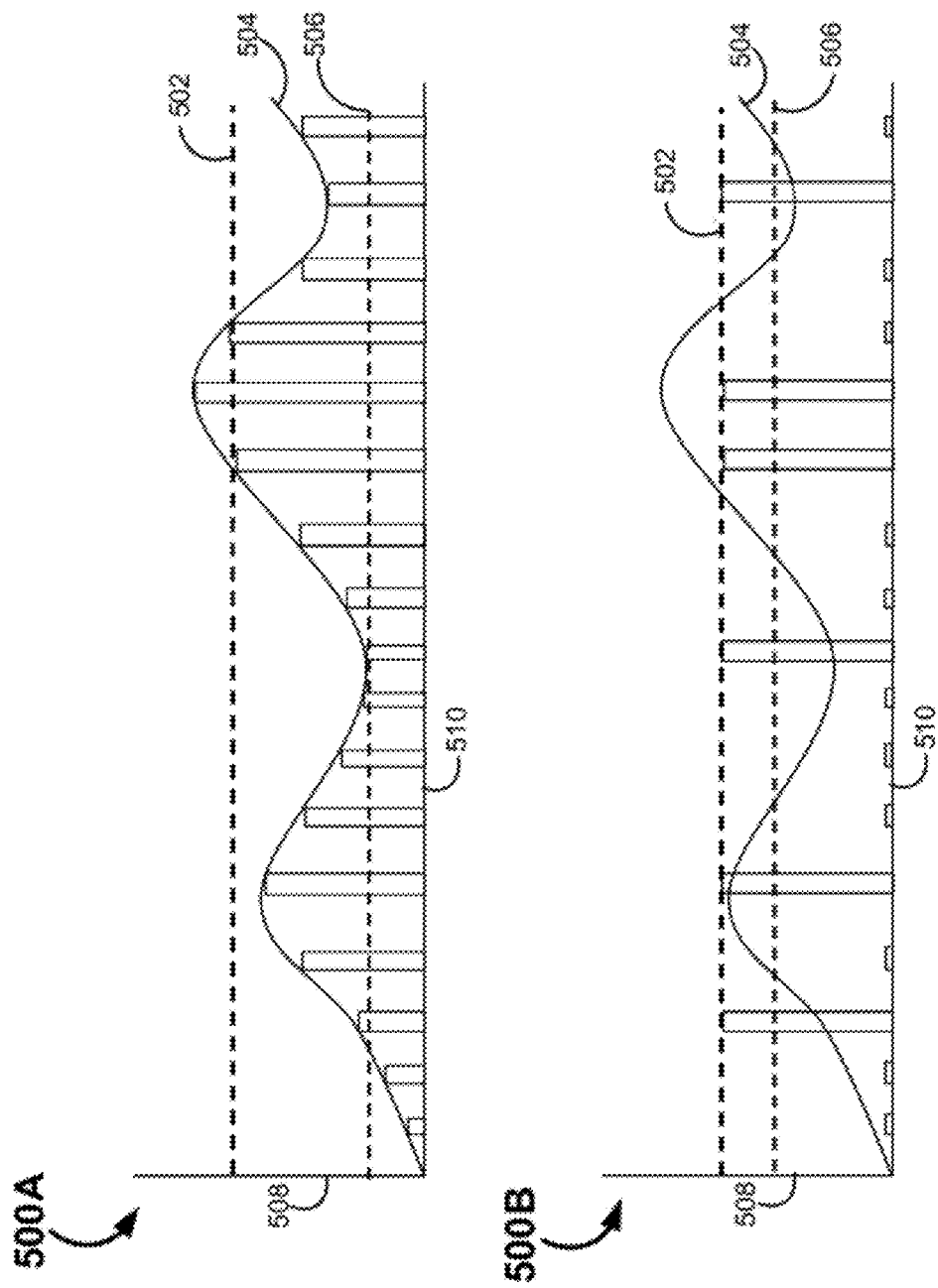

SYSTEM AND METHODS FOR IMPROVING EFFICIENCY IN INTERNAL COMBUSTION ENGINES

RELATED APPLICATIONS

This application claims the priority of U.S. Provisional Patent Application No. 61/080,192, filed Jul. 11, 2008; U.S. Provisional Patent Application No. 61/104,222, filed Oct. 9, 2008; and U.S. Provisional Patent Application No. 61/224,817, filed Jul. 10, 2009. All of these priority applications are incorporated herein by reference and are entitled: "Internal Combustion Engine Control for Improved Fuel Efficiency."

This application is also a continuation-in-part of U.S. patent application Ser. No. 12/501,345 filed on Jul. 10, 2009, entitled "Internal Combustion Engine Control for Improved Fuel Efficiency", which is a continuation-in-part of U.S. patent application Ser. No. 12/355,725 filed on Jan. 16, 2009, entitled the same. The content of these applications are incorporated herein by reference.

BACKGROUND OF THE INVENTION

The present invention relates to internal combustion engine control systems and methods. More particularly, the present invention relates to systems and methods for improving the efficiency of internal combustion engines utilizing advanced variable displacement.

Current internal combustion engines are notoriously inefficient. Such inefficiency results in smaller distances required between fill ups, increased costs of operation and the release of greater amounts of undesirable emissions, including greenhouse gasses, as compared to more efficient engine types. With increases in fuel costs, and with ever more environmentally conscious consumers and legislation, it has become imperative to provide increasingly fuel efficient engines for automotive, industrial and other applications.

In regards to the automotive industry, a number of methods have developed in order to increase engine efficiency. Some measures are subtle, such as optimizing gearing ratios. On the other extreme is the introduction of hybrid systems which combine electric engines and complicated drive train systems with the internal combustion engine.

Overall, such fuel saving measures have improved the efficiency of vehicles. However, there is often a tradeoff of fuel saving features to performance. Also, in regards to some of the more extreme fuel saving features, such as hybrid systems, conversion of existing internal combustion engine vehicles is difficult and often financially prohibitive. Moreover, few of the current measures utilized to increase engine efficiency actually address the root cause of the inefficiencies.

Most internal combustion engines utilize reciprocating pistons with two or four stroke working cycles. These engines operate at efficiencies that are far below theoretical peak efficiency because the engine must be able to operate under a wide variety of loads. Accordingly, the amount of air and/or fuel that is delivered into each cylinder typically varies depending upon the desired torque or power output. It is well understood that the cylinders are more efficient when they are operated under specific conditions that permit full or near-full compression and optimal fuel injection levels that are tailored to the cylinder size and operating conditions. Generally, the best thermodynamic efficiency of an engine is found when the most air is introduced into the cylinders, which typically occurs when the air delivery to the engine is un-throttled. However, in engines that control the power output by using a throttle to regulate the flow of air into the cylinders (e.g., Otto cycle engines used in many cars), operating at an un-throttled position (i.e., at "full throttle") would typically result in the delivery of more power (and often far more power) than desired or appropriate.

In engines that do not generally throttle the flow of air into the cylinders (e.g., most diesel engines), power is controlled by modulating the amount of fuel delivered to the cylinders. Operating such engines at thermodynamically optimal fuel injection levels, again, would typically result in the delivery of more power than desired or appropriate. Therefore, in most applications, standard internal combustion engines are operated under conditions well below their optimal thermodynamic efficiency a significant majority of the time.

There are a number of reasons that internal combustion engines do not operate as efficiently at partial throttle. One of the most significant factors is that less air is provided to the cylinder at partial throttle than at full throttle which reduces the effective compression of the cylinder, which in turn reduces the thermodynamic efficiency of the cylinder. Another very significant factor is that operating at partial throttle requires more energy to be expended to pump air into and out of the cylinders than is required when the cylinder is operating at full throttle—these losses are frequently referred to as pumping losses.

One approach to gain engine efficiency, and hence lower fuel consumption is varying the displacement of the engine (variable displacement). The concept was initially introduced by Cadillac™ in the 1980s to less than stellar reviews. The luxury sedan's engine flipped between four, six and eight cylinders, but had a poor service record and suffered from engine vibration issues. The greatest vibration problems kicked in when the engine was in six-cylinder mode, an intrinsically unbalanced configuration. The technology was deemed too unstable, with too little demand to be developed until recently.

Most current commercially available variable displacement engines effectively "shut down" some of the cylinders during certain low-load operating conditions. When a cylinder is "shut down", its piston still reciprocates, however neither air nor fuel is delivered to the cylinder so the piston does not deliver any power during its power stroke. Since the cylinders that are shut down do not deliver any power, the proportionate load on the remaining cylinders is increased, thereby allowing the remaining cylinders to operate at an improved thermodynamic efficiency. The improved thermodynamic efficiency results in improved fuel efficiency. Although the remaining cylinders tend to operate at improved efficiency, they still do not operate at their optimal efficiency the vast majority of the time because they are still not operating consistently at "full throttle." That is, they have the same drawbacks of partial throttle operations, (e.g., lower compression, higher pumping losses) even though the scale of their inefficiencies is reduced.

Another drawback of most current commercially available variable displacement engines is that they tend to revert out of the variable displacement mode very quickly when changes are made to the desired operational state of the engine. For example, many commercially available automotive variable displacement engines appear to revert to a "conventional" all cylinder operational mode any time the driver requests non-trivial additional power by further depressing the accelerator pedal. In many circumstances this results in the engine switching out of the fuel saving variable displacement mode, even though the engine is theoretically capable of delivering the desired power using only the reduced number of cylinders that were being used in the variable displacement mode. It is believed that the reason that such variable displacement engines kick out of the variable displacement mode so quickly is due to the perceived difficulty of controlling the engine to provide substantially the same response regardless of how many cylinders are being used at any given time.

More generally, engine control approaches that vary the effective displacement of an engine by skipping the delivery of fuel to certain cylinders are often referred to as "skip fire" control of an engine. In skip fire control, fuel is not delivered to selected cylinders based on some designated control algorithm. The variable displacement engines that effectively shut down cylinders that are described above are essentially a class of skip fire engines. Over the years, a number of skip fire engine control arrangements have been proposed, however, most still contemplate throttling the engine or modulating the amount of fuel delivered to the cylinders in order to control the engine's power output.

As suggested above, most commercially available variable displacement engines shut down specific cylinders to vary the displacement in discrete steps. Other approaches have also been proposed for varying the displacement of an engine to facilitate improved thermodynamic efficiency. For example, some designs contemplate varying the effective size of the cylinders to vary the engine's displacement. Although such designs may improve thermodynamic and fuel efficiencies, existing variable cylinder size designs tend to be relatively complicated and expensive to produce making them impractical for widespread use in commercial vehicles.

Although existing variable displacement engines work well in many applications, there are continuing efforts to further improve the thermodynamic efficiency of internal combustion engines without necessarily requiring expensive alterations to the engine's design.

Furthermore, in many existing engines used by current vehicles, the number of cylinders capable of being "shut down" when in variable displacement modes may be limited. For example, in the GM Generation IV small block V8 engine half of the cylinders are capable of being shut down. Current engine design, however, requires that the remaining 4 cylinders remain operational. Likewise, the six cylinder Honda™ J-series engine is capable of shutting down 3 or 4 cylinders. Yet other engines are arranged to shut down cylinders in banks. In virtually all such engines, current methods of variable displacement modes are unable to provide low power one or two cylinder operation.

Moreover, it is usual for existing variable displacement style systems to readily drop out of a variable displacement mode and revert to "conventional" operation when slightly increased power demands are placed upon them. Thus, the time spent in a reduced displacement mode is typically limited, resulting in reduced efficiency realization.

Also, current variable displacement type systems have relatively slow reaction times, thus the switching between cylinders being used is less responsive than required for peak efficiencies. Such slow modulation results in the engines being run in an overpowered manner so that there are no perceived performance issues. Again, this results in the engine being run at a lower than peak efficiency rating.

Additionally, variable displacement modes may result in strains being placed upon the exhaust systems of the engines. This may result in the engines failing compliance to state and federal emissions standards. A catalytic converter may be used to reduce the toxicity of emissions from an internal combustion engine. The catalytic converter provides an environment for a chemical reaction wherein toxic combustion by-products are converted to less-toxic substances. There are two way and three way catalytic converters.

The three reactions in a three way catalytic converter occur most efficiently when the catalytic converter receives exhaust from an engine running slightly above the stoichiometric point. This is between 14.6 and 14.8 parts air to 1 part fuel, by weight, for gasoline. The ratio for LPG, natural gas and ethanol fuels is slightly different, requiring modified fuel system settings when using those fuels. Generally, engines fitted with 3-way catalytic converters are equipped with a computerized closed-loop feedback fuel injection system employing one or more oxygen sensors.

When a 3-way catalyst is used in an open-loop system, $NO_x$ reduction (one of the three reactions) efficiency is low. Within a narrow fuel/air ratio band surrounding stoichiometry, conversion of all three pollutants is very complete, sometimes approaching 100%. However, outside of that band, conversion efficiency falls off very rapidly. When there is more oxygen than required, then the system is said to be running lean, and the system is in oxidizing condition. In that case, the converter's two oxidizing reactions (oxidation of CO and hydrocarbons) are favored, at the expense of the reducing reaction. When there is excessive fuel, then the engine is running rich. The reduction of $NO_x$ is favored, at the expense of CO and HC oxidation.

In many catalytic converters, the oxygen sensor is the basis of the closed loop control system on a spark ignited rich burn engine, however it is also used for diagnostics. In vehicles with OBD II, a second oxygen sensor is fitted after the catalytic converter to monitor the $O_2$ levels. The on-board computer makes comparisons between the readings of the two sensors. If both sensors give the same output, the catalytic converter is not functioning and must be replaced.

During variable displacement operation, readings by the oxygen sensors may be erratic and may signify "improper" engine operation. In reality, such oxygen readings may be perfectly acceptable, or may require changes to air fuel ratios to ensure proper operation. Regardless, being in compliance with emissions standards is imperative for most automotive engines, and has resulted in hurdles to the development of successful wide range variable displacement systems.

In view of the foregoing, systems and methods for improving efficiency in internal combustion engines are disclosed. The present invention provides a novel system for variable displacement engine control whereby existing engines which include cylinders incapable of being "shut down" may be easily modified to provide a full range of variable displacement modes, including very low power operations using one or more operational cylinders. Additionally, the present invention provides for variable displacement modes of operation which may effectively suppress undesired engine vibration.

SUMMARY OF THE INVENTION

The present invention discloses an engine control system. More particularly, the present invention teaches systems and methods for improving efficiency in internal combustion engines. The engine control system may be utilized to modify current engines to operate in advanced variable displacement modes where cylinders are activated in order to maximize the percentage of time that each working chamber operates at optimal efficiency.

The system and method for improving efficiency of an internal combustion engine includes a fuel processor. The engine includes cylinders, and at least one of these cylinders is controllable (i.e. can be deactivated by shutting intake and exhaust valves).

The system receives instructions for a desired engine output. This instruction may be an accelerator pedal position or other input such as a cruise control data feed. In addition, current operating conditions of the engine may be received. These operating conditions may include engine speed, current activated cylinders, vehicle weight, slope the vehicle is on, and movement resistance.

The system may then determine an operational state corresponding to the desired output. The operational state includes designating the cylinders into one of three categories: working, deactivated and passive.

The number of working cylinders may be calculated by dividing the desired output by the power provided by one cylinder operating at substantially optimal efficiency. This may result in a target number of cylinders. In circumstances where this is not a whole number, the number of working cylinders may be varied over a succession of engine revolutions to generate the desired output.

In addition, the number of working cylinders calculation may rely upon operating conditions. Further, adaptive predictive programming may be utilized to determine the number of working cylinders necessary to generate the needed engine power output.

Then the system substantially disables fuel flow to and air flow to the deactivated cylinders by shutting the intake and exhaust valves of the deactivated cylinders. The system also substantially disables fuel flow to and firing of the passive cylinders. However, unlike the deactivated cylinders, air passes through the passive cylinders. Moreover, the system substantially regulates fuel flow to, air flow to and firing of the working cylinders. Thus, the working cylinders act as normal firing cylinders. Firing of the working cylinders may be synchronized with engine speed to reduce unwanted engine vibrations and ensure smooth engine operation.

In addition, the system may be designed to substantially modulate the regulation of fuel flow to, air flow to and firing of at least one of the working cylinders during some of the at least one of the subset of working cylinder's combustion cycles. Thus, in some engine cycles, more cylinders fire than in other cycles. This results in a fine control over average engine power output over a succession of engine revolutions. This modulation may be dynamically determined during operation of the engine on a combustion cycle by combustion cycle basis.

The number of working, passive and deactivated cylinders may be continually altered in response to changes in desired output or operating conditions.

In some situations, the engine may include more than one segregated exhaust manifolds. In these embodiments, the exhaust from the working cylinders may be provided to a different exhaust manifold than the air flowing through the passive cylinders, hereby segregating these gasses from one another. This insures proper catalytic converter operation on the exhaust gasses.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A and 4B are taken from *Engineering Fundamentals of the Internal Combustion Engine*, by Willard W. Pulkrabek (2004)—ISBN 0-13-140570-5;

FIG. 5 is a graph illustrating an example of analog versus digital fuel injection amounts in reference to the instantaneous torque output in accordance with an embodiment of the present invention;

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1A:
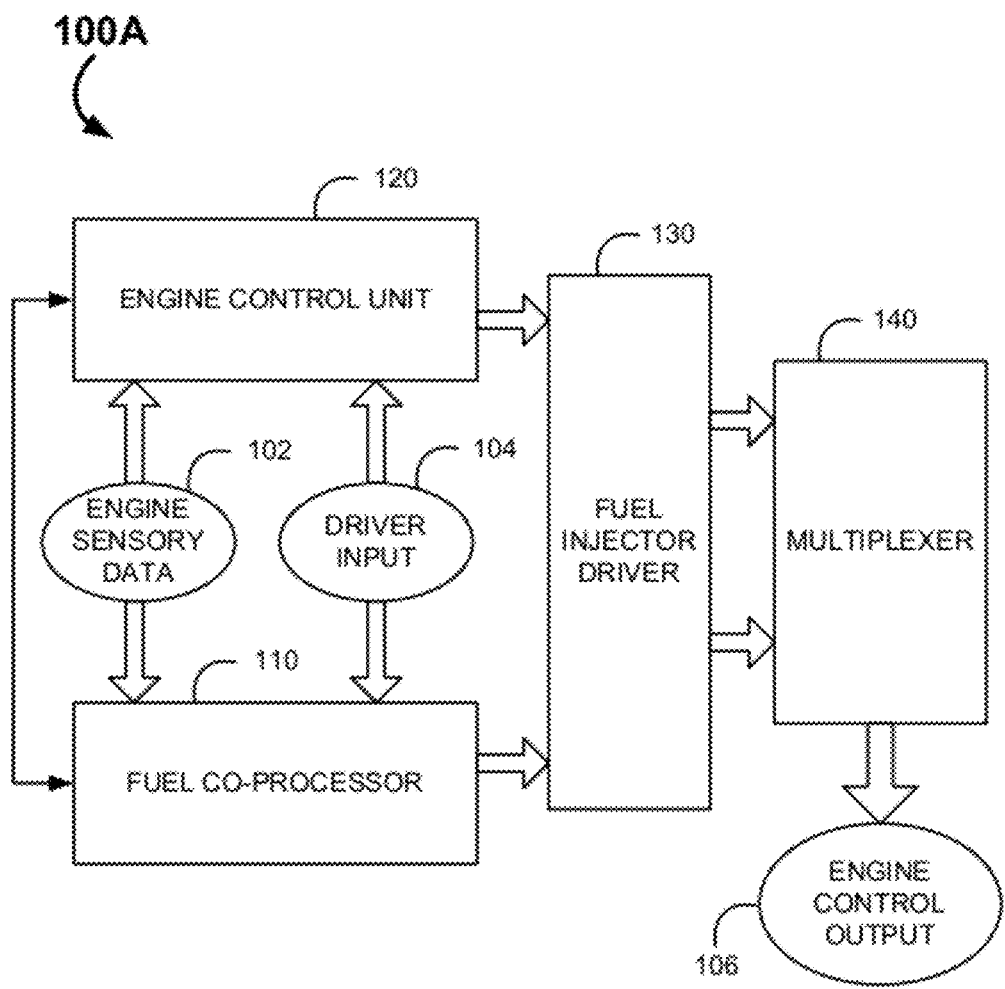
FIG. 1A is a structural block diagram for an example of an engine efficiency improvement system in accordance with an embodiment of the present invention.

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to systems and methods for controlling the operation of internal combustion engines to improve their thermodynamic and fuel efficiencies. In particular, the present invention is directed to novel methods and systems for variable displacement which offers wider ranges of working chambers over previously designed commercial engines.

Note that in the remainder of this application particular attention will be placed upon internal combustion engines for use in automobiles, trucks and other vehicular uses. It is important to realize that internal combustion engines are utilized in a wide range of other applications and that the present invention is versatile enough to be utilized in a myriad of applications. This includes small appliance applications, such as portable generators, power washers, compressors and lawn mowers, for example. Additionally, the present invention may be useful in association with industrial applications, such as manufacturing equipment and construction machinery, for example. It is thus intended that the present invention is usable in conjunction with any internal combustion engine regardless of eventual use or application.

Most internal combustion engines are arranged to vary the amount of air and/or fuel that is delivered to the cylinders (or other working chambers) based on the engine output that is requested by the user or otherwise required at any given time. However, the thermodynamic efficiency of a fixed size cylinder is not the same at every air and fuel level. Rather, the thermodynamic efficiency is best when an optimal amount of air and fuel is delivered to the cylinder to achieve maximum permissible compression and optimal combustion efficiency. Since internal combustion engines need to be able to operate under a wide variety of different loads, the net result is that the engines tend to operate at lower than optimal compression or air/fuel ratios and therefore inefficiently much of the time.

From a theoretical standpoint, the thermodynamic efficiency of an internal combustion engine may be improved by only firing a portion of the available chambers at their optimal efficiency and effectively "shutting down" the remaining chambers. For example, if at a given time, an engine requires 25% of the power that would be outputted by running all of its cylinders at their maximum compression and an optimized air/fuel ratio, then that power may most efficiently be generated by operating 25% of the engine's working chambers at their optimal efficiency while not fueling the remaining 75% of the chambers. Thus, in an exemplary eight cylinder engine, two of the cylinders may be operational at an optimal efficiency and the remaining six cylinders may be left as non operational. This is referred to as variable displacement.

The present application describes a number of engine designs and control arrangements for effectively controlling the operation of an engine in manners that permit some of the engine working chambers to operate at or near their maximum efficiency while effectively shutting down some of the remaining chambers. The various described embodiments include implementations that are well suited for use in: 1) retrofitting existing engines; 2) new engines based on current designs; and/or 3) new engine designs that incorporate other developments or are optimized to enhance the benefits of the described variable displacement.

Improving the thermodynamic efficiency of the engine using the described approaches may significantly improve the fuel efficiency of internal combustion engines. The fuel efficiency of the existing fleet of fuel injected automotive gas engines on the road today may have their fuel efficiency greatly improved by installing a fuel co-processor that implements the described methods and cooperates with the car's existing engine control unit (ECU), or by replacing the ECU with an ECU that implements the described methods. More dramatic improvements may be possible in applications where it is possible to control the fuel injection profile and/or to provide turbocharged (or supercharged) air flow (which is possible in some vehicles currently on the road) and in applications where the engine and its controller (or a fuel co-processor) are specifically designed to utilize the described techniques.

The ability to closely control the operational conditions within an engine's cylinders (or other working chambers) also opens up the possibilities of utilizing different fuels and/or fuel compositions in traditional internal combustion engines that are not practical today due to the need to operate the cylinders under widely varying loads. Operating the cylinders at their optimum efficiency also has the potential benefit of reducing the overall level of emissions of reactive species, such as nitric oxides ($NO_x$), and other pollutants generated during operation of the engine.

Below are provided a number of examples of working chamber permutations under a variety of desired output conditions. For the sake of clarity, multiple subsections with corresponding headings are provided. These subsections are provided solely in the interest of clarity and are not intended to limit the present invention in any manner.

I. System and Methods for Engine Control

A. Engine Efficiency Improvement System

FIG. 1A provides a structural block diagram for an example of an Engine Efficiency Improvement System 100A. Portions of the Engine Efficiency Improvement System 100A may be preexisting components found within current vehicle engines. For Example, most vehicles include an Engine Control Unit 120 and a Fuel Injector Driver 130. Additionally, most engines include means for generating Engine Sensory Data 102 and Driver Input 104. Thus, for many current engines, an aftermarket system including the Fuel Processor 110 and the Multiplexer 140 may be installed which compliments the existing Engine Control Unit 120 of the vehicle. This design is particularly well adapted for retrofitting existing engines to incorporate the described continuously variable displacement operating mode.

The described control may be implemented in a wide variety of different manners. It may be accomplished using digital logic, analog logic, algorithmically or in any other appropriate manner. In some embodiments, the continuously variable control logic will be build into the Engine Control Unit 120 (ECU, sometimes also referred to as an ECM, engine control module). In other embodiments, continuously variable displacement mode control logic may be built into the Fuel Processor 110 that is arranged to work in conjunction with an existing Engine Control Unit 120.

Figure 1B:
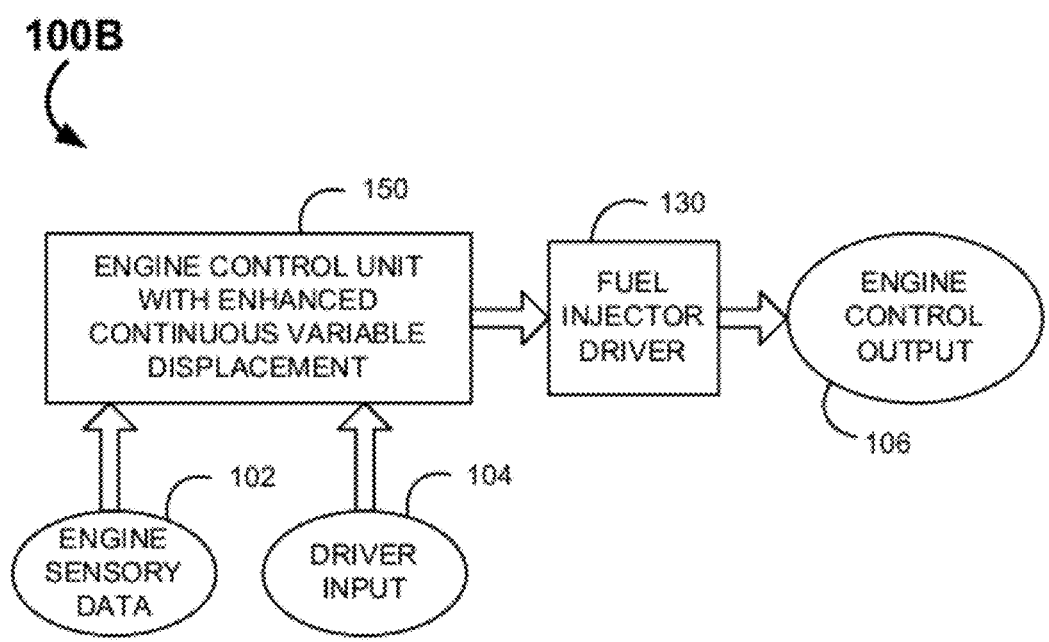
FIG. 1B is a structural block diagram for a second example of an engine efficiency improvement system in accordance with an embodiment of the present invention.

It is anticipated that as the technology develops, the continuously variable displacement mode control logic will be integrated into the engine control units that are provided with new vehicles or engines, as illustrated at FIG. 1B. This is particularly beneficial because it allows the ECU to readily take advantage of all of the features of the engine that are available to improve engine performance using the continuously variable displacement mode.

New ECUs that incorporate the continuously variable displacement mode may also be developed for vehicles that are on the road today (and for other existing engines and/or engine designs). When such ECUs are developed, the existing engines may readily be retrofitted by simply replacing the existing ECU with an improved ECU that incorporates the variable displacement mode.

Alternatively, as will be appreciated by those familiar with current automotive engine control design, the engine control units in most late model automobiles are arranged such that third party devices may interface with the engine control unit. These interfaces are often provided, at least in part, to facilitate engine diagnostics; however, a variety of third parties products such as turbochargers, superchargers, etc., include control co-processors that have been designed to utilize such interfaces to work with the engines without voiding the manufacturer's warranty. These interfaces may be used advantageously to allow a low cost fuel co-processor that incorporates the continuously variable control logic to be installed as a retrofit to greatly improve the fuel efficiency of cars on the road today.

When a new vehicle is designed, the entire Engine Efficiency Improvement System 100A may be installed. Here the Engine Control Unit 120 and the Fuel Processor 110 may be separate processing devices, or there may be an integrated ECU, as described in FIG. 1B, which incorporates the functionalities of the Engine Control Unit 120 and Fuel Processor 110 in an Engine Control Unit with Enhanced Continuous Variable Displacement 150.

The Engine Sensory Data 102 and Driver Input 104 are provided to the Engine Control Unit 120 and Fuel Processor 110 for determining the eventual desired Engine Control Output 106. Engine Sensory Data 102 may include such little information as engine speed, or may include a much wider set of information such as current variable displacement mode (i.e. number of current operational chambers), vehicle weight, slope that the vehicle is on, towing load, road friction resistance, operational information and other relevant vehicle information. Likewise, the Driver Input 104 may include such little information as the accelerator pedal's position, or may include much more information such as brake pedal position, overdrive selection, steering wheel position, driver grip strength on the steering wheel, or any other information on the driver's intent and desires.

The Engine Control Unit 120 often includes look up tables for the fuel injection driver. As will be appreciated by those familiar with the art, the designs of the existing ECUs and their respective interfaces vary significantly and accordingly, the Fuel Processor 110 may be adapted and designed to work with the particular ECU provided for the engine. Most late model automotive engine control units (ECUs) have external interfaces that permit third party devices to interact with the ECU. Often, this interface takes the form of a diagnostic interface. In some embodiments, the Fuel Processor 110 communicates with the Engine Control Unit 120 through the diagnostic interface.

When operating in a continuously variable displacement mode, the Fuel Processor 110 overrides the throttle and fuel injection level instructions calculated by the Engine Control Unit 120 and instead orders the firings and throttle positions determined to be appropriate by the Fuel Processor 110. The Fuel Processor 110 also overrides other inputs (such as the oxygen sensor input) as appropriate to insure that the rest of the engine's systems run correctly.

In this embodiment, the Fuel Processor 110 and the Engine Control Unit 120 include and/or are coupled to a Fuel Injector Driver 130 for each of the fuel injectors so that the Fuel Processor 110 itself may drive the fuel injectors. Thus, the Engine Control Unit 120 and the Fuel Processor 110 operate in parallel, with each receiving inputs (i.e., Engine Sensory Data 102 and Driver Input 104) and both determining the appropriate engine control, which are fed to a Multiplexer 140. When the engine is operating in the continuously variable displacement mode, the Multiplexer 140 is directed to only deliver the signals received from the Fuel Processor 110 to the fuel injectors (and any other components controlled by the fuel co-processor). Any time the engine is taken out of the variable displacement mode, the Multiplexer 140 is directed to only deliver the signals received from the Engine Control Unit 120 to the fuel injectors (and other components). Any components that are controlled by the Engine Control Unit 120 in both the normal and variable displacement operating modes are always controlled directly by the Engine Control Unit 120.

The resulting signal from the Multiplexer 140 may include the Engine Control Output 106. This Engine Control Output 106 may include throttle control information, valve control information, firing timing control and other information such as oxygen sensor input overrides.

In FIG. 1B, a single ECU with enhanced continuous variable displacement 150 is illustrated. This Enhanced ECU receives the Engine Sensory Data 102 and Driver input 104 to generate a wide range of output, including firing timing, throttle control, fuel injection control and variable cylinder controls. The Enhanced ECU 150 may couple to the Fuel injection Driver 130 and produce final Engine Control Output 106.

Although specific wirings of the fuel co-processor are illustrated in FIG. 1A, it should be appreciated that a wide variety of other wirings and/or couplings may be utilized. For example, in some cases only a portion of input signals may be delivered to the Fuel Processor 110, since some of the input signals may not be relevant to the operation of the Fuel Processor 110. Additionally or alternatively, input signals that are intended to be modified by the Fuel Processor 110 may be wired to first be input to the Fuel Processor 110 and then a (potentially) modified signal may be fed from the Fuel Processor 110 to the Engine Control Unit 120. That is, the Fuel Processor 110 may intercept some or all of the input signals and modify some of those signals as appropriate prior to their delivery to the Engine Control Unit 120.

In still other embodiments, some or all of the output lines may be connected to the Fuel Processor 110 rather than the Engine Control Unit 120. This is particularly appropriate in implementations in which the Fuel Processor 110 is designed to determine the firing pattern in all operations of the engine.

B. Fuel Processor

Figure 2A:
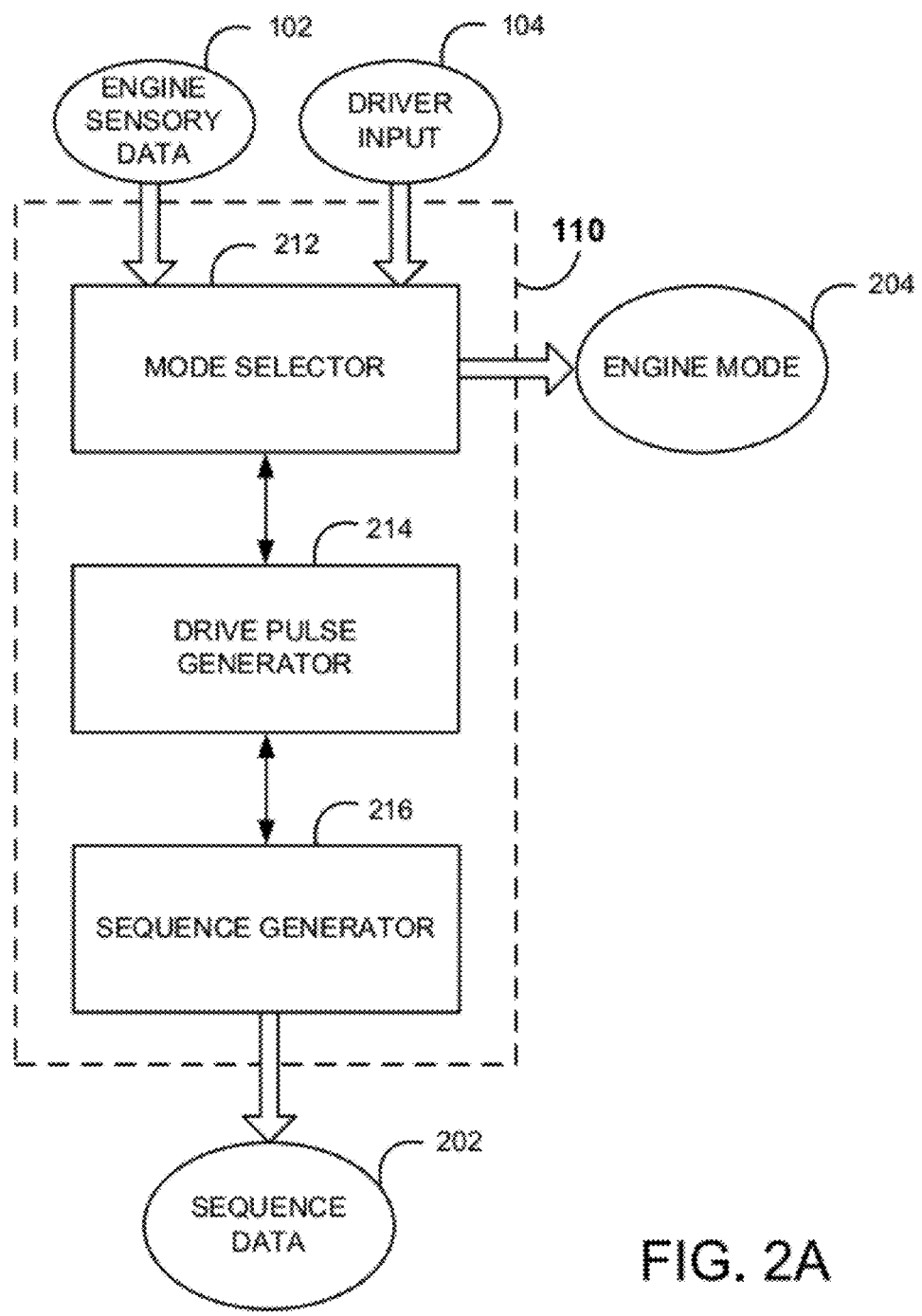
FIG. 2A is a structural block diagram for an example of a fuel processor of the engine efficiency improvement system in accordance with an embodiment of the present invention.

FIG. 2A is a structural block diagram for an example of the Fuel Processor 110 of the Engine Efficiency Improvement System 100A. In the illustrated embodiment, the Fuel Processor 110 includes a Mode Selector 212, a Drive Pulse Generator 214 and a Sequence Generator 216. The Engine Sensory Data 102 and the Driver Input 104 may be seen provided to the Mode Selector 212.

The Mode Selector 212 may be arranged to use adaptive predictive control to dynamically calculate a multi-bit output which corresponds to a particular engine mode. For example, a three bit output may be utilized to designate the various modes in an 8 cylinder engine. Thus, an output of 001 may correspond to a 2 cylinder variable displacement mode setting. An output of 011 may correspond to three working cylinders, and so on. Thus, the mode selectors may drive the engine to shut down some of the cylinders when they are not required for power output.

The Drive Pulse Generator 214 may be arranged to use adaptive predictive control to dynamically calculate a drive pulse signal that generally indicates when cylinder firings are required to obtain the desired output. As will be discussed in more detail below, the controller may be synchronized with the engine speed (part of Engine Sensory Data 102) so that the generated drive pulse pattern is appropriate to deliver the power desired at the current engine speed, which may be constantly changing. The drive pulse signal may then be provided to a Sequence Generator 216 that orders the pulses to provide the final Sequence Data 202. Generally, the Sequence Generator 216 may be arranged to order the firing pattern in a manner that helps prevent excessive or inappropriate vibration within the engine. As is well known in the engine design field, the order that cylinders are fired may have a significant effect on vibrations within many engines. Therefore, as will be described in more detail below, the Sequence Generator 216 is designed to help insure that vibrations generated by the operation of the engine are within design tolerances. If a particular engine is enabled to be run using an arbitrary firing pattern (i.e., the cylinders may be fired in any pattern without generating undue vibrations), then the sequencer may potentially be eliminated and the Drive Pulse Generator 214 could be used to dictate the firing pattern.

In a first implementation, each cylinder that is fired is operated at or near its optimal thermodynamic efficiency. That is, air and fuel are introduced into the cylinder in amounts that allow the most work to be obtained from the cylinders per unit of fuel burnt while still meeting other constraints on the engine (such as emissions requirements, the effects of the combustion on engine life, etc.). In most throttled engines, this corresponds approximately to a "full throttle" position, which permits the most air to be introduced to the cylinder. Many vehicles include engine control units (ECUs) that determine (among many other things) the desired air/fuel ratios and the amount of fuel to be injected for each cylinder firing. Often the ECUs have lookup tables that identify the desired air fuel ratios and/or fuel injection amounts for a number of different operating conditions (e.g., different throttle positions, engine speeds, manifold air flow, etc.) based on various current ambient conditions (including air pressure, temperature, humidity, etc.). In such vehicles, the amount of fuel that the firing control unit causes to be injected into each cylinder in the continuously variable displacement mode may be the value stored in the fuel injection lookup table for operating the cylinder at full throttle under the current conditions.

The Driver Input 104 may come from any suitable source that may be considered a reasonable proxy for a desired engine output. For example, the input signal may simply be a signal indicative of accelerator pedal position taken directly or indirectly from an accelerator pedal position sensor. Alternatively, in vehicles that do not have electronic accelerator position sensors but have a throttle, a signal indicative of desired throttle position may be used in place of the accelerator position signal. In vehicles that have a cruise control feature, the Driver Input 104 may come from a cruise controller. In still other embodiments, the Driver Input 104 may be a function of several variables in addition to accelerator position. In other engines, that have fixed operational states, the Driver Input 104 may be set based on a particular operational setting. In general, the desired output signal found in the Driver Input 104 may come from any suitable source that is available in the vehicle or engine being controlled.

The Drive Pulse Generator 214 is generally arranged to determine the number and general timing of cylinder firings that are required to generate the desired output given the current operating state and operating conditions of the engine. The Drive Pulse Generator 214 uses feedback control, such as adaptive predictive control to determine when cylinders must be fired to deliver the desired engine output. Thus, the drive pulse signal outputted by the Drive Pulse Generator 214 effectively indicates the instantaneous displacement required by the engine to deliver the desired engine output. The displacement required by the engine will vary with operating conditions and may be based on both what has happened in the past and what is predicted for the immediate future. In various embodiments, the Drive Pulse Generator 214 is generally not constrained to limit fluctuations in the number of cylinder firings that are required per revolution of the crankshaft to deliver the desired output. Thus, the effective displacement of the engine may be continuously varied by selecting which cylinders to fire and which cylinders not to fire, on a firing opportunity by firing opportunity basis. This is very different than conventional commercially available variable displacement engines where rapid fluctuations between different displacements, and particularly different cylinder firing patterns, are considered undesirable (see, e.g., U.S. Pat. No. 5,408,974). This ability to continuously vary the effective displacement of the engine is sometimes referred to herein as a continuously variable displacement mode of operation.

A variety of different control schemes may be implemented within the Drive Pulse Generator 214. Generally, the control schemes may be implemented digitally, algorithmically, using analog components or using hybrid approaches. The drive pulse generator may be implemented on a processor, on programmable logic such as an FPGA, in circuitry such as an ASIC, on a digital signal processor (DSP), using analog components, etc.

One class of controllers that is particularly well suited for use in the drive pulse generator is adaptive predictive controllers. As will be appreciated by those familiar with control theory, adaptive predictive controllers are adaptive in that they utilize feedback to adapt or change the nature of their output signal based on the variance of the output signal from a desired output signal and predictive in that they are integrative so that past behavior of the input signal affects future output signals.

A variety of different adaptive predictive controllers may be used to calculate the chamber firings required to provide the desired output. One class of adaptive predictive controllers that work particularly well in this application is sigma delta controllers. The sigma delta controller may utilize sample data sigma delta, continuous time sigma delta, algorithm based sigma delta, differential sigma delta, hybrid analog/digital sigma delta arrangements, or any other suitable sigma delta implementation. In some embodiments, the sigma delta controller's clock signal is arranged to vary proportionally with the engine speed. In other implementations, a variety of other adaptive predictive controllers including pulse width modulation (PWM), least means square (LMS) and recursive least square (RLS) controllers may be used to dynamically calculate the required chamber firings.

The Drive Pulse Generator 214 preferably uses feedback control in determining when drive pulses are appropriate to deliver the desired engine output. Components of the feedback may include feedback of the drive pulse signal and/or feedback of the actual cylinder firing pattern. Since the drive pulse signal indicates when working chamber firings are appropriate, it may generally be thought of as a signal indicative of requested firings. The Sequence Generator 216 then determines the actual timing of the requested firings. When desired, the information fed back from the actual firing pattern may include information indicative of the firing pattern itself, the timing of the firings, the scale of the firings and/or any other information about the cylinder firings that is desired by or useful to the Drive Pulse Generator 214. Generally, it is also desirable to provide the Drive Pulse Generator 214 with an indication of the engine speed (included in the Engine Sensory Data 102) so that the drive pulse signal may generally be synchronized with the engine.

Various feedbacks may also be provided to the Sequence Generator 216 as desired. For example, feedback or memory indicative of actual firing timing and/or pattern may be useful to the Sequence Generator 216 to allow it to sequence the actual cylinder firings in a manner that helps reduce engine vibrations.

Figure 2B:
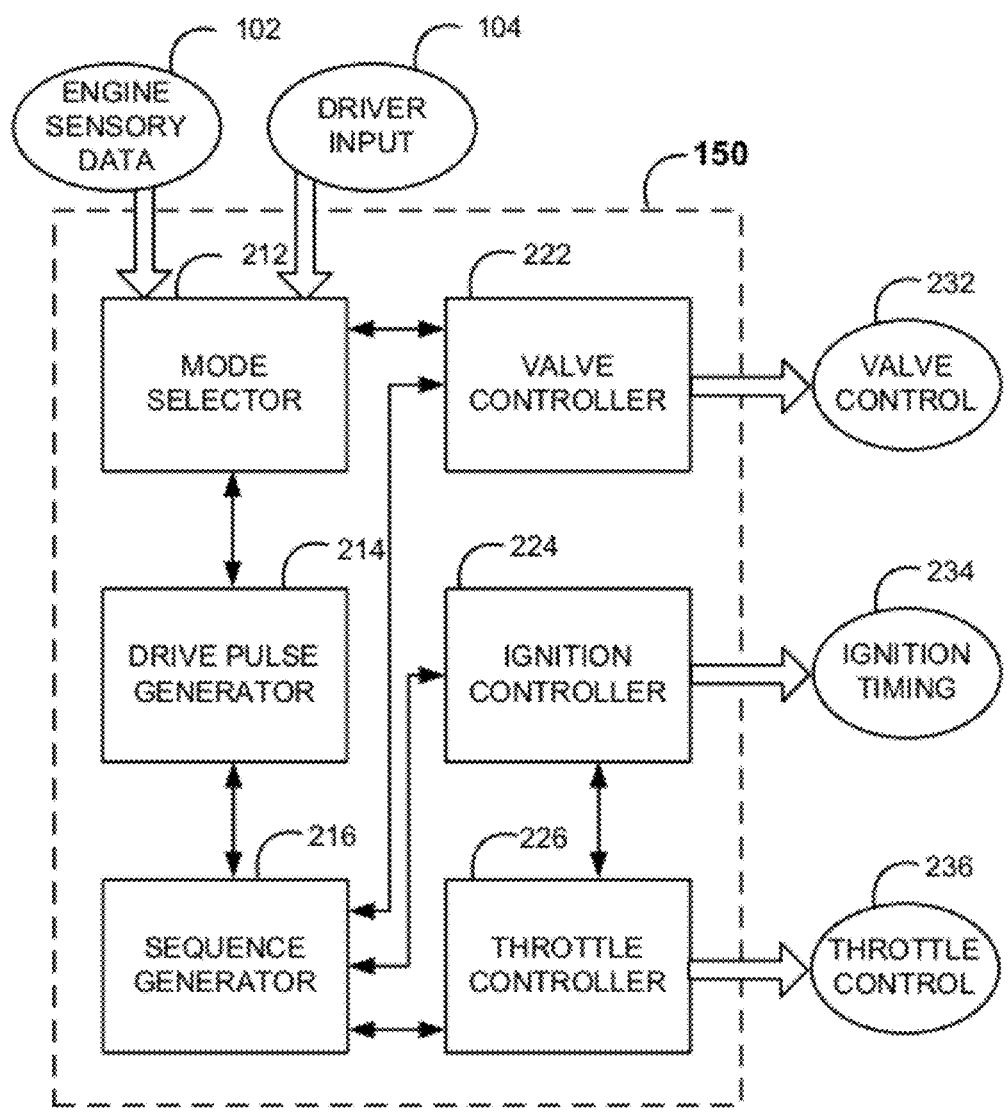
FIG. 2B is a structural block diagram for an example of an ECU with enhanced variable displacement control in accordance with an embodiment of the present invention.

FIG. 2B is an example of an Enhanced ECU 150 which is a combined ECU including the abilities of a fuel co-processor. Like the above described Fuel Co Processor 110, the Enhanced ECU 150 receives Engine Sensory Data 102 and Driver input 104. A Mode Selector 212 uses the information to generate a multi-bit mode selection output. The Mode Selector may utilize adaptive predictive programming as well as engine feedback in determination of mode type desired. The mode selection may be provided to the Valve Controller 222 to determine which cylinder valves are to be shut, thereby "deactivating" particular cylinders. Deactivated cylinders may act as air springs, thereby providing very little impact upon the fuel efficiency of the engine. Additional Valve Control Data 232 may be generated by the Valve Controller 222 to ensure proper air mixing ratios in response to oxygen sensor feedback.

The Drive Pulse Generator 214, as described above in great detail may produce pulse signals for desired cylinder firing. These signals may be utilized by the Sequence Generator 216 for generation of firing sequences. The Drive Pulse Generator 214 output may be a digital, single bit output. As discussed above, the Drive Pulse Generator 214 may utilize adaptive predictive control logic and engine feedback in the generation of the pulse signals.

The Sequence Generator 216 is also known as a "Sequencer". The Sequence Generator 216 may use the generated single bit output from the Drive Pulse Generator 214 and compare it to the firing opportunities of the engine given the engine's speed. A final firing sequence may then be generated and provided to the Ignition Controller 224. The Ignition Controller may use the firing sequence to generate Ignition timing Data 234.

A Throttle Controller 226 may utilize data regarding to firing sequences, mode selection and desired output to drive the throttle of the engine. In some embodiments, the Throttle Control 236 may be substantially un-throttled for all working cylinders, and closed throttle for skip fire and deactivated cylinders. However, in some alternate embodiments it may be required to partially throttle cylinders at some periods where a conventional engine operation is desired (such as at idle and extremely low loads).

Figure 3A:
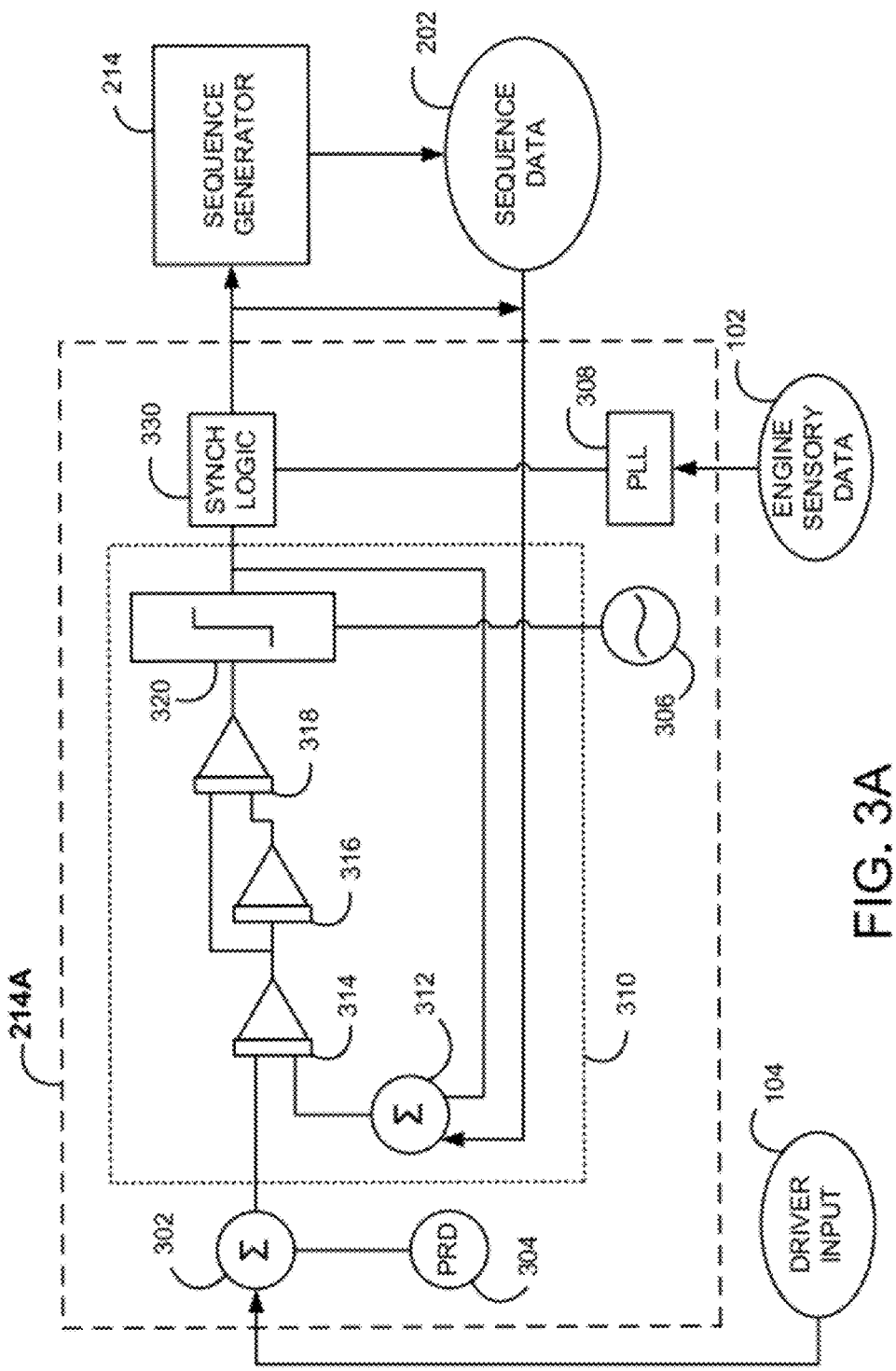
FIG. 3A is a structural block diagram for a first example embodiment of a drive pulse generator for the fuel processor of the engine efficiency improvement system in accordance with an embodiment of the present invention.

FIG. 3A is a structural block diagram for a first example embodiment of a sigma-delta control based Drive Pulse Generator 214A for the Fuel Processor 110. The Drive Pulse Generator 214 includes a sigma-delta controller 310 and a synchronizer. The sigma-delta controller 310 utilizes principles of sigma-delta conversion, which is a type of oversampled conversion. (Sigma-delta conversion is also referred to as delta-sigma conversion.) The basic theory of sigma-delta conversion has been described in what is commonly referred to as a seminal reference on the subject: H. Inose, Y. Yasuda, and J. Murakami, "A Telemetering System by Code Modulation: Δ-Σ Modulation," IRE Transactions on Space Electronics Telemetry, Vol. SET-8, September 1962, pp. 204-209. Reprinted in N. S. Jayant, Waveform Quantization and Coding, IEEE Press and John Wiley, 1976, ISBN 0-471-01970-4.

The illustrated sigma-delta control circuit 310 is an analog third order sigma-delta circuit generally based on an architecture known as the Richie architecture. Sigma-delta control circuit 310 receives an analog input signal that is indicative of a desired output (which might be thought of as desired work output or desired torque). Since sigma-delta controllers of the type illustrated are generally known and understood, the following description sets forth the general architecture of a suitable controller. However, it should be appreciated that there are a wide variety of different sigma-delta controllers that may be configured to work very well for a particular implementation.

In the illustrated embodiment, the Driver Input 104 may be indicative of accelerator pedal position (although as described above, other suitable input signals indicative of, or proxies for, desired output may be used as well). The input signal is provided as a positive input to the sigma-delta control circuit 310, and particularly to a first integrator 314. The negative input of the integrator 314 is configured to receive a feedback signal that is a function of the output such that the operation of the sigma delta control circuit 310 is adaptive. As will be described later, the feedback signal may actually be a composite signal that is based on more than one output stage. The integrator 314 may also receive other inputs such as dither signal 304 which also will be described in more detail below. In various implementations, some of the inputs to integrator 314 may be combined prior to their delivery to the integrator 314 or multiple inputs may be made directly to the integrator. In the illustrated embodiment, the dither signal 304 is combined with the input signal by an adder 1202 and the combined signal is used as the positive input. The feedback signal is a combination of feedback from the output of the sigma delta control circuit and the controlled system.

The sigma delta control circuit 310 includes two additional integrators, integrator 316 and integrator 318. The "order" of the sigma delta control circuit 310 is three, which corresponds to the number of its integrators (i.e., integrators 314, 316 and 318). The output of the first integrator 314 is fed to the second integrator 316 and is also fed forward to the third integrator 318.

The output of the last integrator 318 is provided to a comparator 320 that acts as a one-bit quantizer. The comparator 320 provides a one-bit output signal that is synchronous with a clock signal. Generally, in order to insure very high quality control, it is desirable that the clock signal (and thus the output stream of the comparator) have a frequency that is many times the maximum expected firing opportunity rate. For analog sigma delta control circuits, it is typically desirable for the output of the comparator to oversample the desired drive pulse rate by a factor of at least about 10 and oversampling factors on the order of at least about 100 work particularly well. That is, the output of the comparator 320 is preferably at a rate of at least 10 times and often at least 100 times the rate at which engine firing opportunities occur. The clock signal provided to the comparator 320 may come from any suitable source. For example, the clock signal is provided by a crystal oscillator 306.

It should be appreciated that these clock rates are actually relatively slow for modern digital electronic systems and are therefore readily obtainable and usable. For example, if the controlled engine is an eight-cylinder engine that operates using a four stroke working cycle, then the maximum firing opportunity rate expected might be something on the order of 8,000 RPM×8 cylinders×½. The factor of ½ is provided because, in a normally-operating four-cycle engine, each cylinder has a firing opportunity only once every two revolutions of the engine crankshaft. Thus, the maximum expected frequency of firing opportunities may be approximately 32,000 per minute, or about 533 per second. In this case, a clock operating at about 50 kHz would have nearly 100 times the maximum expected rate of firing opportunities. Therefore, a fixed clock having a clock frequency of 50 kHz or greater would work very well in that application.

In other embodiments, the clock used to drive the comparator may be a variable clock that varies proportionally with engine speed. It is believed that the use of a variable speed clock in a sigma delta controller is different than conventional sigma delta controller design. The use of a variable speed clock has the advantage of insuring that the output of the comparator is better synchronized with the engine speed and thus the firing opportunities. The clock may readily be synchronized with the engine speed by utilizing a phase lock loop that is driven by an indication of engine speed (e.g., a tachometer signal).

The one-bit output signal outputted from the comparator 320 is generated by comparing the output of the integrator 318 with a reference voltage. The output is effectively a string of ones and zeros that is outputted at the frequency of the clock. The output of the comparator 320 (which is the output of the sigma delta control circuit 310 is provided to a synchronizer that is arranged to generate the drive pulse signal. In the illustrated embodiment, the sigma delta control circuit 310 and the synchronizer together constitute a drive pulse generator 214A.

The synchronizer is generally arranged to determine when drive pulses should be outputted. The drive pulses are preferably arranged to match the frequency of the firing opportunities so that each drive pulse generally indicates whether or not a particular working cycle of a working chamber should be exercised. In order to synchronize the drive pulse signal with the engine speed, the synchronizer operates using a variable clock signal that is based on engine speed from the Engine Sensory Data 102. A phase-locked loop 1208 may be provided to synchronize the clock with the engine speed. Preferably, the clock signal has a frequency equal to the desired frequency of the outputted drive pulse signal. That is, it is preferably synchronized to match the rate of firing opportunities.

The output signal of the sigma-delta control circuit is generally a digital representation of the analog input signal that is received by the sigma-delta control circuit 310. Because (a) the input signal is effectively treated as a desired output, or a desired work output, and (b) the combustion within the working chambers is controlled such that a generally known and relatively constant amount of work is produced by each engine firing, when the digital output signal from the sigma delta control circuit 310 contains a certain number of "high" symbols, it is appropriate to generate a positive drive pulse (i.e., to order the firing of a working chamber). Thus, conceptually, a purpose of the synchronizer may be thought of as being to count the number of high symbols in the output signal and when enough symbols are counted, sending a drive pulse that is synchronized with the engine speed. In practice, true counting is not actually required (although it may be done in some implementations). Additionally, the number of chambers utilized for a desired application may be calculated from the number of "high" symbols generated over a set period of time.

Another characteristic of the output of the described sigma-delta control circuit with a high oversampling rate when used in this type of engine control application is that the controller tends to emit long blocks of high signals followed by blocks of low signals. This characteristic of the output signal may be used to simplify the design of the synchronizer. In one implementation, the synchronizer merely measures the length (i.e., time or period) of the blocks of high signals emitted in output signal. If the length of the block of high signals exceeds a designated threshold, a drive pulse is generated. If the length of a block of high signals doesn't exceed the threshold—no drive pulses are generated based on that block of high signals. The actual thresholds that are used may be widely varied to meet the needs of a particular design. For example, in some designs the threshold may be the period of the clock signal which (since the clock is synchronized with the engine speed) corresponds to the duty cycle of the drive pulse pattern and the average delay between working chamber firing opportunities. With this arrangement, if the length of a block of high signals is less than one duty cycle, no drive pulses are generated corresponding to the block; if the length of the block exceeds one duty cycle and is less than two duty cycles, then one drive pulse is generated; if it exceeds two duty cycles but is less than three duty cycles, then two sequential drive pulses are generated; and so on.

It should be appreciated that with this arrangement, the "length" or time duration of a burst of high outputs from the sigma-delta control circuit will have to be longer in order to trigger a drive pulse when the engine speed is low than the length of a burst would need to be in order to trigger a drive pulse when the engine speed is high. That is because the duty cycle of the drive pulse signal is longer at lower engine speeds.

In other implementations, the threshold may be set differently. For example, the thresholds might be set such that any block of high outputs having a length that exceeds some designated percentage (e.g., 80 or 90 percent) of the duty cycle of the drive pulse signal causes a drive pulse to be generated, while shorter pulse lengths are effectively truncated.

At first review it may seem that ignoring portions of pulses in the manner suggested above could degrade the performance of the control system to an unacceptable level. However, for many engines, the high frequency of the firing opportunities and the responsiveness of the control system in general make it perfectly acceptable to use such simple synchronizers. Of course, it should be appreciated that a wide variety of other synchronization schemes may be used as well.

It should be appreciated that although the comparator output, the drive pulse signal and the actual firing pattern are all related, their timing will vary and the general magnitude of the comparator output may differ from the others. The most accurate feedback in terms of reflecting actual engine behavior is the firing pattern; however, there may be significant time delays (from the standpoint of the sigma-delta control circuit 310) between the output of the comparator and the actual firing of a working chamber. The next best feedback in terms of reflecting actual engine behavior is the drive pulse signal. Thus, in many implementations it will be desirable to heavily weight the feedback towards the drive pulse signal and/or the firing pattern. However, in practice, the performance of the sigma delta controller may often be enhanced by feeding back some portion of the comparator output signal.

In some embodiments, it may be desirable to anti-aliasing filter the input signal and the feedback signal. The anti-aliasing functionality may be provided as part of the sigma-delta control circuit 310 or it may be provided as an anti-aliasing filter that precedes the sigma delta control circuit or it may be provided in any other suitable form. In the third order analog continuous time sigma-delta control circuit 310 illustrated in FIG. 3A, the first integrator 314 may provide the anti-aliasing functionality. That is, it effectively acts as a low pass filter.

Another known characteristic of sigma delta controllers is that they sometimes generate "tones" which are cyclic variations in the output signal relative to the input signal. Such tones are particularly noticeable when the analog input signal varies slowly, which is often the case when driving and in many other engine control applications. The presence of such tones within the comparator output signal may be reflected in the engine firing pattern. In some situations, there is a risk that such cyclic variations in the drive pattern may generate undesirable resonances within the engine which may generate undesirable vibration patterns. In extreme cases, the tones could even be manifested as a noticeable fluctuation in drive energy. Accordingly, various arrangements may be provided in an effort to help prevent and/or break up such tones. One option that may help prevent and/or break up tones in the sigma-delta controller output is to combine the input signal with a noise signal ("dither") that averages to zero over time, but whose local variations tend to break up the tones in the output signal of the sigma delta controller. A pseudo-random dither generator (PRD) 304 may be employed to generate the dither signal, but it should be appreciated that dither may be introduced using a wide variety of other approaches as well.

The output of the synchronizer is the drive pulse signal discussed above. The drive pulse signal effectively identifies the cylinder firings (or instantaneous effective engine displacement) that is needed to provide the desired engine output. That is, the drive pulse signal provides a pattern of pulses that generally indicates when cylinder firings are appropriate to provide the desired or requested engine output. In theory, the cylinders could be fired directly using the timing of the drive pulse signal outputted by the synchronizer. However, in many cases it will not be prudent to fire the cylinder using exactly the same timing as pulse pattern because this could generate undesirable vibrations within the engine. Accordingly, the drive pulse signal may be provided to the Sequence Generator 216 which determines an appropriate firing pattern. The Sequence Generator 216 is arranged to distribute the cylinder firings called for in a manner that permits the engine to run smoothly without generating excessive vibrations.

In still other embodiments, differential sigma delta controllers may be used. In such embodiments, the synchronizer may be arranged to generate drive pulse patterns based on the differential signals outputted by the sigma delta controller. A wide variety of different differential sigma delta controllers may be used and generally they may include the variable clock and/or multi-bit comparator output features discussed above when desired. One advantage of differential sigma delta controllers is that they may often be configured to provide even smoother performance than a corresponding non-differential sigma delta controller.

Figure 3B:
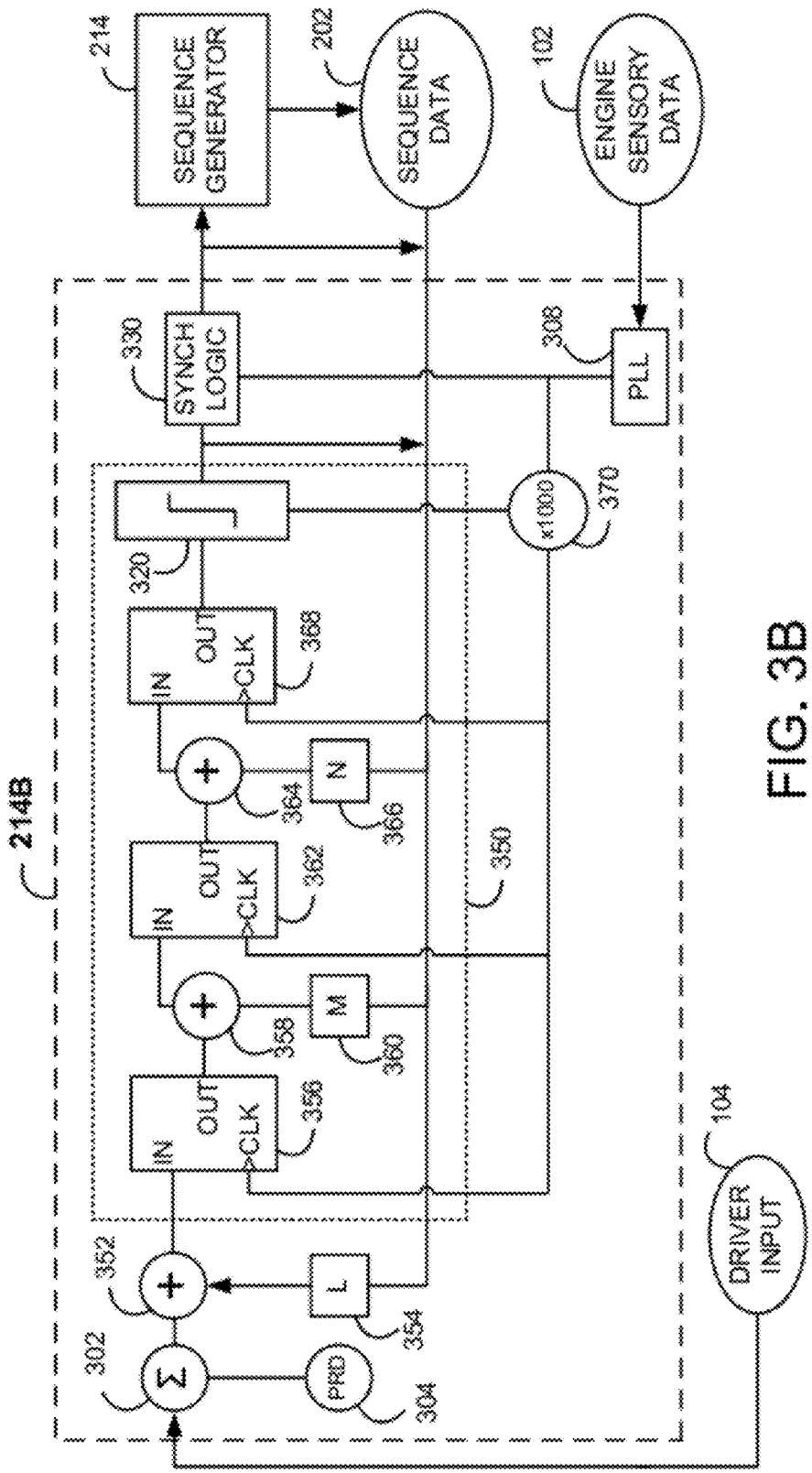
FIG. 3B is a structural block diagram for a second example embodiment of a drive pulse generator for the fuel processor of the engine efficiency improvement system in accordance with an embodiment of the present invention.

FIG. 3B is a structural block diagram for a second example embodiment of a Drive Pulse Generator 214B for the Fuel Processor 110. The Drive Pulse Generator 214B illustrated includes a digital third order sigma delta control circuit 350. In this embodiment, accelerator pedal position indicator signal (as part of Driver Input 104) is inputted to a first digital integrator 356. The output of the first digital integrator 356 is fed to a second digital integrator 362 and the output of the second digital integrator 362 is feed to a third digital integrator 368. The output of the third digital integrator 368 is fed to a comparator 320 that may be arranged to operate in the same manner as either the single bit or multi-bit comparators described above with respect to the analog sigma delta circuits. In the embodiment illustrated in this example, the first digital integrator 356 effectively functions as an anti-aliasing filter.

Negative feedback is provided to each of the three digital integrator stages 356, 362 and 368. The feedback may come from any one or any combination of the output of the comparator 320, the output of the synchronizer logic or the output of the Sequence Generator 216. Each stage feedback has a multiplication factor (354, 360 and 366) of L, M, and N respectively.

Like the analog sigma delta control circuit described above, the primary input to the digital sigma delta control circuit may be an indication of the accelerator position or any other suitable proxy for desired output (from Driver Input 104). As previously described, the desired output signal is combined with pseudo random dither signal 304 in the illustrated embodiment in order to reduce the possibility of generating undesirable tones.

The primary difference between analog and digital operation is that the integrators in analog sigma delta are continuously active, whereas the digital integrators are only active at the beginning of each clock cycle. In some implementations, it may be desirable to run the clock at a very high speed. However, that is not a requirement. Since the output that is ultimately desired has a frequency that is equal to the firing opportunities that are being controlled, the clock may be synchronized with the firing opportunities which may eliminate the need for (or simplify the function of) the synchronizer and/or the Sequence Generator 216. Thus, when a digital controller is used, the controller design may be simplified by running the clock at the frequency of the firing opportunities being controlled.

Although analog and digital controllers have been described, it should be appreciated that in other implementations, it may be desirable to provide hybrid analog/digital sigma delta controllers. In a hybrid analog/digital controller, some of the stages of the sigma delta controller may be formed from analog components, while others may be formed from digital components. One example of a hybrid analog/digital sigma delta controller utilizes an analog integrator 314 as the first stage of the controller, in place of the first digital integrator 356. The second and third integrators are then formed from digital components. Of course, in other embodiments, different numbers of stages may be used and the relative number of analog vs. digital integrators may be varied. In still other embodiments, digital or hybrid differential sigma delta controllers may be used.

C. Efficiency Overview

To help appreciate the efficiency gains that may be attained using the described approach, it is helpful to consider the efficiency of a typical internal combustion engine. For the purpose of this illustration we may discuss an Otto cycle engine (which is the engine type used in most passenger cars on the road today). However, the advantages of the present invention are equally relevant to a wide variety of other internal combustion engines, including engines that operate using a Diesel cycle, a Dual cycle, an Atkins cycle, a Miller cycle, two stroke spark ignition (SI) engine cycles, two stroke compression ignition (CI) engines, hybrid engines, radial engines, mixed cycle engines, Wankel engines, and other types of rotary engines, etc.

Figure 4A:
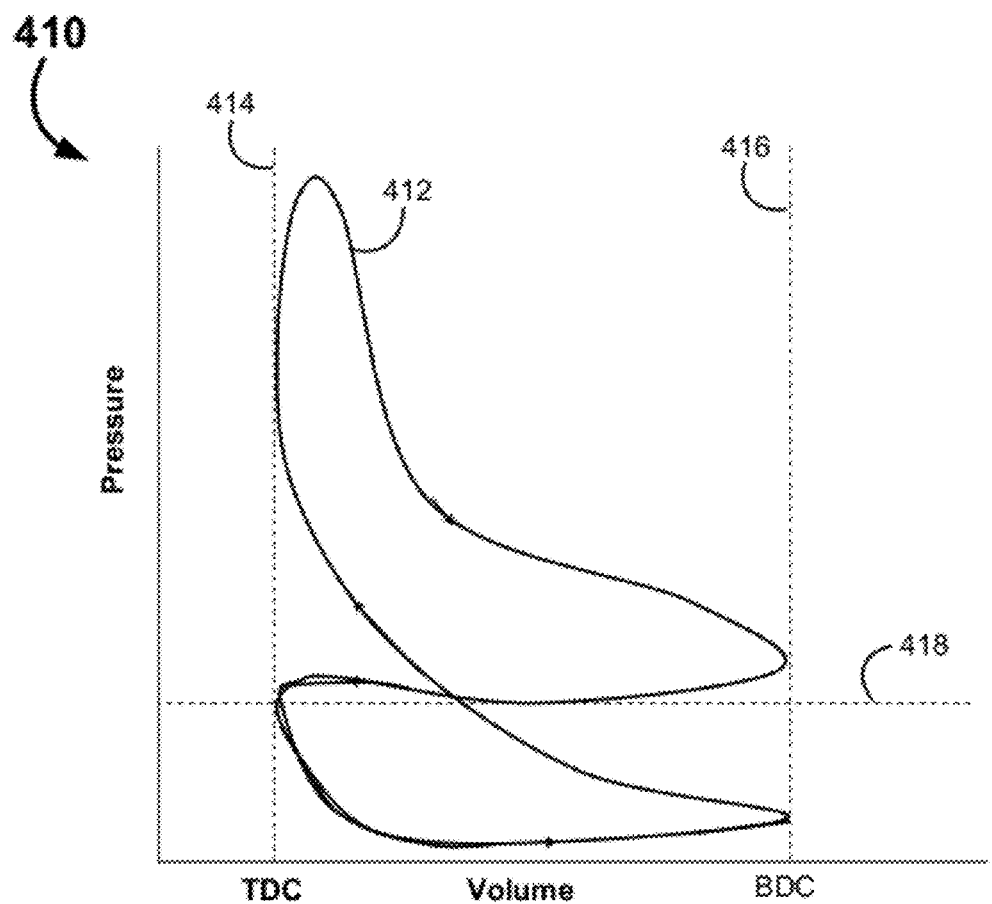
FIG. 4A is a pressure volume (PV) diagram illustrating the thermodynamic working cycle of a representative 4-stroke Otto cycle engine operating at full throttle.
Figure 4B:
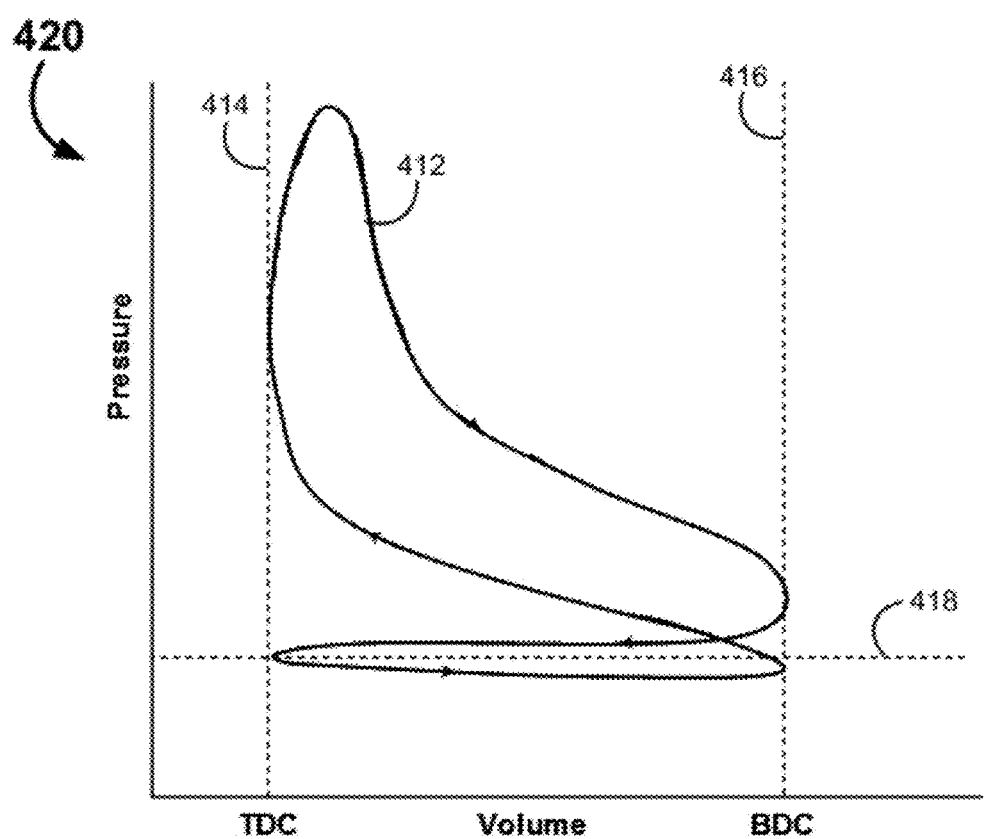
FIG. 4B is a pressure volume (PV) diagram illustrating the thermodynamic working cycle of a representative 4-stroke Otto cycle engine operating at partial throttle.

FIG. 4A is a pressure volume (PV) diagram illustrating the thermodynamic working cycle of a representative 4-stroke Otto cycle engine operating at partial throttle, shown generally at 410. Likewise, FIG. 4B is a pressure volume (PV) diagram illustrating the thermodynamic working cycle of a representative 4-stroke Otto cycle engine operating at full throttle, shown generally at 420.

Since the Otto cycle is a four stroke cycle, the piston reciprocates twice (720° rotation of the crankshaft) for each working cycle of the cylinder. Therefore, each working cycle effectively forms two loops in the PV diagram, shown generally at 412. The horizontal axis represents the volume and the range of each loop along the volume axis extends from a minimum volume, indicated as TDC 414 (top dead center), and a maximum volume, indicated as BDC 416 (bottom dead center). In general, the area bounded by the upper loop represents the amount of work that is generated by firing a cylinder, whereas the area bounded by the lower loop represents the energy losses that are experienced due to pumping air into and out of the cylinder (these losses are frequently referred to as pumping loses). The overall work that is outputted by the engine is the difference between the area of the upper loop and the area of the lower loop.

Comparing the PV diagrams of a cylinder operating at full throttle and a cylinder operating at partial throttle, it may be seen that the overall efficiency of the cylinder operating at partial throttle is below (and often far below) the efficiency of the cylinder at full throttle. There are a number of factors that influence the operating efficiencies, but one of the biggest factors is based on the position of the throttle itself. When the throttle is partially closed, less air is provided to the cylinder. Thus, the pressure within the cylinder when the intake valve closes may be significantly below atmospheric pressure. When the starting pressure within the cylinder is significantly below atmospheric pressure, the effective compression of the cylinder during that engine cycle is reduced, which significantly lowers the pressure that builds up during the combustion stoke and reduces the amount of work generated by the firing of the cylinder. This may be seen by comparing the area of the top loop in FIG. 4B which is the work generated by a cylinder operating at full throttle to the area of the top loop in FIG. 4A which is the work generated by the cylinder operating at partial throttle. Additionally, the fact that the throttle is partially closed makes it harder to draw air into the cylinder, so pumping losses increase. This may be seen by comparing the area of the bottom loop in FIG. 4B which is the pumping loss experienced by the cylinder operating at full throttle to the area of the bottom loop in FIG. 4A which is the pumping loss experienced by the cylinder operating at partial throttle. By subtracting the bottom loop from the top loop in each of FIGS. 4A and 4B, respectively, it may be seen that the net work generated by the engine operating at full throttle is much greater than the net work generated by the engine operating at partial throttle, even when an adjustment is made to compensate for the fact that the partial throttle operation uses less fuel.

Although the comparison illustrated above is for an Otto cycle engine, it should be appreciated that similar types of efficiency losses are experienced by internal combustion engines operating on other thermodynamic cycles when they are operated at less than their optimal efficiency (which typically corresponds to unthrottled air delivery combined with combustion at a thermodynamically optimal air/fuel ratio).

In various embodiments of the invention, the thermodynamic efficiency of an internal combustion engine is improved by operating the engine in a variable displacement mode in which some of the working chambers are operated at (or close to) their optimal thermodynamic efficiency while skipping working cycles that are not needed.

FIG. 5 is a graph illustrating an example of analog (500A) versus digital (500B) fuel injection amounts in reference to the instantaneous torque output. Axis 510 is cylinder firings over a time period, and axis 508 indicates the fuel injection amount. The dashed lines 502 indicate the optimal fuel injection amount. Line 506 indicates the average miles per gallon (MPG) and line 504 indicates instantaneous torque output. As may be seen, the injection patterns in the digital fuel injection plot 500B all occur at substantially optimal injection levels. This results in a substantially identical torque output as compared to the analog injection plot 500A. However, the efficiency of the individual chambers firing at optimal injection amounts results in a higher overall efficiency, which is reflected in the higher MPG of the digital injection plot 500B.

D. Method for Improving Engine Efficiency

Figure 6A:
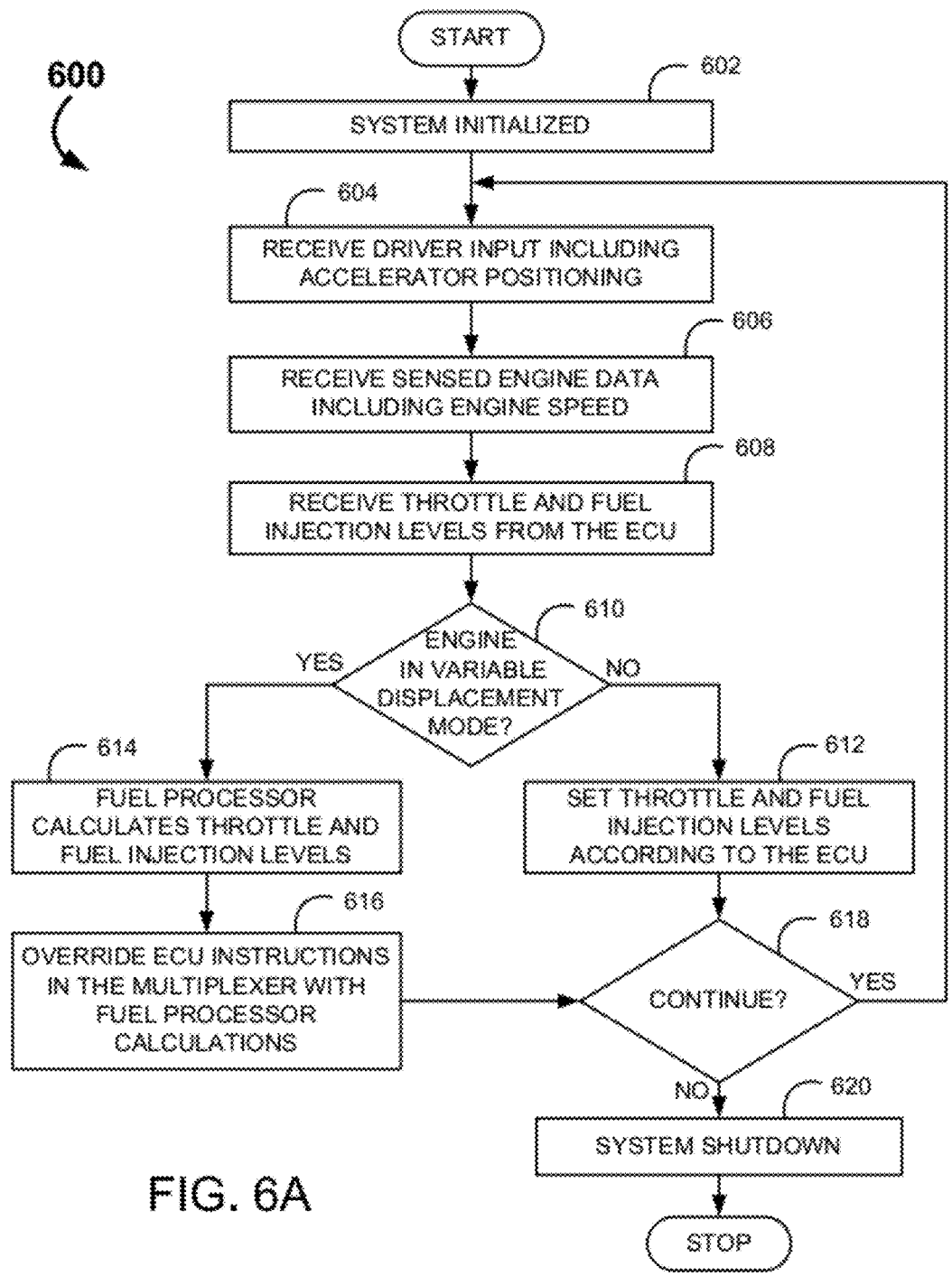
FIG. 6A is flowchart diagram illustrating an example process for improving the efficiency of an internal combustion engine in accordance with an embodiment of the present invention.

FIG. 6A is flowchart diagram illustrating an example process for improving the efficiency of an internal combustion engine, shown generally at 600. The process begins with the system initialization at step 602. System initialization may occur at start of the vehicle, or may be initialized by driver action, such as selecting a fuel saving mode while operating the vehicle.

The process then progresses to step 604 where driver input is received. As previously noted, at a minimum, driver input may include some indication of desired output, such as accelerator position. Alternatively, in vehicles that do not have electronic accelerator position sensors but have a throttle, a signal indicative of desired throttle position may be used in place of the accelerator position signal. In vehicles that have a cruise control feature, the driver input may come from a cruise controller. In still other embodiments, the driver input may be a function of several variables in addition to accelerator position. In other engines, that have fixed operational states, the driver input may be set based on a particular operational setting. In general, the desired output signal found in the driver input may come from any suitable source that is available in the vehicle or engine being controlled. Additionally, other driver input may be collected including brake pedal position, selected overdrive features, etc.

Then, at step 606, engine sensory data is received. This engine data may include, at a minimum, engine speed data. However, other operating conditions (e.g., manifold air flow, vehicle weight, tow load, etc.) and various current ambient conditions (including air pressure, temperature, humidity, etc.) may likewise be included in this data.

The process then progresses to step 608 where throttle and fuel injection levels are received from the ECU fuel injection lookup tables. The process then progresses to step 610 where an inquiry is made as to whether the engine is in a continuous variable displacement mode. There are times during the operation of an engine where it might not be desirable to operate the engine in the described continuously variable displacement operating mode. At such times, the engine may be operated in the same way it would be operated today, i.e., in a normal or conventional operating mode, or in any other manner that is deemed appropriate. For example, when an engine is cold started it may not be desirable to immediately operate any of the cylinders at their optimal efficiency. Another example is when the engine is idling and/or the engine speed is low and the load on the engine is low. In such conditions, it may be undesirable to operate the cylinders at their optimal efficiency because it may be difficult to insure smooth operation of the engine and/or control vibrations. Similarly, when the driver is braking and in other situations where the load on the engine is very low, it may be undesirable to continue to fully optimize the working cycles.

To handle these types of situations, the engine may be run in a conventional mode any time that the optimized working cycles are undesirable. A wide variety of triggers may be used to determine when it is appropriate to shift between operational modes. For example, an engine control unit that incorporates the optimized control described herein may be arranged to operate in a conventional mode for a fixed period after every start, or until the engine reaches a desired operating temperature. Similarly, the engine control unit may be arranged to operate in a conventional mode any time the engine is operating at speeds outside a prescribed range, e.g., the engine is idling or otherwise operating at less than a threshold engine speed (e.g., 2000 RPM). Although the concern is greatest when the engine is operating at low engine speeds, if desired or appropriate, the optimized control of the variable displacement mode may also be disengaged at engine speeds above a designated threshold as well (e.g., at above 6000 RPM). This might be desirable to provide additional power at high engine speeds or when maximum engine output is desired. In another example, the engine could be operated in the variable displacement mode only when the engine is running within a specific range of engine speeds (e.g., 2000-4000 RPM). In other examples, the trigger thresholds for entering and exiting the variable displacement mode may be different. For example, it may be desirable to provide a first threshold (e.g. operating at over 2500 RPM) to trigger entering into the variable displacement mode and to provide a second threshold (e.g., operating at less than 2000 RPM) for exiting the variable displacement mode. The staggering of the thresholds helps reduce the probability of frequent transitions in and out of different operating modes. Likewise, in yet other embodiments, vibration sensors may cause the engine to drop out of variable displacement modes when undesired engine vibrations are detected.

It should be appreciated that these are just examples of situations where it may be desirable to opt out of the continuously variable displacement mode and that there may be a wide variety of other situations that might warrant disengagement and/or triggers that may be used to initiate disengagement. The described situations and triggers are simply examples which may be used individually, in any desired combination, or not at all. Various embodiments of engine control units, firing control units, fuel co-processors and other arrangements that incorporate the described optimizations may be arranged to disengage the continuously variable displacement mode whenever deemed appropriate and/or whenever operation in the continuously variable displacement mode is deemed inappropriate.

If, at step 610, the engine is not operating in a variable displacement mode, then the process then progresses to step 612 where throttle and fuel injection levels are set according to the ECU. Modern engine control units receive inputs from a number of sensors that permit the engine control unit (ECU) to monitor the operational state of the engine. By way of example, the sensors may include a mass of air flow sensor (MAF sensor), an ambient air temperature sensor, an engine coolant temperature sensor, a manifold air pressure sensor, an engine speed sensor, a throttle position sensor, etc. The ECU interprets the sensor inputs in order to calculate the appropriate amount of fuel to be injected and controls engine operation by manipulating the fuel and/or air flow. The actual amount of fuel injected depends on the engine's operational state and environmental conditions including variables such as engine and ambient temperatures, engine speed and workload, throttle position, exhaust gas composition, etc. Generally, an extensive amount of effort and analysis is undertaken in order to define an optimal or desired amount of fuel to be provided to cylinders under different operational conditions. Often these efforts result in the development of multi-dimensional maps that define the appropriate amount of fuel to be injected for specific operating conditions. The fuel injection maps are often reflected in lookup tables stored in the ECU. The ECU then uses the lookup tables to determine the appropriate amount of fuel to inject into a working chamber based upon the current operational state of the engine.

Else, if at step 610 variable displacement mode is being used, the process then progresses to step 614 where the fuel processor calculates throttle and fuel injection levels. The same considerations may be taken into account when operating in the continuously variable displacement mode as when operating in conventional modes. In many implementations, the throttle position in the continuously variable displacement mode will be fixed (e.g., wide open). However, it should be appreciated that the actual mass of the air that is introduced into the working chamber will not always be the same even when the air delivery is unthrottled due to differences in the operational state of the engine and environmental conditions. For example, at higher engine speeds, less air may actually enter a cylinder during a particular working cycle than would enter the same cylinder at lower engine speeds. Similarly, at sea level, more air will typically enter a cylinder than would occur at high elevations at the same engine speed. Other factors will affect the amount of air introduced into the cylinder as well. In some embodiments, these factors are taken into account when determining how much fuel to deliver during any particular working cycle. Further, factors such as the desired air/fuel ratio may be taken into account when determining the amount of fuel to deliver. The desired air/fuel ratio may also vary dynamically based on the operational state of the engine. In some circumstances, it may be desirable to use lean air/fuel mixtures, whereas in other operational states it may be desirable to utilize richer air/fuel mixtures.

The determination of the amount of fuel to deliver during any particular optimized firing may readily be accomplished by using the same (or more simplified) types of fuel injections maps that are used today. A difference for throttled engines being that only one (or a limited number) of throttle positions would need to be considered. When retrofitting existing engines, the existing fuel injection maps may typically be used for this purpose. Of course, as the technology develops, it may be desirable to develop fuel injection maps specifically tailored for operation in the continuously variable displacement mode.

Therefore, it should be appreciated that the actual amount of fuel that is injected during each working cycle is generally not an absolute and fixed number (although that is possible and indeed desirable in some implementations). Rather, it is preferably an amount that is optimized for the current operational state of the engine. As suggested above, when we refer to an "optimized" amount of fuel—we don't necessarily mean that the amount is optimized for any particular variable (e.g., fuel efficiency, power, thermodynamic efficiency, environmental concerns). Rather, it may be an amount of fuel that is deemed appropriate for a particular operational state. The optimized quanta of fuel may be provided in a lookup table, calculated dynamically, or determined in any other suitable manner. When lookup tables are provided, the actual quanta of fuel delivered may be adjusted relative to the value provided by the lookup table based on emissions or other feedback received by the ECU.

After determining fuel injection and throttle levels, the process then progresses to step 616 where the Fuel processor calculations are used to override the ECU instructions. This Override may occur in the multiplexer.

After throttle and fuel injection levels are set (regardless of if the ECU or fuel processor calculations are used), the process then progresses to step 618 where an inquiry is made as to whether to continue. If continuation is desired, the process returns to step 604. Otherwise, at step 620 the system undergoes shutdown and the process ends. Under normal operating conditions the process continues; however, turning off the vehicle or actively disabling variable displacement modes may cause a system shutdown.

Figure 6B:
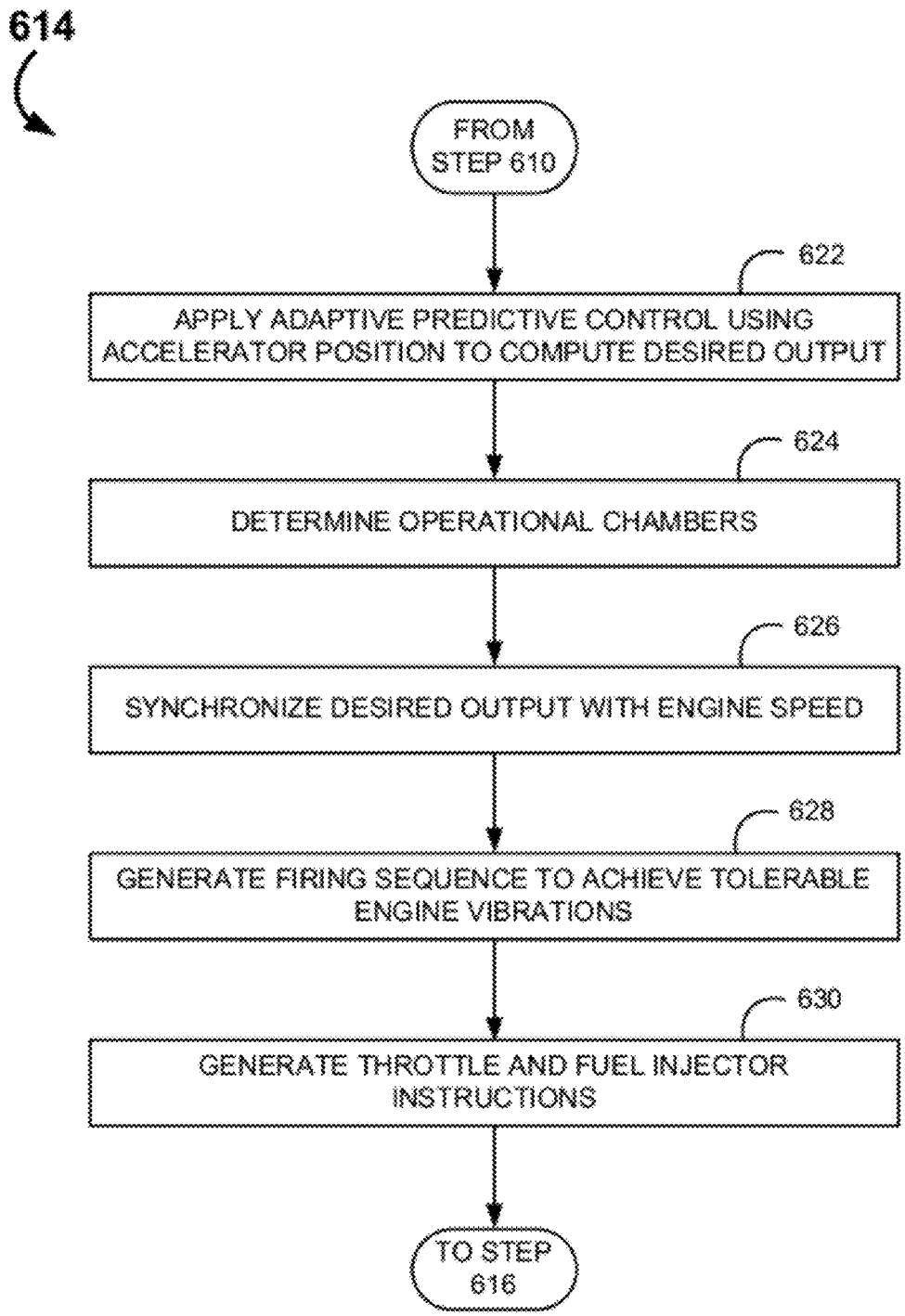
FIG. 6B is flowchart diagram illustrating an example process for calculating throttle and fuel injection levels in accordance with an embodiment of the present invention.

FIG. 6B is flowchart diagram illustrating an example process for calculating throttle and fuel injection levels, shown generally at 614. The process begins from step 610 of FIG. 6A. Then the process progresses to step 622 where adaptive predictive control using accelerator pedal position is applied to compute the desired output. This desired output may include firing sequences, as well as the total power output desired.

Figure 6C:
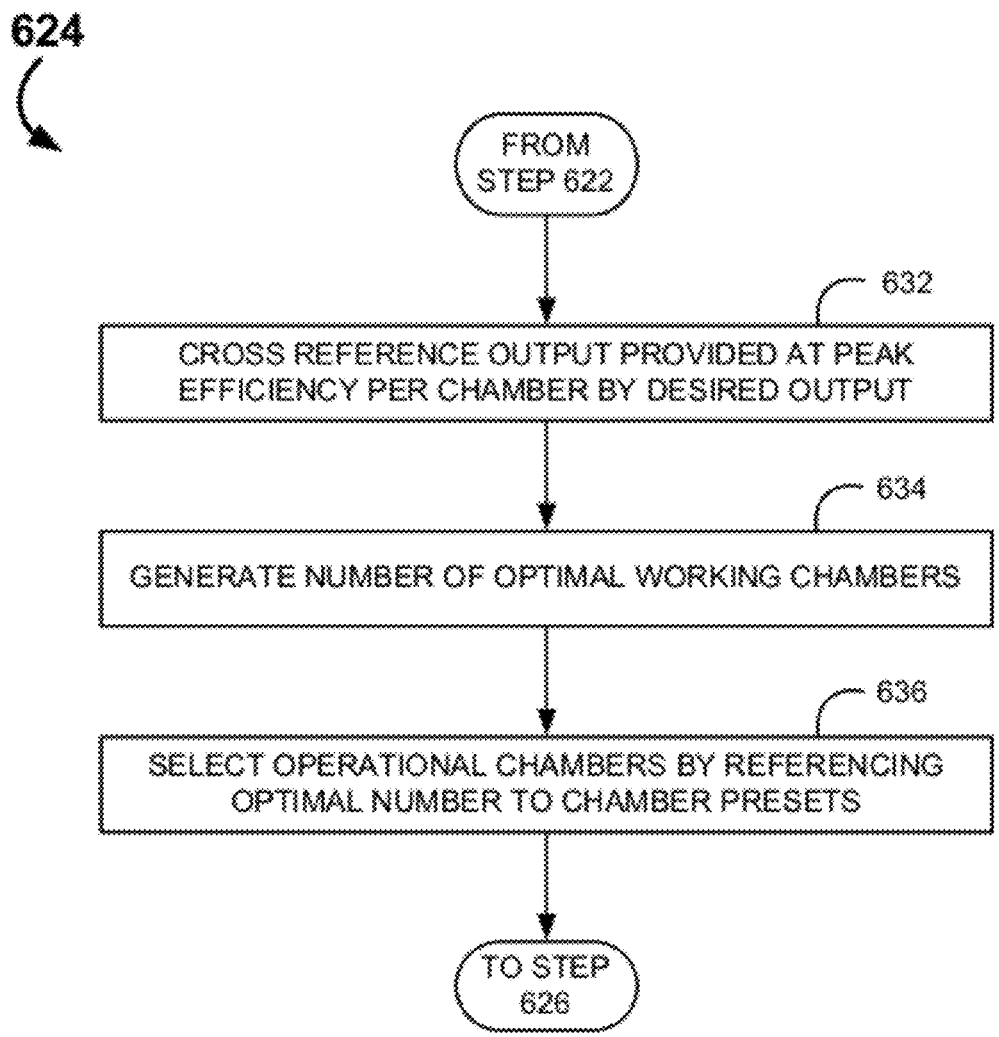
FIG. 6C is flowchart diagram illustrating an example process for determining operational chambers in accordance with an embodiment of the present invention.

Then, at step 624, a determination is made as to the number of operational chambers, and which of the chambers are to be operational. Turning attention to FIG. 6C is an example process for determining operational chambers, shown generally at 624. This process begins at step 632 where the output provided by a firing chamber at peak efficiency is cross referenced by the desired output. In some embodiments, this cross reference may divide the power of the desired output by the power generated by a chamber operating at peak efficiency. The resulting number (referred to as the raw cylinder number) may then be rounded up, thereby giving the number of operational chambers to be used, as shown at step 634.

In some other embodiments the resulting raw cylinder number may be rounded both up and down, thus resulting in two numbers of chambers that are operational. Then, for each engine cycle one or the other of these numbers of cylinders may be operational. This provides the desired output when averaged over several engine combustion cycles. The ratio of the number of cylinders used may be dependent upon the decimal portion of the calculated raw cylinder number.

For example, suppose the accelerator position indicates a desired output of 120 horsepower (hp) and the output of a V6 engine at optimal efficiency is 240 hp. Also assume that, at optimal output, each cylinder is contributing equally to the total engine output. Thus, each cylinder provides 40 hp of power when operating at peak efficiency. Thus, the raw cylinder number would be 120 hp/40 hp=3 (desired output/ output per cylinder). Thus, in this simplified example, 3 cylinders would be set as operational.

Continuing the example, suppose the driver of the vehicle depresses the pedal further as she attempts to pass another vehicle. Now the desired output rises to 140 hp. The resulting raw cylinder number rises to 3.5. In some embodiments, the system may switch to a 4 cylinder operation and run the engine slightly throttled. Throttling the engine reduces the overall efficiency; however, as compared to a conventional 6 cylinder operation, efficiency is still increased.

In another embodiment, the system may then run at 3 cylinders (rounded down) at optimal efficiency for some combustion cycles, and at 4 cylinders (rounded up) at optimal efficiency for other combustion cycles. Thus, some cycles may produce 120 hp, and other cycles 160 hp may be produced. Thus, when the ratio of 3 cylinder operation is equal to 4 cylinder operation, the average output is 140 hp for this simplified example. Due to the relative short duration of engine combustion cycles (at 3000 rpm there is a cycle every 0.02 seconds), any fluctuations in engine power output dependent upon cycle may be virtually unperceiveable.

Thus, in some embodiments the number of cylinders in operation per engine combustion cycle may be alternating per cycle, such as: 3, 4, 3, 4, 3, . . . 4. Alternatively, it may be every other cycle, such as: 3, 3, 4, 4, 3, 3, . . . 4, 4. Of course, other cylinder number per cycle patterns may be utilized a long as the ratio of cylinders fired provides an average output equal to the desired output.

Again, referring back to the previous example, assume that after passing the other car, the driver is traveling at an increased speed but is no longer accelerating for a pass, thus the driver is able to slightly reduce the power required to, say 130 hp. Now the raw cylinder number is 3.25. In the same embodiment described above, the system may still use 3 cylinders at some engine cycles and 4 cylinders at other cycles. However, as the desired output is lower than before, the ratio of 3 cylinder operation may be higher than the operation in 4 cylinders. In fact, to provide the proper average power output, a three to one ratio would be appropriate, such as 3, 3, 3, 4, 3, 3, 3, 4, . . . 3. Of course, other cylinder number per cycle patterns may be utilized a long as the ratio of cylinders fired provides an average output equal to the desired output.

Note that the foregoing examples are hypothetical situations which ignore many of the nuances of engine function for the sake of example simplicity. For example, each cylinder may produce different power outputs, or power output per cylinder may range dependent upon engine and environmental factors (such as engine speed and elevation). The present invention is robust enough to detect these complexities of engine function in determining the number and ratio of cylinders which are to be utilized.

After determining the required number of chambers to be operational, the exact chambers to be used may be selected by referencing the number of chambers to preset chamber maps. These chamber maps may be generated to minimize undesired vibrations in the engine under particular operational conditions.

Returning to FIG. 6B, after determining the operational chambers, the process then progresses to step 626 where the output signal is synchronized to the engine speed and the availability of the operating chambers during the given working cycle. From the synchronization a firing sequence may be generated, at step 628, which achieves tolerable engine vibrations.

Finally, at step 630, the throttle and fuel injector instructions are generated. The process then concludes by returning to step 616 of FIG. 6A.

II. Example One

Eight Chamber Dual Exhaust Engines

A. Overview

Figure 7A:
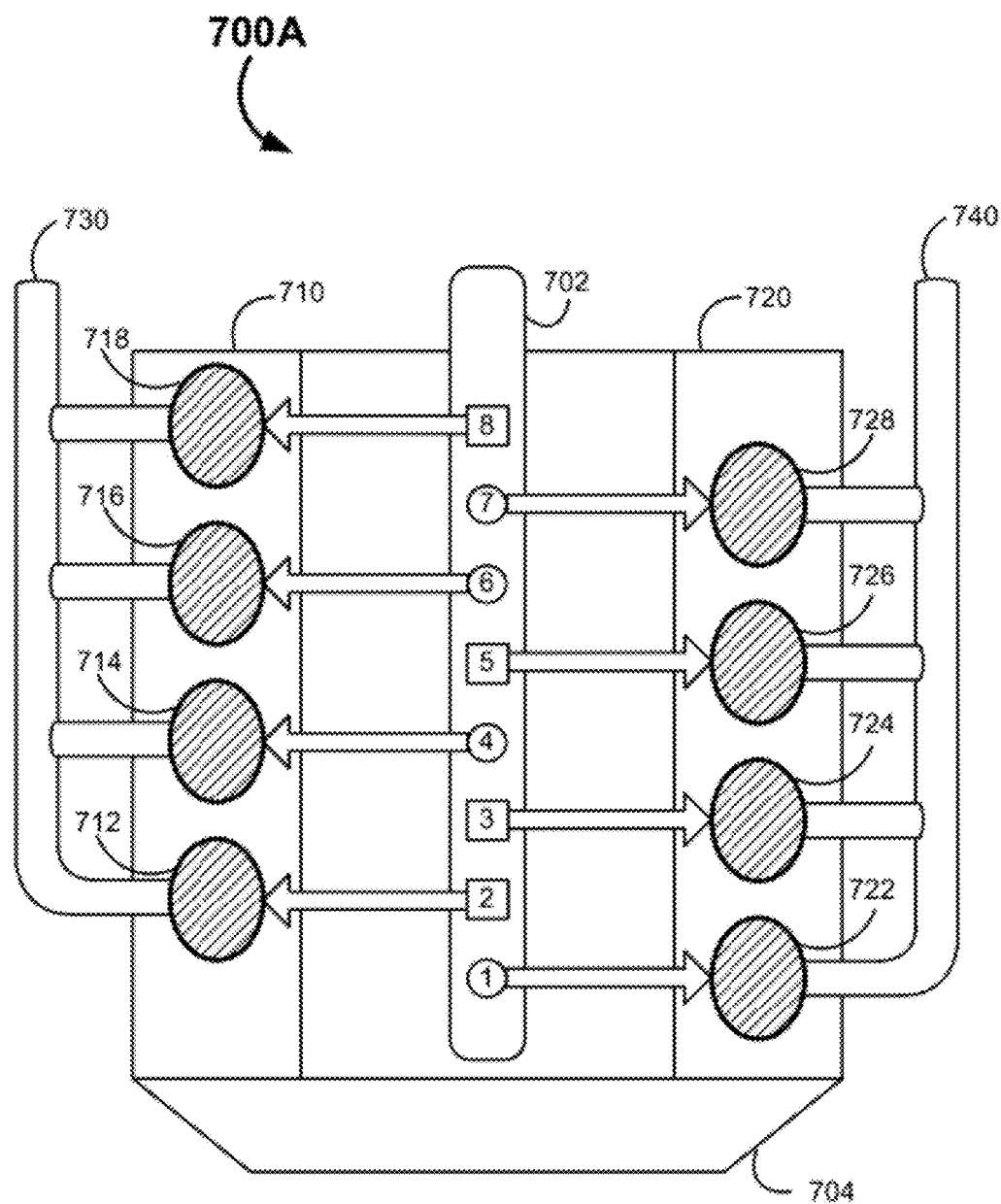
FIG. 7A is an illustrative diagram of an example V8 style internal combustion engine in conventional operation in accordance with an embodiment of the present invention.

To facilitate discussion, FIG. 7A is an illustrative diagram of an example V8 style internal combustion engine in conventional operation, shown generally at 700A. This style engine is functionally similar to the GM™ LS V8 small block engine. Of course, many V8 style engines are functionally similar to the exemplary diagram. The Engine Block 704 is illustrated having eight working chambers, labeled 718 to 722.

In a V style engine, cylinder numbering varies among manufacturers. Generally speaking, the most forward cylinder is numbered 1 (here labeled 722), but some manufacturers will then continue numbering along that bank first (so that side of the engine would be 1-2-3-4, and the opposite bank would be 5-6-7-8) while others will number the cylinders from front to back along the crankshaft, so one bank would be 1-3-5-7 and the other bank would be 2-4-6-8. (As is illustrated in the example). To further complicate matters, manufacturers may not have used the same system for all of their engines. It is important to check the numbering system used before comparing firing orders, because the order will vary significantly with crankshaft design.

Generally, when referring to cars, the left-hand side of the car is the side that corresponds with the driver's left, as seen from the driver's seat. It may also be thought of as the side that would be on the left if one was standing directly behind the car looking at it.

When referring to engines, the front of the engine is the part where the pulleys for the accessories (such as the alternator and water pump) are, and the rear of the engine is where the flywheel is, through which the engine connects to the transmission. The front of the engine may point towards the front, side or rear of the car. Thus, in the present example, the Right Bank 720 and the Left Bank 710 may be seen.

A Crank Shaft 702 is also illustrated for orientation purposes. Chamber numbers are illustrated in the center of the engine on the Crank Shaft 702. The Chamber numbers are labeled from one, at the front of the engine, to eight, at the rear of the engine, in the present Figure. Chamber number designators are illustrated as square or circular. In this example, square chamber designators are intended to illustrate chambers which have controllable operation, while circular chamber number designators indicate that the given chamber is non-controllable. Thus, Chamber One 722, Chamber Four 714, Chamber Six 716, and Chamber Seven 728 are chambers which are always operational, whereas Chamber Two 712, Chamber Three 724, Chamber Five 726 and Chamber Eight 718 are capable of being "shut off". This operational limitation is common in a number of existing engines currently in use, including the GM™ LS V8 small block engine.

Also of note, the illustrated light block engine has a dual exhaust manifold system, whereby the Right Exhaust Manifold 740 receives exhaust from the Chamber One 722, Chamber Three 724, Chamber Five 726 and Chamber Seven 728 located on the Right Bank 720. Conversely, the Left Exhaust Manifold 730 receives exhaust from the Chamber Two 712, Chamber Four 714, Chamber Six 716 and Chamber Eight 718 located on the Left Bank 710. For many engine types, two or more exhaust manifolds are not uncommon. It is the presence of both multiple exhaust manifolds and controllably operated chambers which enables the advanced variable displacement operation of the present invention.

The illustration at 700A of FIG. 1 provides background in a V8 style engine operating in a "conventional" mode, whereby all chambers of the engine are in an operational state (as is indicated by the diagonal line shading of the chambers).

Figure 7B:
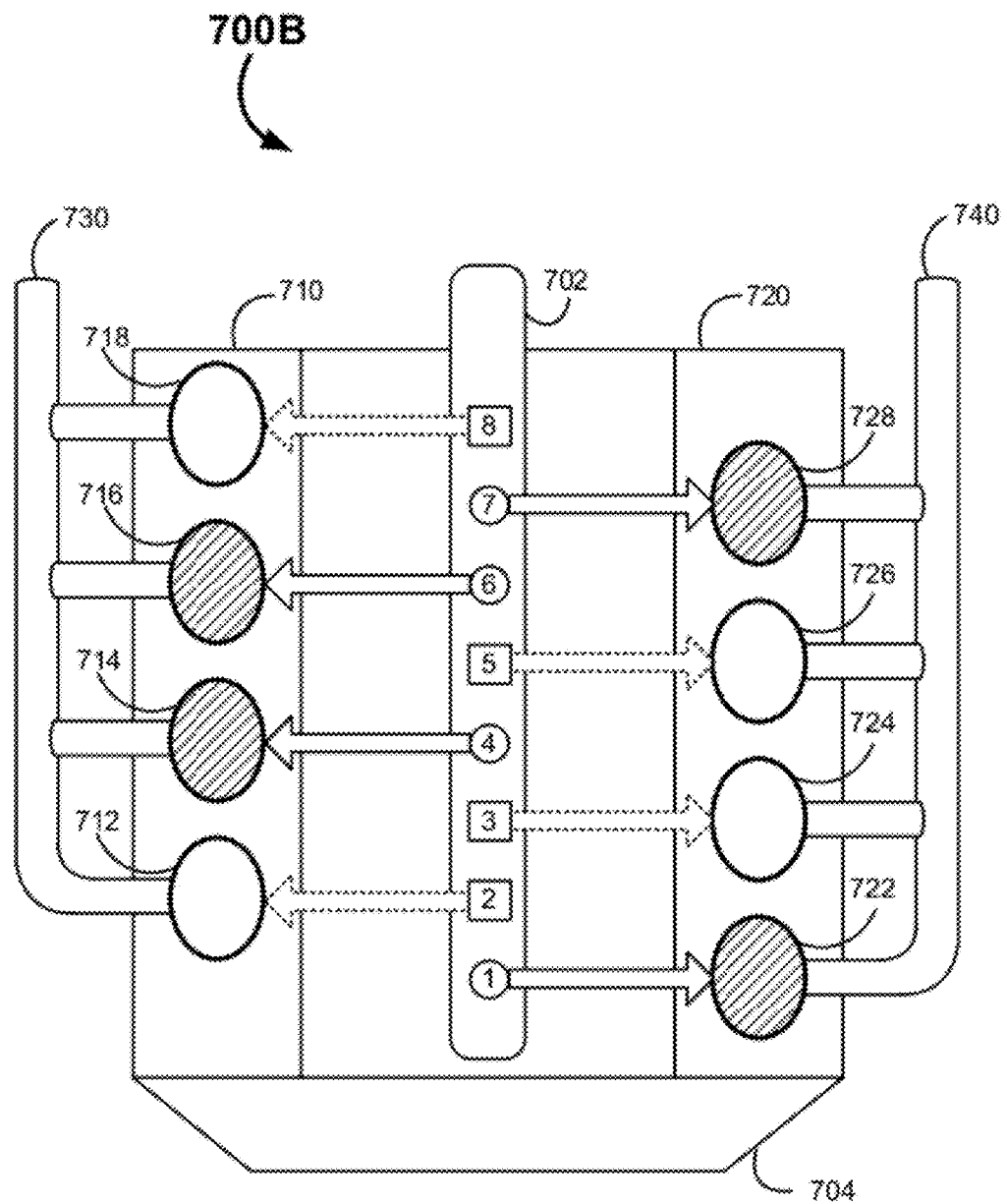
FIG. 7B is an illustrative diagram of an example V8 style internal combustion engine in a current variable displacement mode where four working chambers are operational in accordance with an embodiment of the present invention.

FIG. 7B is an illustrative diagram of an example V8 style internal combustion engine in a known variable displacement mode where four working chambers are operational, shown generally at 700B. As is well known, the GM™ LS V8 small block engine has been designed to undergo a form of variable displacement whereby the controllable chambers are "shut down" thereby allowing the engine to enter a four cylinder operational mode. FIG. 7B provides an illustration of such an operational state.

As may be seen, Chamber Two 712, Chamber Three 724, Chamber Five 726 and Chamber Eight 718 are currently shut off (as indicated by the lack of shading). Cylinder deactivation may be achieved by keeping the intake and exhaust valves closed for a particular chamber. By keeping the intake and exhaust valves closed, it creates an "air spring" in the combustion chamber. The trapped exhaust gases (kept from the previous charge burn) are compressed during the piston's upstroke and push down on the piston during its downstroke. The compression and decompression of the trapped exhaust gases have an equalizing effect, thus, overall, there is virtually no extra load on the engine. Additionally, the arrows leading to the disabled cylinders are dashed to indicate that intake air is not being supplied to these chambers.

Of note is that there are many known techniques for disabling a cylinder. For example, for pushrod designs, when cylinder deactivation is called for, hydraulic valve lifters are collapsed by using solenoids to alter the oil pressure delivered to the lifters. In their collapsed state, the lifters are unable to elevate their companion pushrods under the valve rocker arms, resulting in valves that cannot be actuated and remain closed. Likewise, for overhead cam designs, generally a pair of locked-together rocker arms is employed for each valve. One rocker follows the cam profile while the other actuates the valve. When a cylinder is deactivated, solenoid controlled oil pressure releases a locking pin between the two rocker arms. While one arm still follows the camshaft, the unlocked arm remains motionless and unable to activate the valve. The present invention is versatile enough to utilize any of the foregoing, as well as another known or future known mechanism for deactivating cylinders.

As Chamber Two 712, Chamber Three 724, Chamber Five 726 and Chamber Eight 718 are not in an operational state, the remaining four cylinders are responsible for supplying the full output of the engine. Thus, under lower loads, this operational state enables the remaining "on" cylinders to run at, or near, full throttle, thereby increasing overall efficiency.

While this four working cylinder design, implemented by GM, has had success in increasing fuel efficiency, the operational cylinders are often in less than optimal conditions since there is such a large change in the number of operational cylinders (from eight to four). Additionally, for very low load conditions, having even fewer than the four cylinders is often desired for improved fuel efficiency. The GM model enables only eight or four cylinders to be operational. Increasing the granularity of the number of cylinders that may be used in a given operational state enables much greater fuel efficiency improvements.

Previous attempts at more granular variable displacement have been made with limited success. This is likely because engine vibration resulting from unbalanced engines is particularly troublesome. The present invention provides a novel method of controlling engine vibration in granular variable displacement modes, thereby enabling engines, such as the GM light block, to operate in a 2, 3, 4, 5, 6, 7 or 8 chamber mode. Additionally, governmentally mandated smog laws additionally limit the potential operation of particular engines. The present invention provides novel methods for running engines, such as the GM light block, at reduced cylinder numbers while remaining in compliance with state and federally mandated smog regulations.

By enabling such a wide range of operating cylinders, each chamber may be run at, or near, optimal efficiency a greater amount of the time. Thus, vast improvements in fuel efficiency may be realized. The following illustrative FIGS. 8A to 13D provide permutations of the V8 style engine in a variety of variable displacement modes. Note that these illustrations are intended to be exemplary in nature and do not limit the scope of the present invention.

B. Two Chamber Operation

FIGS. 8A to 8H are illustrative diagrams of an example V8 style internal combustion engine in a variable displacement mode where two working chambers are operational. As there are only four "controllable" cylinders on the GM light block engine, two of the non-controllable chambers are in an operational mode, which is indicated by diagonal line shading. The remaining non-controllable chambers are then run without fuel injection, thereby allowing air to flow through the chambers to the exhaust manifold, which is indicated by dotted shading. It is important to note, however, that the combusted gases from the operational chambers cannot be mixed with flow through air, as this will result in failure of smog regulations on state and federal levels. Thus, to be in legal compliance, the air 'flow through' chambers must be on a separate exhaust manifold as the operational chambers. Examples are provided below.

Figure 8A:
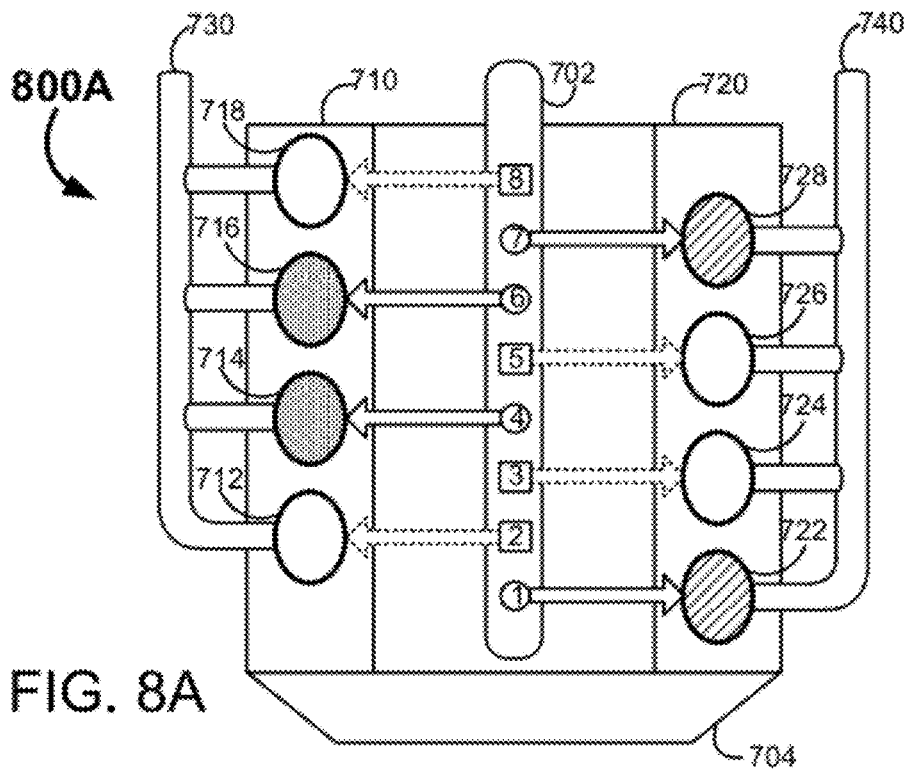
FIGS. 8A to 8H are illustrative diagrams of an example V8 style internal combustion engine in a variable displacement mode where two working chambers are operational in accordance with an embodiment of the present invention.

At FIG. 8A, illustrated at 800A, Chamber One 722 and Chamber Seven 728 are operational (indicated by diagonal shading). That is intake and exhaust valves are open and fuel is being delivered. The operational chambers vent to Right Exhaust Manifold 740. On the other hand, Chamber Four 714 and Chamber Six 716 are 'flow through' chambers where intake and exhaust valves are open but no fuel is being injected into the chambers (indicated by dotted shading). These 'flow through' chambers vent their air to the Left Exhaust Manifold 730. As such, combustion gasses and airflow-through vent to separate exhaust manifolds, thus achieving legal smog compliance. All remaining chambers: Chamber Two 712, Chamber Eight 718, Chamber Three 724 and Chamber Five 726 are effectively shut down (indicated by no shading). Shut down chambers have no fuel injection and intake and exhaust valves are closed.

Figure 8B:
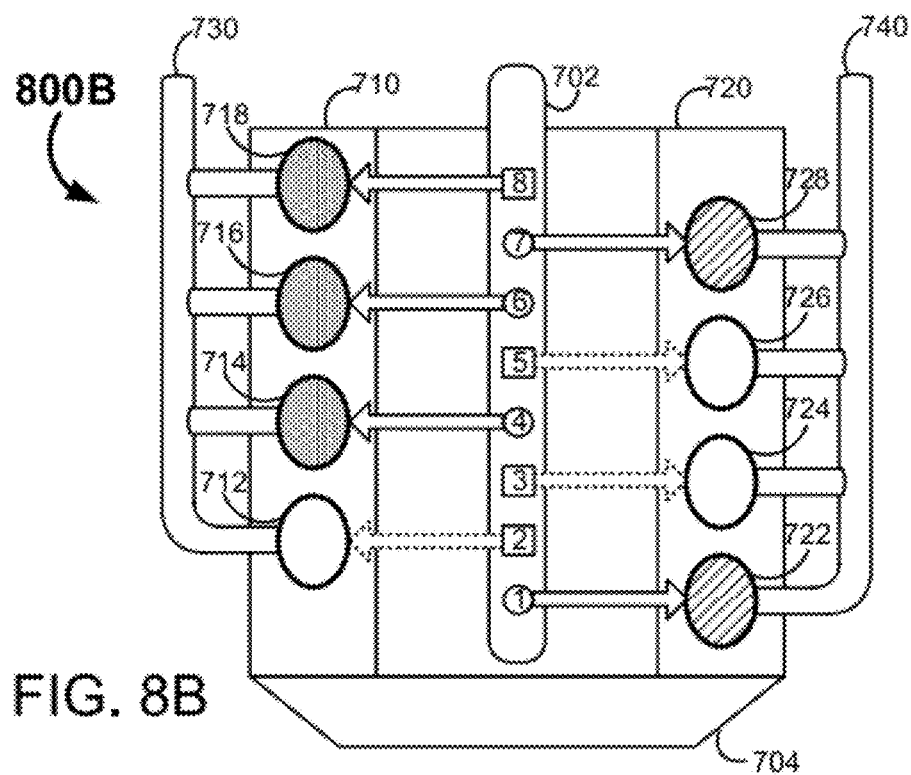

At FIG. 8B, illustrated at 800B, Chamber One 722 and Chamber Seven 728 are still operational (indicated by diagonal shading), and the operational chambers vent to Right Exhaust Manifold 740. On the other hand, Chamber Four 714, Chamber Six 716 and Chamber Eight 718 are 'flow through' chambers where intake and exhaust valves are open but no fuel is being injected into the chambers (indicated by dotted shading). These 'flow through' chambers vent their air to the Left Exhaust Manifold 730. Again, combustion gasses and flow-through-air vent to separate exhaust manifolds, thus achieving legal smog compliance. The Chamber Two 712, Chamber Three 724 and Chamber Five 726 are effectively shut down (indicated by no shading). Shut down chambers have no fuel injection and intake and exhaust valves are closed.

Figure 8C:
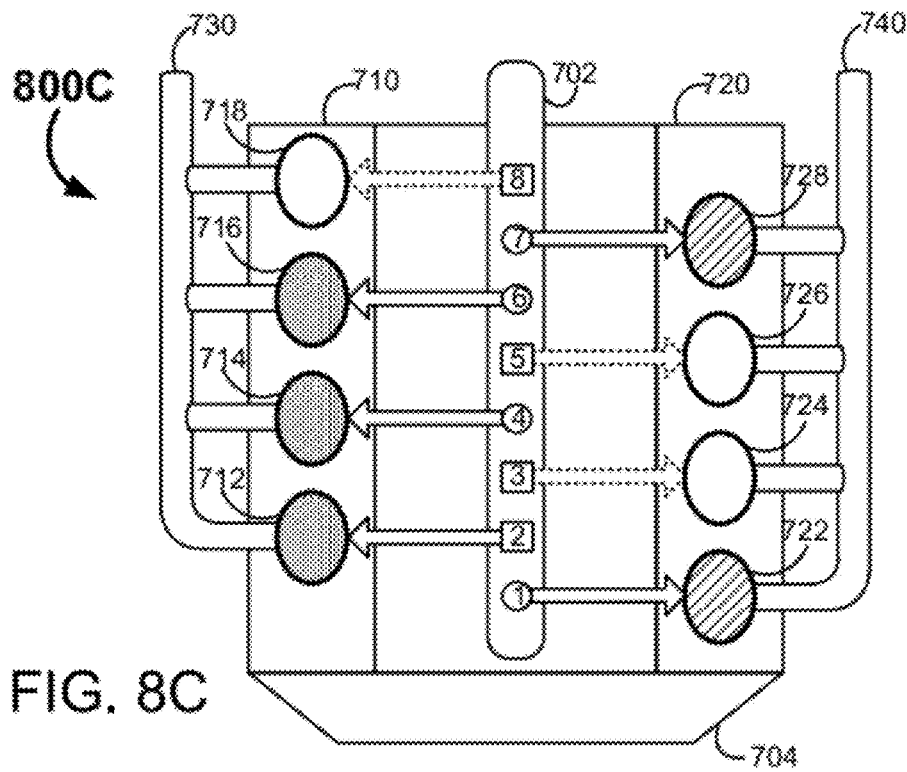

At FIG. 8C, illustrated at 800C, Chamber One 722 and Chamber Seven 728 are still operational (indicated by diagonal shading), and the operational chambers vent to Right Exhaust Manifold 740. On the other hand, Chamber Four 714, Chamber Six 716 and Chamber Two 712 are 'flow through' chambers (indicated by dotted shading). These 'flow through' chambers vent their air to the Left Exhaust Manifold 730, preventing mixing with combustion gasses and achieving legal smog compliance. The Chamber Eight 718, Chamber Three 724 and Chamber Five 726 are effectively shut down (indicated by no shading).

Figure 8D:
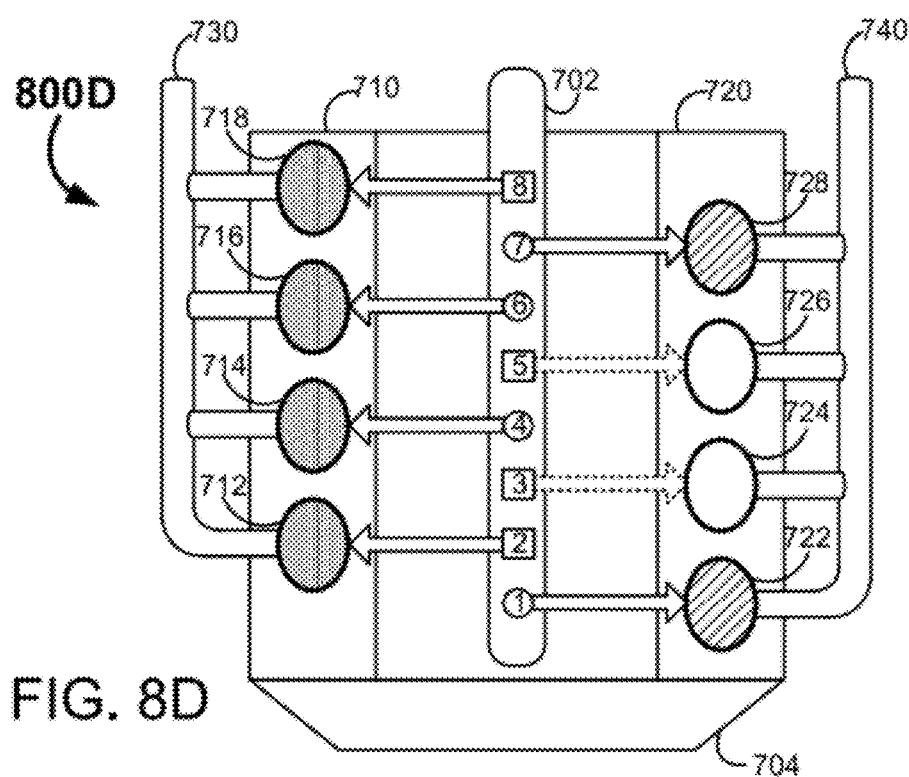

At FIG. 8D, illustrated at 800D, Chamber One 722 and Chamber Seven 728 are still operational (indicated by diagonal shading), and the operational chambers vent to Right Exhaust Manifold 740. On the other hand, Chamber Two 712, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance. The Chamber Three 724 and Chamber Five 726 are effectively shut down (indicated by no shading).

Figure 8E:
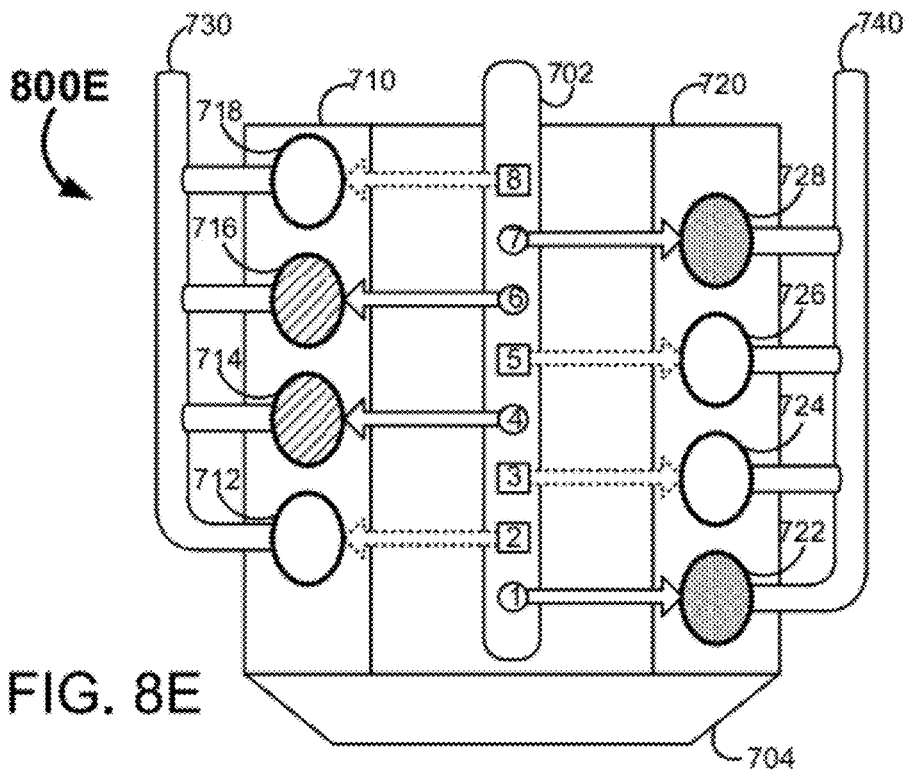

At FIG. 8E, illustrated at 800E, Chamber Four 714 and Chamber Six 716 are now operational (indicated by diagonal shading), and the operational chambers vent to Left Exhaust Manifold 730. On the other hand, Chamber One 722 and Chamber Seven 728 are now 'flow through' chambers (indicated by dotted shading) which vent their air to the Right Exhaust Manifold 740, thus preventing mixing with combustion gasses and achieving legal smog compliance. The Chamber Two 712, Chamber Eight 718, Chamber Three 724 and Chamber Five 726 are effectively shut down (indicated by no shading).

Figure 8F:
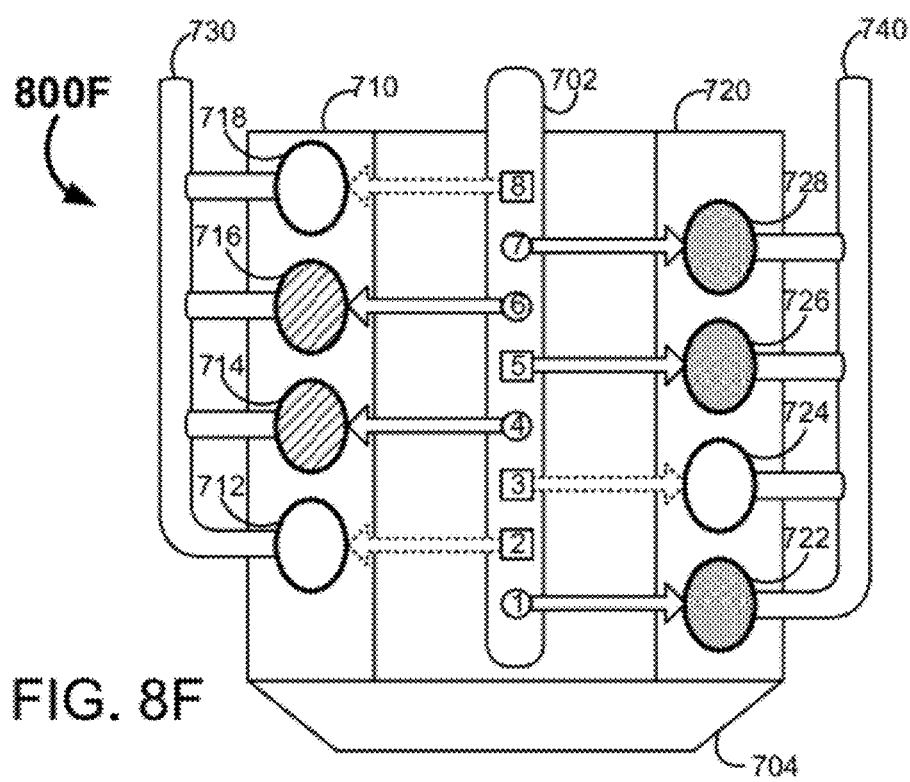

At FIG. 8F, illustrated at 800F, Chamber Four 714 and Chamber Six 716 are still operational (indicated by diagonal shading), and the operational chambers vent to Left Exhaust Manifold 730. On the other hand, Chamber One 722, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. All remaining chambers Chamber Two 712, Chamber Eight 718 and Chamber Three 724 are effectively shut down (indicated by no shading).

Figure 8G:
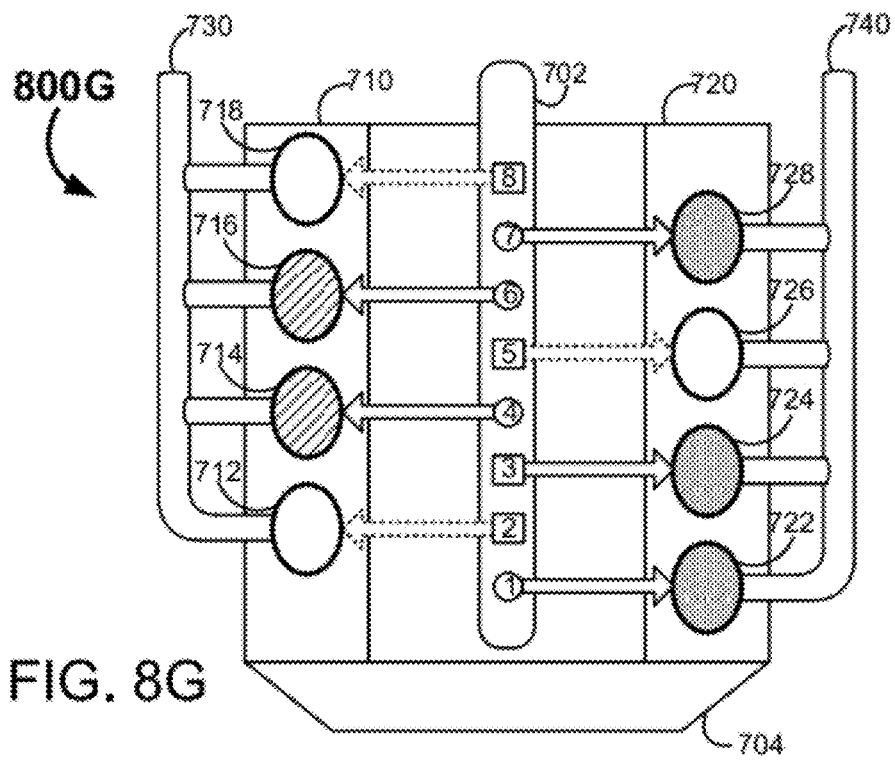

At FIG. 8G, illustrated at 800G, Chamber Four 714 and Chamber Six 716 are still operational (indicated by diagonal shading), and the operational chambers vent to Left Exhaust Manifold 730. On the other hand, Chamber One 722, Chamber Three 724 and Chamber Seven 728 are 'flow through' chambers (indicated by dotted shading) which vent their air to the Right Exhaust Manifold 740, thus preventing mixing with combustion gasses and achieving legal smog compliance. The Chamber Two 712, Chamber Eight 718 and Chamber Five 726 are effectively shut down (indicated by no shading).

Figure 8H:
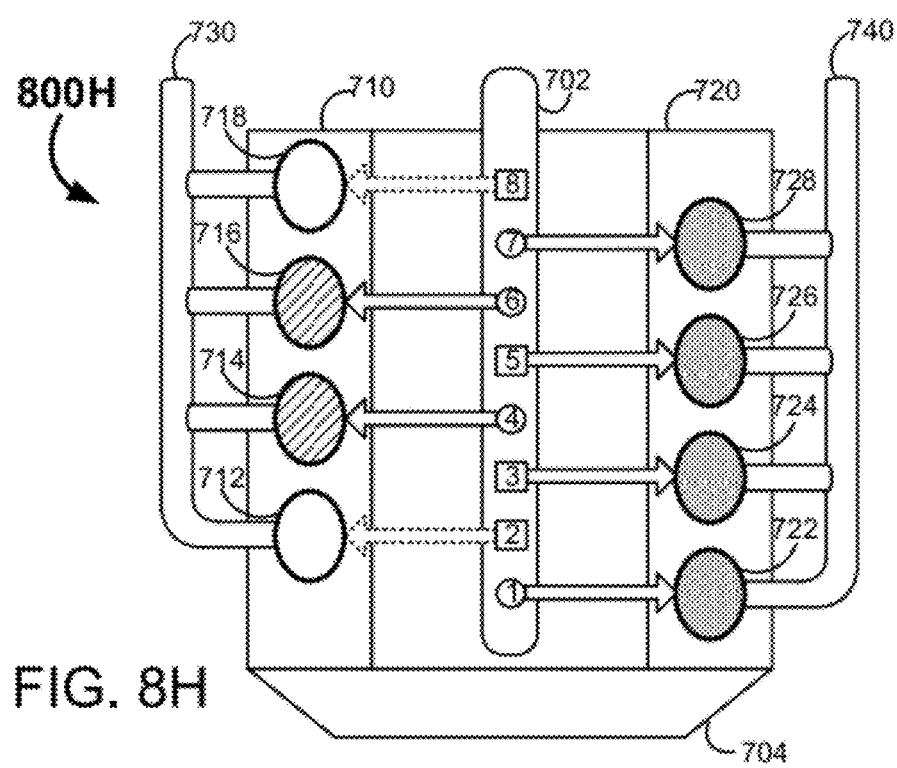

At FIG. 8H, illustrated at 800H, Chamber Four 714 and Chamber Six 716 are still operational (indicated by diagonal shading), and the operational chambers vent to Left Exhaust Manifold 730. On the other hand, Chamber One 722, Chamber Three 724, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. The Chamber Two 712 and Chamber Eight 718 are effectively shut down (indicated by no shading).

Thus, in this manner any two non-controllable chambers on a single manifold may be operational thereby providing a two cylinder variable displacement mode to V8 small block engines of similar design.

C. Three Chamber Operation

Figure 9A:
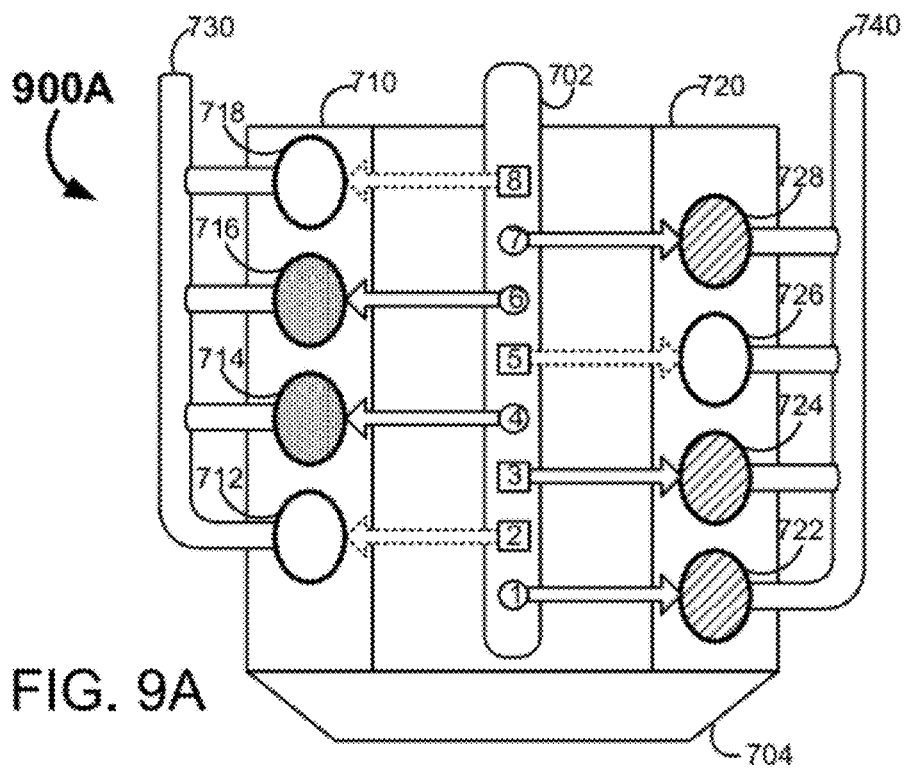
FIGS. 9A to 9Q are illustrative diagrams of an example V8 style internal combustion engine in a variable displacement mode where three working chambers are operational in accordance with an embodiment of the present invention.
Figure 9B:
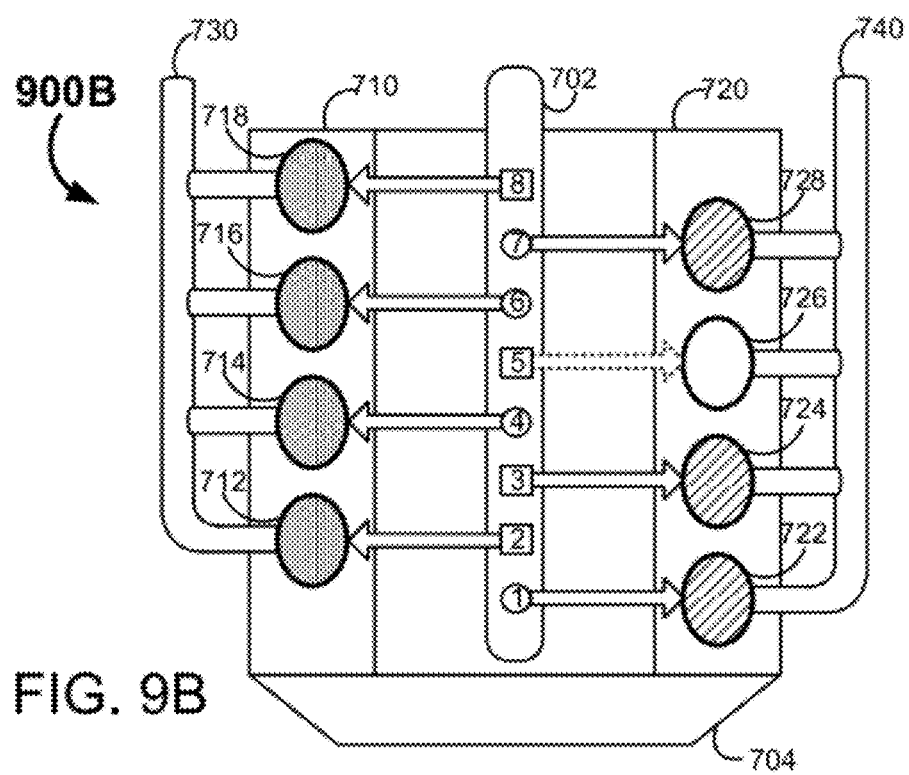
Figure 9C:
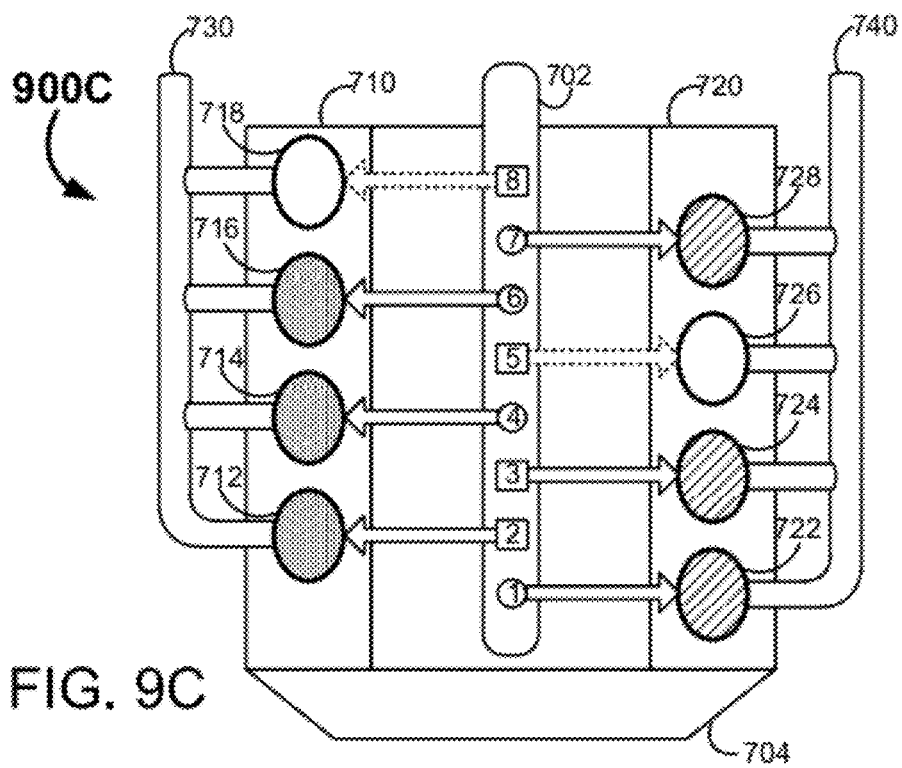
Figure 9D:
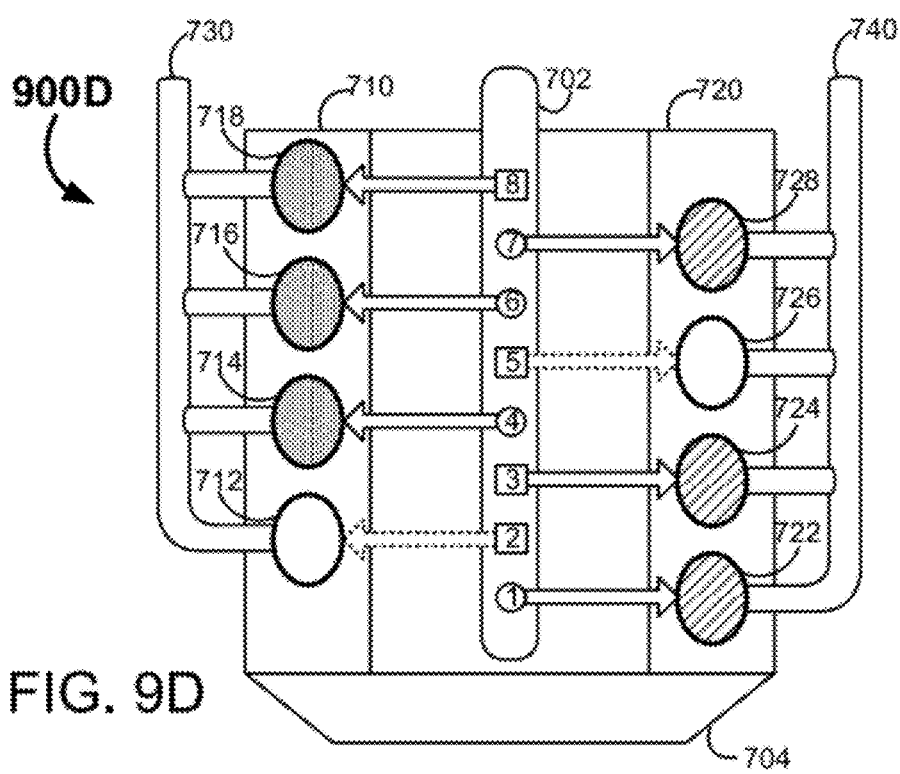
Figure 9E:
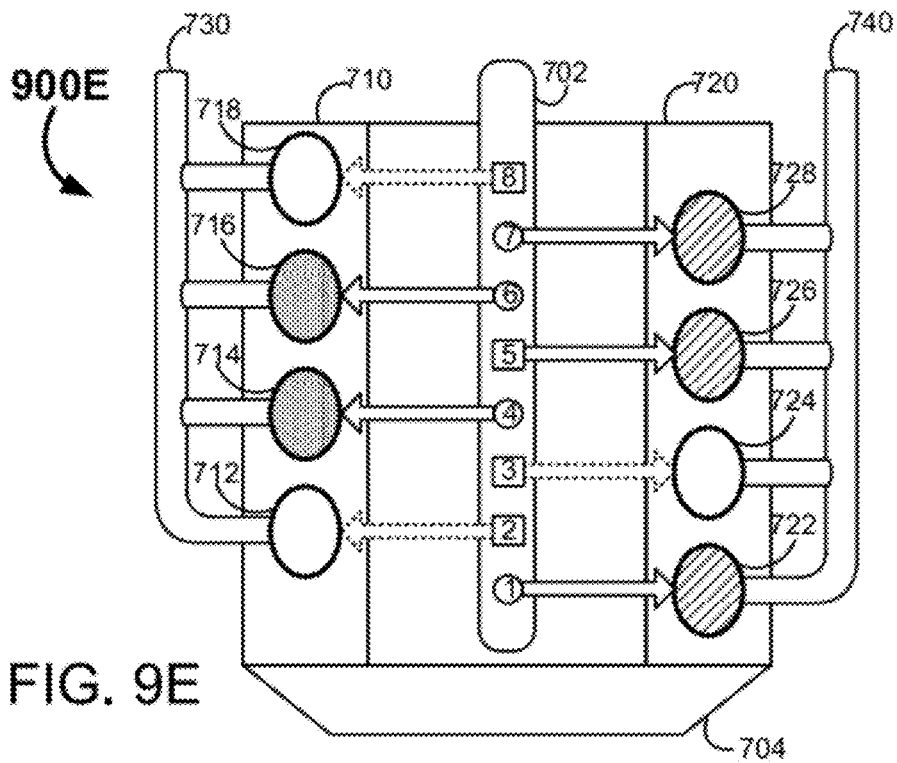
Figure 9F:
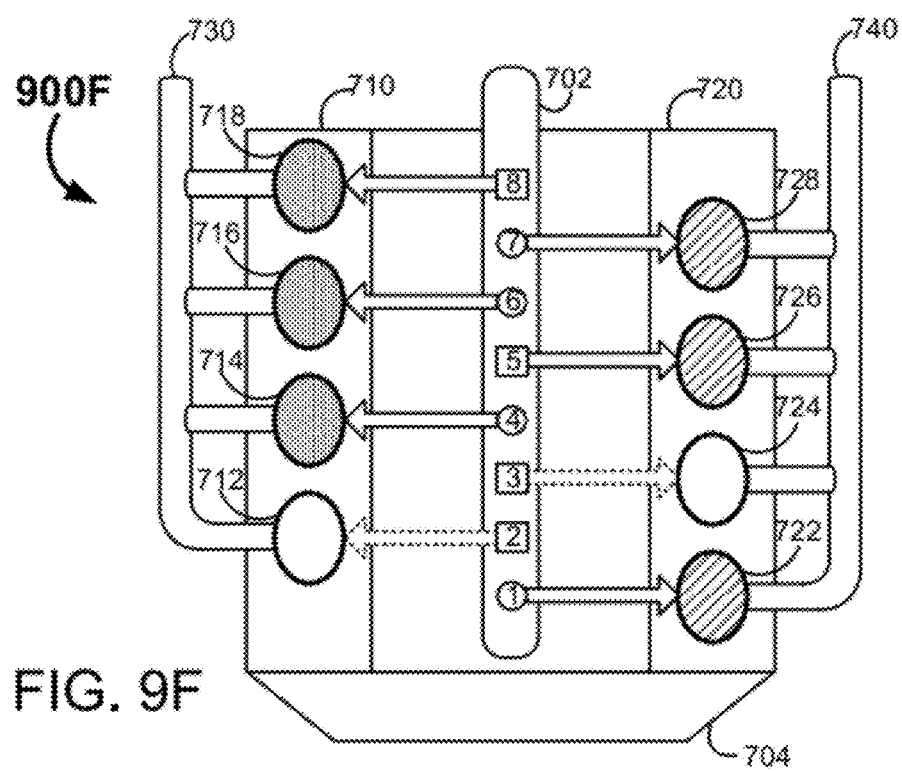
Figure 9G:
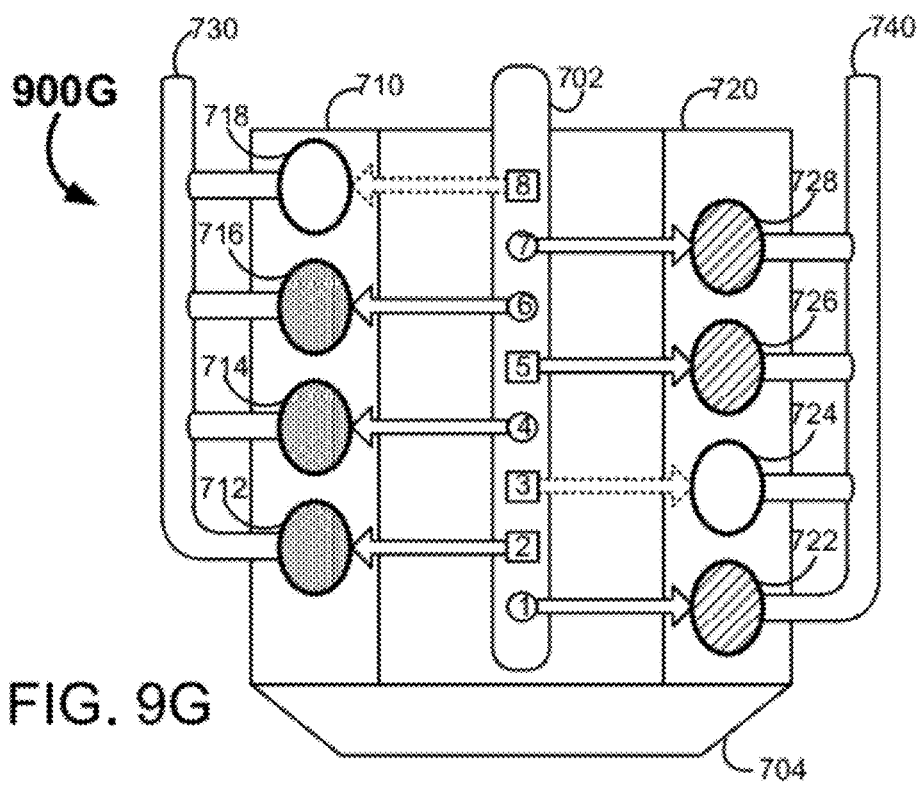
Figure 9H:
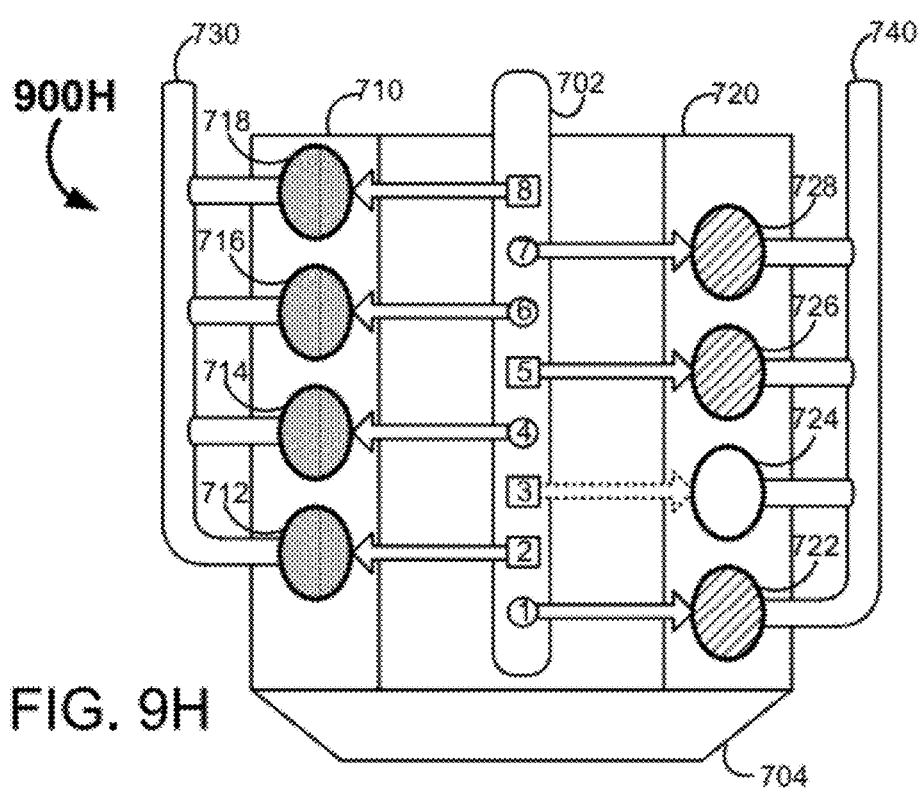
Figure 9I:
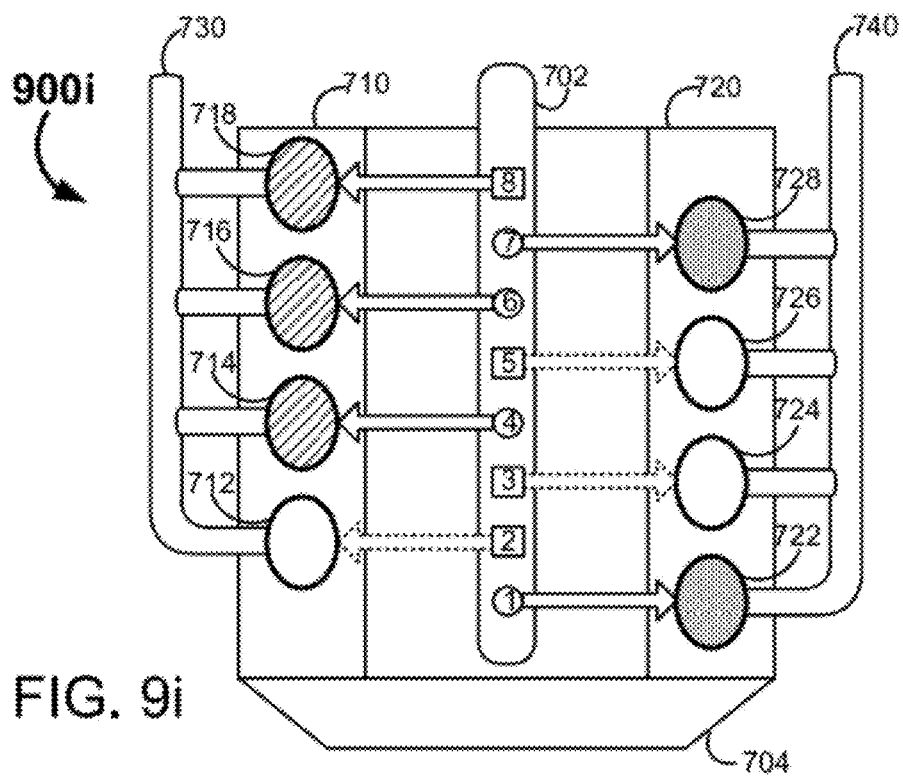
Figure 9J:
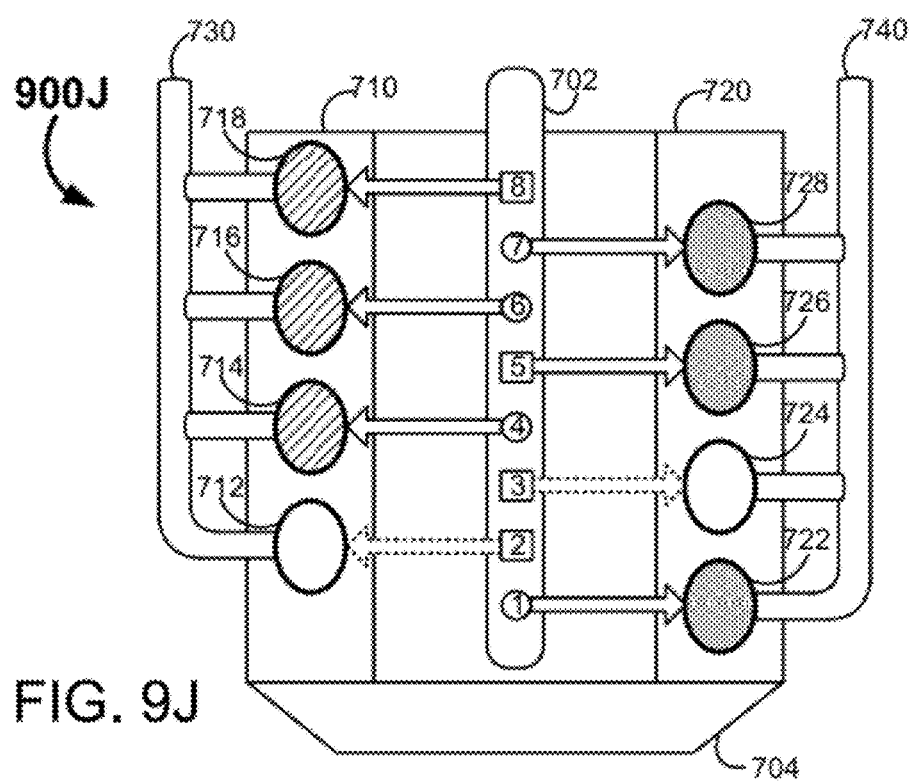
Figure 9K:
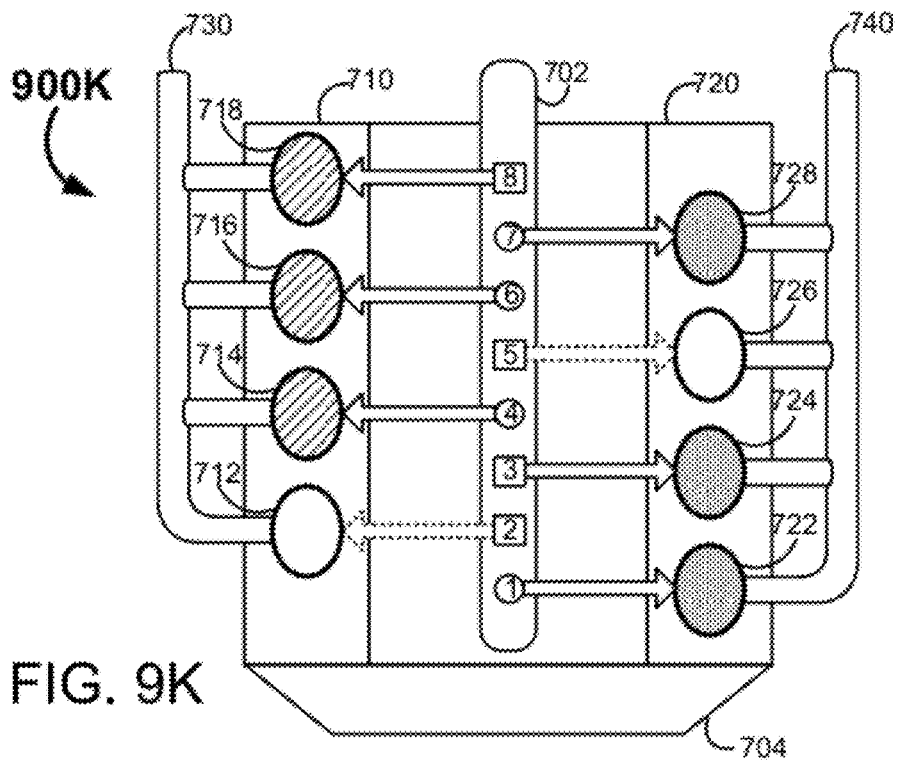
Figure 9L:
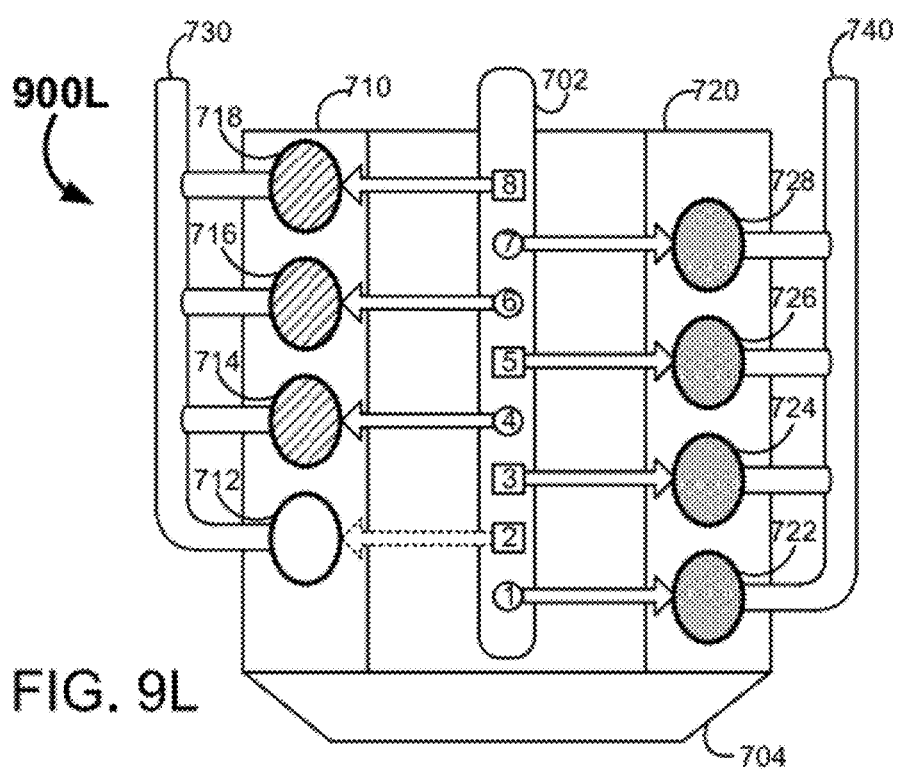
Figure 9M:
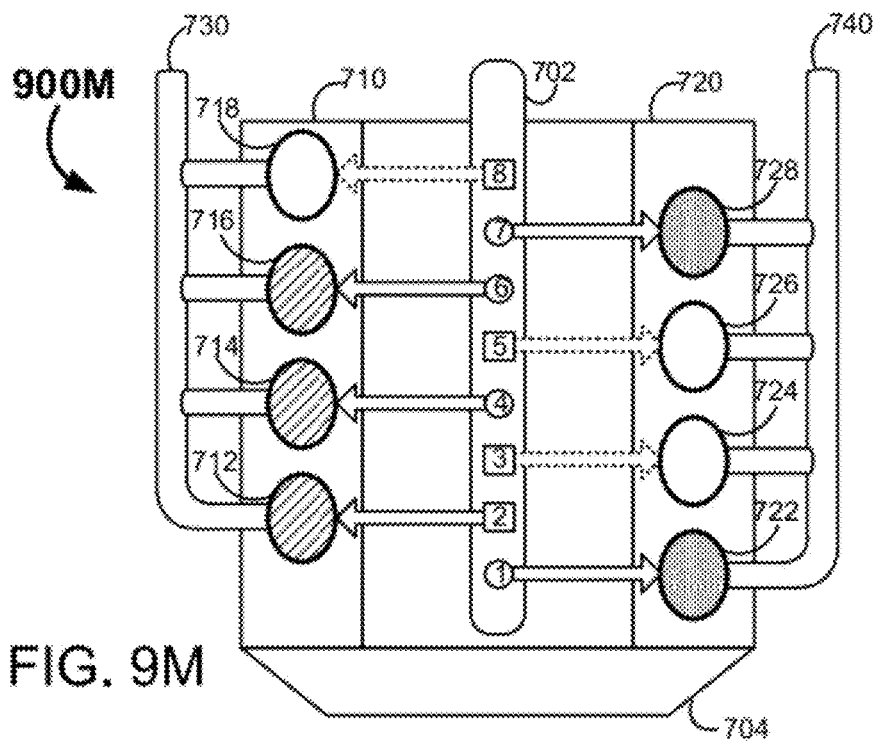
Figure 9N:
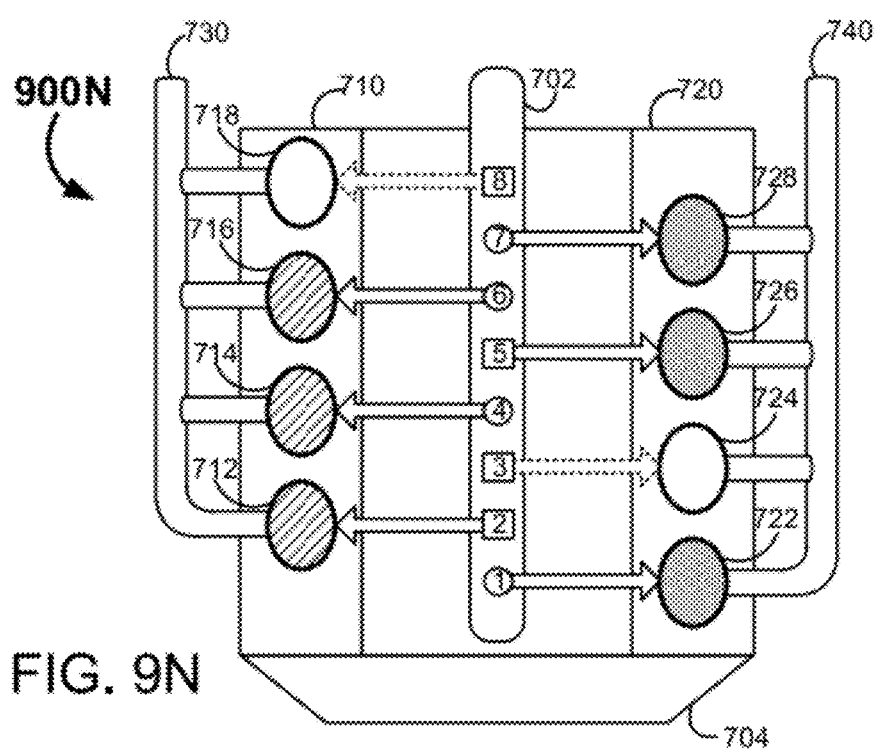
Figure 9P:
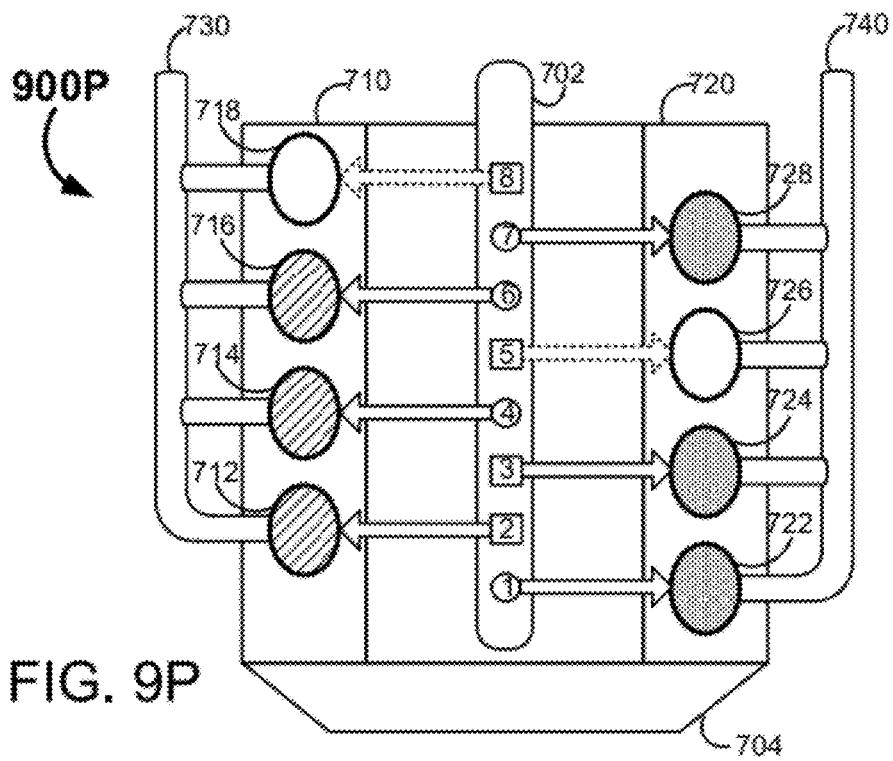
Figure 9Q:
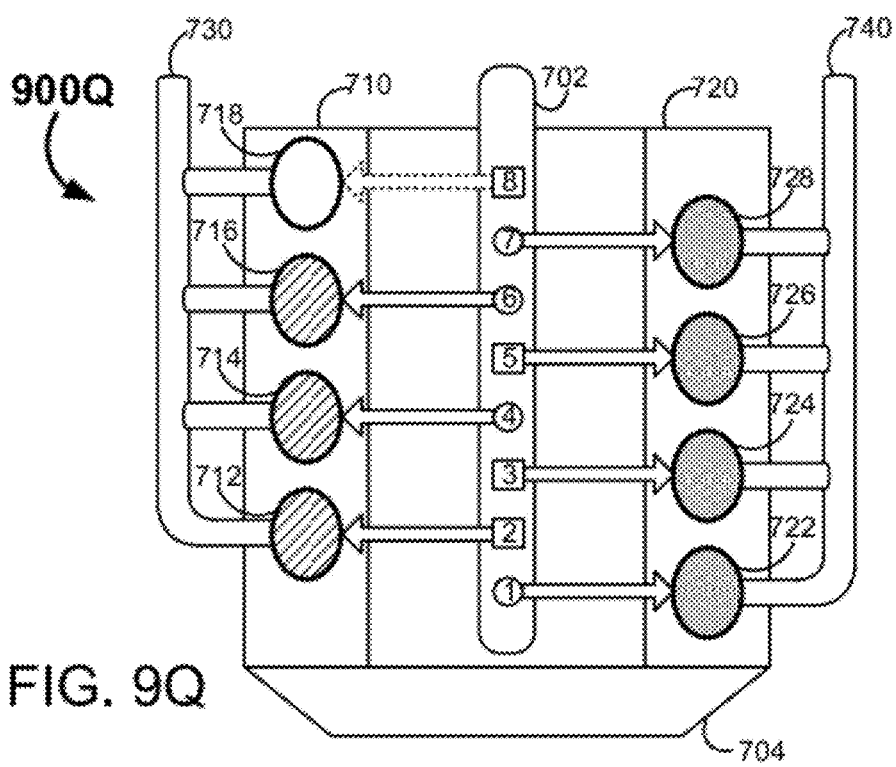

FIGS. 9A to 9Q are illustrative diagrams of an example V8 style internal combustion engine in a variable displacement mode where three working chambers are operational. As noted, there are only four "controllable" cylinders on the GM light block engine, two of the non-controllable chambers are in an operational mode, which is indicated by diagonal line shading. Also, a single controllable cylinder on the same bank is run as operational. The remaining non-controllable chambers on the other bank are then run without fuel injection, thereby allowing air to flow through the chambers to the exhaust manifold, which is indicated by dotted shading. It is important to note, however, that the combusted gases from the operational chambers cannot be mixed with flow through air, as this will result in failure of smog regulations on state and federal levels. Thus, to be in legal compliance, the air 'flow through' chambers must be on a separate exhaust manifold as the operational chambers. Examples are provided below.

At FIG. 9A, illustrated at 900A, Chamber One 722, Chamber Three 724 and Chamber Seven 728 are operational (indicated by diagonal shading). That is intake and exhaust valves are open and fuel is being delivered. The operational chambers vent to Right Exhaust Manifold 740. On the other hand, Chamber Four 714 and Chamber Six 716 are 'flow through' chambers where intake and exhaust valves are open but no fuel is being injected into the chambers (indicated by dotted shading). These 'flow through' chambers vent their air to the Left Exhaust Manifold 730. As such, combustion gasses and air-flow-through vent to separate exhaust manifolds, thus achieving legal smog compliance. The Chamber Two 712, Chamber Eight 718 and Chamber Five 726 are effectively shut down (indicated by no shading). Shut down chambers have no fuel injection and intake and exhaust valves are closed.

At FIG. 9B, illustrated at 900B, Chamber One 722, Chamber Three 724 and Chamber Seven 728 are still operational (indicated by diagonal shading), and the operational chambers vent to Right Exhaust Manifold 740. On the other hand, Chamber Two 712, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance. Only the Chamber Five 726 is effectively shut down (indicated by no shading).

At FIG. 9C, illustrated at 900C, Chamber One 722, Chamber Three 724 and Chamber Seven 728 are still operational (indicated by diagonal shading), and the operational chambers vent to Right Exhaust Manifold 740. On the other hand, Chamber Two 712, Chamber Four 714 and Chamber Six 716 are 'flow through' chambers (indicated by dotted shading) which vent their air to the Left Exhaust Manifold 730, thus preventing mixing with combustion gasses and achieving legal smog compliance. The Chamber Eight 718 and Chamber Five 726 are effectively shut down (indicated by no shading).

At FIG. 9D, illustrated at 900D, Chamber One 722, Chamber Three 724 and Chamber Seven 728 are still operational (indicated by diagonal shading), and the operational chambers vent to Right Exhaust Manifold 740. On the other hand, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance. The Chamber Two 712 and Chamber Five 726 are effectively shut down (indicated by no shading).

At FIG. 9E, illustrated at 900E, Chamber One 722, Chamber Five 726 and Chamber Seven 728 are now operational (indicated by diagonal shading), and the operational chambers vent to Right Exhaust Manifold 740. On the other hand, Chamber Four 714 and Chamber Six 716 are 'flow through' chambers (indicated by dotted shading) which vent their air to the Left Exhaust Manifold 730, thus preventing mixing with combustion gasses and achieving legal smog compliance. The Chamber Two 712, Chamber Eight 718 and Chamber Three 724 are effectively shut down (indicated by no shading).

At FIG. 9F, illustrated at 900F, Chamber One 722, Chamber Five 726 and Chamber Seven 728 are still operational (indicated by diagonal shading), and the operational chambers vent to Right Exhaust Manifold 740. On the other hand, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance. The Chamber Two 712 and Chamber Three 724 are effectively shut down (indicated by no shading).

At FIG. 9G, illustrated at 900G, Chamber One 722, Chamber Five 726 and Chamber Seven 728 are still operational (indicated by diagonal shading), and the operational chambers vent to Right Exhaust Manifold 740. On the other hand, Chamber Four 714, Chamber Six 716 and Chamber Two 712 are 'flow through' chambers (indicated by dotted shading) which vent their air to the Left Exhaust Manifold 730, thus preventing mixing with combustion gasses and achieving legal smog compliance. The Chamber Eight 718 and Chamber Three 724 are effectively shut down (indicated by no shading).

At FIG. 9H, illustrated at 900H, Chamber One 722, Chamber Five 726 and Chamber Seven 728 are still operational (indicated by diagonal shading), and the operational chambers vent to Right Exhaust Manifold 740. On the other hand, Chamber Two 712, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance. Only the Chamber Three 724 is effectively shut down (indicated by no shading).

At FIG. 9i, illustrated at 900i, Chamber Four 714, Chamber Six 716 and Chamber Eight 718 are now operational (indicated by diagonal shading), and the operational chambers vent to Left Exhaust Manifold 730. On the other hand, Chamber One 722 and Chamber Seven 728 are 'flow through' chambers (indicated by dotted shading) which vent their air to the Right Exhaust Manifold 740, thus preventing mixing with combustion gasses and achieving legal smog compliance. The Chamber Two 712, Chamber Three 724 and Chamber Five 726 are effectively shut down (indicated by no shading).

At FIG. 9J, illustrated at 900J, Chamber Four 714, Chamber Six 716 and Chamber Eight 718 are still operational (indicated by diagonal shading), and the operational chambers vent to the Left Exhaust Manifold 730. On the other hand, Chamber One 722, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. The Chamber Two 712 and Chamber Three 724 are effectively shut down (indicated by no shading).

At FIG. 9K, illustrated at 900K, Chamber Four 714, Chamber Six 716 and Chamber Eight 718 are still operational (indicated by diagonal shading), and the operational chambers vent to the Left Exhaust Manifold 730. On the other hand, Chamber One 722, Chamber Three 724 and Chamber Seven 728 are 'flow through' chambers (indicated by dotted shading) which vent their air to the Right Exhaust Manifold 740, thus preventing mixing with combustion gasses and achieving legal smog compliance. The Chamber Two 712 and Chamber Five 726 are effectively shut down (indicated by no shading).

At FIG. 9L, illustrated at 900L, Chamber Four 714, Chamber Six 716 and Chamber Eight 718 are still operational (indicated by diagonal shading), and the operational chambers vent to the Left Exhaust Manifold 730. On the other hand, Chamber One 722, Chamber Three 724, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. Only Chamber Two 712 is effectively shut down (indicated by no shading).

At FIG. 9M, illustrated at 900M, Chamber Four 714, Chamber Six 716 and Chamber Two 712 are now operational (indicated by diagonal shading), and the operational chambers vent to the Left Exhaust Manifold 730. On the other hand, Chamber One 722 and Chamber Seven 728 are 'flow through' chambers (indicated by dotted shading) which vent their air to the Right Exhaust Manifold 740, thus preventing mixing with combustion gasses and achieving legal smog compliance. The Chamber Eight 718, Chamber Three 724 and Chamber Five 726 are effectively shut down (indicated by no shading).

At FIG. 9N, illustrated at 900N, Chamber Four 714, Chamber Six 716 and Chamber Two 712 are still operational (indicated by diagonal shading), and the operational chambers vent to the Left Exhaust Manifold 730. On the other hand, Chamber One 722, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. The Chamber Eight 718 and Chamber Three 724 are effectively shut down (indicated by no shading).

At FIG. 9P, illustrated at 900P, Chamber Four 714, Chamber Six 716 and Chamber Two 712 are still operational (indicated by diagonal shading), and the operational chambers vent to the Left Exhaust Manifold 730. On the other hand, Chamber One 722, Chamber Three 724 and Chamber Seven 728 are 'flow through' chambers (indicated by dotted shading) which vent their air to the Right Exhaust Manifold 740, thus preventing mixing with combustion gasses and achieving legal smog compliance. The Chamber Eight 718 and Chamber Five 726 are effectively shut down (indicated by no shading).

At FIG. 9Q, illustrated at 900Q, Chamber Four 714, Chamber Six 716 and Chamber Two 712 are still operational (indicated by diagonal shading), and the operational chambers vent to the Left Exhaust Manifold 730. On the other hand, Chamber One 722, Chamber Three 724, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. Only Chamber Eight 718 is effectively shut down (indicated by no shading).

Thus, in this manner any two non-controllable chambers, and one controllable chamber on a single manifold may be operational thereby providing a three cylinder variable displacement mode to V8 small block engines of similar design.

D. Four Chamber Operation

FIGS. 10A to 10i are illustrative diagrams of an example V8 style internal combustion engine in a variable displacement mode where four working chambers are operational. As noted, there are only four "controllable" cylinders on the GM light block engine. Thus, as is currently done, all of the non-controllable chambers may be in an operational mode, which is indicated by diagonal line shading. However, it is also possible to run an entire bank of the chambers in an operational mode and have the remaining non-controllable chambers on the other bank run without fuel injection, thereby allowing air to flow through the chambers to the exhaust manifold, which is indicated by dotted shading. It is important to note, however, that the combusted gases from the operational chambers cannot be mixed with flow through air, as this will result in failure of smog regulations on state and federal levels. Thus, to be in legal compliance, the air 'flow through' chambers, if used, must be on a separate exhaust manifold as the operational chambers. Examples are provided below.

Figure 10A:
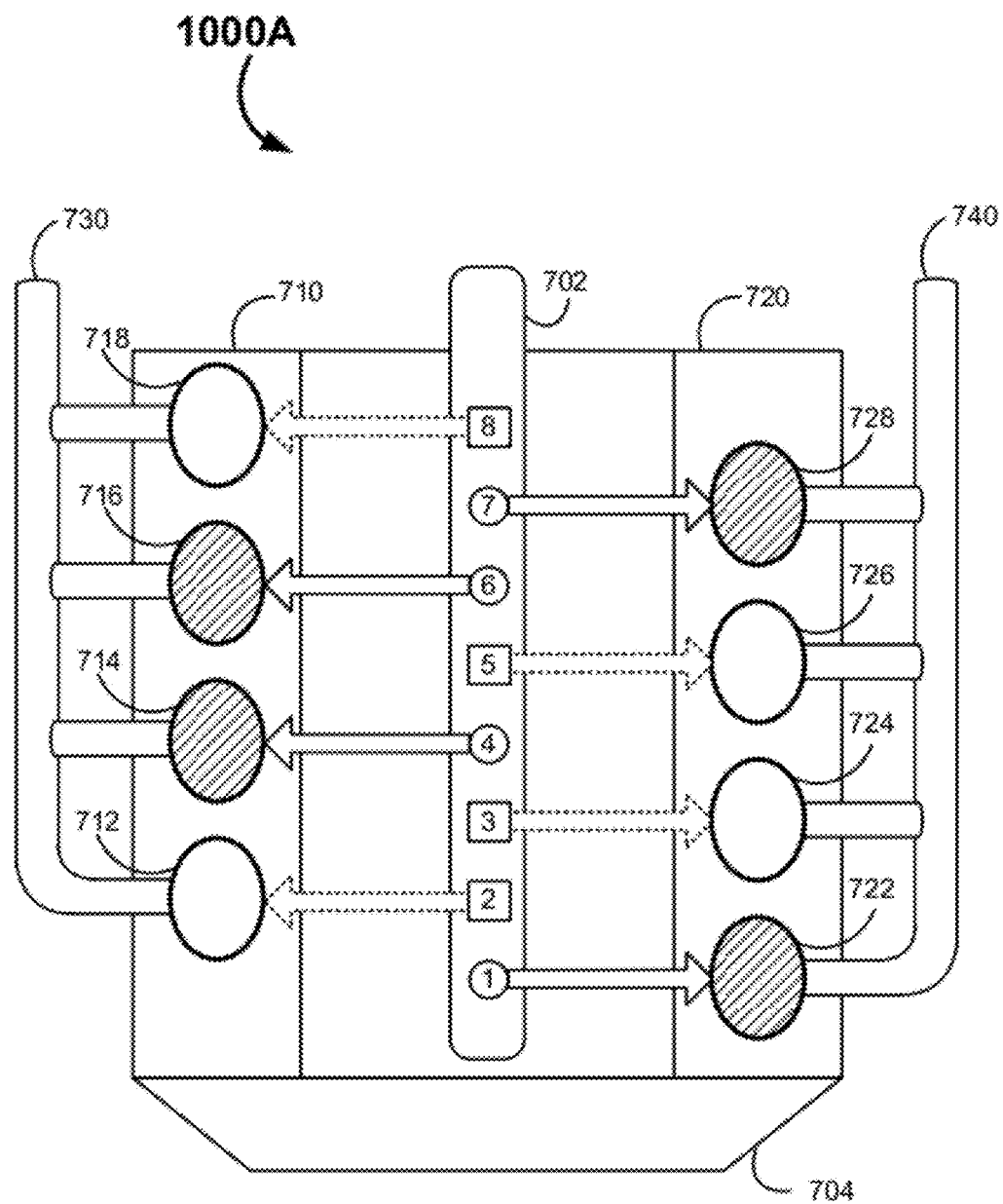
FIGS. 10A to 10*i* are illustrative diagrams of an example V8 style internal combustion engine in a variable displacement mode where four working chambers are operational in accordance with an embodiment of the present invention.

At FIG. 10A, illustrated at 1000A, Chamber One 722, Chamber Four 714, Chamber Six 716 and Chamber Seven 728 are operational (indicated by diagonal shading). That is intake and exhaust valves are open and fuel is being delivered. All other chamber: Chamber Two 712, Chamber Three 724, Chamber Five 726 and Chamber Eight 718 are effectively shut down (indicated by no shading). Shut down chambers have no fuel injection and intake and exhaust valves are closed. This is the same operational mode as the GM light block engine is currently designed to enter when in a reduced load operation.

Figure 10B:
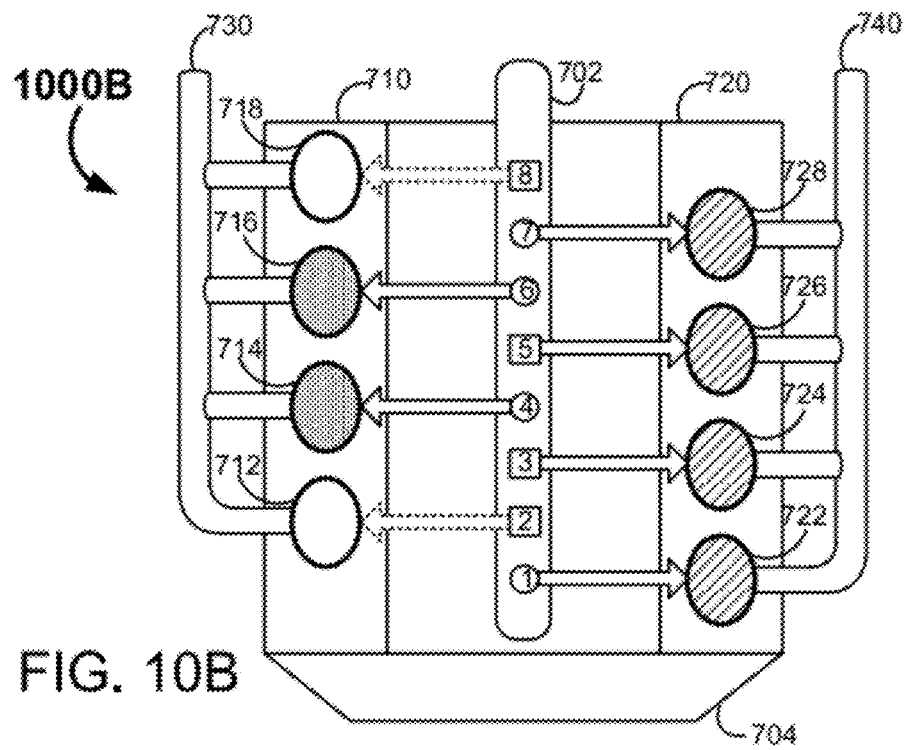

At FIG. 10B, illustrated at 1000B, all chambers in the Right Bank 720 are operational (indicated by diagonal shading), and the operational chambers vent to the Right Exhaust Manifold 740. On the other hand, Chamber Four 714 and Chamber Six 716 are 'flow through' chambers (indicated by dotted shading) which vent their air to the Left Exhaust Manifold 730, thus preventing mixing with combustion gasses and achieving legal smog compliance. Chamber Two 712 and Chamber Eight 718 are effectively shut down (indicated by no shading).

Figure 10C:
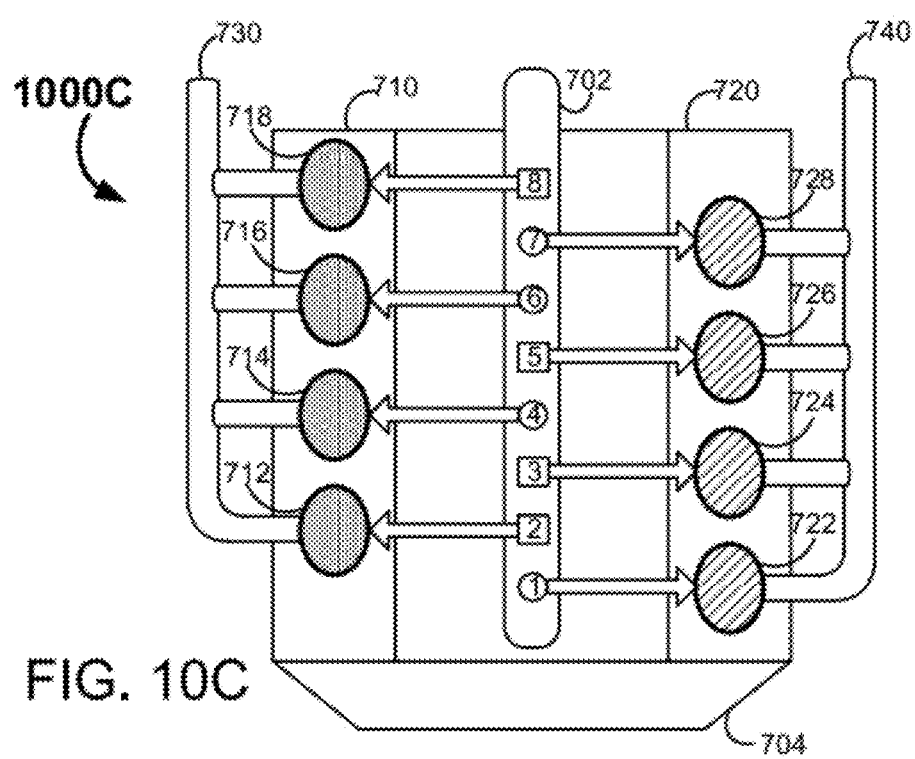

At FIG. 10C, illustrated at 1000C, all chambers in the Right Bank 720 are operational (indicated by diagonal shading), and the operational chambers vent to the Right Exhaust Manifold 740. On the other hand, Chamber Two 712, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance.

Figure 10D:
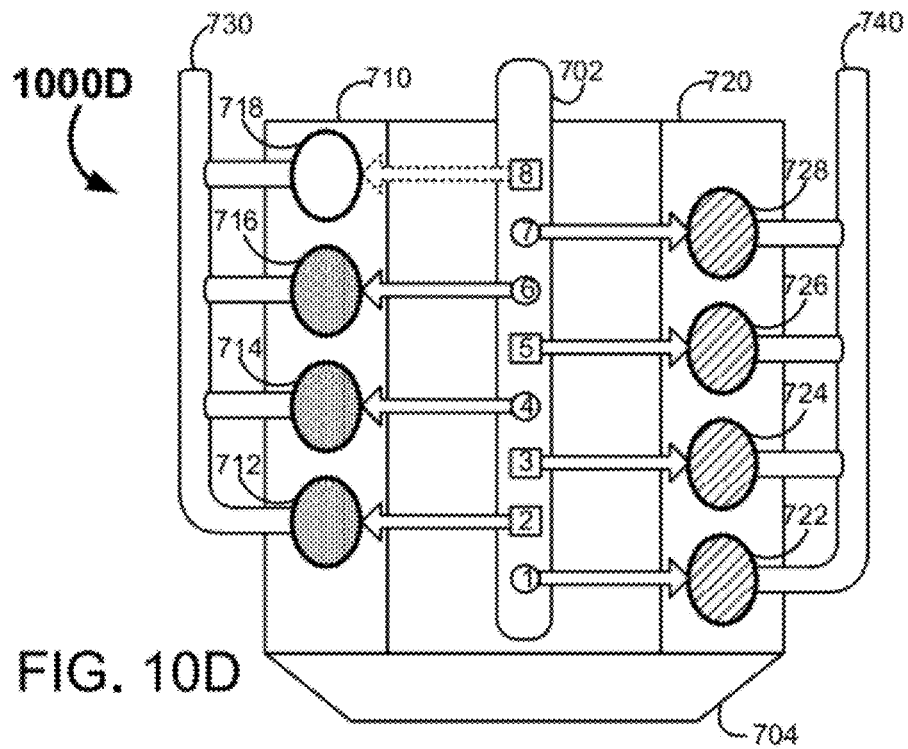

At FIG. 10D, illustrated at 1000D, all chambers in the Right Bank 720 are operational (indicated by diagonal shading), and the operational chambers vent to the Right Exhaust Manifold 740. On the other hand, Chamber Two 712, Chamber Four 714 and Chamber Six 716 are 'flow through' chambers (indicated by dotted shading) which vent their air to the Left Exhaust Manifold 730, thus preventing mixing with combustion gasses and achieving legal smog compliance. Only Chamber Eight 718 is effectively shut down (indicated by no shading).

Figure 10E:
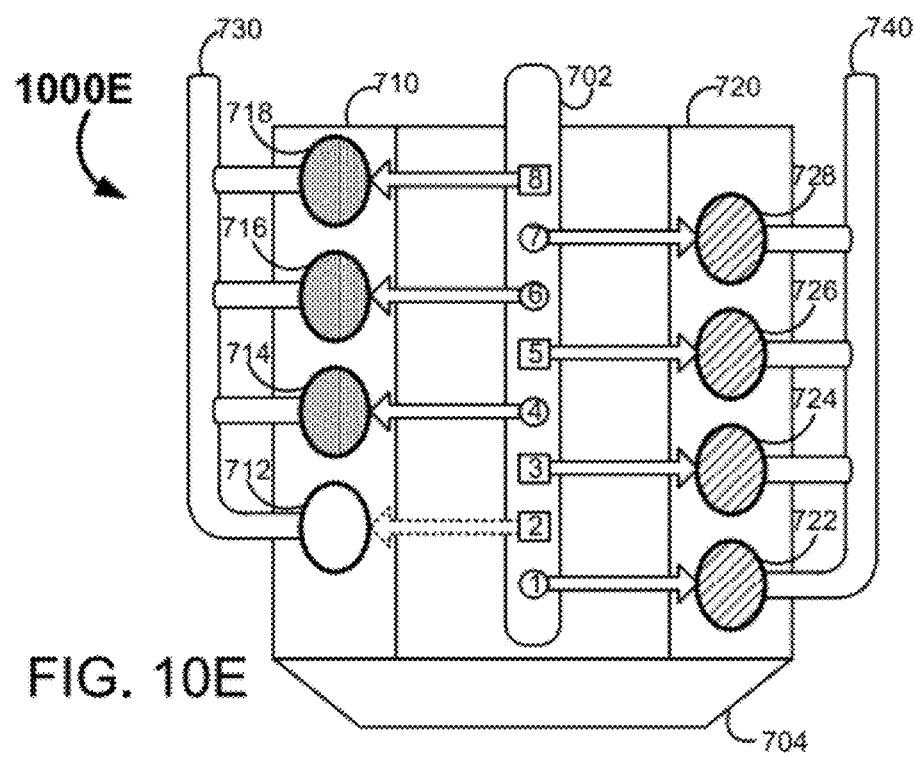

At FIG. 10E, illustrated at 1000E, all chambers in the Right Bank 720 are operational (indicated by diagonal shading), and the operational chambers vent to the Right Exhaust Manifold 740. On the other hand, Chamber Four 714, Chamber Six 716 and Chamber Eight 718 are 'flow through' chambers (indicated by dotted shading) which vent their air to the Left Exhaust Manifold 730, thus preventing mixing with combustion gasses and achieving legal smog compliance. Only Chamber Two 712 is effectively shut down (indicated by no shading).

Figure 10F:
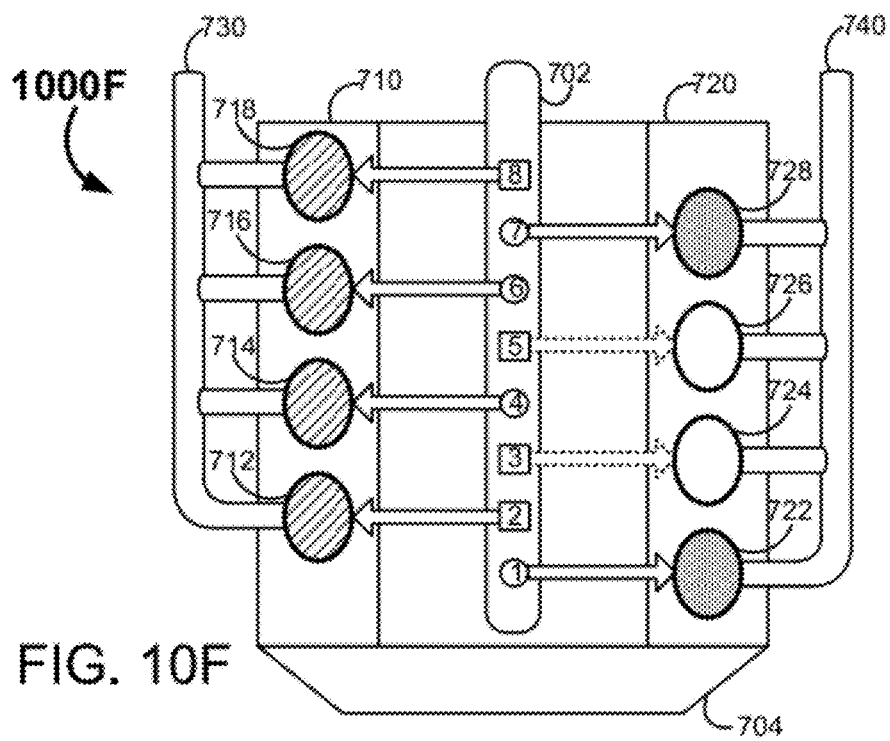

At FIG. 10F, illustrated at 1000F, all chambers in the Left Bank 710 are operational (indicated by diagonal shading), and the operational chambers vent to the Left Exhaust Manifold 730. On the other hand, Chamber One 722 and Chamber Seven 728 are 'flow through' chambers (indicated by dotted shading) which vent their air to the Right Exhaust Manifold 740, thus preventing mixing with combustion gasses and achieving legal smog compliance. Chamber Three 724 and Chamber Five 726 are effectively shut down (indicated by no shading).

Figure 10G:
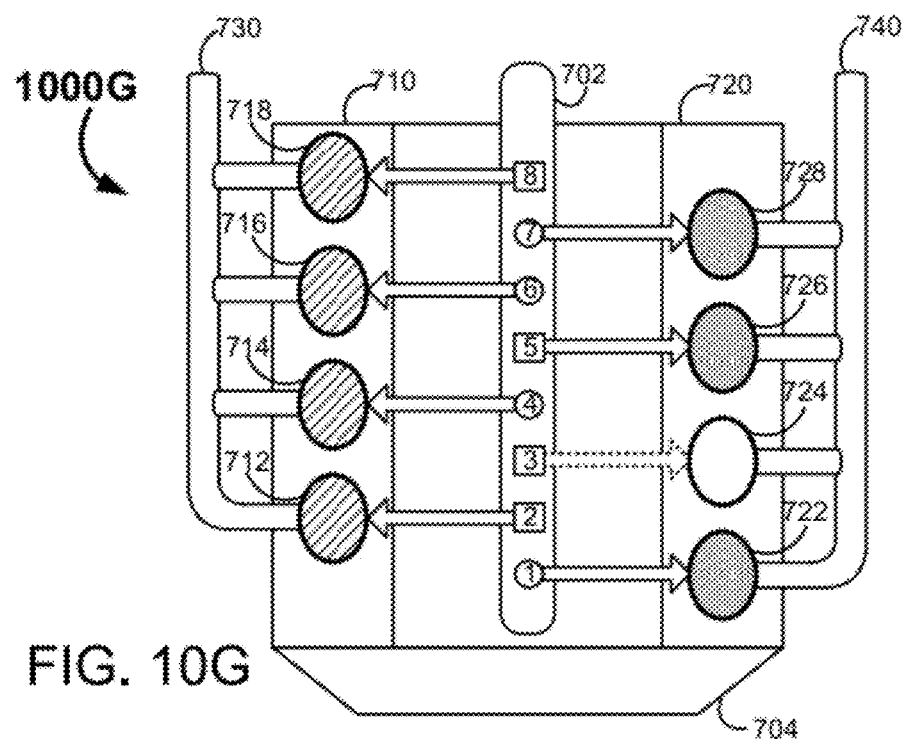

At FIG. 10G, illustrated at 1000G, all chambers in the Left Bank 710 are operational (indicated by diagonal shading), and the operational chambers vent to the Left Exhaust Manifold 730. On the other hand, Chamber One 722, Chamber Five 726 and Chamber Seven 728 are 'flow through' chambers (indicated by dotted shading) which vent their air to the Right Exhaust Manifold 740, thus preventing mixing with combustion gasses and achieving legal smog compliance. Only Chamber Three 724 is effectively shut down (indicated by no shading).

Figure 10H:
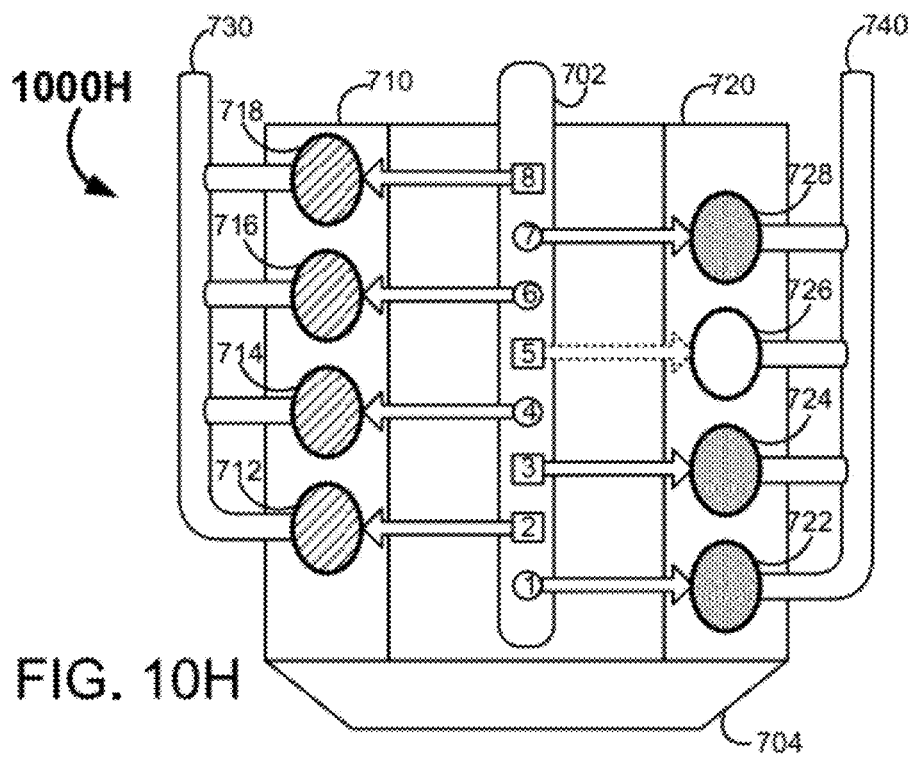
Figure 10I:
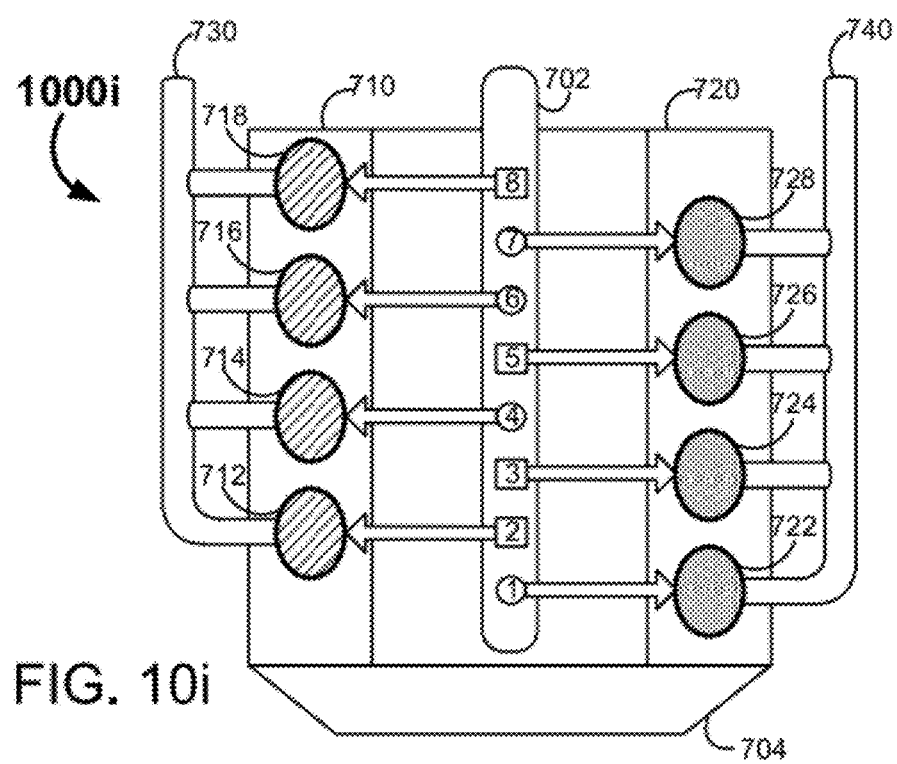

At FIG. 10H, illustrated at 1000H, all chambers in the Left Bank 710 are operational (indicated by diagonal shading), and the operational chambers vent to the Left Exhaust Manifold 730. On the other hand, Chamber One 722, Chamber Three 724 and Chamber Seven 728 are 'flow through' chambers (indicated by dotted shading) which vent their air to the Right Exhaust Manifold 740, thus preventing mixing with combustion gasses and achieving legal smog compliance. Only Chamber Five 726 is effectively shut down (indicated by no shading).

At FIG. 10$i$, illustrated at 1000$i$, all chambers in the Left Bank 710 are operational (indicated by diagonal shading), and the operational chambers vent to the Left Exhaust Manifold 730. On the other hand, Chamber One 722, Chamber Three 724, Chamber Five 726 and Chamber Seven 728 are 'flow through' chambers (indicated by dotted shading) which vent their air to the Right Exhaust Manifold 740, thus preventing mixing with combustion gasses and achieving legal smog compliance.

Thus, in this manner all non-controllable chambers, or all chambers on one bank may be operational thereby providing a four cylinder variable displacement mode to V8 small block engines of similar design.

E. Five Chamber Operation

FIGS. 11A to 11D are illustrative diagrams of an example V8 style internal combustion engine in a variable displacement mode where five working chambers are operational. Since, as previously noted, the combusted gases from the operational chambers cannot be mixed with flow through air, after a four chamber operational mode, the inclusion of air flow through chambers becomes impossible on a dual exhaust manifold system. Thus, the examples provided below illustrate permutations of five working cylinders where the four non controllable cylinders are operational plus an additional one of the controllable chambers.

Figure 11A:
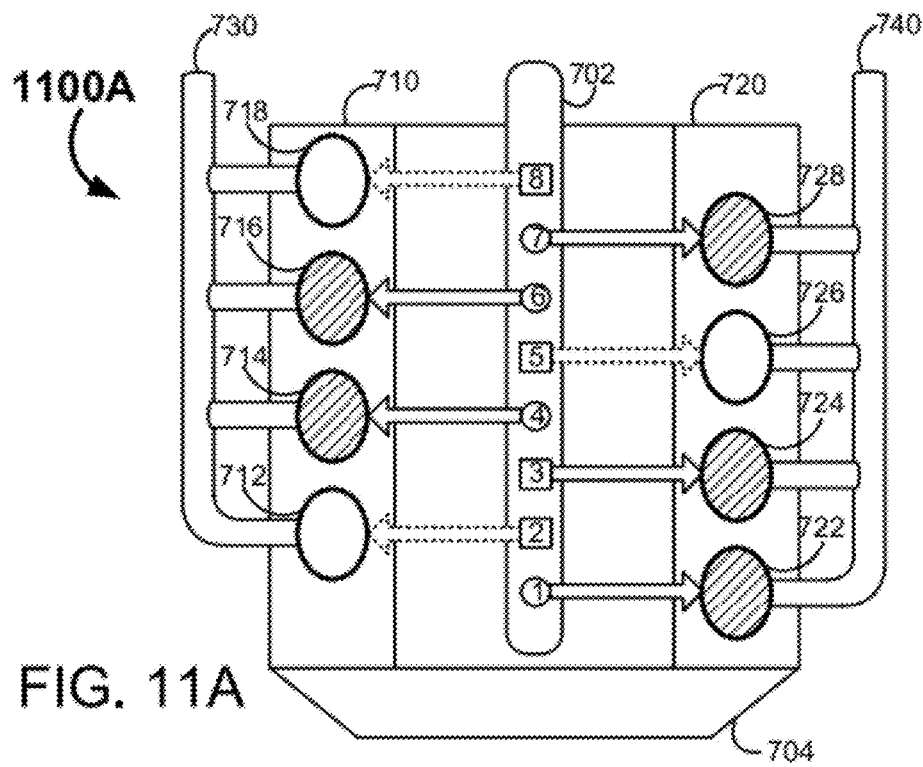
FIGS. 11A to 11D are illustrative diagrams of an example V8 style internal combustion engine in a variable displacement mode where five working chambers are operational in accordance with an embodiment of the present invention.

At FIG. 11A, illustrated at 1100A, Chamber One 722, Chamber Three 724, Chamber Four 714, Chamber Six 716 and Chamber Seven 728 are operational (indicated by diagonal shading). That is intake and exhaust valves are open and fuel is being delivered. All other chambers: Chamber Two 712, Chamber Five 726 and Chamber Eight 718 are effectively shut down (indicated by no shading). Shut down chambers have no fuel injection and intake and exhaust valves are closed.

Figure 11B:
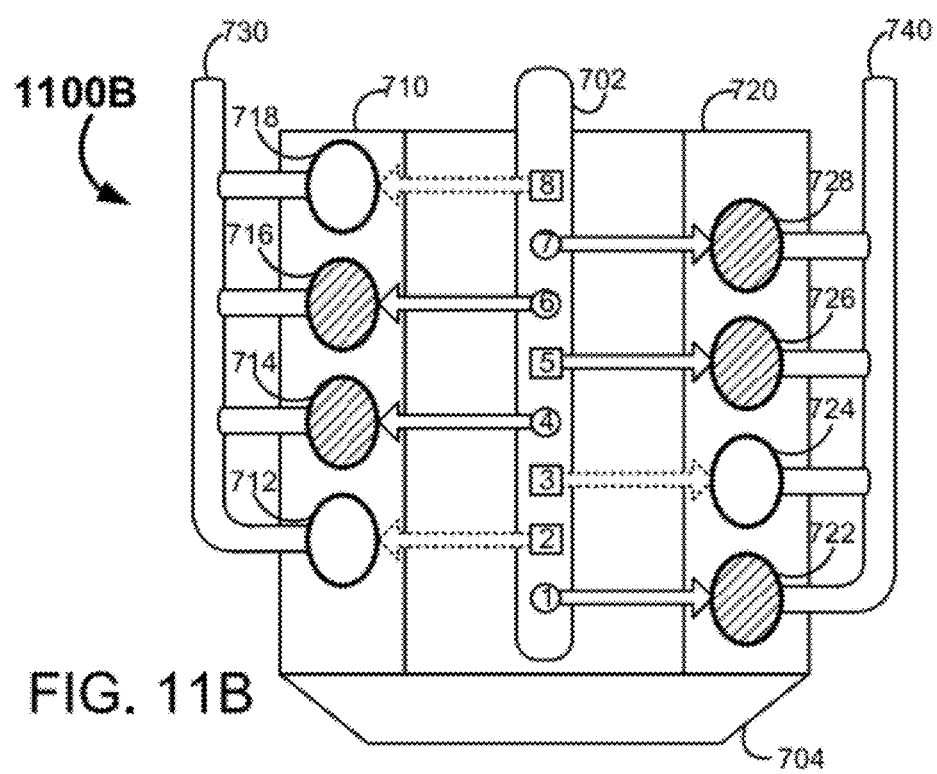

At FIG. 11B, illustrated at 1100B, Chamber One 722, Chamber Five 726, Chamber Four 714, Chamber Six 716 and Chamber Seven 728 are operational (indicated by diagonal shading). All other chambers: Chamber Two 712, Chamber Three 724 and Chamber Eight 718 are effectively shut down (indicated by no shading).

Figure 11C:
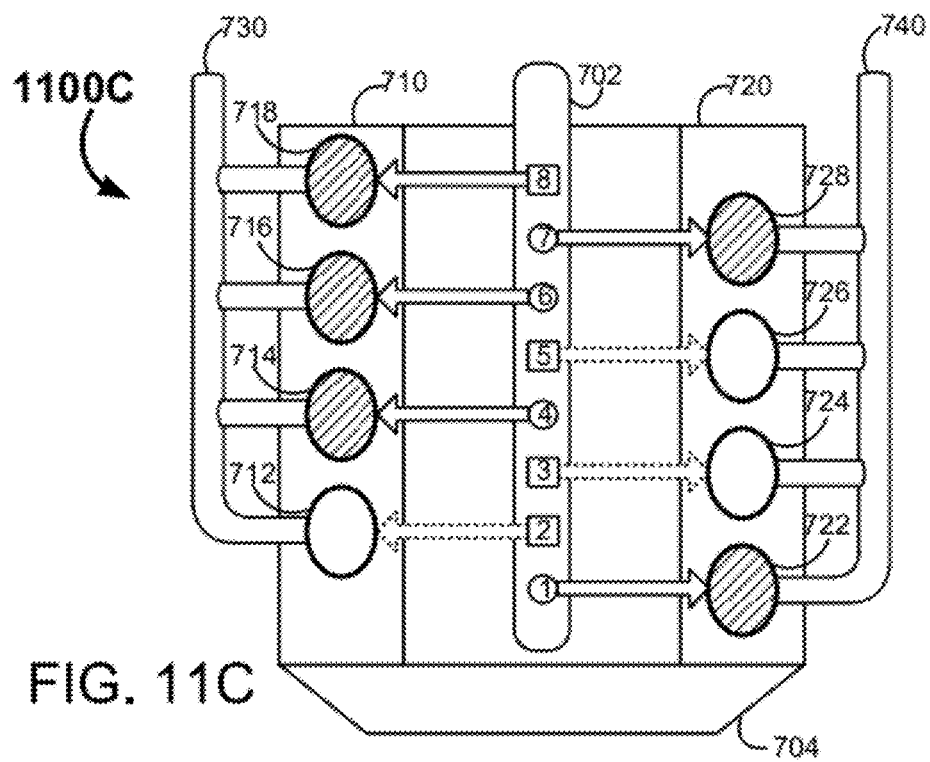

At FIG. 11C, illustrated at 1100C, Chamber One 722, Chamber Six 716, Chamber Four 714, Chamber Eight 718 and Chamber Seven 728 are operational (indicated by diagonal shading). All other chambers: Chamber Two 712, Chamber Three 724 and Chamber Five 726 are effectively shut down (indicated by no shading).

Figure 11D:
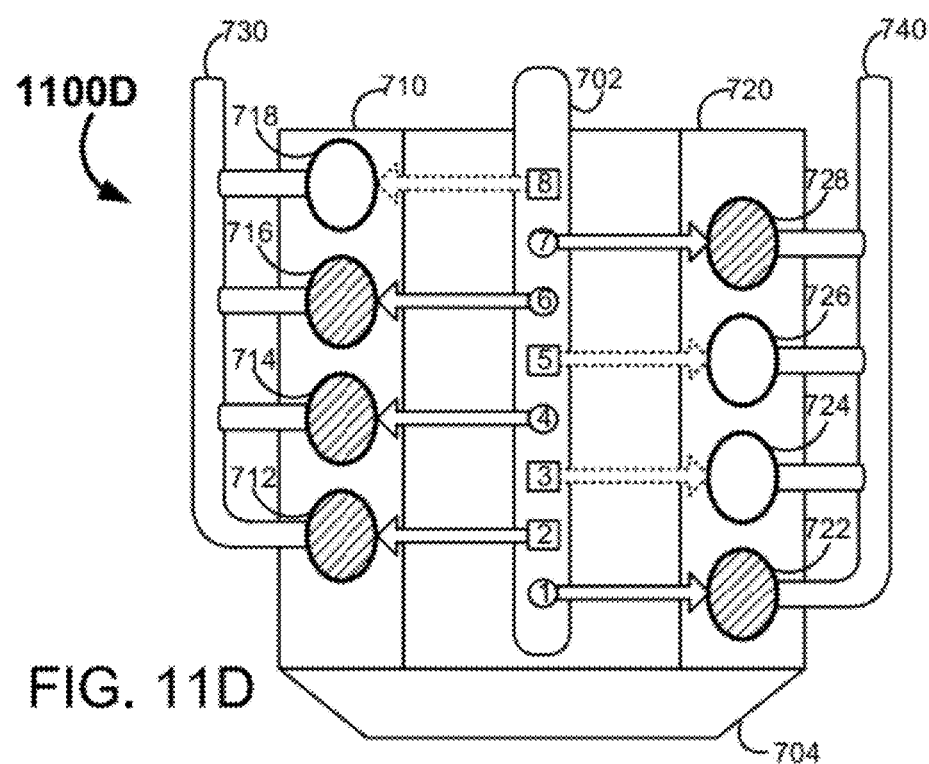

At FIG. 11D, illustrated at 1100D, Chamber One 722, Chamber Two 712, Chamber Four 714, Chamber Six 716 and Chamber Seven 728 are operational (indicated by diagonal shading). All other chambers: Chamber Three 724, Chamber Five 726 and Chamber Eight 718 are effectively shut down (indicated by no shading).

Thus, in this manner all non-controllable chambers plus one controllable chamber may be operational thereby providing a five cylinder variable displacement mode to V8 small block engines of similar design.

F. Six Chamber Operation

FIGS. 12A to 12F are illustrative diagrams of an example V8 style internal combustion engine in a variable displacement mode where six working chambers are operational. As with five cylinder operation, the inclusion of air flow through chambers becomes impossible on a dual exhaust manifold system. Thus, the examples provided below illustrate permutations of six working cylinders where the four non controllable cylinders are operational plus two additional ones of the controllable chambers.

Figure 12A:
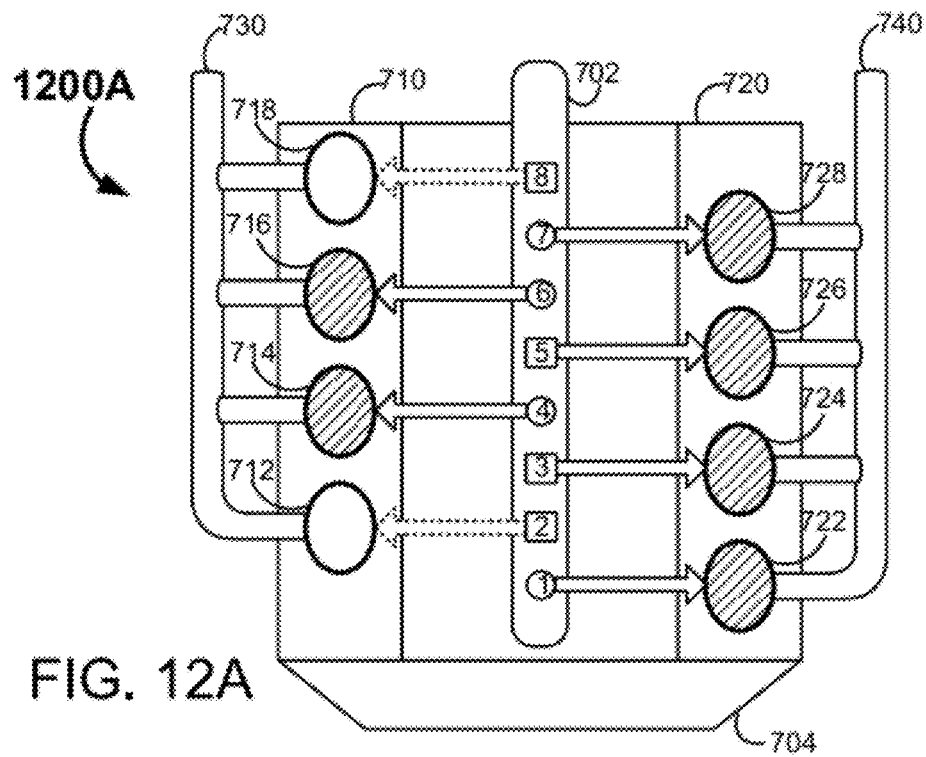
FIGS. 12A to 12F are illustrative diagrams of an example V8 style internal combustion engine in a variable displacement mode where six working chambers are operational in accordance with an embodiment of the present invention.

At FIG. 12A, illustrated at 1200A, Chamber One 722, Chamber Three 724, Chamber Four 714, Chamber Five 726, Chamber Six 716 and Chamber Seven 728 are operational (indicated by diagonal shading). That is intake and exhaust valves are open and fuel is being delivered. All other chambers: Chamber Two 712 and Chamber Eight 718 are effectively shut down (indicated by no shading). Shut down chambers have no fuel injection and intake and exhaust valves are closed.

Figure 12B:
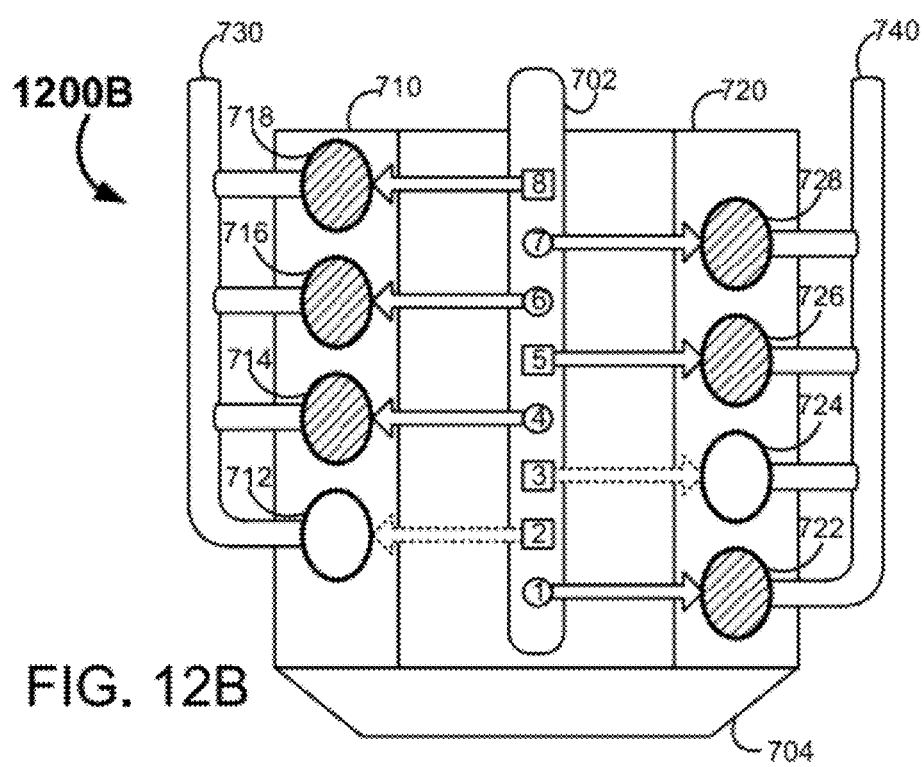

At FIG. 12B, illustrated at 1200B, Chamber One 722, Chamber Four 714, Chamber Five 726, Chamber Six 716, Chamber Seven 728 and Chamber Eight 718 are operational (indicated by diagonal shading). All other chambers: Chamber Two 712 and Chamber Three 724 are effectively shut down (indicated by no shading).

Figure 12C:
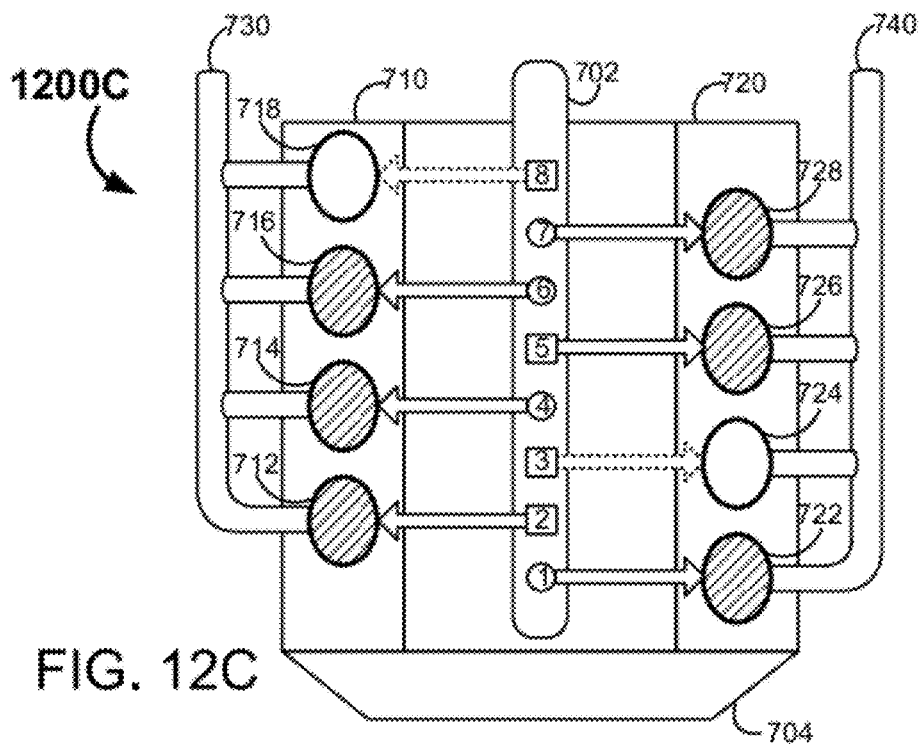

At FIG. 12C, illustrated at 1200C, Chamber One 722, Chamber Two 712, Chamber Four 714, Chamber Five 726, Chamber Six 716 and Chamber Seven 728 are operational (indicated by diagonal shading). All other chambers: Chamber Eight 718 and Chamber Three 724 are effectively shut down (indicated by no shading).

Figure 12D:
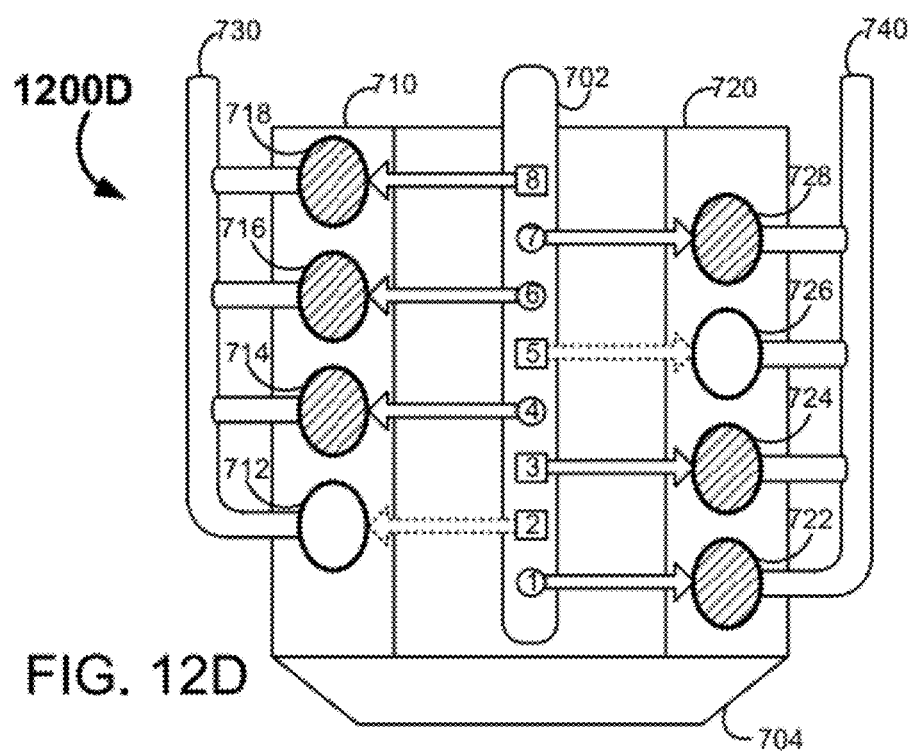

At FIG. 12D, illustrated at 1200D, Chamber One 722, Chamber Three 724, Chamber Four 714, Chamber Six 716, Chamber Seven 728 and Chamber Eight 718 are operational (indicated by diagonal shading). All other chambers: Chamber Two 712 and Chamber Five 726 are effectively shut down (indicated by no shading).

Figure 12E:
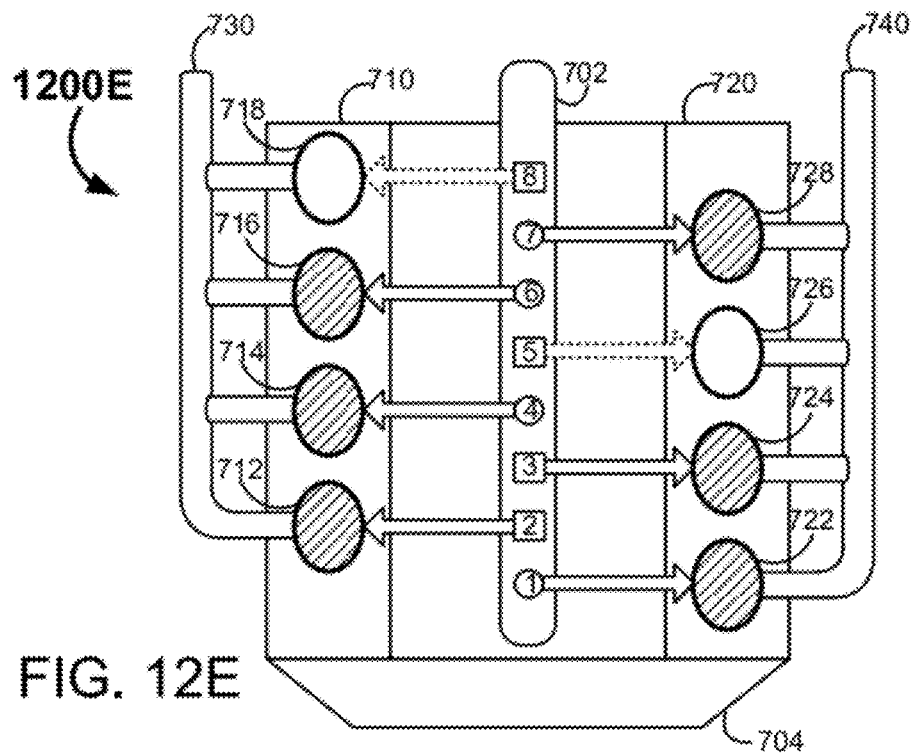

At FIG. 12E, illustrated at 1200E, Chamber One 722, Chamber Two 712, Chamber Three 724, Chamber Four 714, Chamber Six 716 and Chamber Seven 728 are operational (indicated by diagonal shading). All other chambers: Chamber Five 726 and Chamber Eight 718 are effectively shut down (indicated by no shading).

Figure 12F:
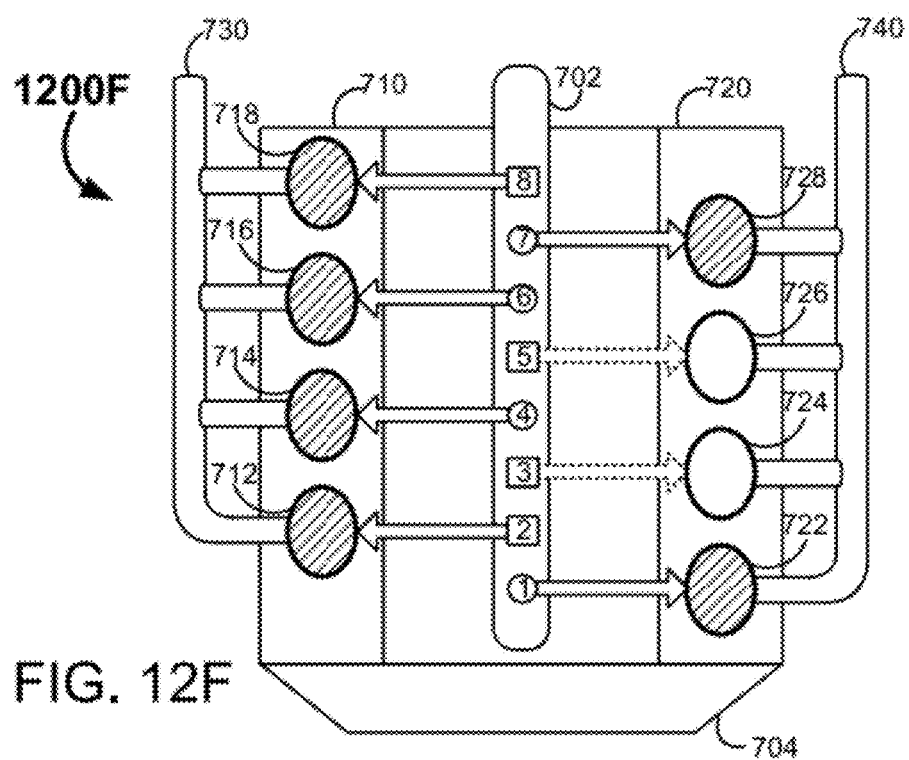

At FIG. 12F, illustrated at 1200F, Chamber One 722, Chamber Two 712, Chamber Four 714, Chamber Six 716, Chamber Seven 728 and Chamber Eight 718 are operational (indicated by diagonal shading). All other chambers: Chamber Three 724 and Chamber Five 726 are effectively shut down (indicated by no shading).

Thus, in this manner all non-controllable chambers plus two controllable chambers may be operational thereby providing a six cylinder variable displacement mode to V8 small block engines of similar design.

G. Seven Chamber Operation

FIGS. 13A to 13D are illustrative diagrams of an example V8 style internal combustion engine in a variable displacement mode where seven working chambers are operational. As with five and six cylinder operation, the inclusion of air flow through chambers becomes impossible on a dual exhaust manifold system. Thus, the examples provided below illustrate permutations of six working cylinders where one of the controllable chambers is deactivated and thus "shut down".

Figure 13A:
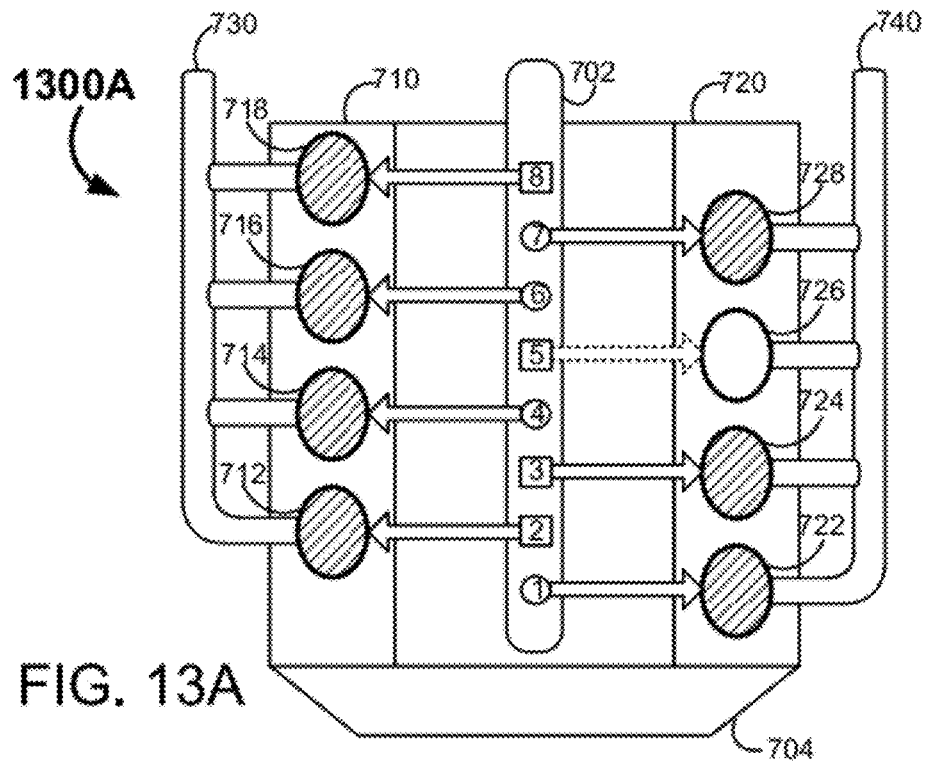
FIGS. 13A to 13D are illustrative diagrams of an example V8 style internal combustion engine in a variable displacement mode where seven working chambers are operational in accordance with an embodiment of the present invention.

At FIG. 13A, illustrated at 1300A, Chamber One 722, Chamber Two 712, Chamber Three 724, Chamber Four 714, Chamber Six 716, Chamber Seven 728 and Chamber Eight 718 are operational (indicated by diagonal shading). That is intake and exhaust valves are open and fuel is being delivered. Only Chamber Five 726 is effectively shut down (indicated by no shading). Shut down chambers have no fuel injection and intake and exhaust valves are closed.

Figure 13B:
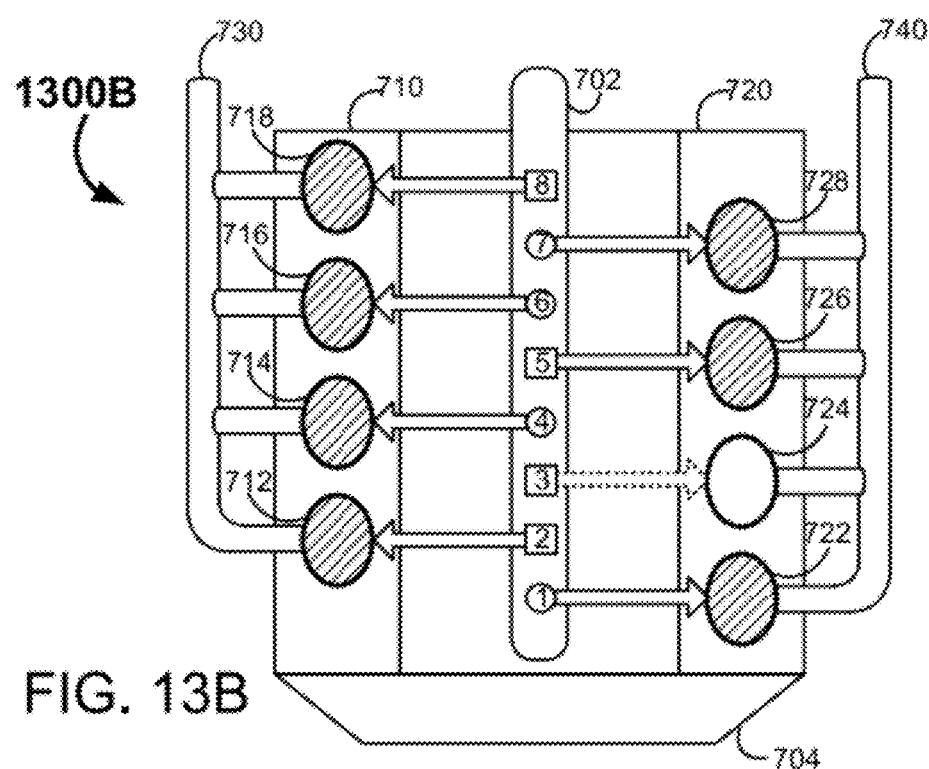

At FIG. 13B, illustrated at 1300B, Chamber One 722, Chamber Two 712, Chamber Four 714, Chamber Five 726, Chamber Six 716, Chamber Seven 728 and Chamber Eight 718 are operational (indicated by diagonal shading). Only Chamber Three 724 is effectively shut down (indicated by no shading).

Figure 13C:
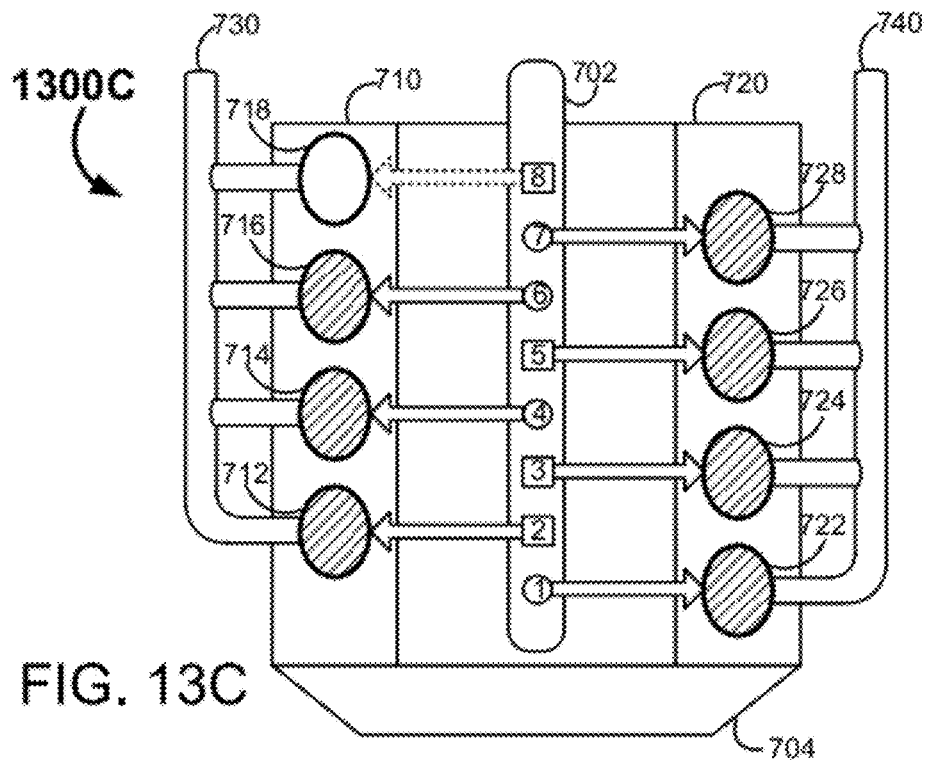

At FIG. 13C illustrated at 1300C Chamber One 722, Chamber Two 712, Chamber Three 724, Chamber Four 714, Chamber Five 726, Chamber Six 716 and Chamber Seven 728 are operational (indicated by diagonal shading). Only Chamber Eight 718 is effectively shut down (indicated by no shading).

Figure 13D:
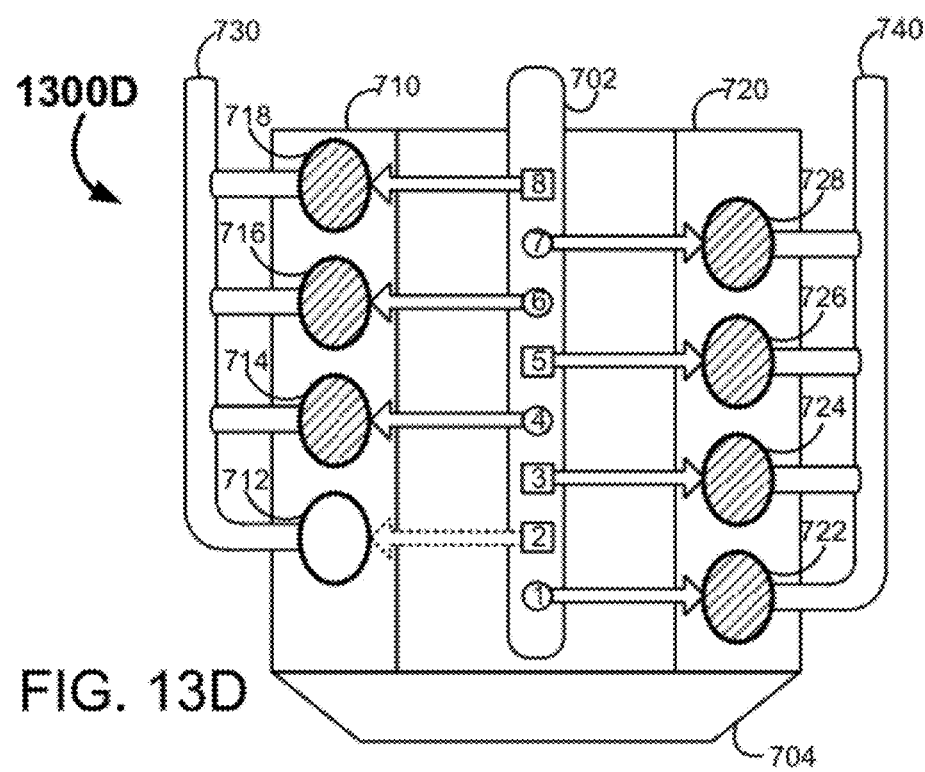

At FIG. 13D, illustrated at 1300D, Chamber One 722, Chamber Three 724, Chamber Four 714, Chamber Five 726, Chamber Six 716, Chamber Seven 728 and Chamber Eight 718 are operational (indicated by diagonal shading). Only Chamber One 722 is effectively shut down (indicated by no shading).

Thus, in this manner one controllable chamber is deactivated thereby providing a seven cylinder variable displacement mode to V8 small block engines of similar design.

III. Example Two

Six Chamber Dual Exhaust Engines

FIGS. 14A to 18E are functional permutations of an example V6 style internal combustion engine in conventional operation. This style engine is functionally similar to the Honda™ V6 J-series engine. Of course, many V6 style engines are functionally similar to the exemplary diagram.

The six cylinder Honda™ engine is capable of shutting down 2 or 3 cylinders. The system uses the i-VTEC system to turn off one bank of cylinders under light loads, turning the V6 into a straight-3. The latest Variable Cylinder Management system is able to turn off one bank of cylinders or one cylinder on opposing banks, allowing for three-cylinder use under light loads and four-cylinder use under medium loads.

The Honda J series engine deactivates specific cylinders by using the VTEC (Variable Valve-Timing and Lift Electronic Control) system to close the intake and exhaust valves while simultaneously the Powertrain Control Module cuts fuel to those cylinders. When operating on three cylinders, the rear cylinder bank is shut down. When running on four cylinders, the left and centre cylinders of the front bank operate, and the right and centre cylinders of the rear bank operate.

The spark plugs continue to fire in inactive cylinders to minimize plug temperature loss and prevent fouling induced from incomplete combustion during cylinder re-activation.

The system is electronically controlled, and uses special integrated spool valves that do double duty as rocker-shaft holders in the cylinder heads. Based on commands from the system's electronic control unit, the spool valves selectively direct oil pressure to the rocker arms for specific cylinders. This oil pressure in turn drives synchronizing pistons that connect and disconnect the rocker arms.

The current Honda™ J-series engines monitor throttle position, vehicle speed, engine speed, automatic-transmission gear selection and other factors to determine the correct cylinder activation scheme for the operating conditions. In addition, the system determines whether engine oil pressure is suitable for variable displacement switching and whether catalytic-converter temperature will remain in the proper range. To smooth the transition between activating or deactivating cylinders, the system adjusts ignition timing, drive-by-wire throttle position and turns the torque converter lock-up on and off. As a result, the transition between three-, four-, and six-cylinder operation is unnoticeable.

However, despite the successes in fuel efficiency realized by the Honda™ J-series engines, there are numerous technical hurdles which have, until now, reduced the engine's efficiency. These hurdles include 1) the relatively short duration the engines remain in a variable displacement mode, 2) the limited number of variable displacement modes, and 3) the relative unresponsiveness of these engines to changes in desired output and operating conditions.

The present invention overcomes these hurdles by enabling a wider range of operational modes, including one, two and five cylinder operation. In addition the switching between said modalities of operation are much more rapid, thanks in part to the digital sigma-delta modulator described above. The greater range of working conditions enables, and the ability to switch between them rapidly enables engines including the present invention to run in a variable displacement for longer durations, even continuously. This all results in much greater efficiency gains over the current variable displacement engines.

The Engine Block 1404 is illustrated having six working chambers, labeled 1412 to 1426. A Left Bank 1410 and a Right Bank 1420 are shown, as is the Crank Shaft 1402 for orientation purposes. Chamber numbers are illustrated in the center of the engine on the Crank Shaft 1402. The Chamber numbers are labeled from one, at the front of the engine, to six, at the rear of the engine, in the present Figures. Chamber number designators are illustrated as square or circular. In this example square chamber designators are intended to illustrate chambers which have controllable operation, while the single circular chamber number designator indicates that the given chamber is non-controllable. Thus, Chamber Six 1416 is always operational, whereas Chamber One 1422, Chamber Two 1412, Chamber Three 1424, Chamber Four 1414, and Chamber Five 1426 are capable of being "shut off". This operational limitation is common in a number of existing engines currently in use, including the Honda™ J-series engine.

Also of note, the illustrated engine has a dual exhaust manifold system, whereby the Right Exhaust Manifold 1440 receives exhaust from the Chamber One 1422, Chamber Three 1424 and Chamber Five 1426 located on the Right Bank 1420. Conversely, the Left Exhaust Manifold 1430 receives exhaust from the Chamber Two 1412, Chamber Four 1414 and Chamber Six 1416 located on the Left Bank 1410. For many engine types, two or more exhaust manifolds are not uncommon.

A. One Chamber Operation

Figure 14A:
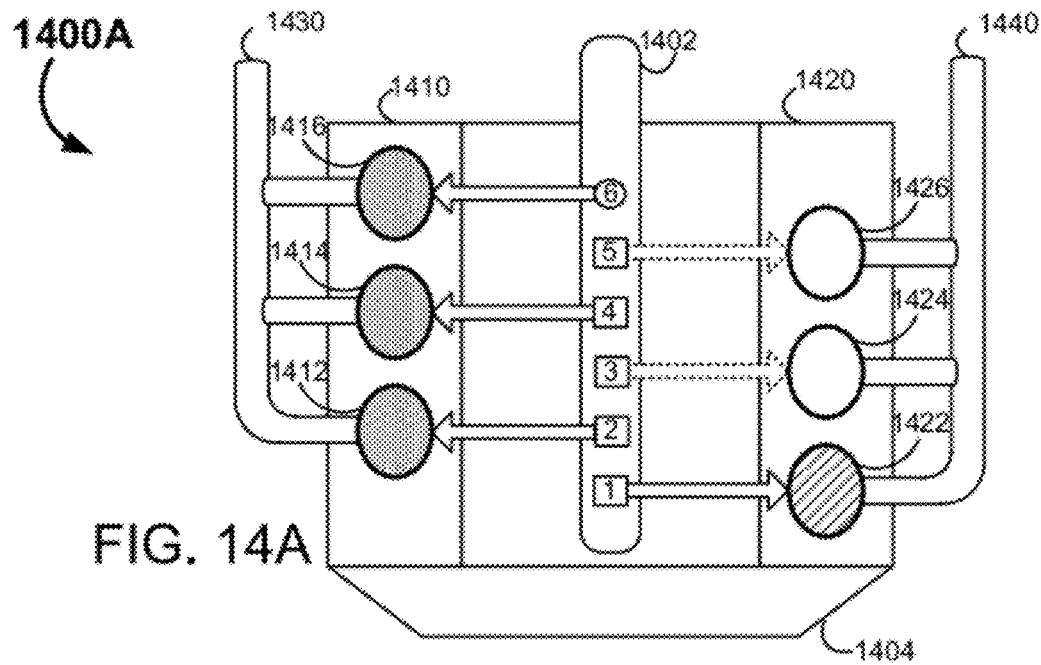
FIGS. 14A to 14U are illustrative diagrams of an example V6 style internal combustion engine in a variable displacement mode where one working chamber is operational in accordance with an embodiment of the present invention.
Figure 14B:
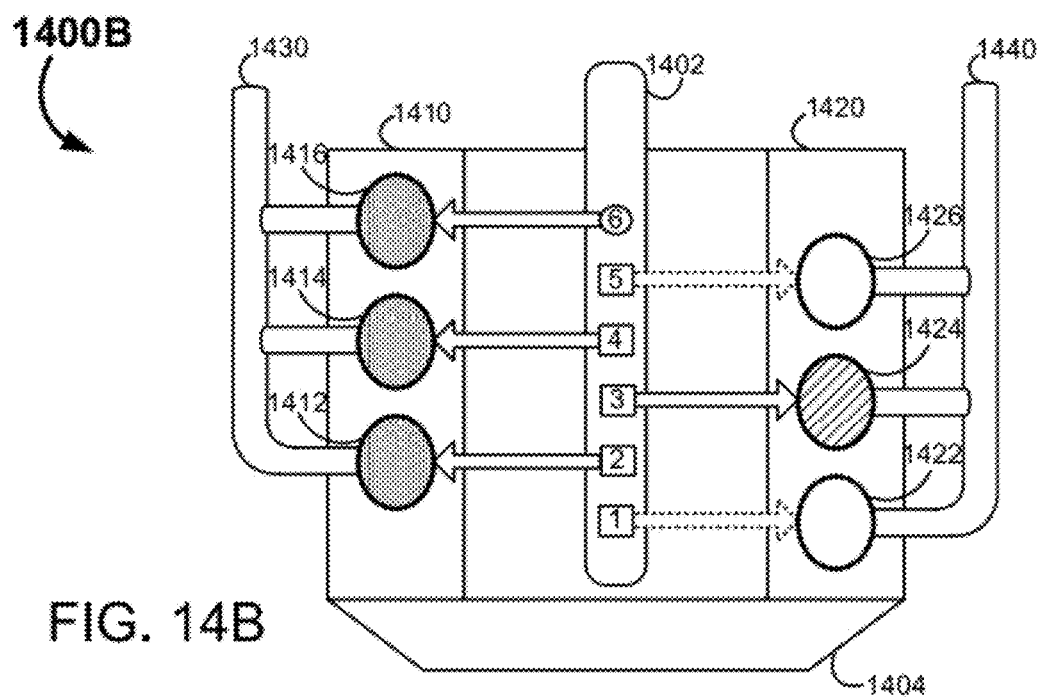
Figure 14C:
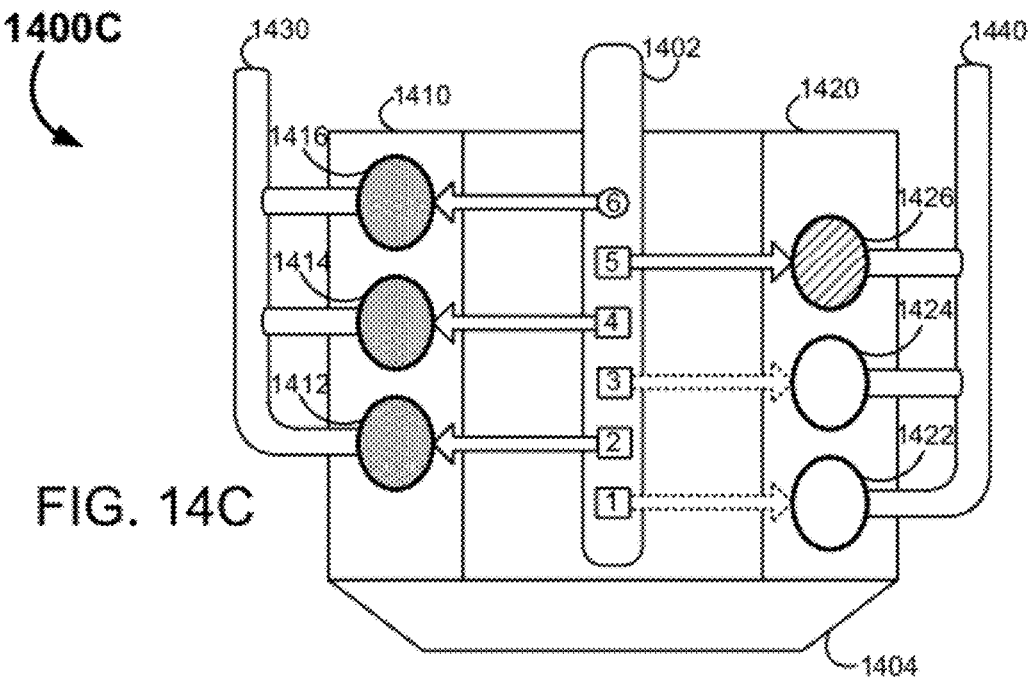
Figure 14D:
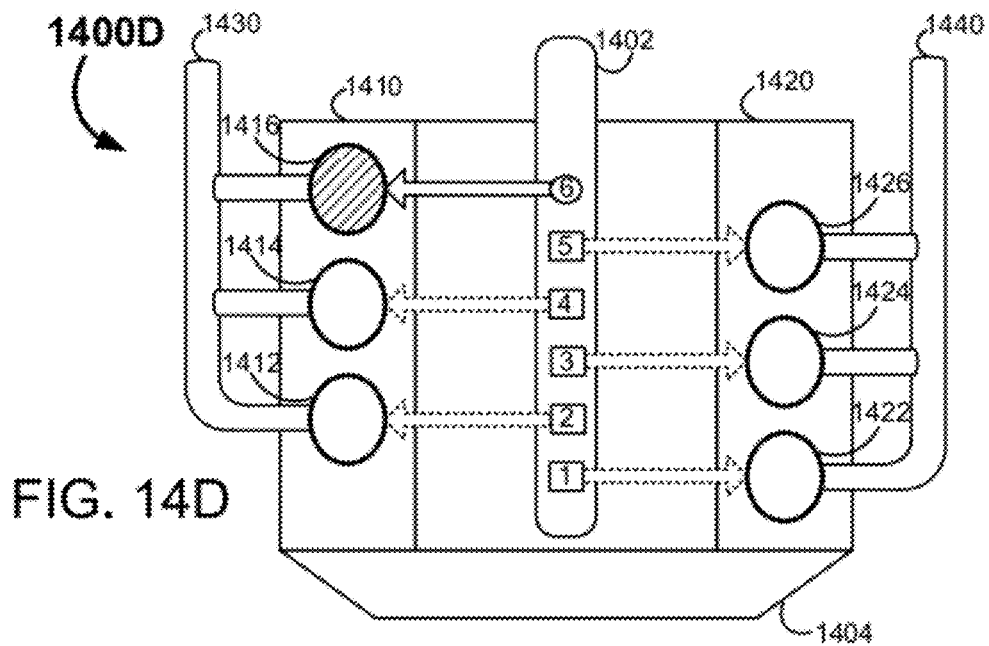
Figure 14E:
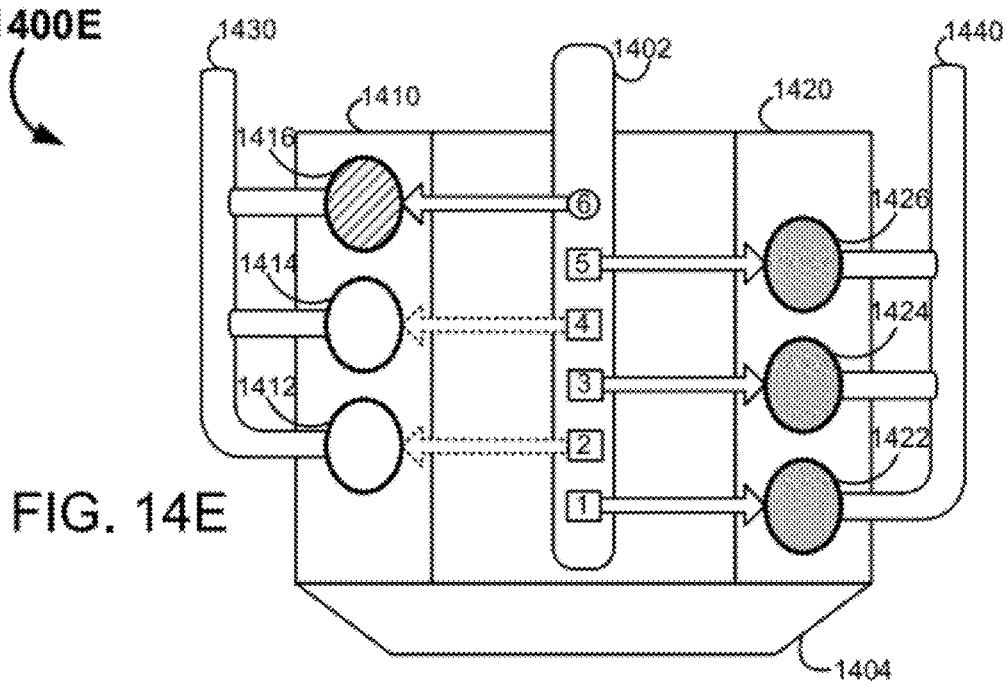
Figure 14F:
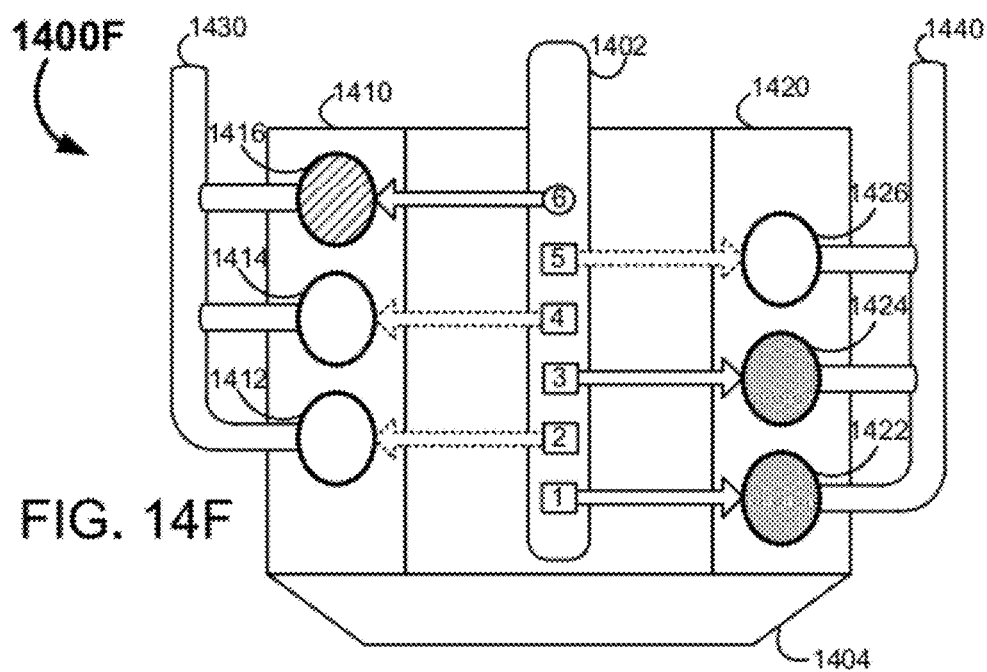
Figure 14G:
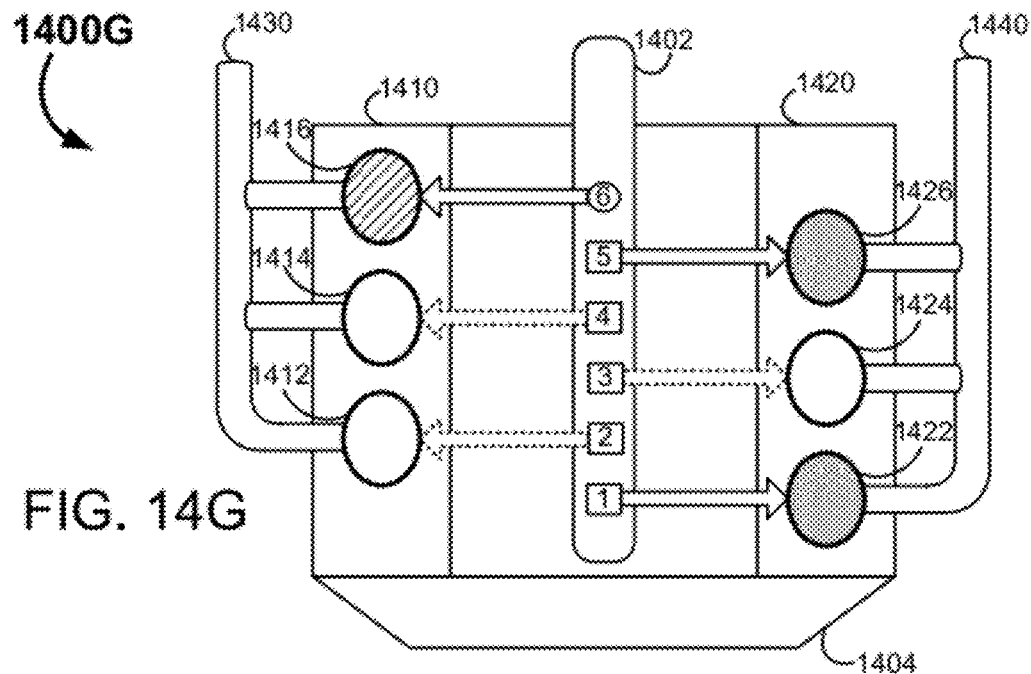
Figure 14H:
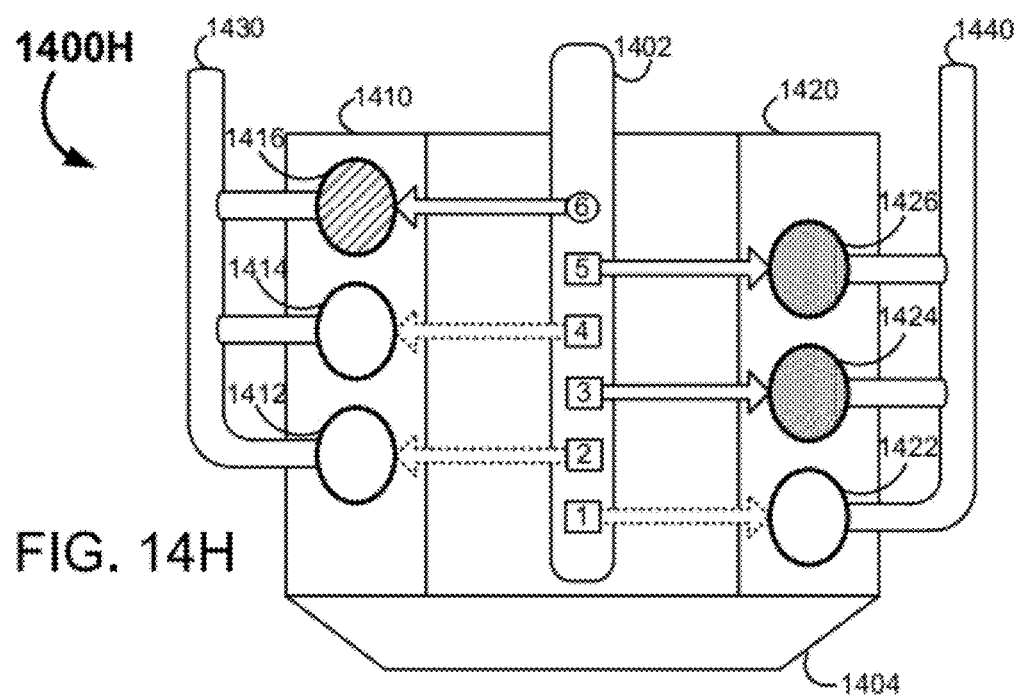
Figure 14I:
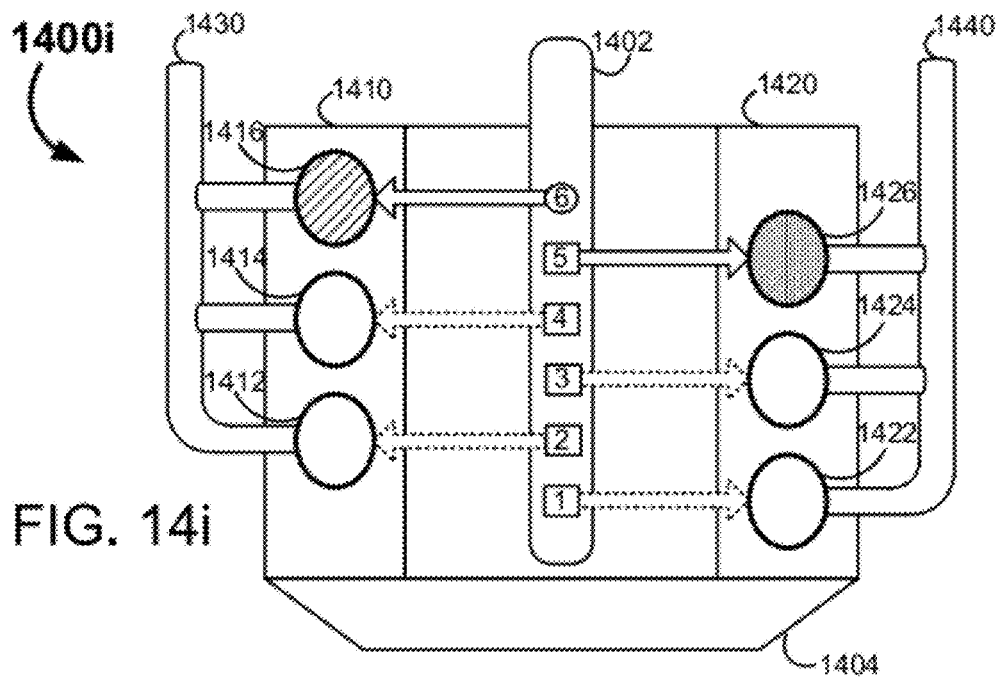
Figure 14J:
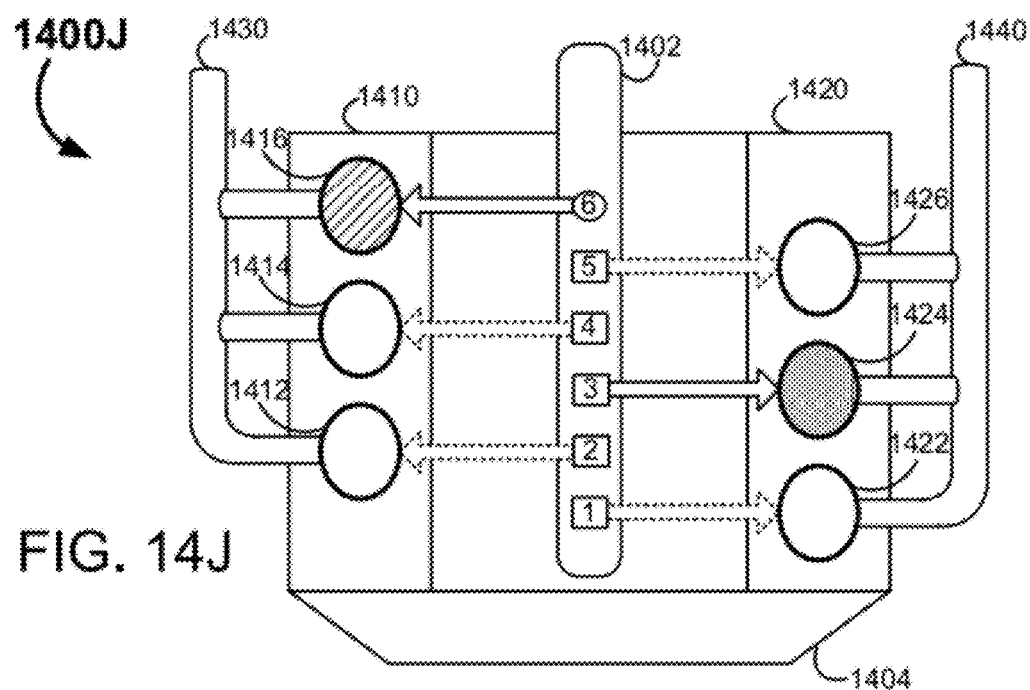
Figure 14K:
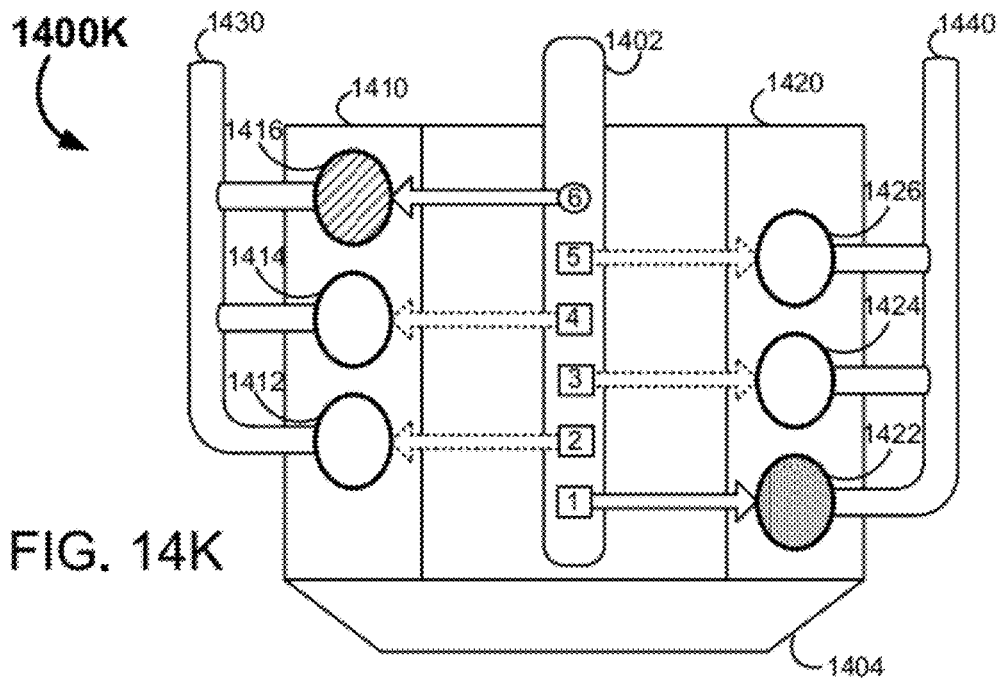
Figure 14L:
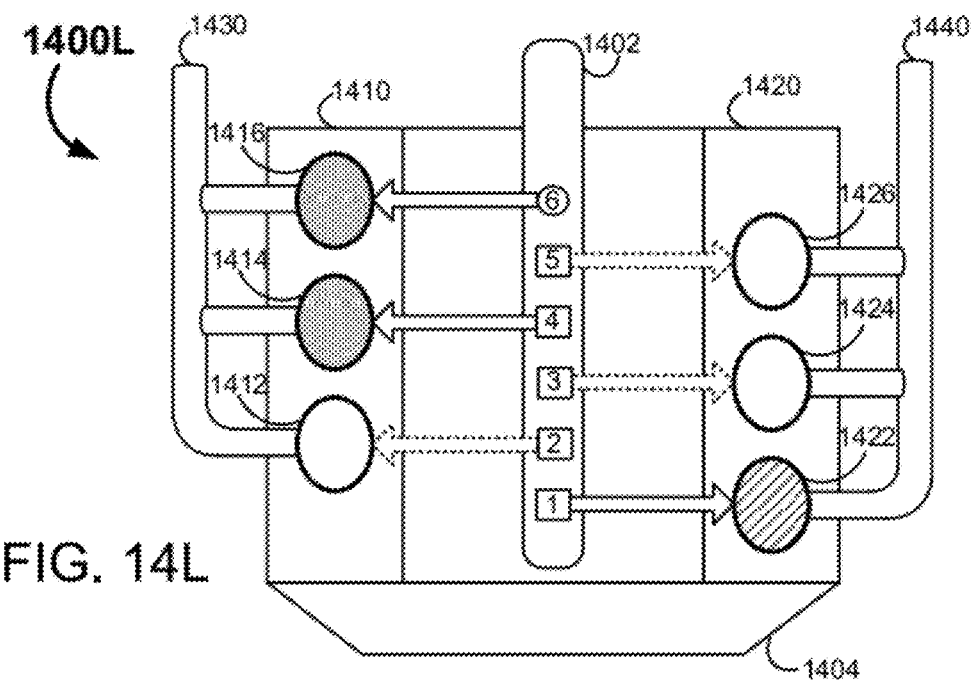
Figure 14M:
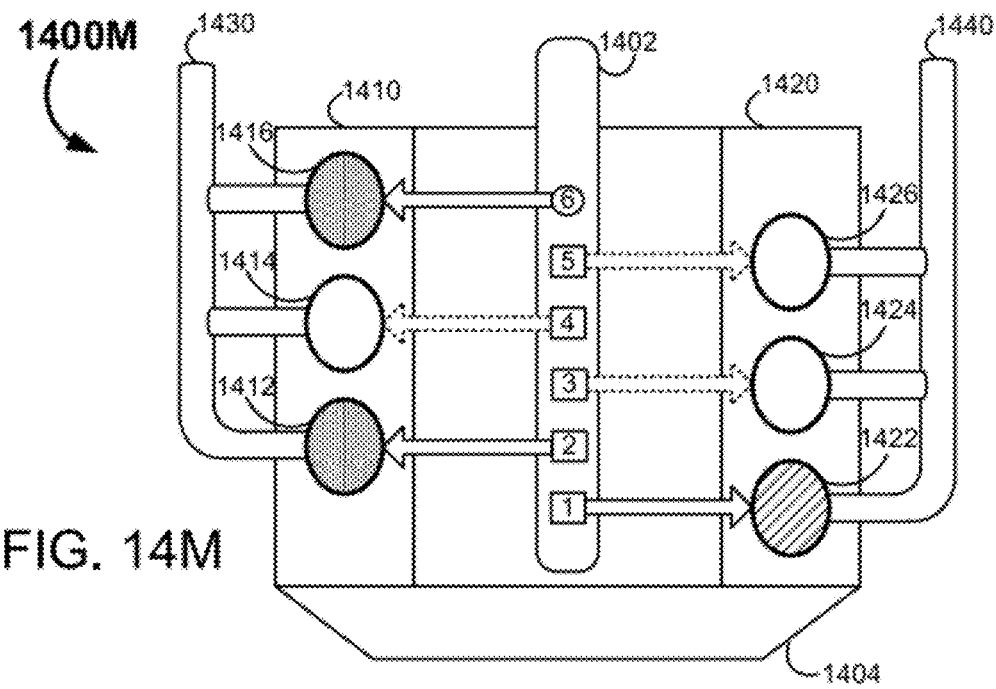
Figure 14N:
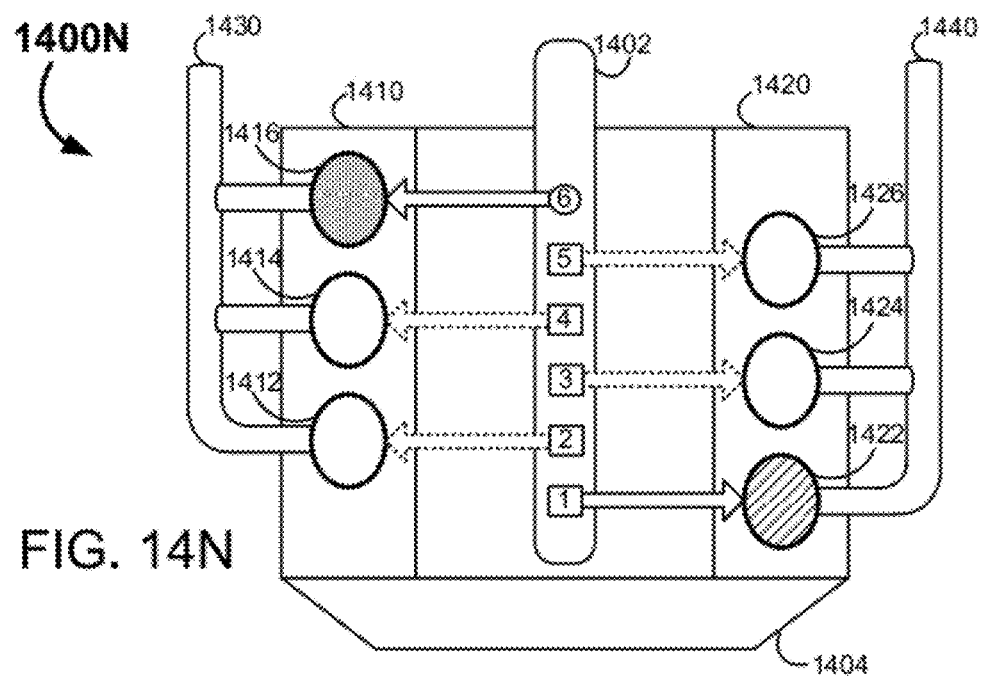
Figure 14P:
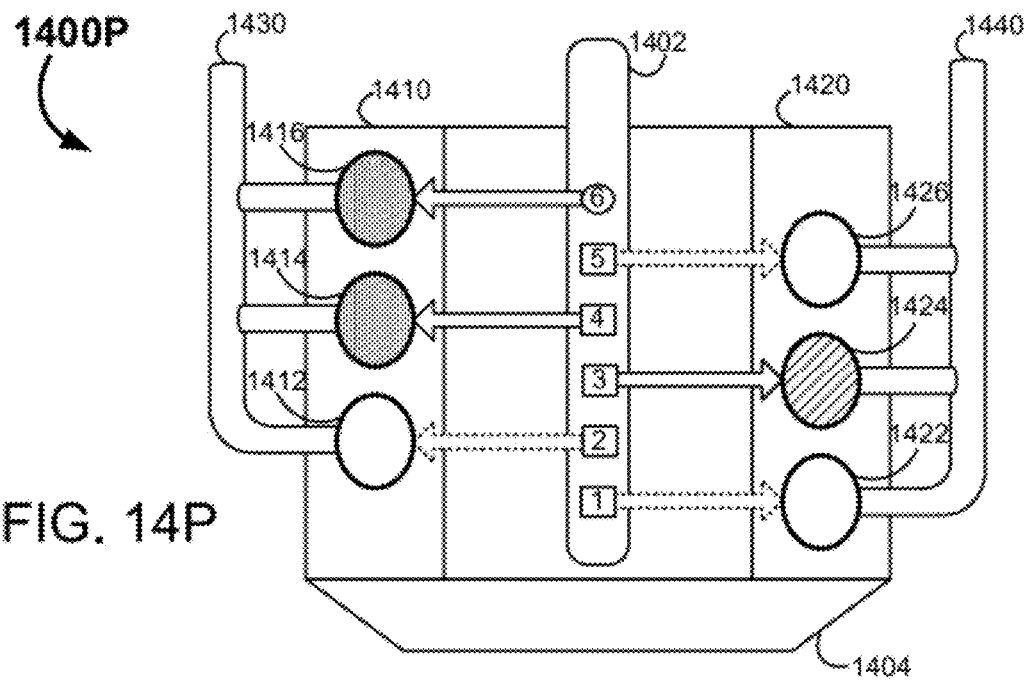
Figure 14Q:
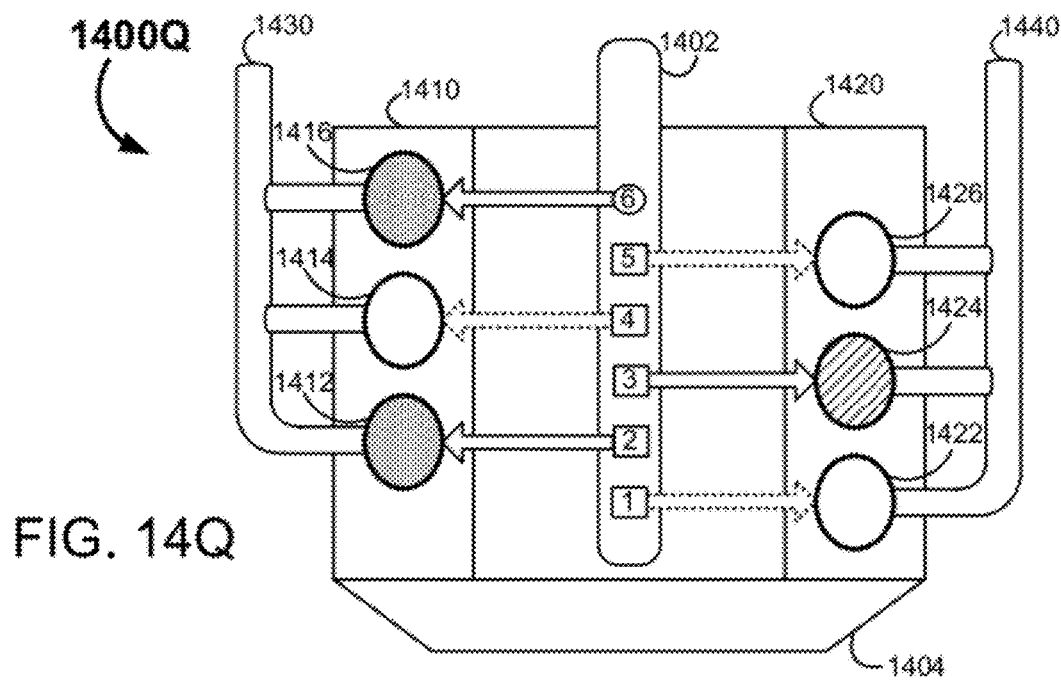
Figure 14R:
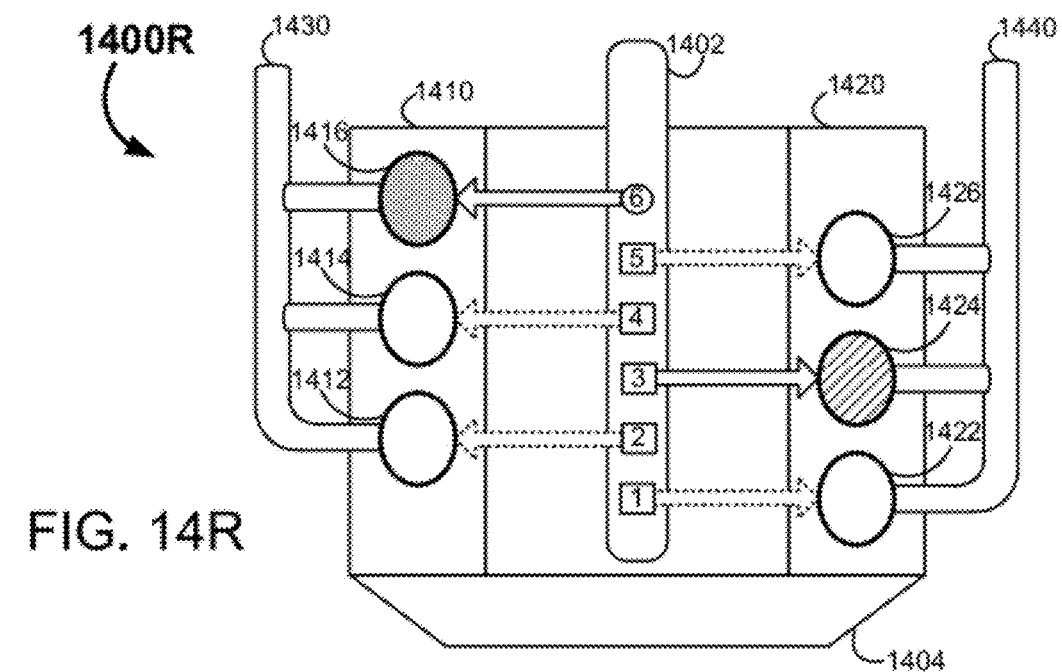
Figure 14S:
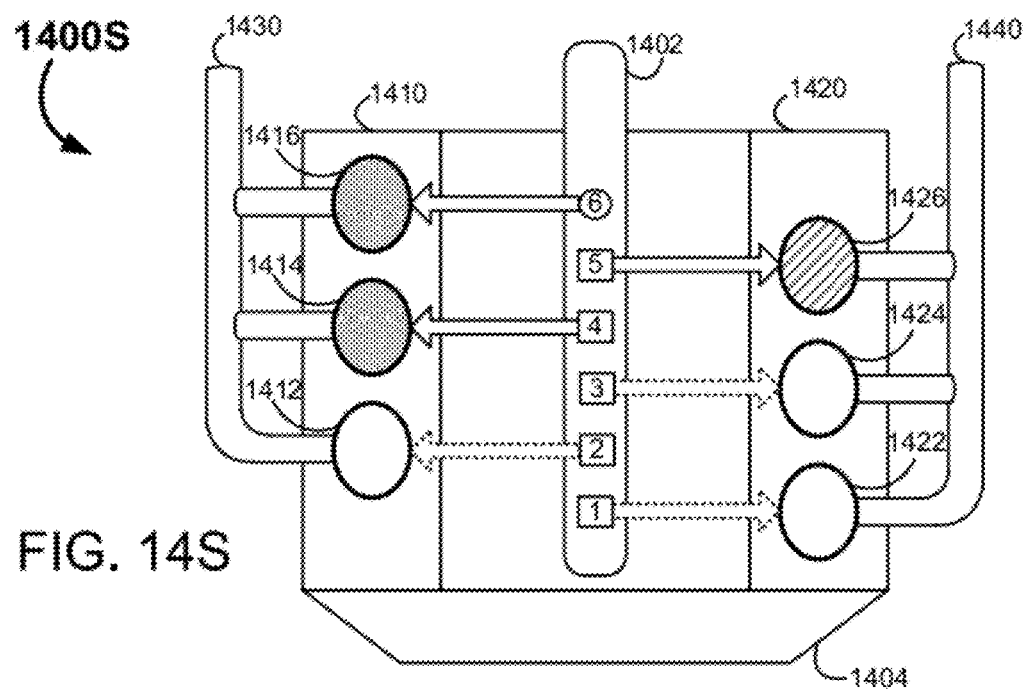
Figure 14T:
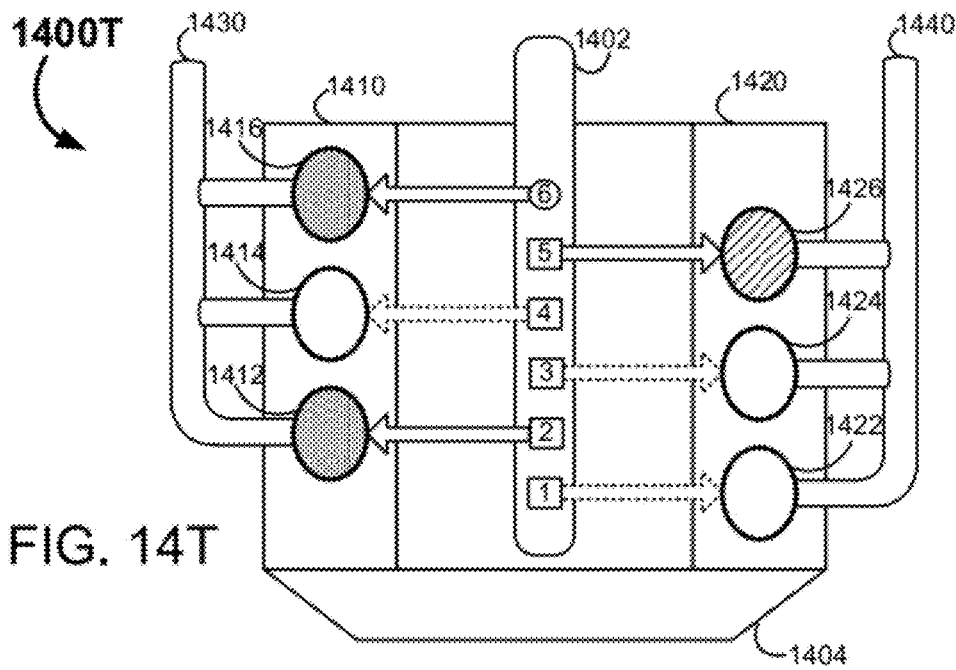
Figure 14U:
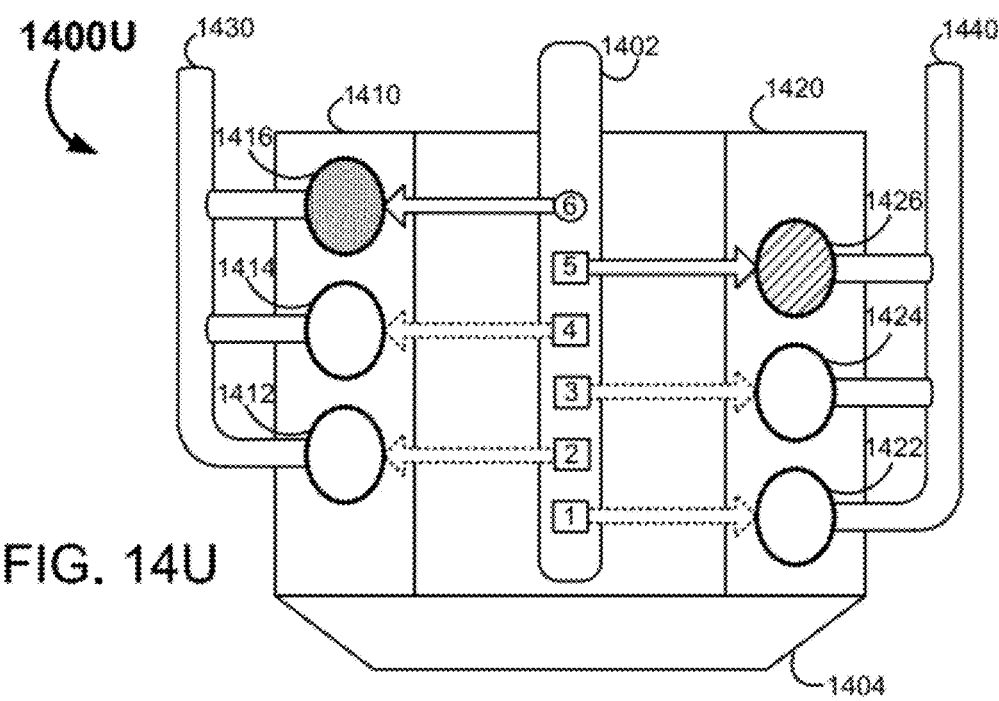

FIGS. 14A to 14U are illustrative diagrams of an example V6 style internal combustion engine in a variable displacement mode where one working chamber is operational. As there is only one non-controllable chamber in this engine type, there is a large amount of leeway available in choosing which chamber is operational. Additionally, with the inclusion of dual exhaust manifolds, it is also possible to include air "flow through" chambers which intake and exhaust valve are operational but do not receive any fuel injection. In general, however, "flow through" type chambers reduce engine efficiency due to experienced pump loss, and are thus undesirable unless needed.

At FIG. 14A, illustrated at 1400A, Chamber One 1422 is operational (indicated by diagonal shading). That is intake and exhaust valves are open and fuel is being delivered. The operational chamber vents to Right Exhaust Manifold 1440. On the other hand, Chamber Two 1412, Chamber Four 1414, and Chamber Six 1416 are 'flow through' chambers where intake and exhaust valves are open but no fuel is being injected into the chambers (indicated by dotted shading). These 'flow through' chambers vent their air to the Left Exhaust Manifold 1430. As such, combustion gasses and air-flow-through vent to separate exhaust manifolds, thus achieving legal smog compliance. Chamber Three 1424 and Chamber Five 1426 are effectively shut down (indicated by no shading). Shut down chambers have no fuel injection and intake and exhaust valves are closed.

At FIG. 14B, illustrated at 1400B, Chamber Three 1424 is operational (indicated by diagonal shading), and vents to Right Exhaust Manifold 1440. Chamber Two 1412, Chamber Four 1414, and Chamber Six 1416 are 'flow through' chambers (indicated by dotted shading) and vent their air to the Left Exhaust Manifold 1430, thereby achieving legal smog compliance. Chamber One 1422 and Chamber Five 1426 are effectively shut down (indicated by no shading).

At FIG. 14C, illustrated at 1400C, Chamber Five 1426 is operational (indicated by diagonal shading), and vents to Right Exhaust Manifold 1440. Chamber Two 1412, Chamber Four 1414, and Chamber Six 1416 are 'flow through' chambers (indicated by dotted shading) and vent their air to the Left Exhaust Manifold 1430, thereby achieving legal smog compliance. Chamber One 1422 and Chamber Three 1424 are effectively shut down (indicated by no shading).

At FIG. 14D, illustrated at 1400D, Chamber Six 1416 is operational (indicated by diagonal shading), and vents to Left Exhaust Manifold 1430. All remaining chambers are effectively shut down (indicated by no shading).

At FIG. 14E, illustrated at 1400E, Chamber Six 1416 is operational (indicated by diagonal shading), and vents to Left Exhaust Manifold 1430. Chamber One 1422, Chamber Three 1424, and Chamber Five 1426 are 'flow through' chambers (indicated by dotted shading) and vent their air to the Right Exhaust Manifold 1440, thereby achieving legal smog compliance. Chamber Two 1412 and Chamber Four 1414 are effectively shut down (indicated by no shading).

At FIG. 14F, illustrated at 1400F, Chamber Six 1416 is operational (indicated by diagonal shading), and vents to Left Exhaust Manifold 1430. Chamber One 1422 and Chamber Three 1424 are 'flow through' chambers (indicated by dotted shading) and vent their air to the Right Exhaust Manifold 1440, thereby achieving legal smog compliance. Chamber Two 1412, Chamber Four 1414 and Chamber Five 1426 are effectively shut down (indicated by no shading).

At FIG. 14G, illustrated at 1400G, Chamber Six 1416 is operational (indicated by diagonal shading), and vents to Left Exhaust Manifold 1430. Chamber One 1422, and Chamber Five 1426 are 'flow through' chambers (indicated by dotted shading) and vent their air to the Right Exhaust Manifold 1440, thereby achieving legal smog compliance. Chamber Two 1412, Chamber Three 1424 and Chamber Four 1414 are effectively shut down (indicated by no shading).

At FIG. 14H, illustrated at 1400H, Chamber Six 1416 is operational (indicated by diagonal shading), and vents to Left Exhaust Manifold 1430. Chamber Three 1424, and Chamber Five 1426 are 'flow through' chambers (indicated by dotted shading) and vent their air to the Right Exhaust Manifold 1440, thereby achieving legal smog compliance. Chamber One 1422, Chamber Two 1412 and Chamber Four 1414 are effectively shut down (indicated by no shading).

At FIG. 14i, illustrated at 1400i, Chamber Six 1416 is operational (indicated by diagonal shading), and vents to Left Exhaust Manifold 1430. Chamber Five 1426 is a 'flow through' chamber (indicated by dotted shading) and vents its air to the Right Exhaust Manifold 1440, thereby achieving legal smog compliance. Chamber One 1422, Chamber Two 1412, Chamber Three 1424 and Chamber Four 1414 are effectively shut down (indicated by no shading).

At FIG. 14J, illustrated at 1400J, Chamber Six 1416 is operational (indicated by diagonal shading), and vents to Left Exhaust Manifold 1430. Chamber Three 1424 is a 'flow through' chamber (indicated by dotted shading) and vents its air to the Right Exhaust Manifold 1440, thereby achieving legal smog compliance. Chamber One 1422, Chamber Two 1412, Chamber Four 1414 and Chamber Five 1426 are effectively shut down (indicated by no shading).

At FIG. 14K, illustrated at 1400K, Chamber Six 1416 is operational (indicated by diagonal shading), and vents to Left Exhaust Manifold 1430. Chamber One 1422 is a 'flow through' chamber (indicated by dotted shading) and vents its air to the Right Exhaust Manifold 1440, thereby achieving legal smog compliance. Chamber Two 1412, Chamber Three 1424, Chamber Four 1414 and Chamber Five 1426 are effectively shut down (indicated by no shading).

At FIG. 14L, illustrated at 1400L, Chamber One 1422 is operational (indicated by diagonal shading), and vents to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber Two 1412, Chamber Three 1424 and Chamber Five 1426 are effectively shut down (indicated by no shading).

At FIG. 14M, illustrated at 1400M, Chamber One 1422 is operational (indicated by diagonal shading), and vents to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber Three 1424, Chamber Four 1414 and Chamber Five 1426 are effectively shut down (indicated by no shading).

At FIG. 14N, illustrated at 1400N, Chamber One 1422 is operational (indicated by diagonal shading), and vents to Right Exhaust Manifold 1440. Chamber Six 1416 is a 'flow through' chamber (indicated by dotted shading) and vents its air to the Left Exhaust Manifold 1430, thereby achieving legal smog compliance. Chamber Two 1412, Chamber Three 1424, Chamber Four 1414 and Chamber Five 1426 are effectively shut down (indicated by no shading).

At FIG. 14P, illustrated at 1400P, Chamber Three 1424 is operational (indicated by diagonal shading), and vents to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber One 1422, Chamber Two 1412 and Chamber Five 1426 are effectively shut down (indicated by no shading).

At FIG. 14Q, illustrated at 1400Q, Chamber Three 1424 is operational (indicated by diagonal shading), and vents to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber One 1422, Chamber Four 1414 and Chamber Five 1426 are effectively shut down (indicated by no shading).

At FIG. 14R, illustrated at 1400R, Chamber Three 1424 is operational (indicated by diagonal shading), and vents to Right Exhaust Manifold 1440. Chamber Six 1416 is a 'flow through' chamber (indicated by dotted shading) and vents its air to the Left Exhaust Manifold 1430, thereby achieving legal smog compliance. Chamber One 1422, Chamber Two 1412, Chamber Four 1414 and Chamber Five 1426 are effectively shut down (indicated by no shading).

At FIG. 14S, illustrated at 1400S, Chamber Five 1426 is operational (indicated by diagonal shading), and vents to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber One 1422, Chamber Two 1412 and Chamber Three 1424 are effectively shut down (indicated by no shading).

At FIG. 14T, illustrated at 1400T, Chamber Five 1426 is operational (indicated by diagonal shading), and vents to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber One 1422, Chamber Three 1424 and Chamber Four 1414 are effectively shut down (indicated by no shading).

At FIG. 14U, illustrated at 1400U, Chamber Five 1426 is operational (indicated by diagonal shading), and vents to Right Exhaust Manifold 1440. Chamber Six 1416 is a 'flow through' chamber (indicated by dotted shading) and vents its air to the Left Exhaust Manifold 1430, thereby achieving legal smog compliance. Chamber One 1422, Chamber Two 1412, Chamber Three 1424 and Chamber Four 1414 are effectively shut down (indicated by no shading).

B. Two Chamber Operation

Figure 15A:
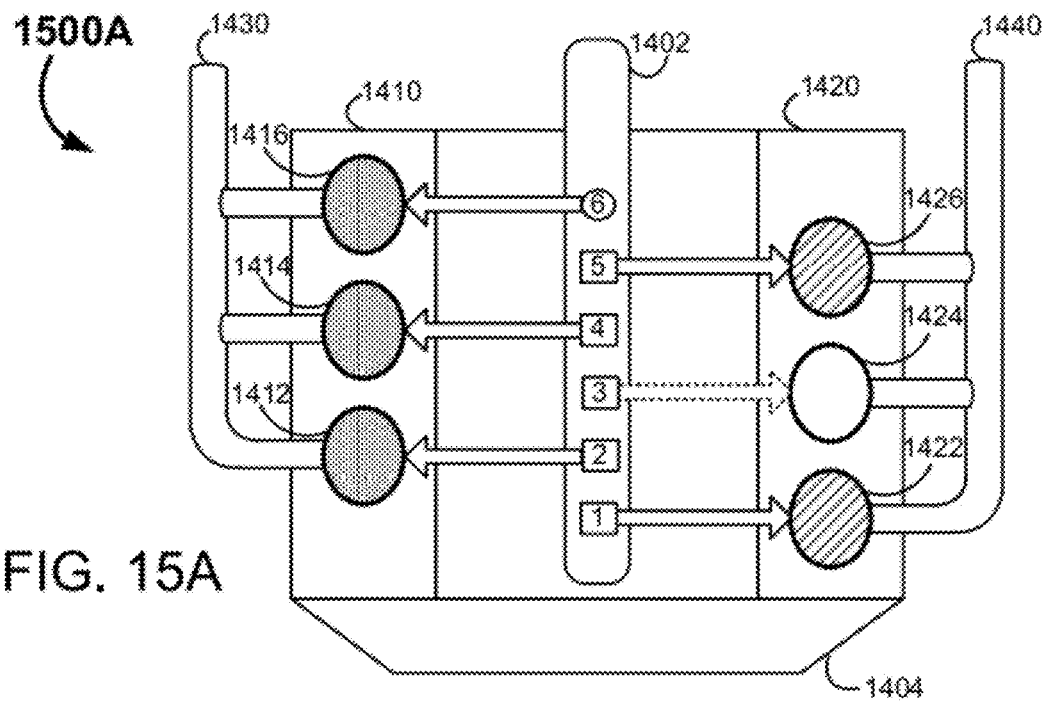
FIGS. 15A to 15AC are illustrative diagrams of an example V6 style internal combustion engine in a variable displacement mode where two working chambers are operational in accordance with an embodiment of the present invention.

FIGS. 15A to 15AC are illustrative diagrams of an example V6 style internal combustion engine in a variable displacement mode where two working chambers are operational.

At FIG. 15A, illustrated at 1500A, Chamber One 1422 and Chamber Five 1426 are operational (indicated by diagonal shading), and vent to Right Exhaust Manifold 1440. Chamber Two 1412, Chamber Four 1414 and Chamber Six 1416 are 'flow through' chambers (indicated by dotted shading) and vent their air to the Left Exhaust Manifold 1430, thereby achieving legal smog compliance. Chamber Three 1424 is effectively shut down (indicated by no shading).

Figure 15B:
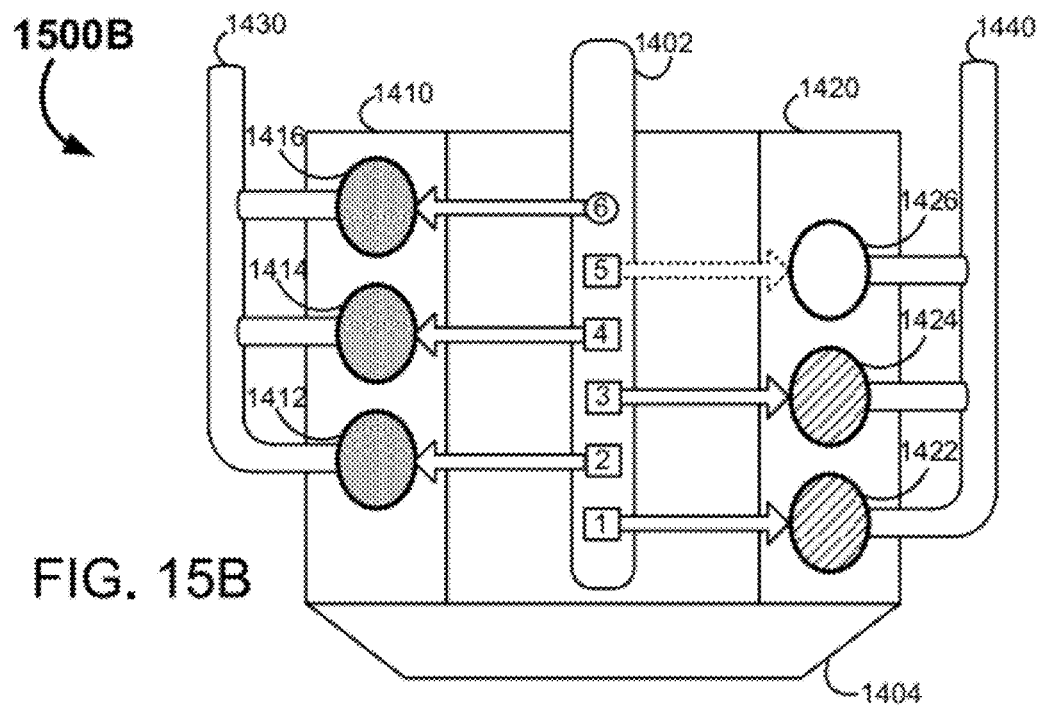

At FIG. 15B, illustrated at 1500B, Chamber One 1422 and Chamber Three 1424 are operational (indicated by diagonal shading), and vent to Right Exhaust Manifold 1440. Chamber Two 1412, Chamber Four 1414 and Chamber Six 1416 are 'flow through' chambers (indicated by dotted shading) and vent their air to the Left Exhaust Manifold 1430, thereby achieving legal smog compliance. Chamber Five 1426 is effectively shut down (indicated by no shading).

Figure 15C:
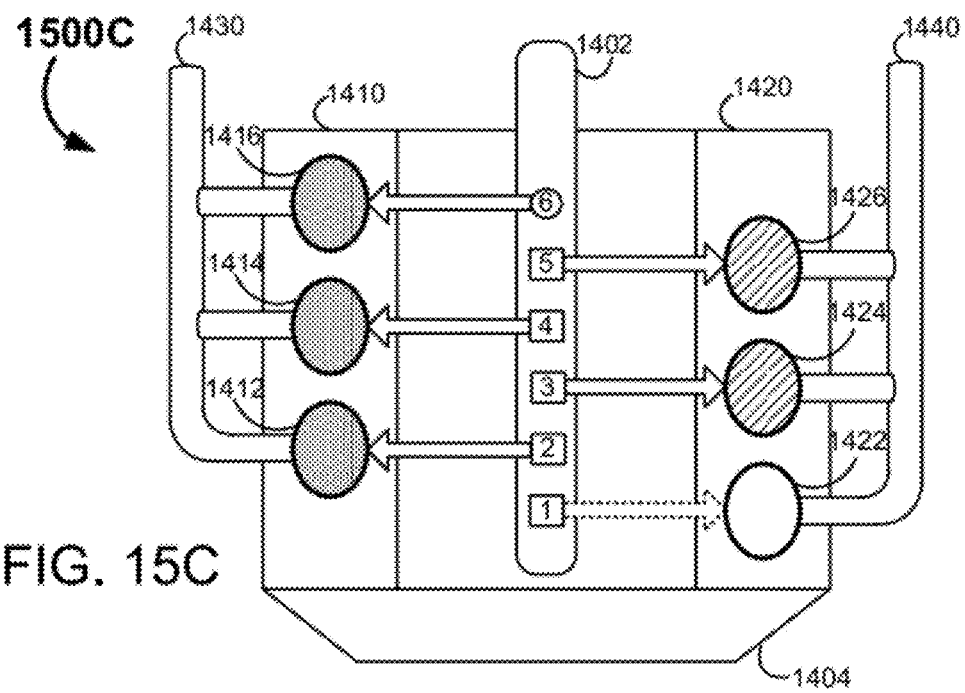

At FIG. 15C, illustrated at 1500C, Chamber Three 1424 and Chamber Five 1426 are operational (indicated by diagonal shading), and vent to Right Exhaust Manifold 1440. Chamber Two 1412, Chamber Four 1414 and Chamber Six 1416 are 'flow through' chambers (indicated by dotted shading) and vent their air to the Left Exhaust Manifold 1430, thereby achieving legal smog compliance. Chamber One 1422 is effectively shut down (indicated by no shading).

Figure 15D:
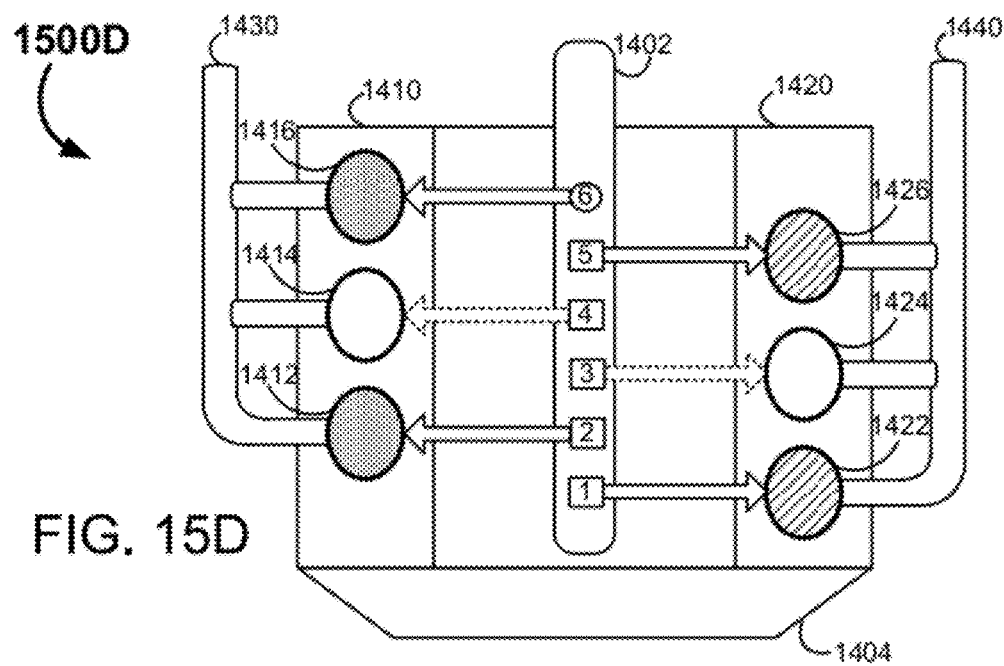

At FIG. 15D, illustrated at 1500D, Chamber One 1422 and Chamber Five 1426 are operational (indicated by diagonal shading), and vent to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber Three 1424 and Chamber Four 1414 are effectively shut down (indicated by no shading).

Figure 15E:
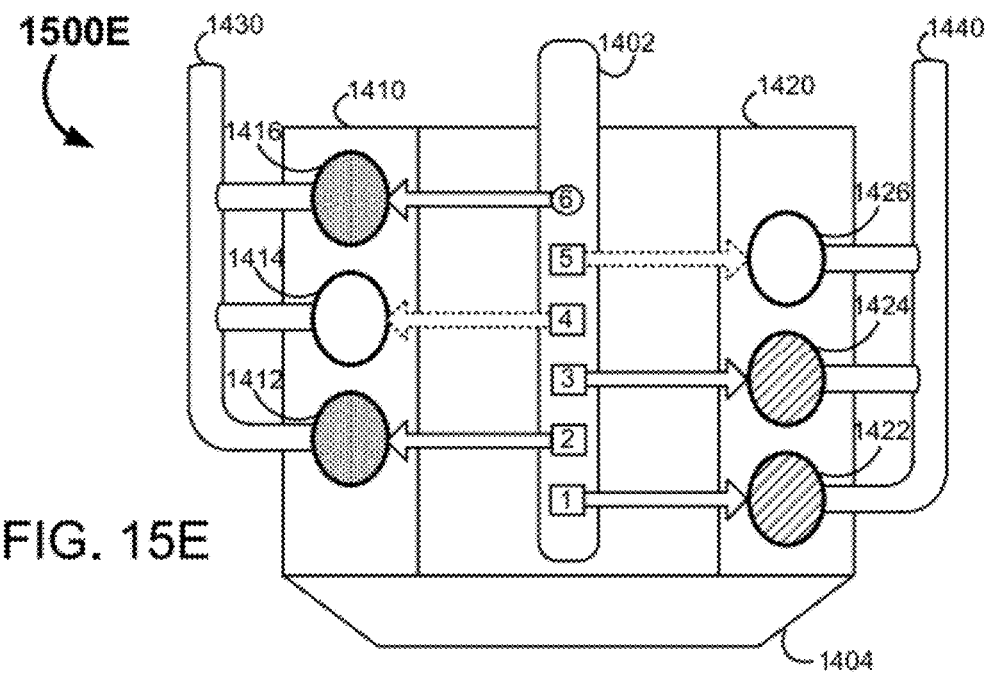

At FIG. 15E, illustrated at 1500E, Chamber One 1422 and Chamber Three 1424 are operational (indicated by diagonal shading), and vent to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber Four 1414 and Chamber Five 1426 are effectively shut down (indicated by no shading).

Figure 15F:
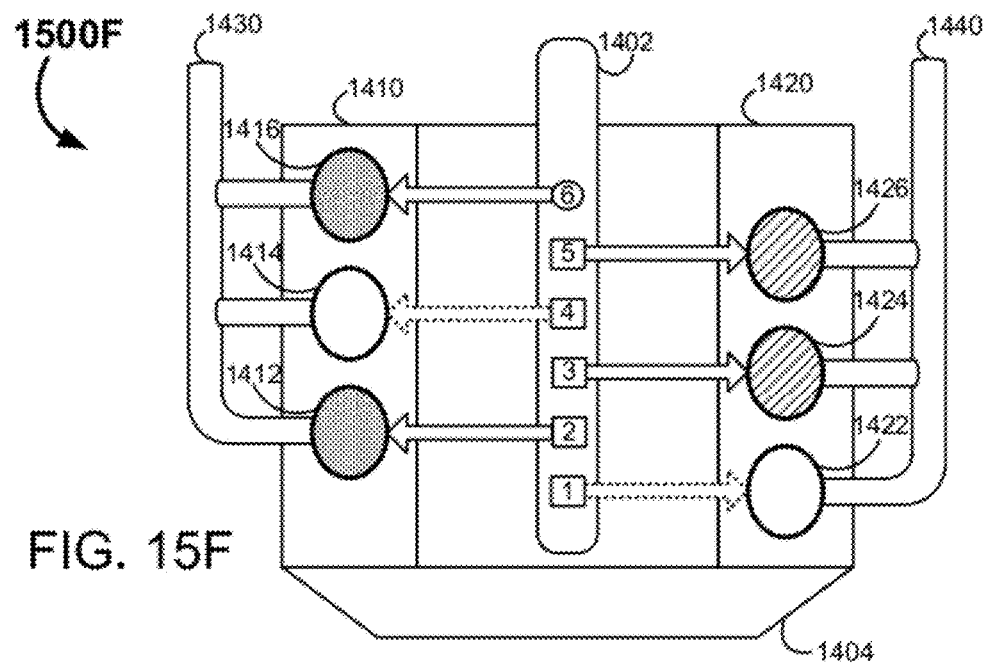

At FIG. 15F, illustrated at 1500F, Chamber Three 1424 and Chamber Five 1426 are operational (indicated by diagonal shading), and vent to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber One 1422 and Chamber Four 1414 are effectively shut down (indicated by no shading).

Figure 15G:
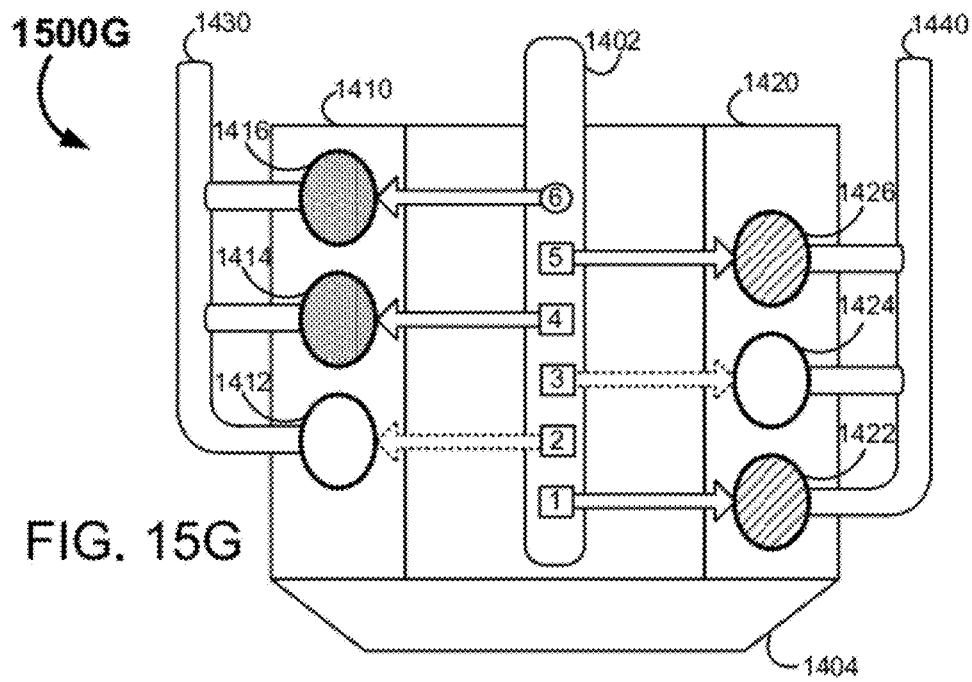

At FIG. 15G, illustrated at 1500G, Chamber One 1422 and Chamber Five 1426 are operational (indicated by diagonal shading), and vent to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber Two 1412 and Chamber Three 1424 are effectively shut down (indicated by no shading).

Figure 15H:
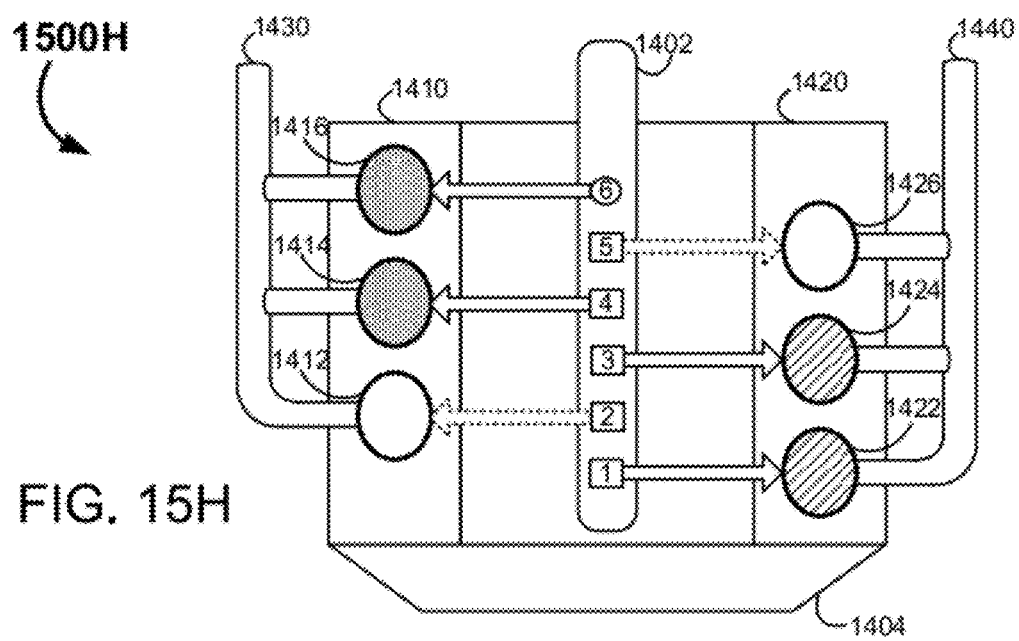

At FIG. 15H, illustrated at 1500H, Chamber One 1422 and Chamber Three 1424 are operational (indicated by diagonal shading), and vent to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber Two 1412 and Chamber Five 1426 are effectively shut down (indicated by no shading).

Figure 15I:
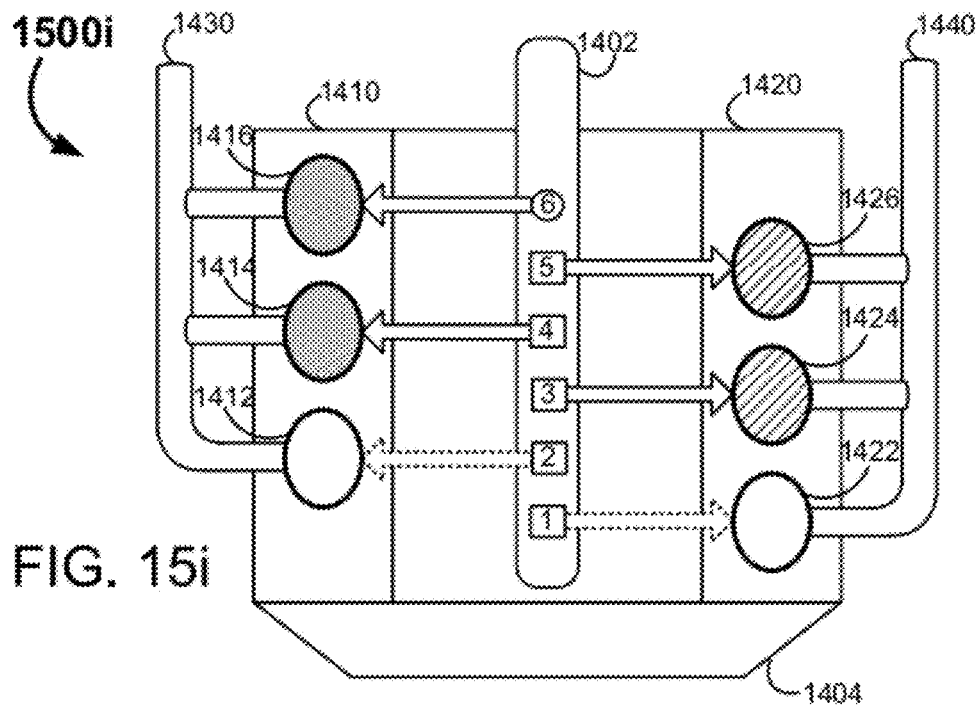

At FIG. 15*i*, illustrated at 1500*i*, Chamber Three 1424 and Chamber Five 1426 are operational (indicated by diagonal shading), and vent to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber One 1422 and Chamber Two 1412 are effectively shut down (indicated by no shading).

Figure 15J:
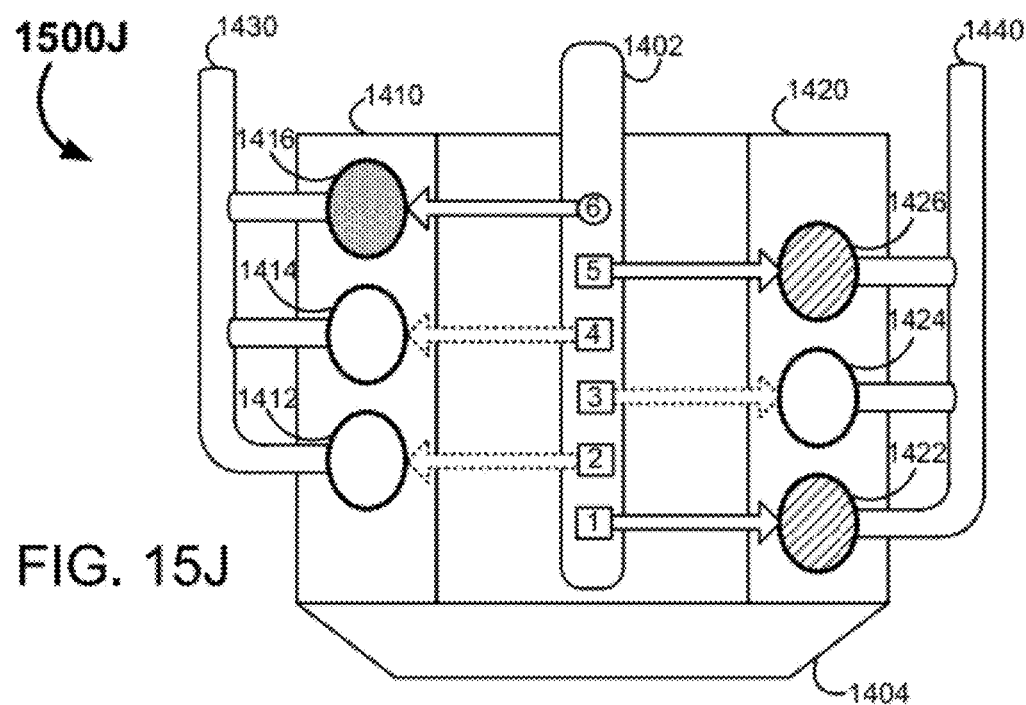

At FIG. 15J, illustrated at 1500J, Chamber One 1422 and Chamber Five 1426 are operational (indicated by diagonal shading), and vent to Right Exhaust Manifold 1440. Chamber Six 1416 is a 'flow through' chamber (indicated by dotted shading) and vents its air to the Left Exhaust Manifold 1430, thereby achieving legal smog compliance. Chamber Two 1412, Chamber Three 1424 and Chamber Four 1414 are effectively shut down (indicated by no shading).

Figure 15K:
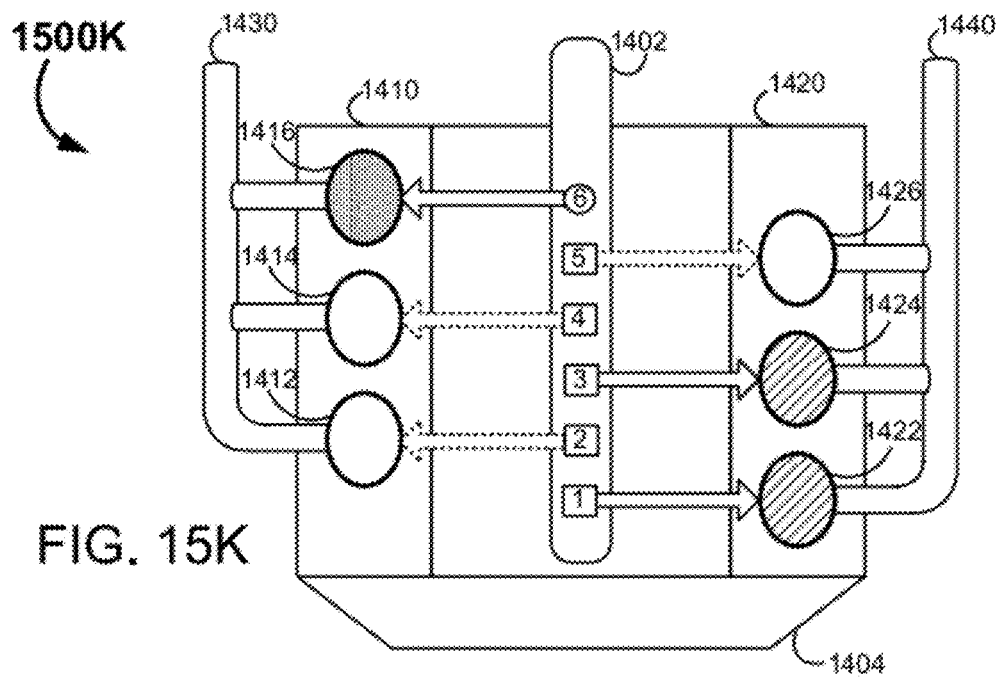

At FIG. 15K, illustrated at 1500K, Chamber One 1422 and Chamber Three 1424 are operational (indicated by diagonal shading), and vent to Right Exhaust Manifold 1440. Chamber Six 1416 is a 'flow through' chamber (indicated by dotted shading) and vents its air to the Left Exhaust Manifold 1430, thereby achieving legal smog compliance. Chamber Two 1412, Chamber Four 1414 and Chamber Five 1426 are effectively shut down (indicated by no shading).

Figure 15L:
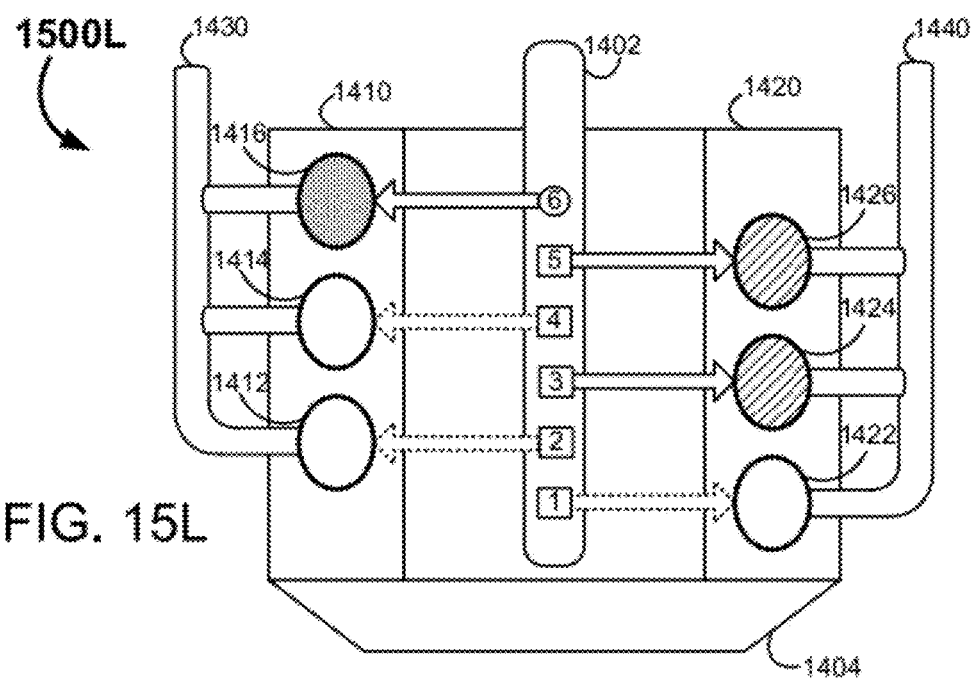

At FIG. 15L, illustrated at 1500L, Chamber Three 1424 and Chamber Five 1426 are operational (indicated by diagonal shading), and vent to Right Exhaust Manifold 1440. Chamber Six 1416 is a 'flow through' chamber (indicated by dotted shading) and vents its air to the Left Exhaust Manifold 1430, thereby achieving legal smog compliance. Chamber One 1422, Chamber Two 1412 and Chamber Four 1414 are effectively shut down (indicated by no shading).

Figure 15M:
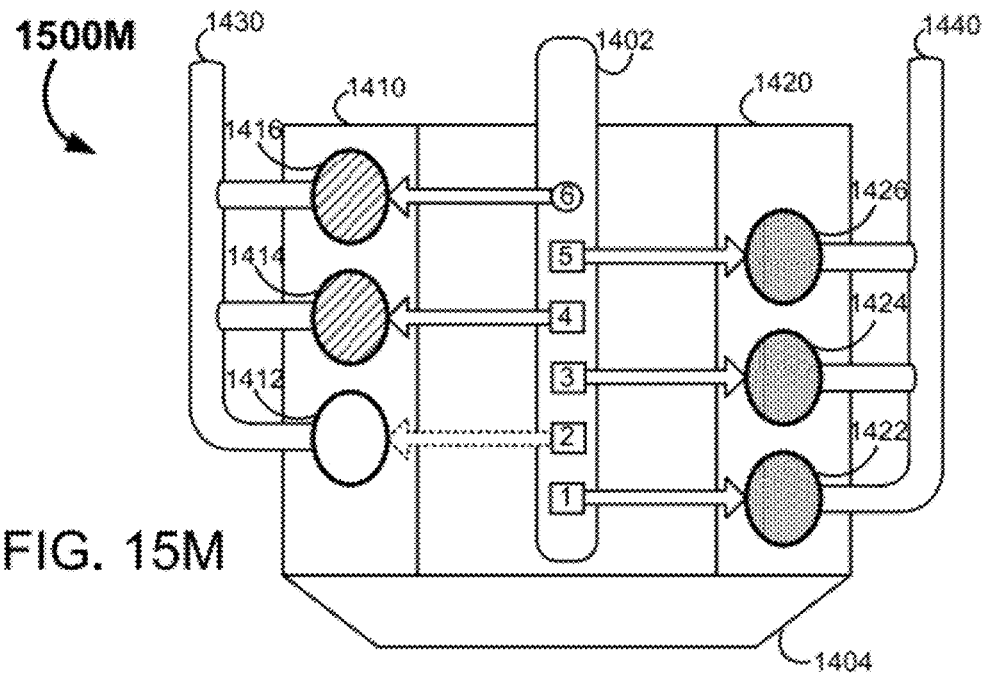

At FIG. 15M, illustrated at 1500M, Chamber Four 1414 and Chamber Six 1416 are operational (indicated by diagonal shading), and vent to Left Exhaust Manifold 1430. Chamber One 1422, Chamber Three 1424 and Chamber Five 1426 are 'flow through' chambers (indicated by dotted shading) and vent their air to the Right Exhaust Manifold 1440, thereby achieving legal smog compliance. Chamber Two 1412 is effectively shut down (indicated by no shading).

Figure 15N:
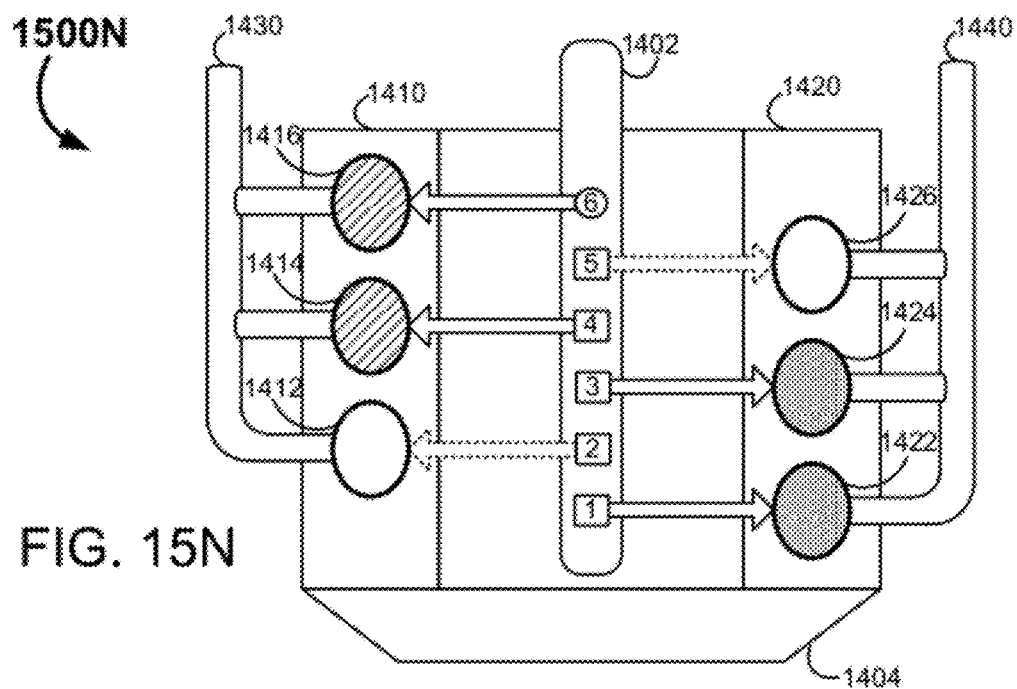

At FIG. 15N, illustrated at 1500N, Chamber Four 1414 and Chamber Six 1416 are operational (indicated by diagonal shading), and vent to Left Exhaust Manifold 1430. Chamber One 1422 and Chamber Three 1424 are 'flow through' chambers (indicated by dotted shading) and vent their air to the Right Exhaust Manifold 1440, thereby achieving legal smog compliance. Chamber Two 1412 and Chamber Five 1426 is effectively shut down (indicated by no shading).

Figure 15P:
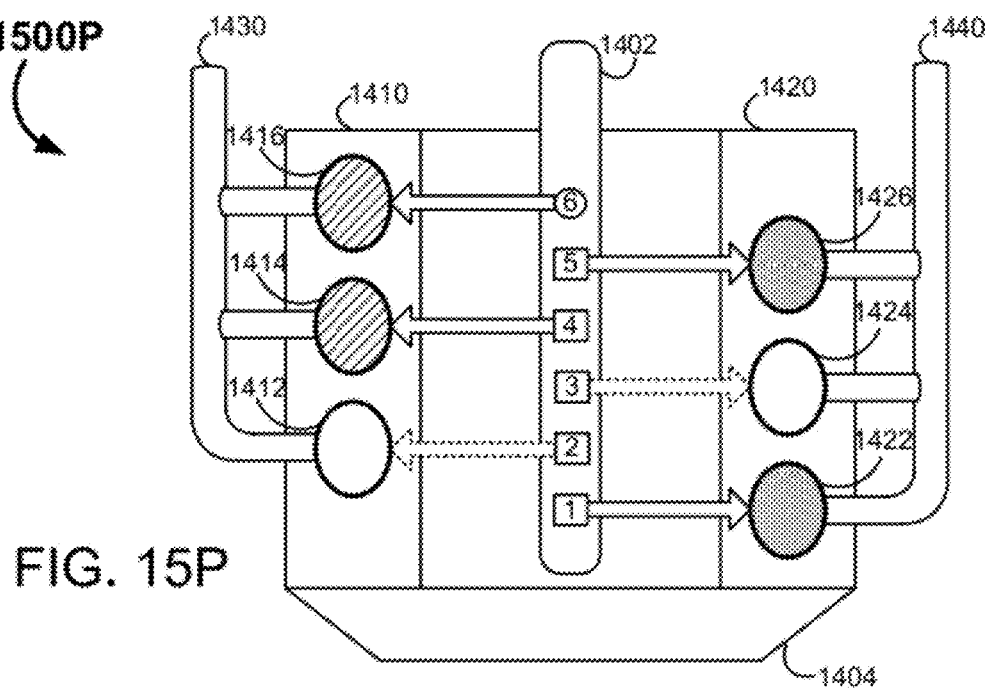

At FIG. 15P, illustrated at 1500P, Chamber Four 1414 and Chamber Six 1416 are operational (indicated by diagonal shading), and vent to Left Exhaust Manifold 1430. Chamber One 1422 and Chamber Five 1426 are 'flow through' chambers (indicated by dotted shading) and vent their air to the Right Exhaust Manifold 1440, thereby achieving legal smog compliance. Chamber Two 1412 and Chamber Three 1424 are effectively shut down (indicated by no shading).

Figure 15Q:
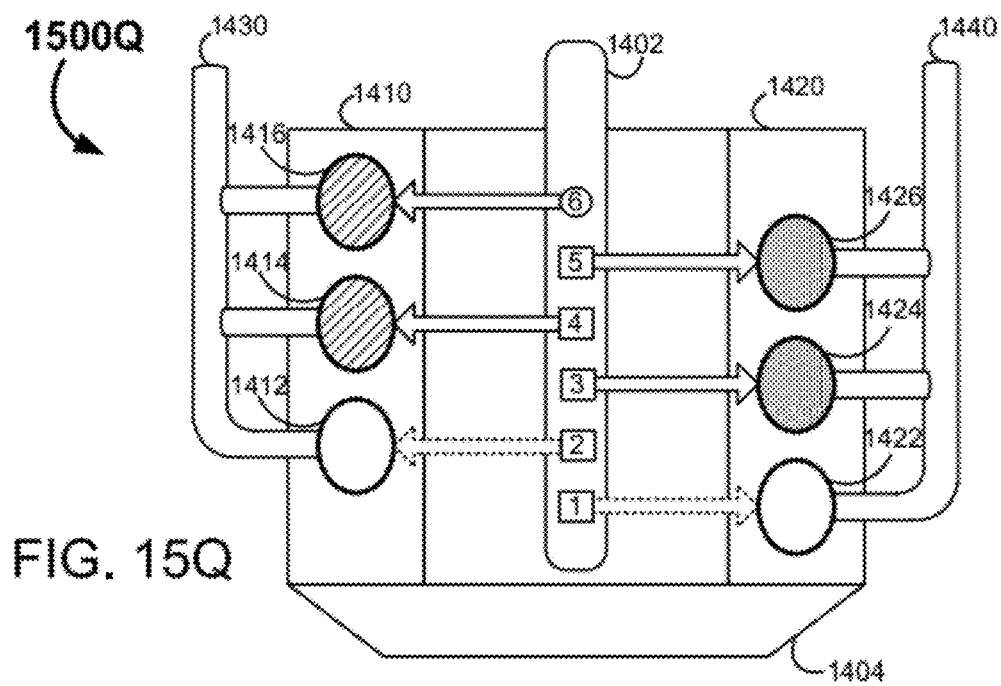

At FIG. 15Q, illustrated at 1500Q, Chamber Four 1414 and Chamber Six 1416 are operational (indicated by diagonal shading), and vent to Left Exhaust Manifold 1430. Chamber Three 1424 and Chamber Five 1426 are 'flow through' chambers (indicated by dotted shading) and vent their air to the Right Exhaust Manifold 1440, thereby achieving legal smog compliance. Chamber One 1422 and Chamber Two 1412 are effectively shut down (indicated by no shading).

Figure 15R:
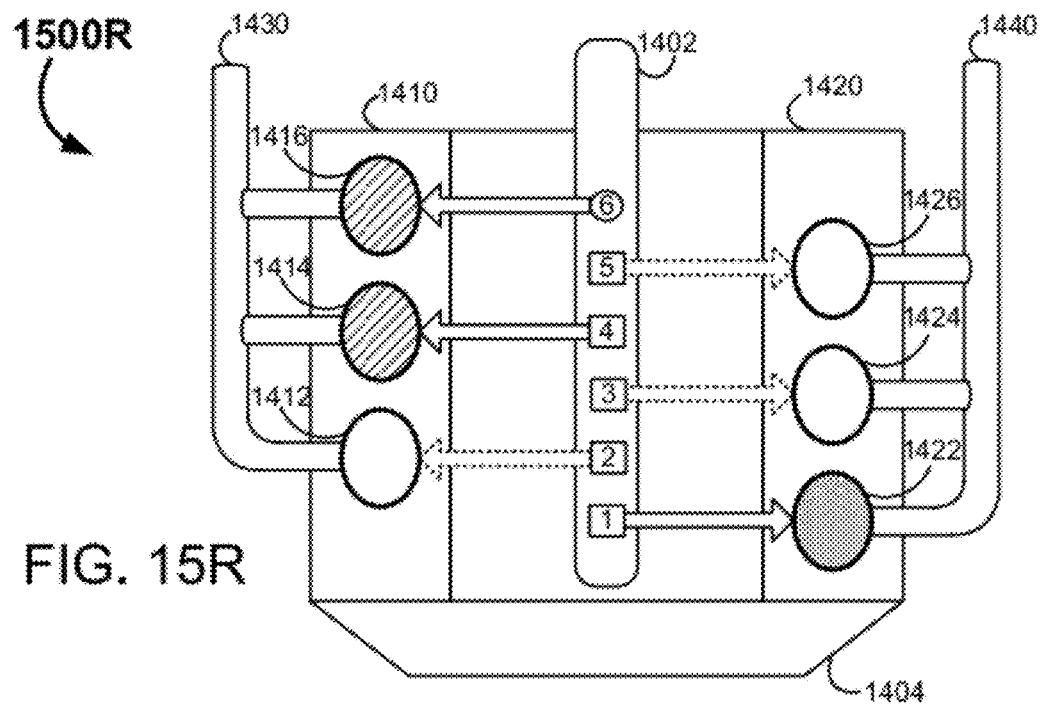

At FIG. 15R, illustrated at 1500R, Chamber Four 1414 and Chamber Six 1416 are operational (indicated by diagonal shading), and vent to Left Exhaust Manifold 1430. Chamber One 1422 is a 'flow through' chamber (indicated by dotted shading) and vents its air to the Right Exhaust Manifold 1440, thereby achieving legal smog compliance. Chamber Two 1412, Chamber Three 1424 and Chamber Five 1426 are effectively shut down (indicated by no shading).

Figure 15S:
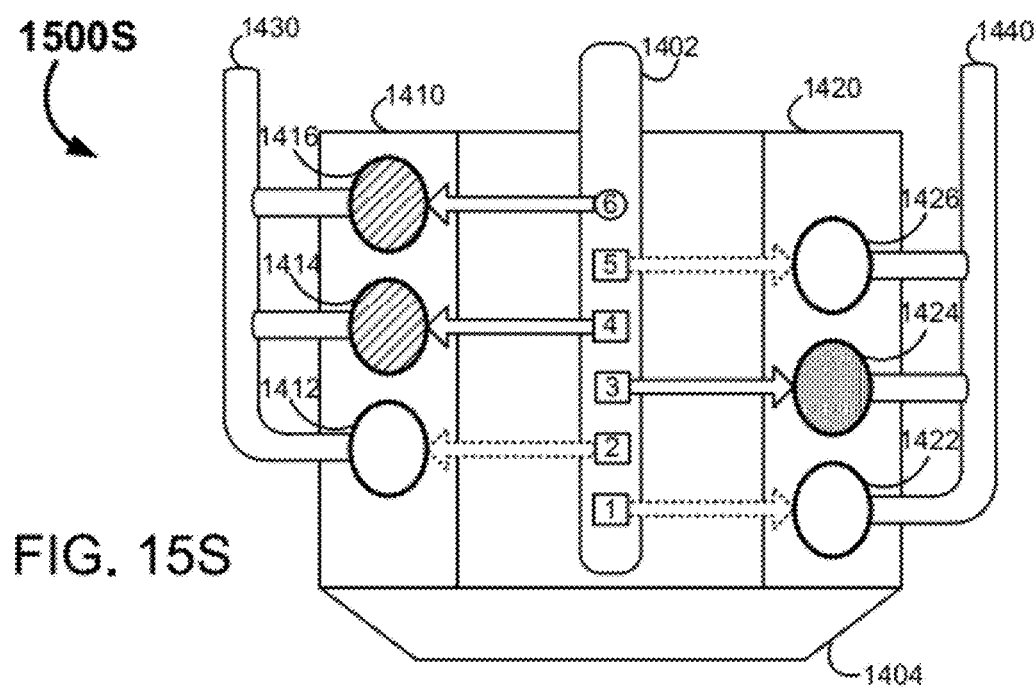

At FIG. 15S, illustrated at 1500S, Chamber Four 1414 and Chamber Six 1416 are operational (indicated by diagonal shading), and vent to Left Exhaust Manifold 1430. Chamber Three 1424 is a 'flow through' chamber (indicated by dotted shading) and vents its air to the Right Exhaust Manifold 1440, thereby achieving legal smog compliance. Chamber One 1422, Chamber Two 1412 and Chamber Five 1426 are effectively shut down (indicated by no shading).

Figure 15T:
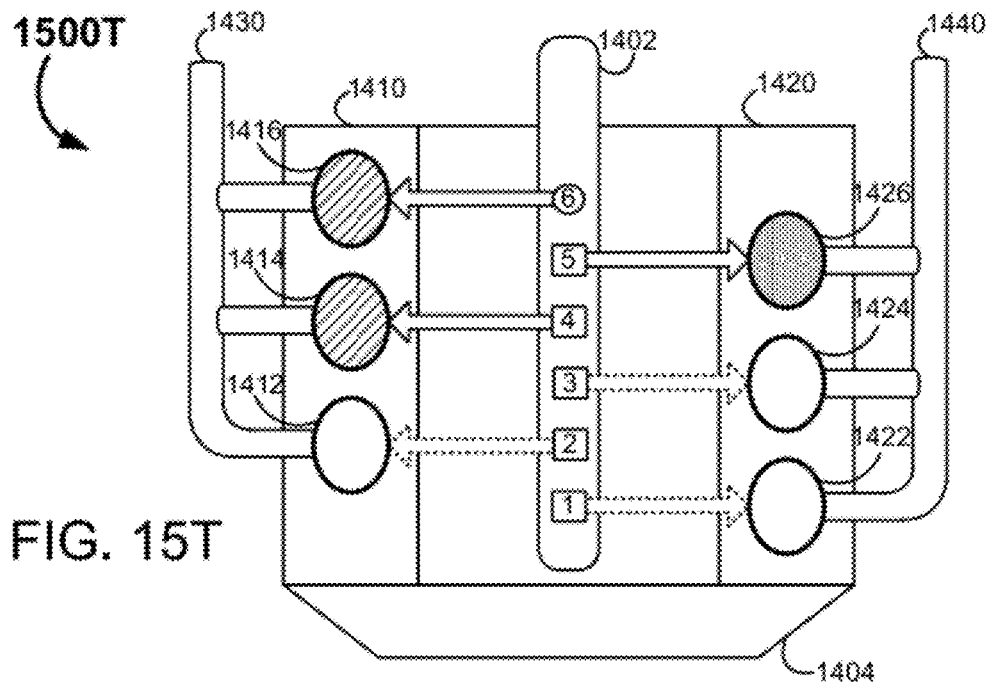

At FIG. 15T, illustrated at 1500T, Chamber Four 1414 and Chamber Six 1416 are operational (indicated by diagonal shading), and vent to Left Exhaust Manifold 1430. Chamber Five 1426 is a 'flow through' chamber (indicated by dotted shading) and vents its air to the Right Exhaust Manifold 1440, thereby achieving legal smog compliance. Chamber One 1422, Chamber Two 1412 and Chamber Three 1424 are effectively shut down (indicated by no shading).

Figure 15U:
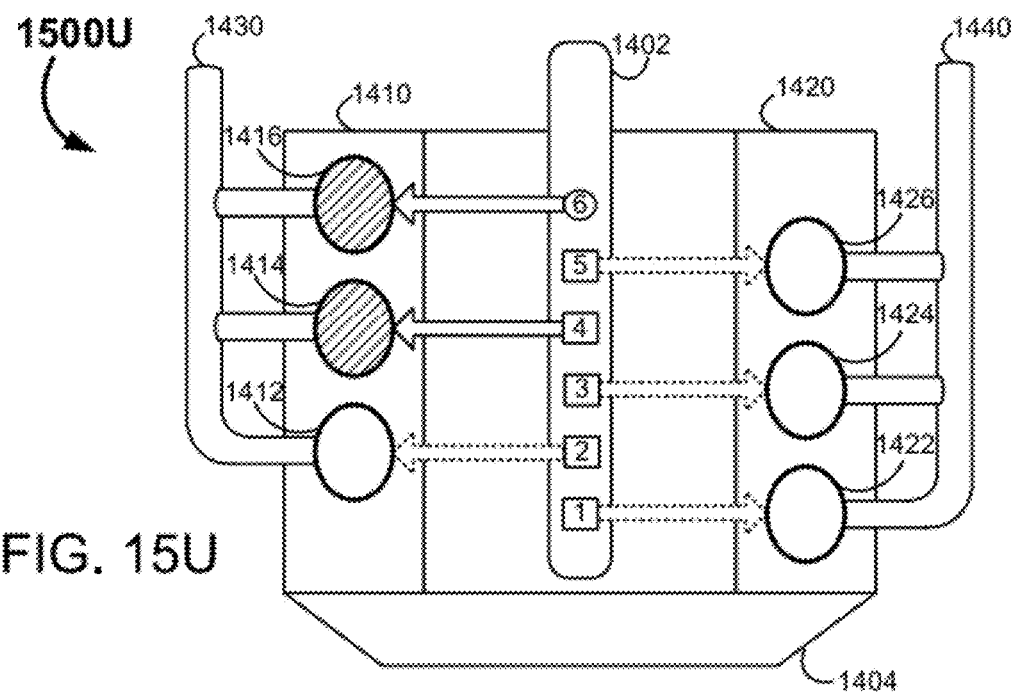

At FIG. 15U, illustrated at 1500U, Chamber Four 1414 and Chamber Six 1416 are operational (indicated by diagonal shading), and vent to Left Exhaust Manifold 1430. Chamber One 1422, Chamber Two 1412, Chamber Three 1424 and Chamber Five 1426 are effectively shut down (indicated by no shading).

Figure 15V:
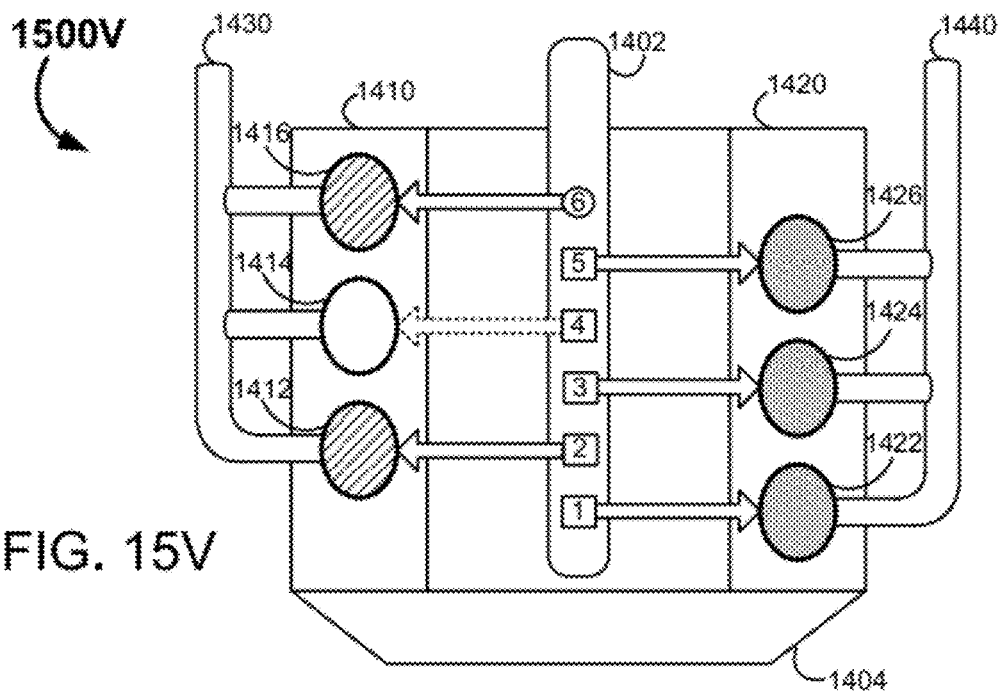

At FIG. 15V, illustrated at 1500V, Chamber Two 1412 and Chamber Six 1416 are operational (indicated by diagonal shading), and vent to Left Exhaust Manifold 1430. Chamber One 1422, Chamber Three 1424 and Chamber Five 1426 are 'flow through' chambers (indicated by dotted shading) and vent their air to the Right Exhaust Manifold 1440, thereby achieving legal smog compliance. Chamber Four 1414 is effectively shut down (indicated by no shading).

Figure 15W:
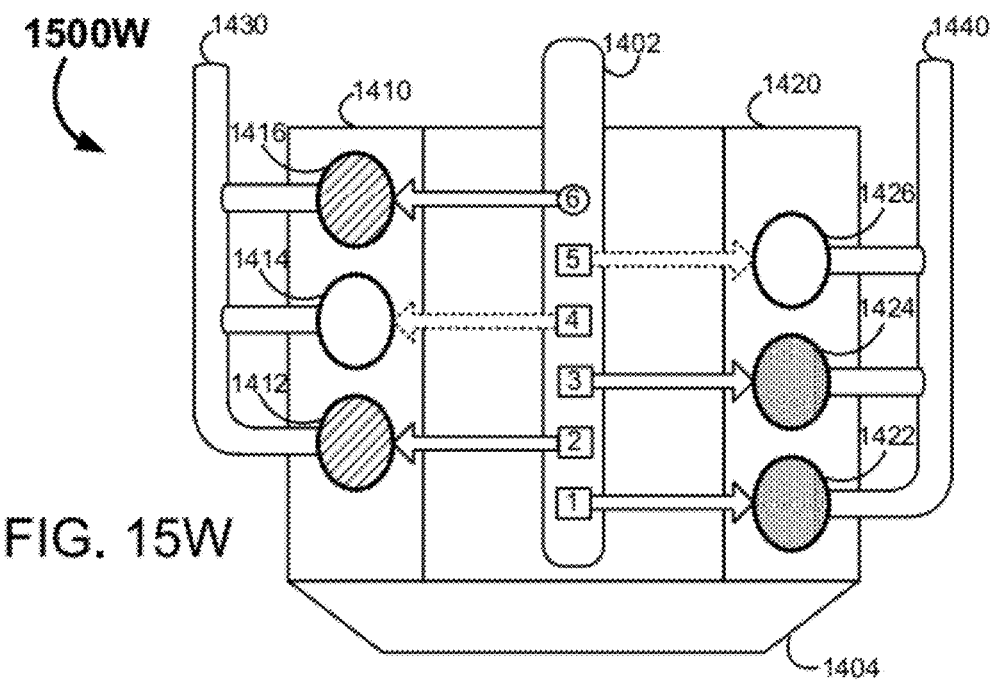

At FIG. 15W, illustrated at 1500W, Chamber Two 1412 and Chamber Six 1416 are operational (indicated by diagonal shading), and vent to Left Exhaust Manifold 1430. Chamber One 1422 and Chamber Three 1424 are 'flow through' chambers (indicated by dotted shading) and vent their air to the Right Exhaust Manifold 1440, thereby achieving legal smog compliance. Chamber Four 1414 and Chamber Five 1426 are effectively shut down (indicated by no shading).

Figure 15X:
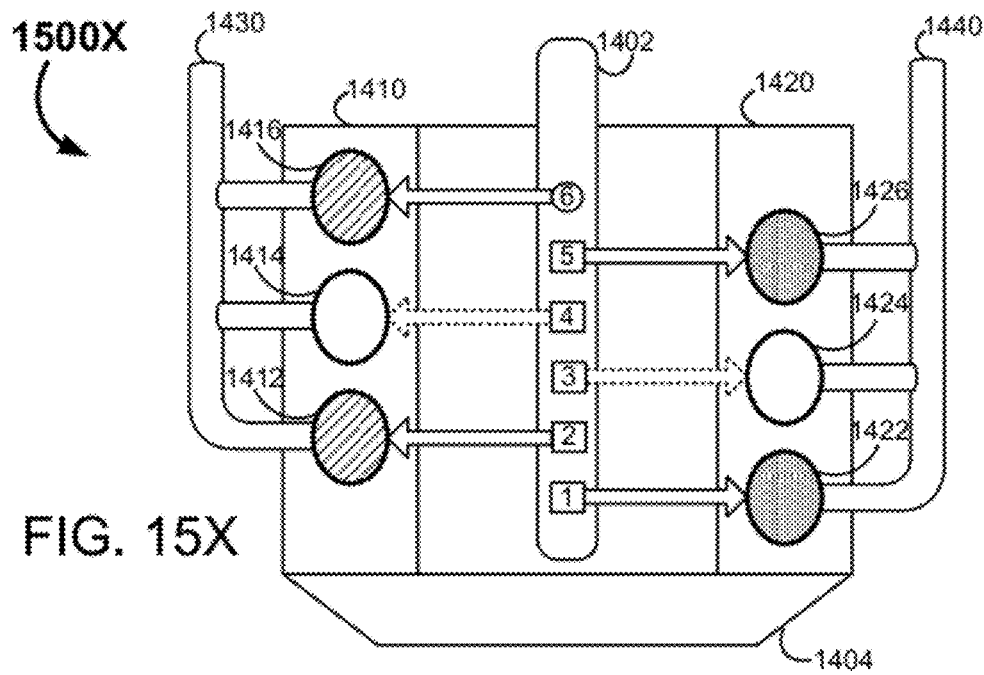

At FIG. 15X, illustrated at 1500X, Chamber Two 1412 and Chamber Six 1416 are operational (indicated by diagonal shading), and vent to Left Exhaust Manifold 1430. Chamber One 1422 and Chamber Five 1426 are 'flow through' chambers (indicated by dotted shading) and vent their air to the Right Exhaust Manifold 1440, thereby achieving legal smog compliance. Chamber Three 1424 and Chamber Four 1414 are effectively shut down (indicated by no shading).

Figure 15Y:
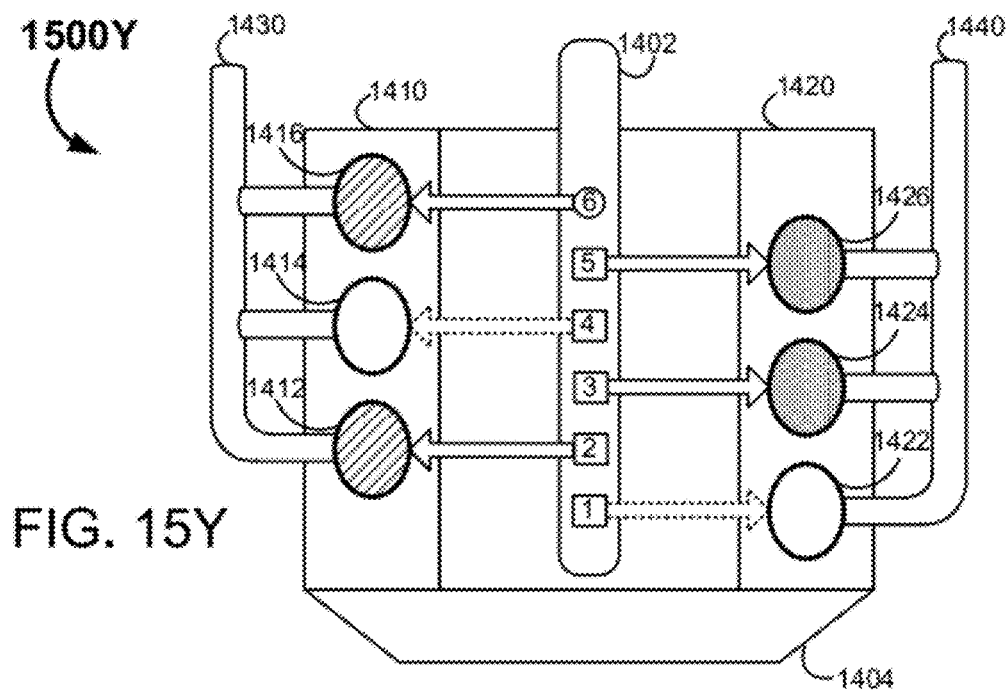

At FIG. 15Y, illustrated at 1500Y, Chamber Two 1412 and Chamber Six 1416 are operational (indicated by diagonal shading), and vent to Left Exhaust Manifold 1430. Chamber Three 1424 and Chamber Five 1426 are 'flow through' chambers (indicated by dotted shading) and vent their air to the Right Exhaust Manifold 1440, thereby achieving legal smog compliance. Chamber One 1422, and 1414 are effectively shut down (indicated by no shading).

Figure 15Z:
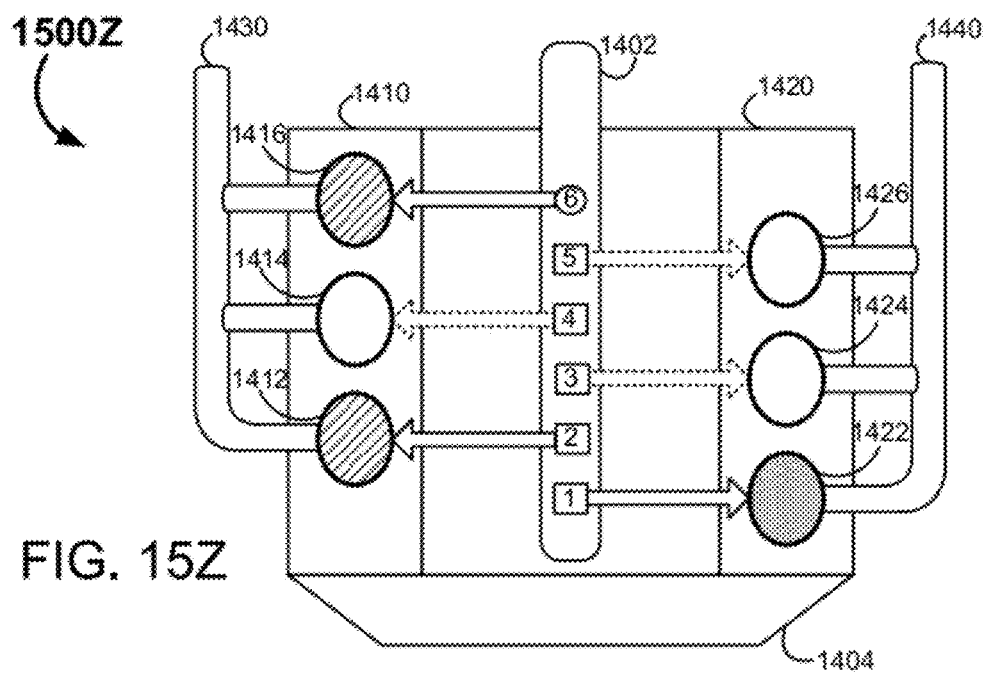
Figure 15A:
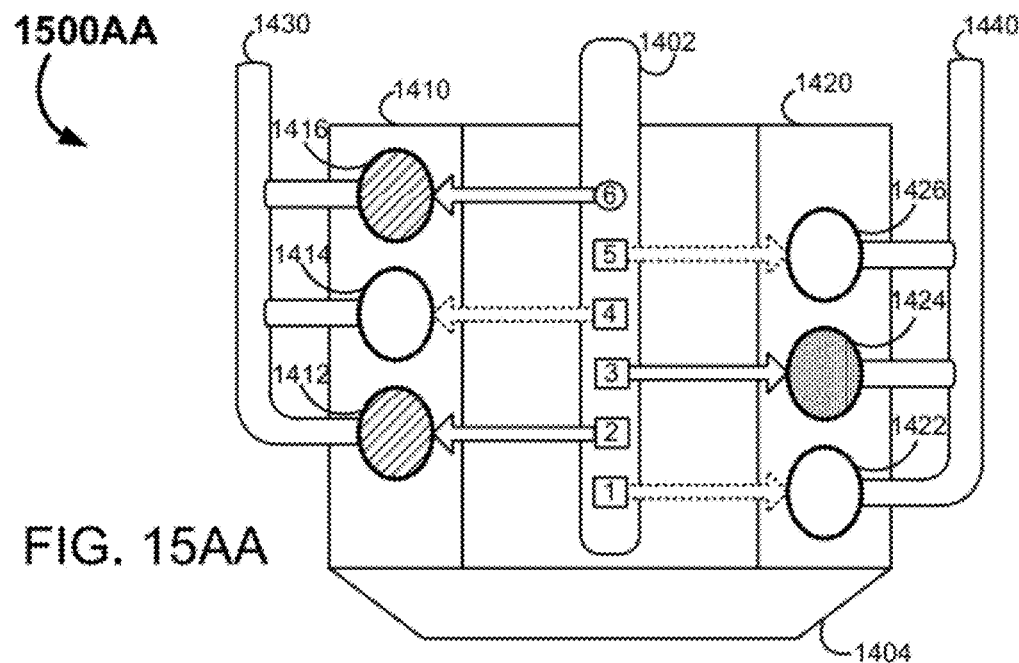
Figure 15A:
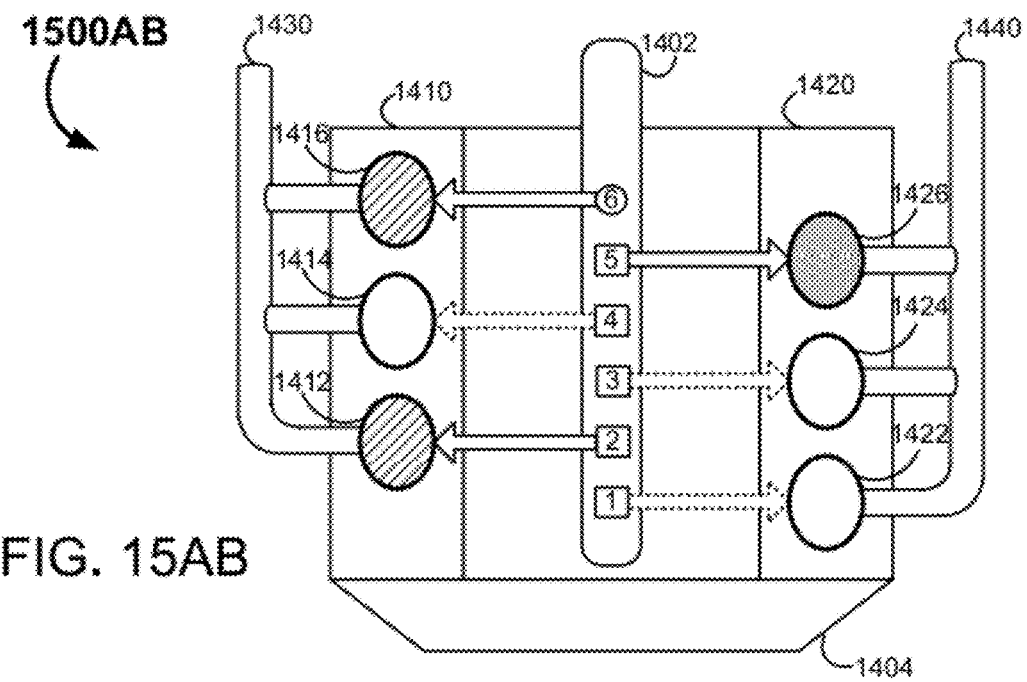
Figure 15A:
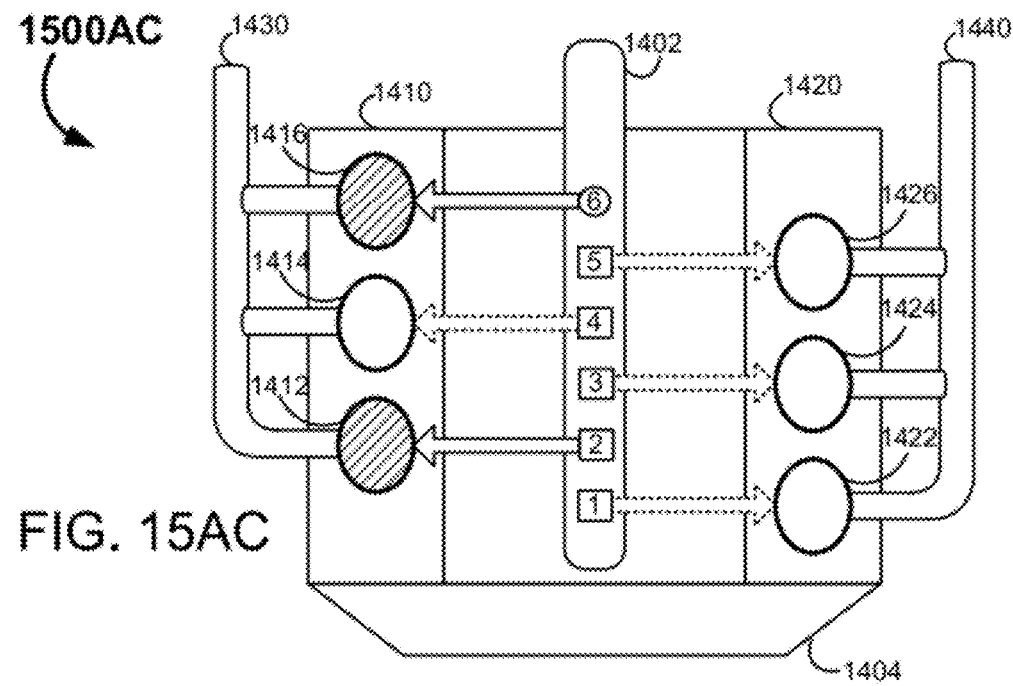

At FIG. 15Z, illustrated at 1500Z, Chamber Two 1412 and Chamber Six 1416 are operational (indicated by diagonal shading), and vent to Left Exhaust Manifold 1430. Chamber One 1422 is a 'flow through' chamber (indicated by dotted shading) and vents its air to the Right Exhaust Manifold 1440, thereby achieving legal smog compliance. Chamber Three 1424, Chamber Four 1414 and Chamber Five 1426 are effectively shut down (indicated by no shading).

At FIG. 15AA, illustrated at 1500AA, Chamber Two 1412 and Chamber Six 1416 are operational (indicated by diagonal shading), and vent to Left Exhaust Manifold 1430. Chamber Three 1424 is a 'flow through' chamber (indicated by dotted shading) and vents its air to the Right Exhaust Manifold 1440, thereby achieving legal smog compliance. Chamber One 1422, Chamber Four 1414 and Chamber Five 1426 are effectively shut down (indicated by no shading).

At FIG. 15AB, illustrated at 1500AB, Chamber Two 1412 and Chamber Six 1416 are operational (indicated by diagonal shading), and vent to Left Exhaust Manifold 1430. Chamber Five 1426 is a 'flow through' chamber (indicated by dotted shading) and vents its air to the Right Exhaust Manifold 1440, thereby achieving legal smog compliance. Chamber One 1422, Chamber Three 1424 and Chamber Four 1414 are effectively shut down (indicated by no shading).

At FIG. 15AC, illustrated at 1500AC, Chamber Two 1412 and Chamber Six 1416 are operational (indicated by diagonal shading), and vent to Left Exhaust Manifold 1430. Chamber One 1422, Chamber Three 1424, Chamber Four 1414 and Chamber Five 1426 are effectively shut down (indicated by no shading).

C. Three Chamber Operation

FIGS. 16A to 16L are illustrative diagrams of an example V6 style internal combustion engine in a variable displacement mode where three working chambers are operational.

Figure 16A:
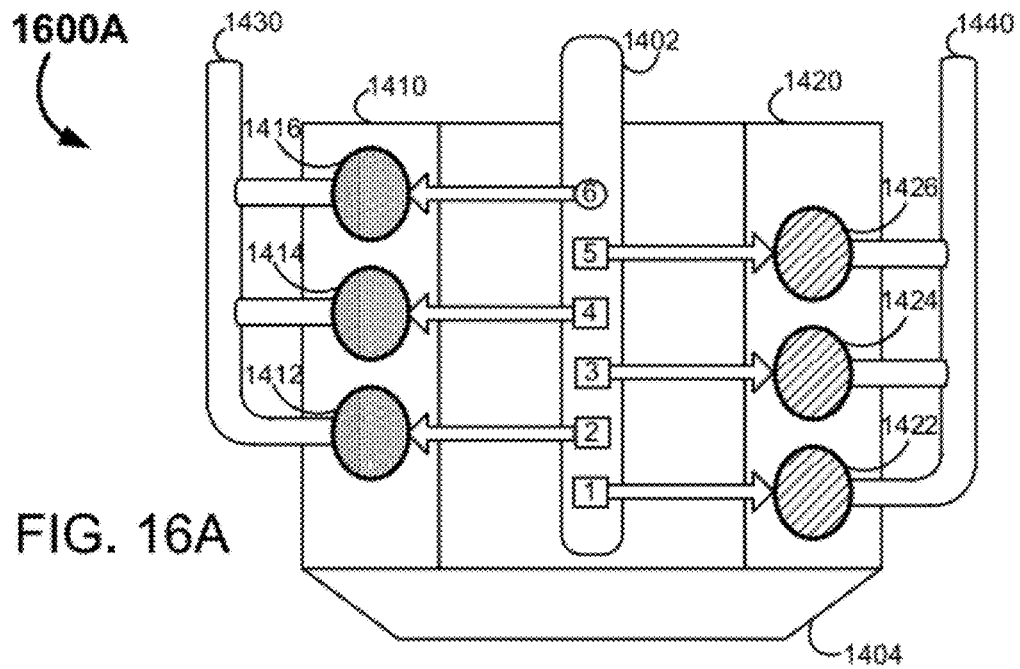
FIGS. 16A to 16L are illustrative diagrams of an example V6 style internal combustion engine in a variable displacement mode where three working chambers are operational in accordance with an embodiment of the present invention.

At FIG. 16A, illustrated at 1600A, Chamber One 1422, Chamber Three 1424 and Chamber Five 1426 are operational (indicated by diagonal shading), and vent to Right Exhaust Manifold 1440. Chamber Two 1412, Chamber Four 1414 and Chamber Six 1416 are 'flow through' chambers (indicated by dotted shading) and vent their air to the Left Exhaust Manifold 1430, thereby achieving legal smog compliance.

Figure 16B:
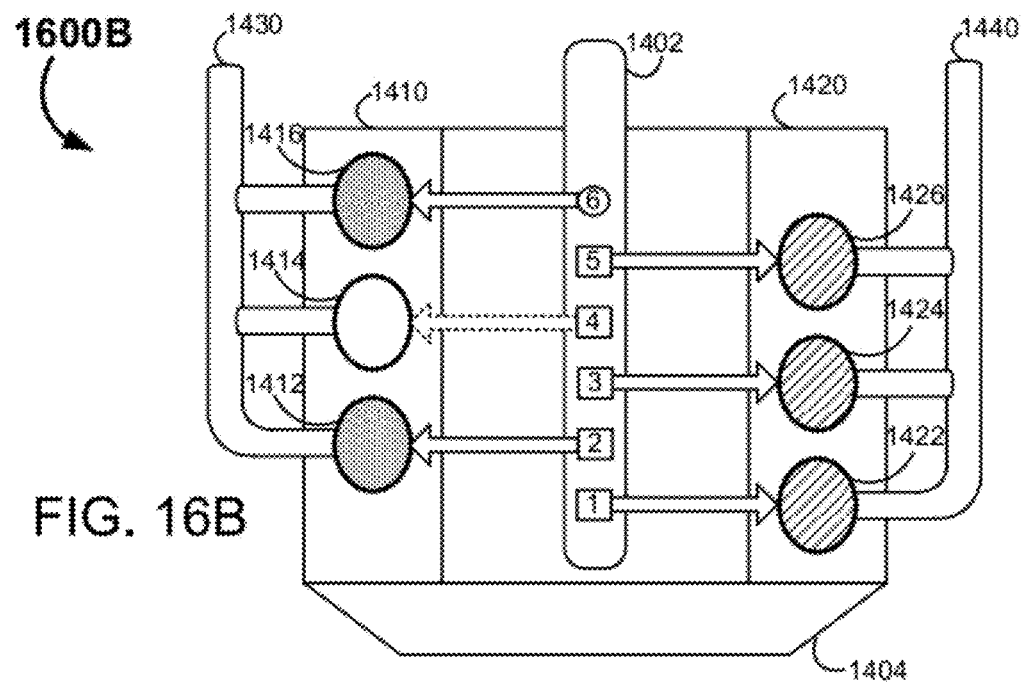

At FIG. 16B, illustrated at 1600B, Chamber One 1422, Chamber Three 1424 and Chamber Five 1426 are operational (indicated by diagonal shading), and vent to Right Exhaust Manifold 1440. Chamber Two 1412 and Chamber Six 1416 are 'flow through' chambers (indicated by dotted shading) and vent their air to the Left Exhaust Manifold 1430, thereby achieving legal smog compliance. Chamber Four 1414 is effectively shut down (indicated by no shading).

Figure 16C:
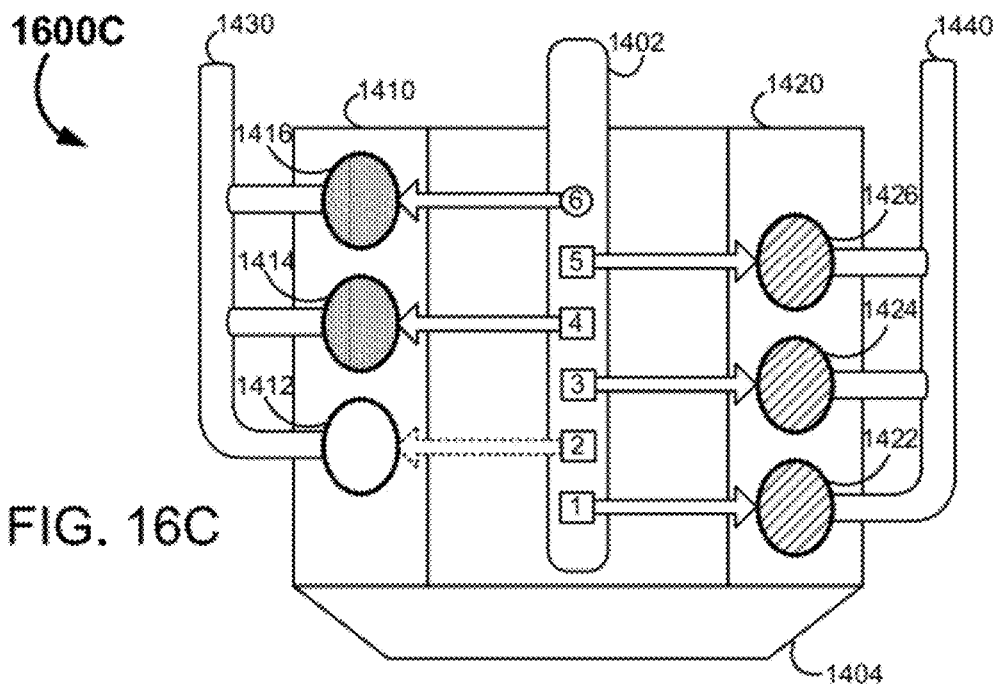

At FIG. 16C, illustrated at 1600C, Chamber One 1422, Chamber Three 1424 and Chamber Five 1426 are operational (indicated by diagonal shading), and vent to Right Exhaust Manifold 1440. Chamber Four 1414 and Chamber Six 1416 are 'flow through' chambers (indicated by dotted shading) and vent their air to the Left Exhaust Manifold 1430, thereby achieving legal smog compliance. Chamber Two 1412 is effectively shut down (indicated by no shading).

Figure 16D:
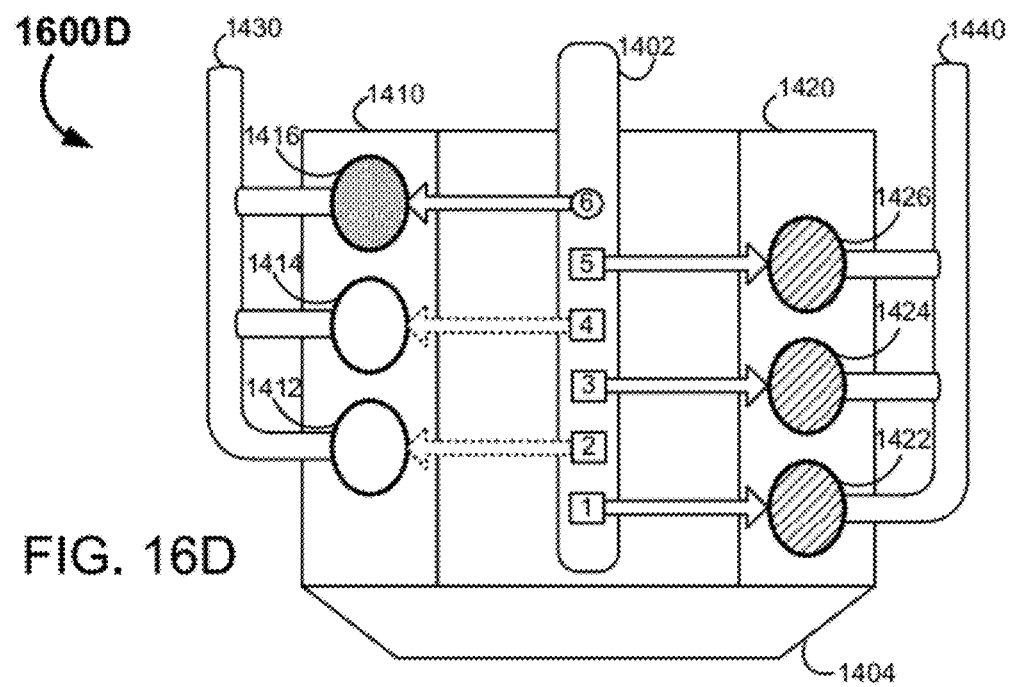

At FIG. 16D, illustrated at 1600D, Chamber One 1422, Chamber Three 1424 and Chamber Five 1426 are operational (indicated by diagonal shading), and vent to Right Exhaust Manifold 1440. Chamber Six 1416 is a 'flow through' chamber (indicated by dotted shading) and vents its air to the Left Exhaust Manifold 1430, thereby achieving legal smog compliance. Chamber Two 1412 and Chamber Four 1414 are effectively shut down (indicated by no shading).

Figure 16E:
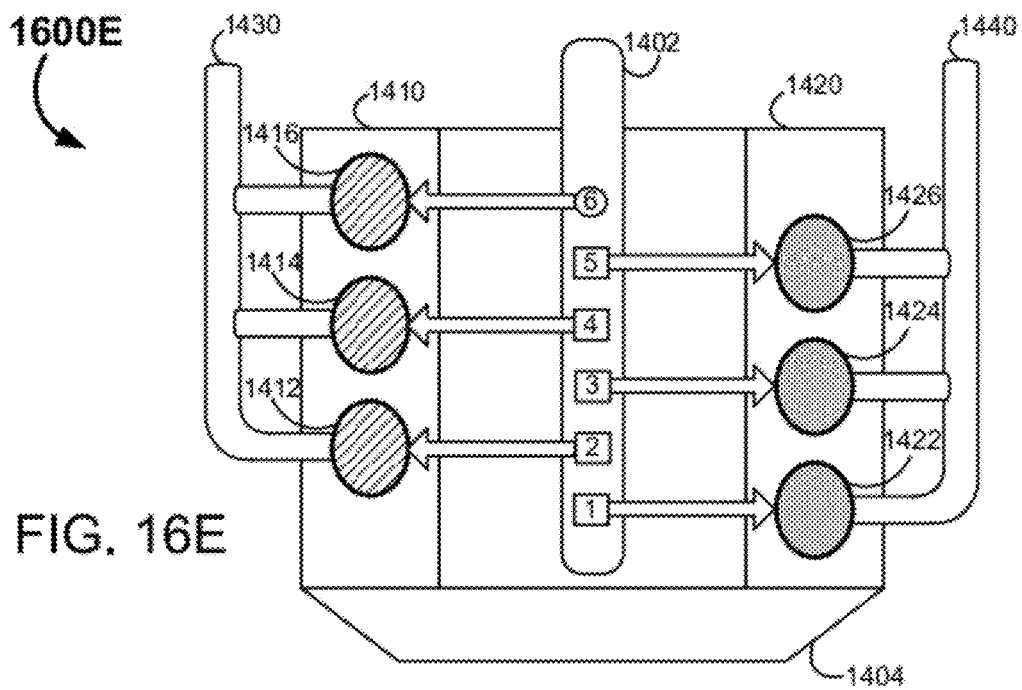

At FIG. 16E, illustrated at 1600E, Chamber Two 1412, Chamber Four 1414 and Chamber Six 1416 are operational (indicated by diagonal shading), and vent to Left Exhaust Manifold 1430. Chamber One 1422, Chamber Three 1424 and Chamber Five 1426 are 'flow through' chambers (indicated by dotted shading) and vent their air to the Right Exhaust Manifold 1440, thereby achieving legal smog compliance.

Figure 16F:
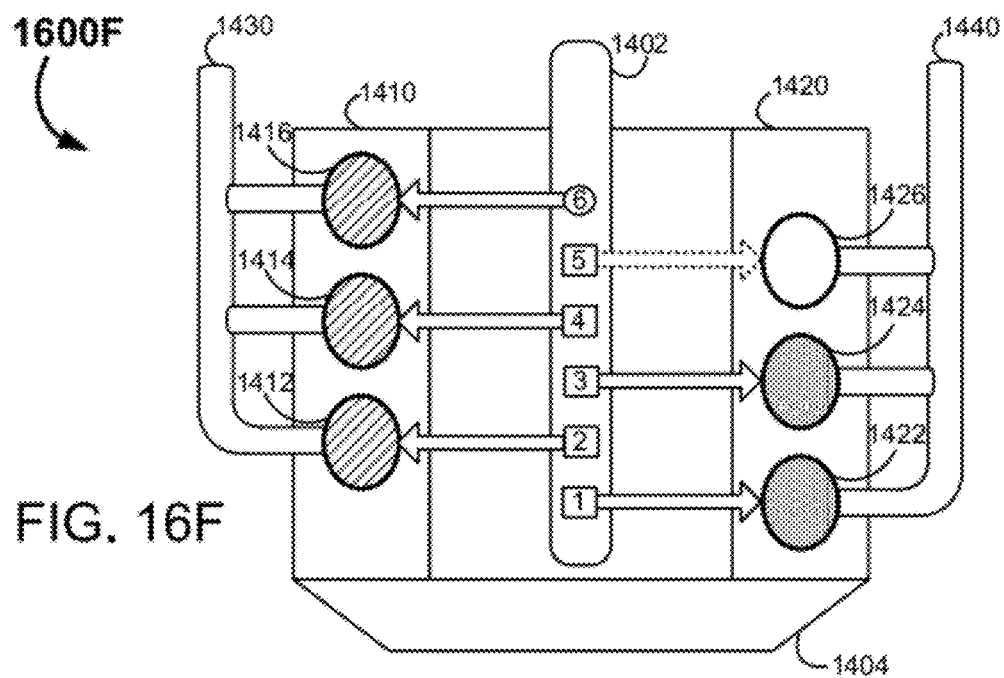

At FIG. 16F, illustrated at 1600F, Chamber Two 1412, Chamber Four 1414 and Chamber Six 1416 are operational (indicated by diagonal shading), and vent to Left Exhaust Manifold 1430. Chamber One 1422 and Chamber Three 1424 are 'flow through' chambers (indicated by dotted shading) and vent their air to the Right Exhaust Manifold 1440, thereby achieving legal smog compliance. Chamber Five 1426 is effectively shut down (indicated by no shading).

Figure 16G:
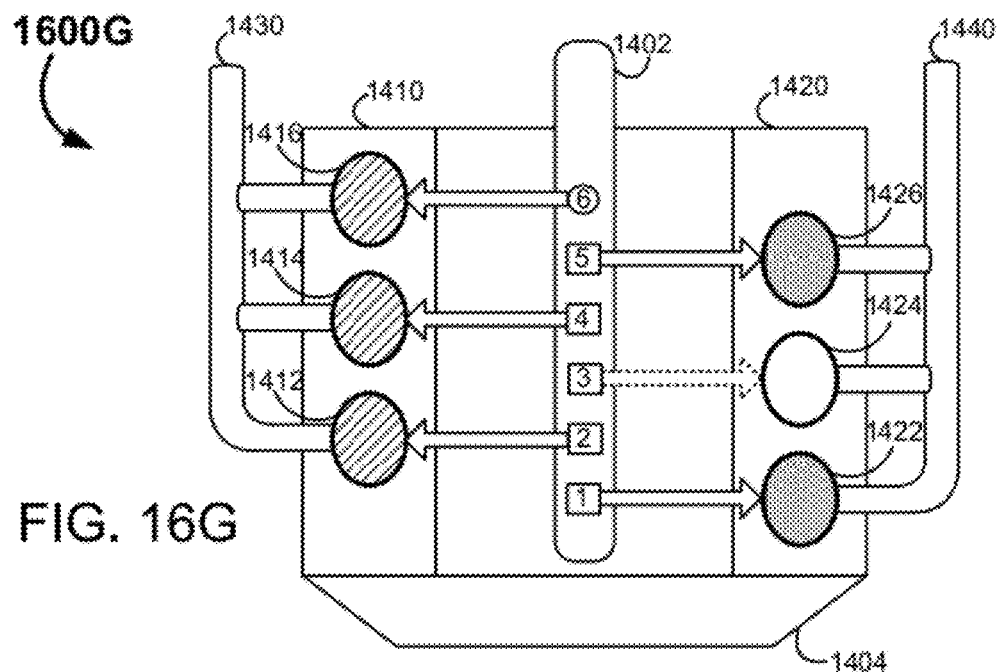

At FIG. 16G, illustrated at 1600G, Chamber Two 1412, Chamber Four 1414 and Chamber Six 1416 are operational (indicated by diagonal shading), and vent to Left Exhaust Manifold 1430. Chamber One 1422 and Chamber Five 1426 are 'flow through' chambers (indicated by dotted shading) and vent their air to the Right Exhaust Manifold 1440, thereby achieving legal smog compliance. Chamber Three 1424 is effectively shut down (indicated by no shading).

Figure 16H:
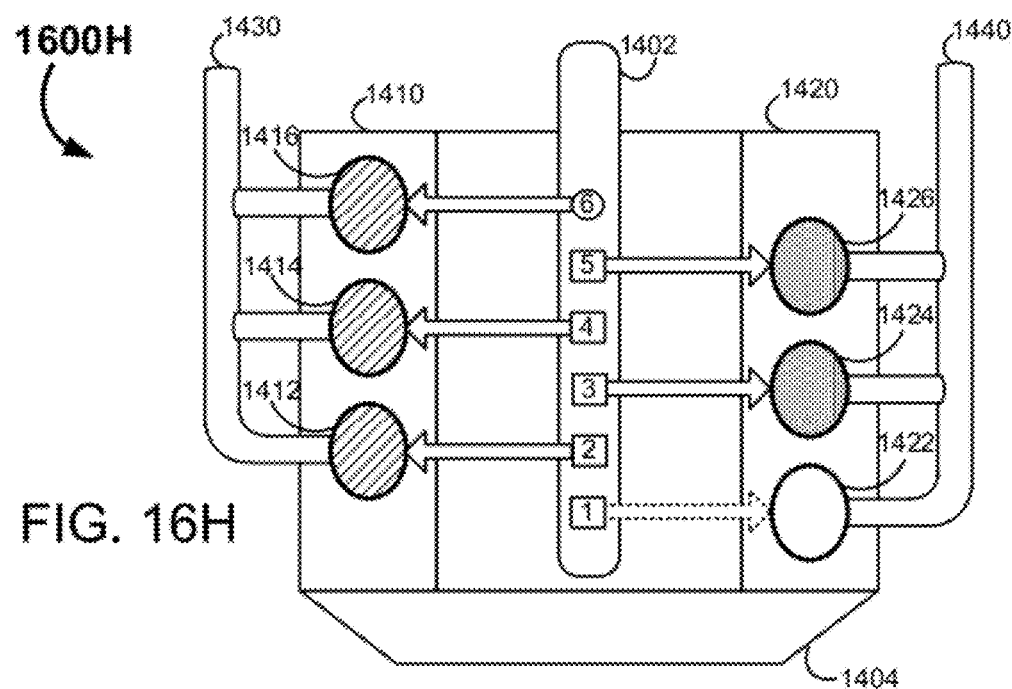

At FIG. 16H, illustrated at 1600H, Chamber Two 1412, Chamber Four 1414 and Chamber Six 1416 are operational (indicated by diagonal shading), and vent to Left Exhaust Manifold 1430. Chamber Three 1424 and Chamber Five 1426 are 'flow through' chambers (indicated by dotted shading) and vent their air to the Right Exhaust Manifold 1440, thereby achieving legal smog compliance. Chamber One 1422 is effectively shut down (indicated by no shading).

Figure 16I:
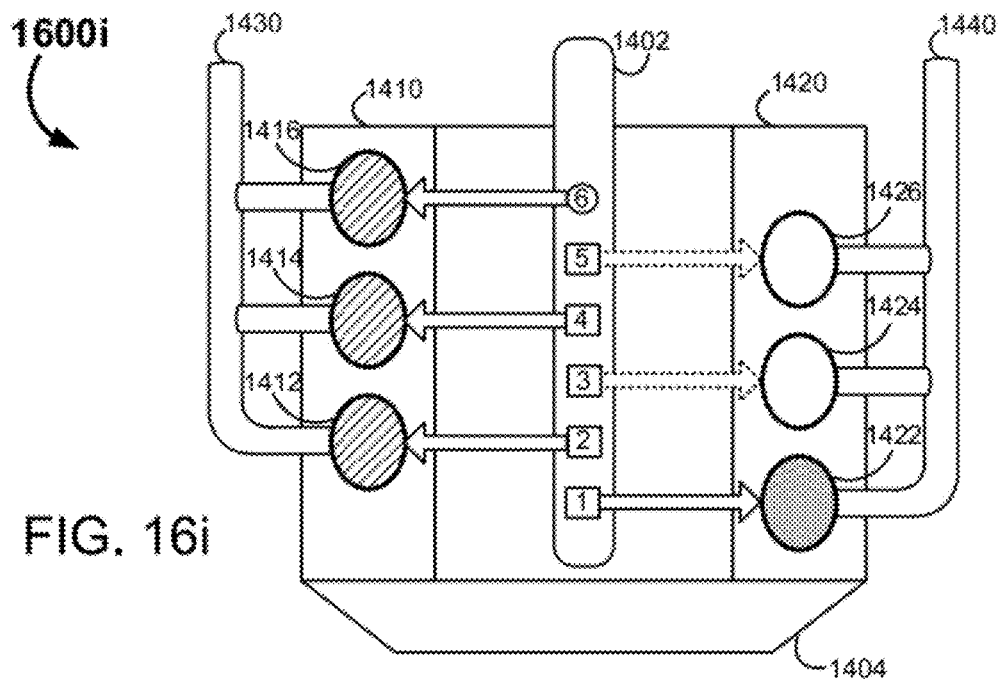

At FIG. 16i, illustrated at 1600i, Chamber Two 1412, Chamber Four 1414 and Chamber Six 1416 are operational (indicated by diagonal shading), and vent to Left Exhaust Manifold 1430. Chamber One 1422 is a 'flow through' chambers (indicated by dotted shading) and vents its air to the Right Exhaust Manifold 1440, thereby achieving legal smog compliance. Chamber Three 1424 and Chamber Five 1426 are effectively shut down (indicated by no shading).

Figure 16J:
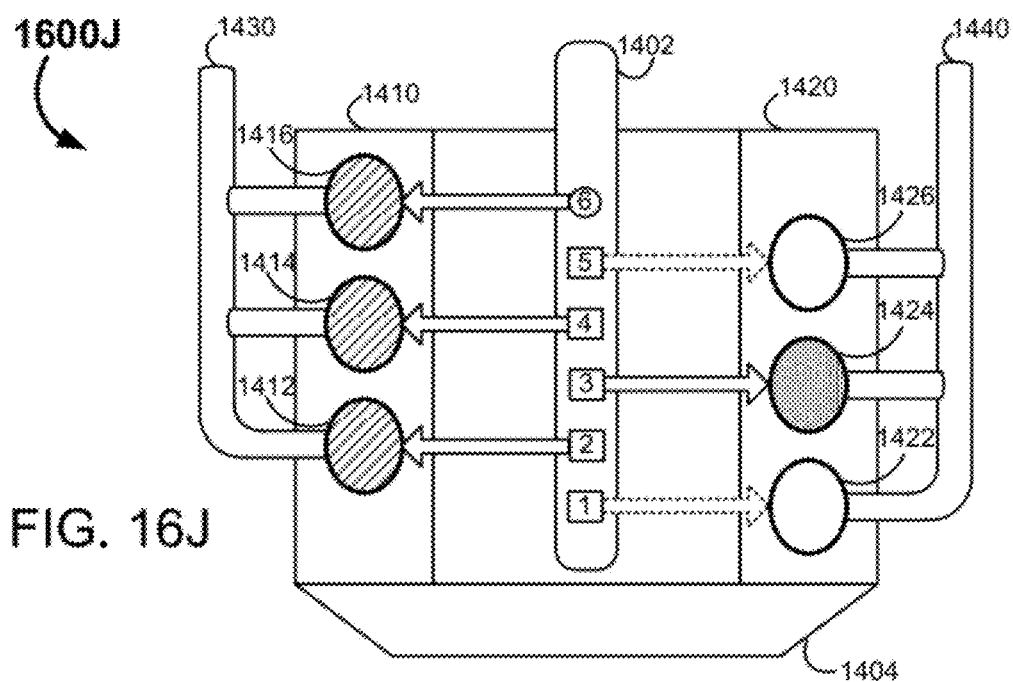

At FIG. 16J, illustrated at 1600J, Chamber Two 1412, Chamber Four 1414 and Chamber Six 1416 are operational (indicated by diagonal shading), and vent to Left Exhaust Manifold 1430. Chamber Three 1424 is a 'flow through' chambers (indicated by dotted shading) and vents its air to the Right Exhaust Manifold 1440, thereby achieving legal smog compliance. Chamber One 1422 and Chamber Five 1426 are effectively shut down (indicated by no shading).

Figure 16K:
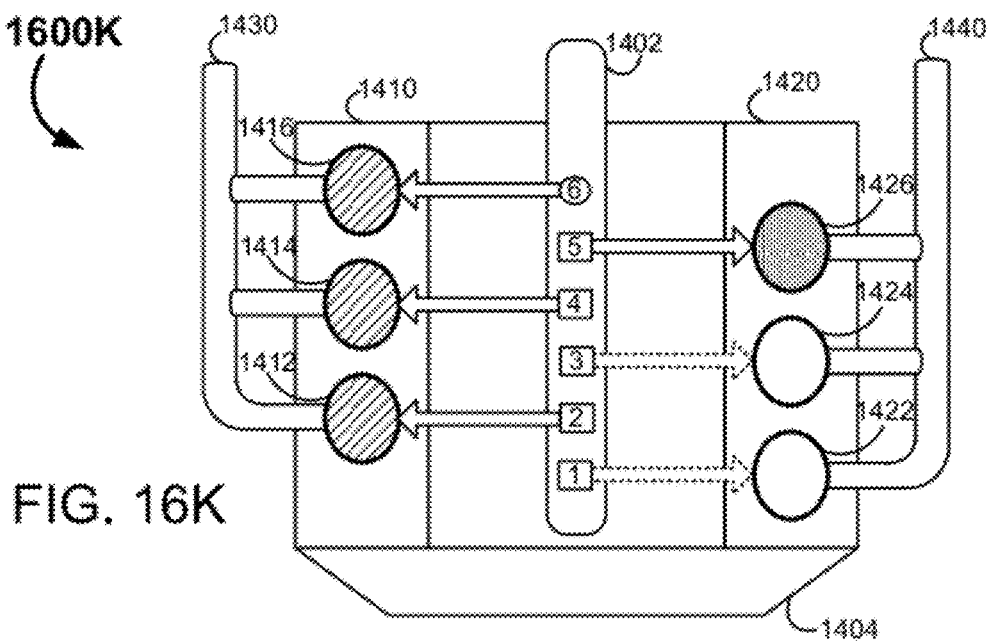

At FIG. 16K, illustrated at 1600K, Chamber Two 1412, Chamber Four 1414 and Chamber Six 1416 are operational (indicated by diagonal shading), and vent to Left Exhaust Manifold 1430. Chamber Five 1426 is a 'flow through' chambers (indicated by dotted shading) and vents its air to the Right Exhaust Manifold 1440, thereby achieving legal smog compliance. Chamber One 1422 and Chamber Three 1424 are effectively shut down (indicated by no shading).

Figure 16L:
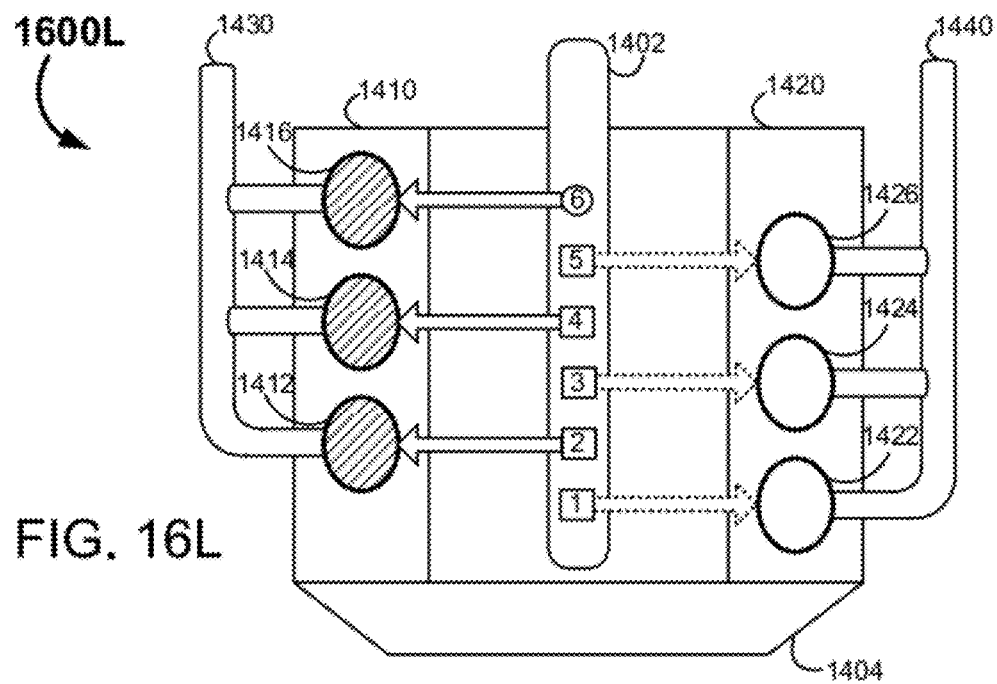

At FIG. 16L, illustrated at 1600L, Chamber Two 1412, Chamber Four 1414 and Chamber Six 1416 are operational (indicated by diagonal shading), and vent to Left Exhaust Manifold 1430. Chamber One 1422, Chamber Three 1424 and Chamber Five 1426 are effectively shut down (indicated by no shading).

D. Four Chamber Operation

FIGS. 17A to 17J are illustrative diagrams of an example V6 style internal combustion engine in a variable displacement mode where four working chambers are operational.

Figure 17A:
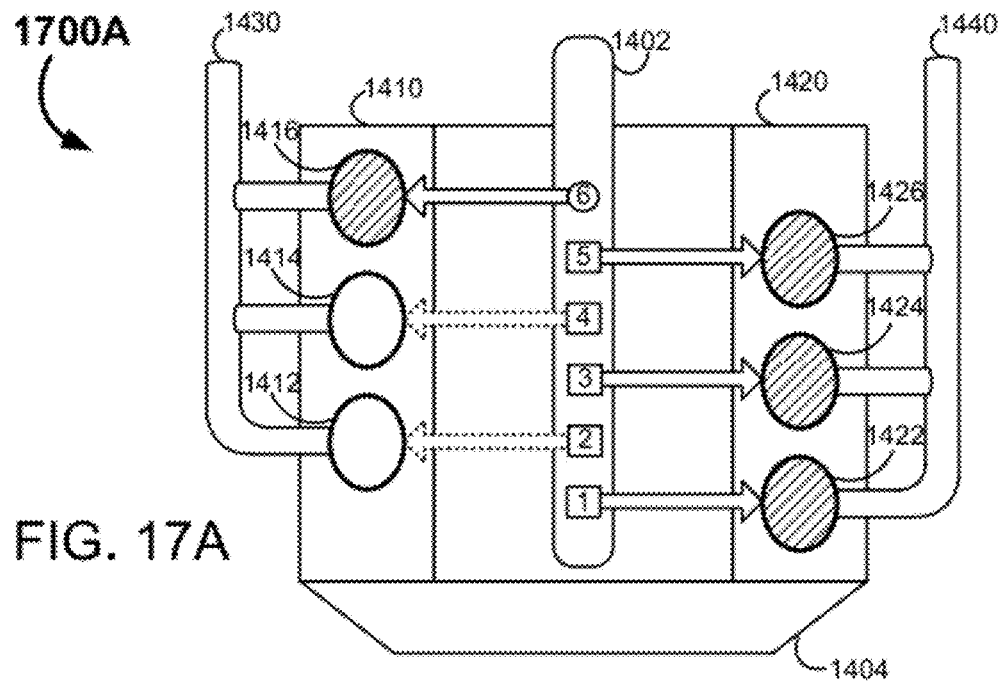
FIGS. 17A to 17J are illustrative diagrams of an example V6 style internal combustion engine in a variable displacement mode where four working chambers are operational in accordance with an embodiment of the present invention.

At FIG. 17A, illustrated at 1700A, Chamber One 1422, Chamber Three 1424, Chamber Five 1426 and Chamber Six 1416 are operational (indicated by diagonal shading). Chamber Two 1412 and Chamber Four 1414 are effectively shut down (indicated by no shading).

Figure 17B:
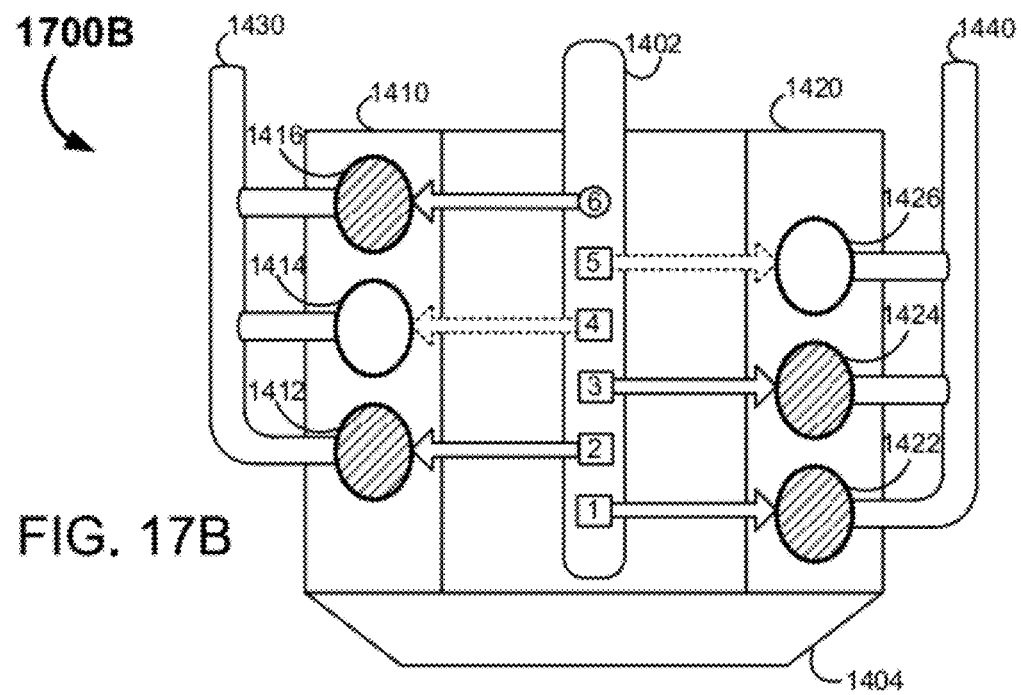

At FIG. 17B, illustrated at 1700B, Chamber One 1422, Chamber Two 1412, Chamber Three 1424 and Chamber Six 1416 are operational (indicated by diagonal shading). Chamber Four 1414 and Chamber Five 1426 are effectively shut down (indicated by no shading).

Figure 17C:
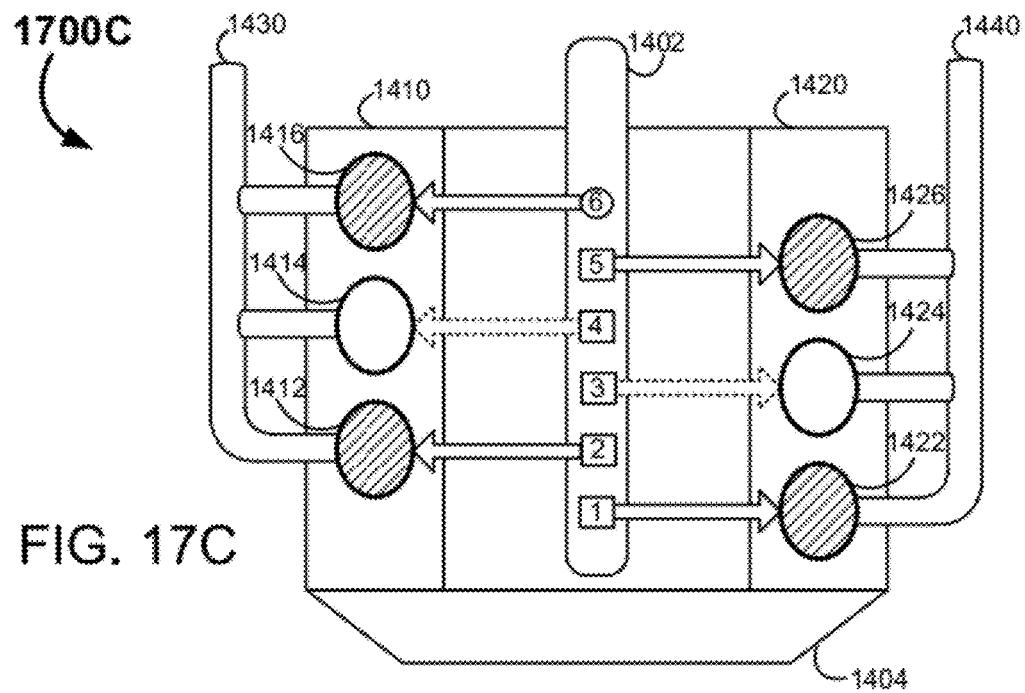

At FIG. 17C, illustrated at 1700C, Chamber One 1422, Chamber Two 1412, Chamber Five 1426 and Chamber Six 1416 are operational (indicated by diagonal shading). Chamber Three 1424 and Chamber Four 1414 are effectively shut down (indicated by no shading).

Figure 17D:
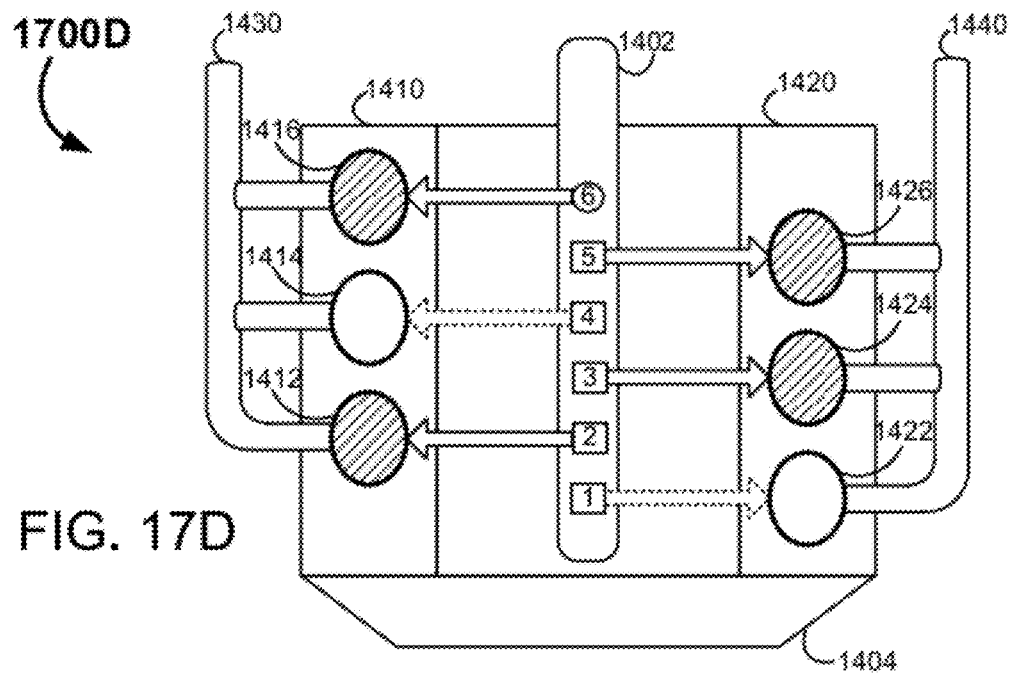

At FIG. 17D, illustrated at 1700D, Chamber Two 1412, Chamber Three 1424, Chamber Five 1426 and Chamber Six 1416 are operational (indicated by diagonal shading). Chamber One 1422 and Chamber Four 1414 are effectively shut down (indicated by no shading).

Figure 17E:
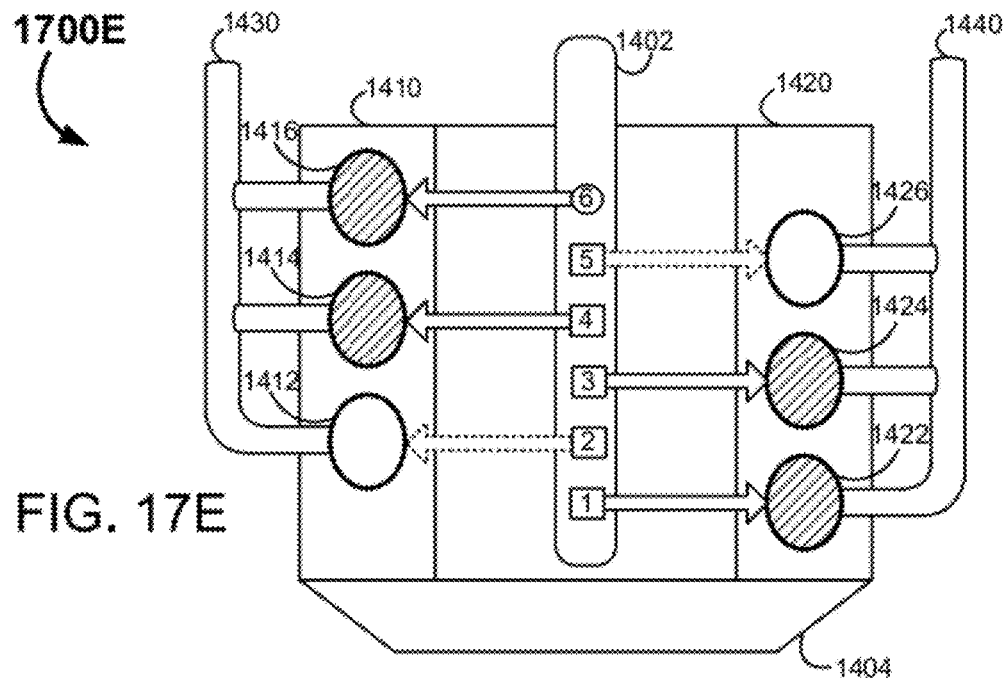

At FIG. 17E, illustrated at 1700E, Chamber One 1422, Chamber Three 1424, Chamber Four 1414 and Chamber Six 1416 are operational (indicated by diagonal shading). Chamber Two 1412 and Chamber Five 1426 are effectively shut down (indicated by no shading).

Figure 17F:
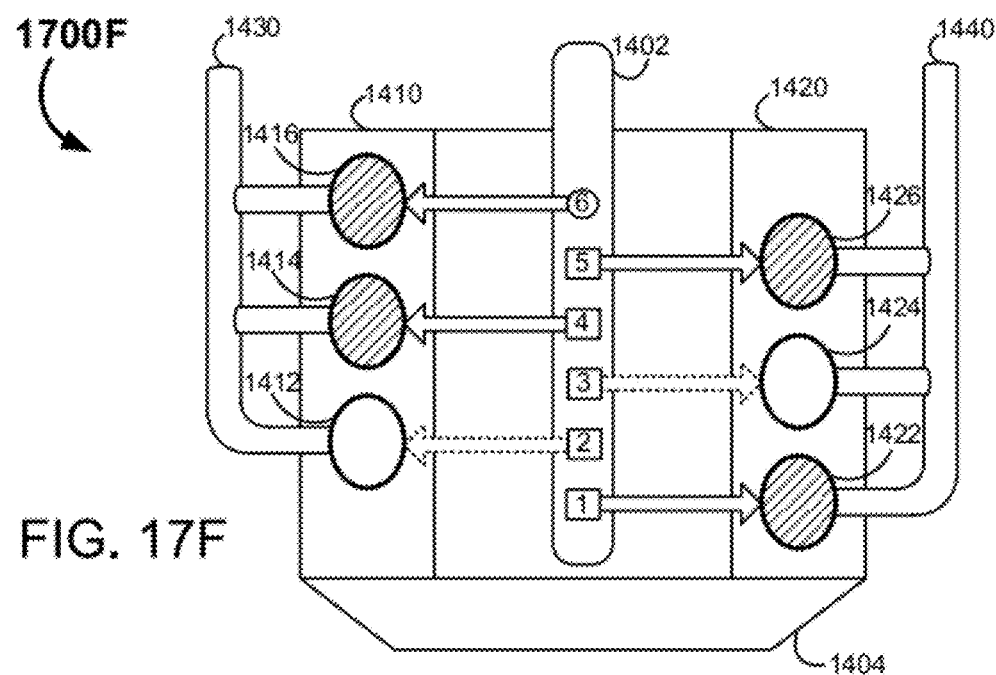

At FIG. 17F, illustrated at 1700F, Chamber One 1422, Chamber Four 1414, Chamber Five 1426 and Chamber Six 1416 are operational (indicated by diagonal shading). Chamber Two 1412 and Chamber Three 1424 are effectively shut down (indicated by no shading).

Figure 17G:
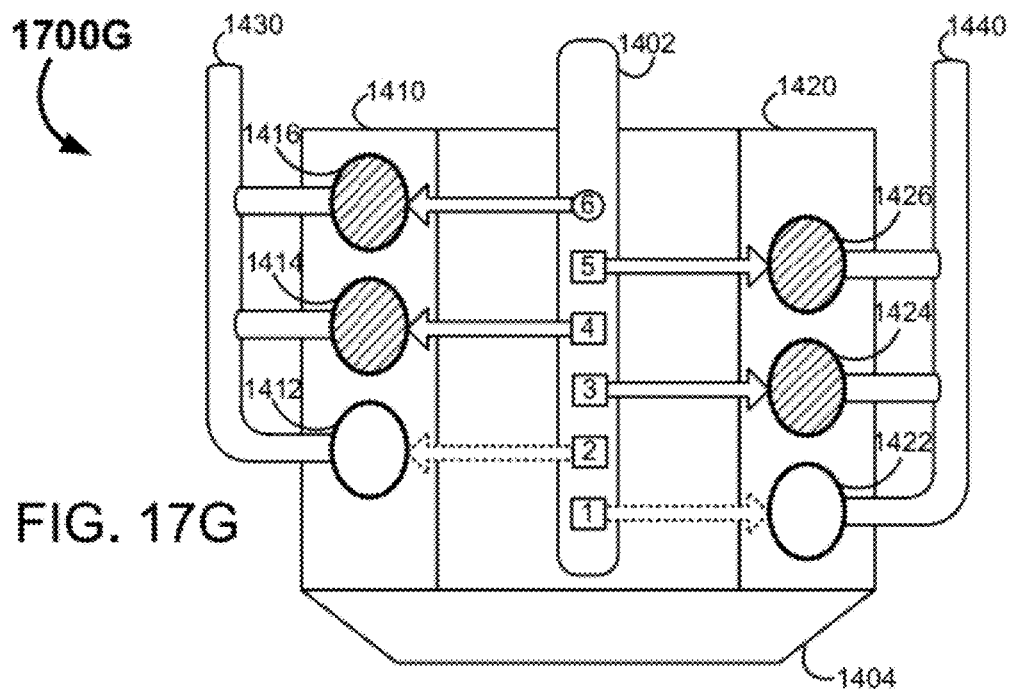

At FIG. 17G, illustrated at 1700G, Chamber Three 1424, Chamber Four 1414, Chamber Five 1426 and Chamber Six 1416 are operational (indicated by diagonal shading). Chamber One 1422 and Chamber Two 1412 are effectively shut down (indicated by no shading).

Figure 17H:
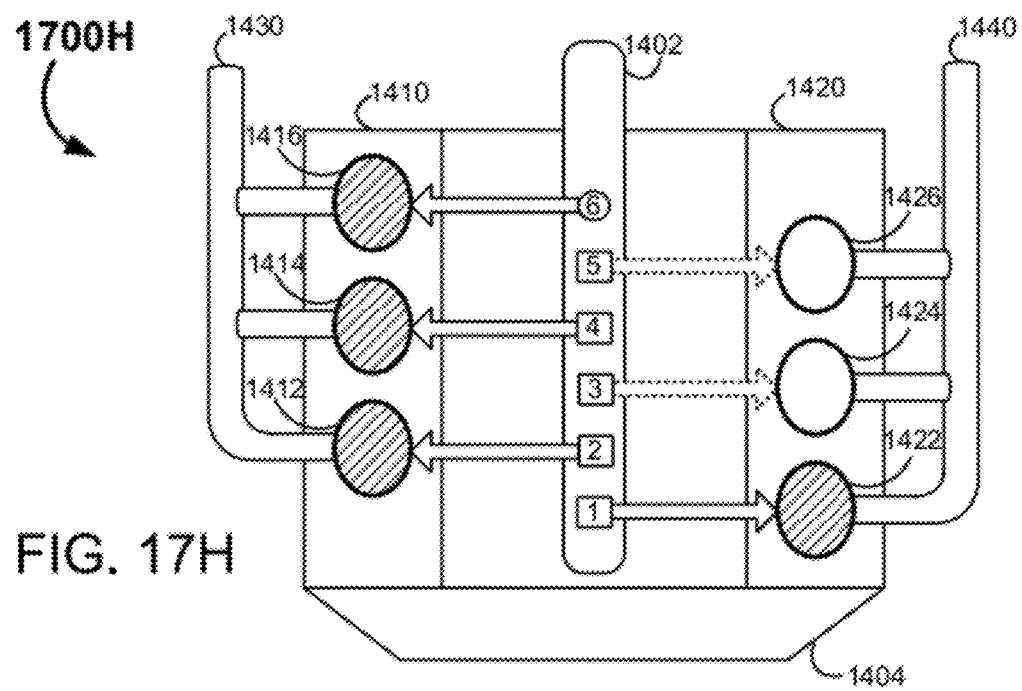

At FIG. 17H, illustrated at 1700H, Chamber One 1422, Chamber Two 1412, Chamber Four 1414 and Chamber Six 1416 are operational (indicated by diagonal shading). Chamber Three 1424 and Chamber Five 1426 are effectively shut down (indicated by no shading).

Figure 17I:
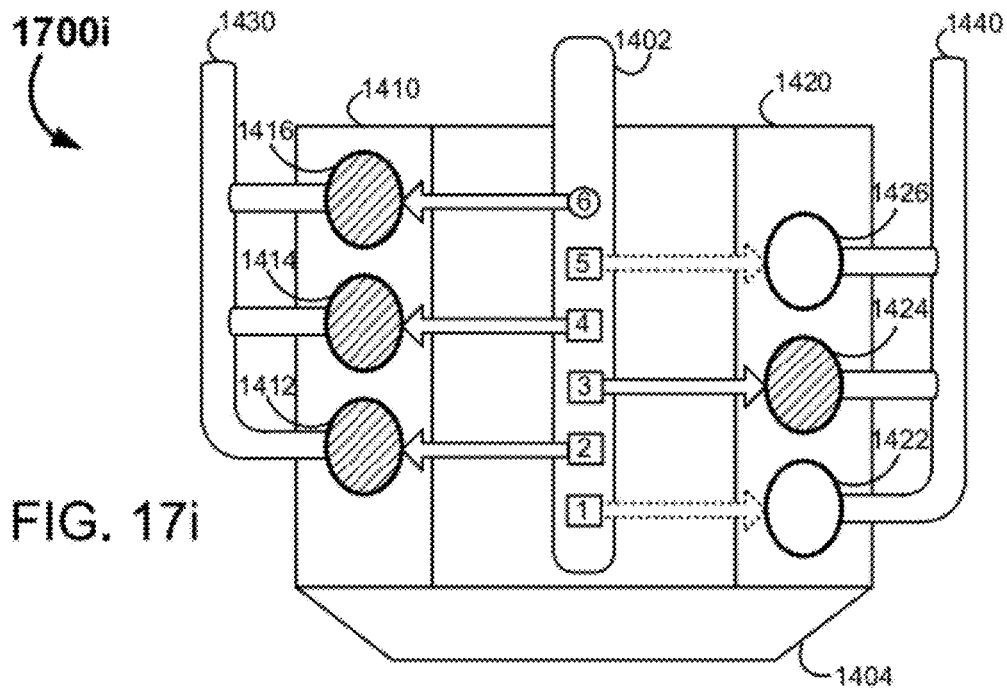

At FIG. 17i, illustrated at 1700i, Chamber Two 1412, Chamber Three 1424, Chamber Four 1414 and Chamber Six 1416 are operational (indicated by diagonal shading). Chamber One 1422 and Chamber Five 1426 are effectively shut down (indicated by no shading).

Figure 17J:
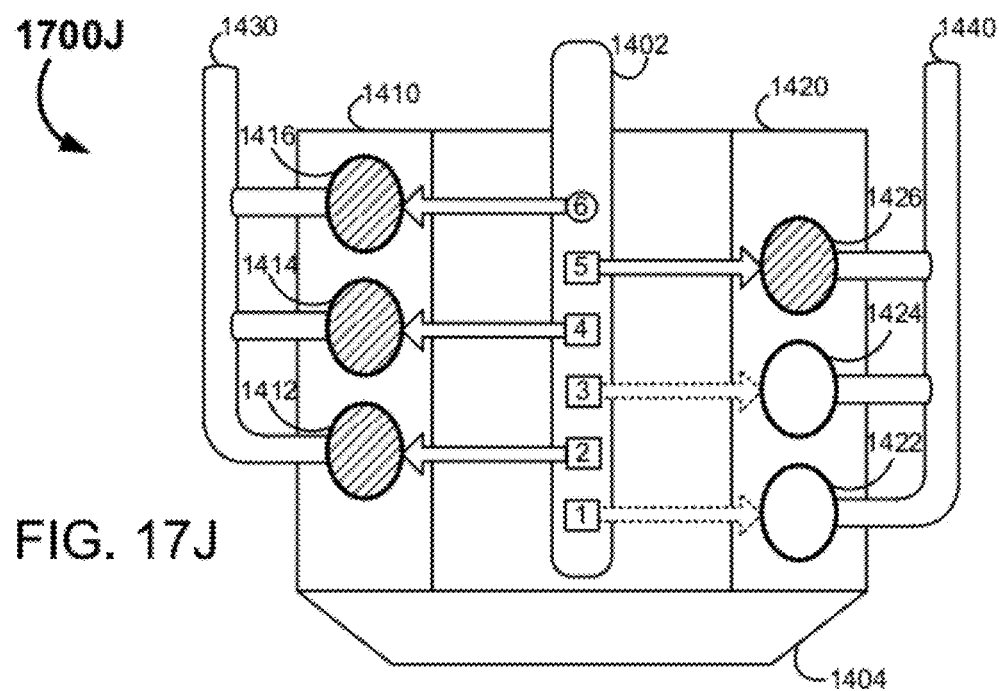

At FIG. 17J, illustrated at 1700J, Chamber Two 1412, Chamber Four 1414, Chamber Five 1426 and Chamber Six 1416 are operational (indicated by diagonal shading). Chamber One 1422 and Chamber Three 1424 are effectively shut down (indicated by no shading).

E. Five Chamber Operation

FIGS. 18A to 18E are illustrative diagrams of an example V6 style internal combustion engine in a variable displacement mode where five working chambers are operational.

Figure 18A:
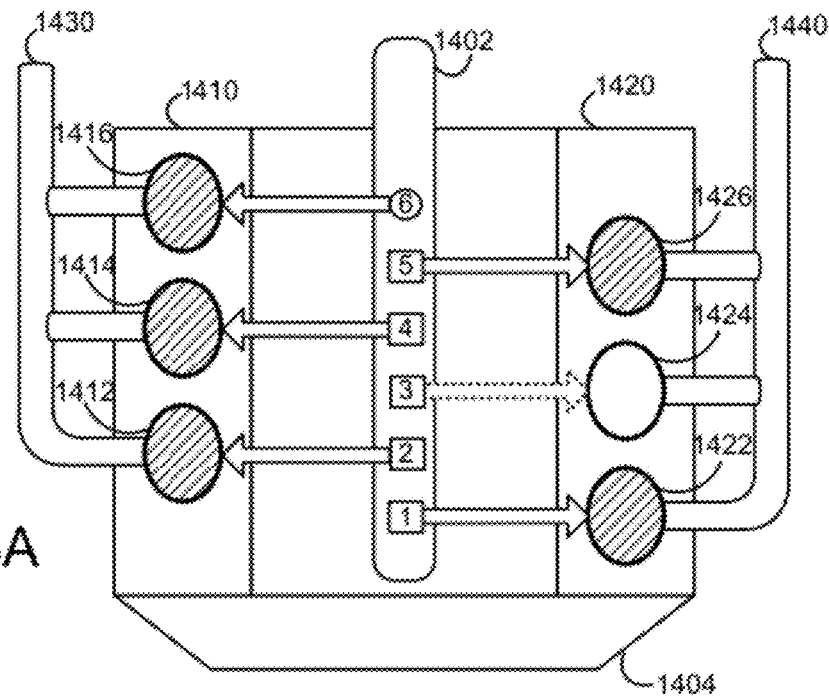
FIGS. 18A to 18E are illustrative diagrams of an example V6 style internal combustion engine in a variable displacement mode where five working chambers are operational in accordance with an embodiment of the present invention.

At FIG. 18A, illustrated at 1800A, Chamber One 1422, Chamber Two 1412, Chamber Four 1414, Chamber Five 1426 and Chamber Six 1416 are operational (indicated by diagonal shading). Chamber Three 1424 is effectively shut down (indicated by no shading).

Figure 18B:
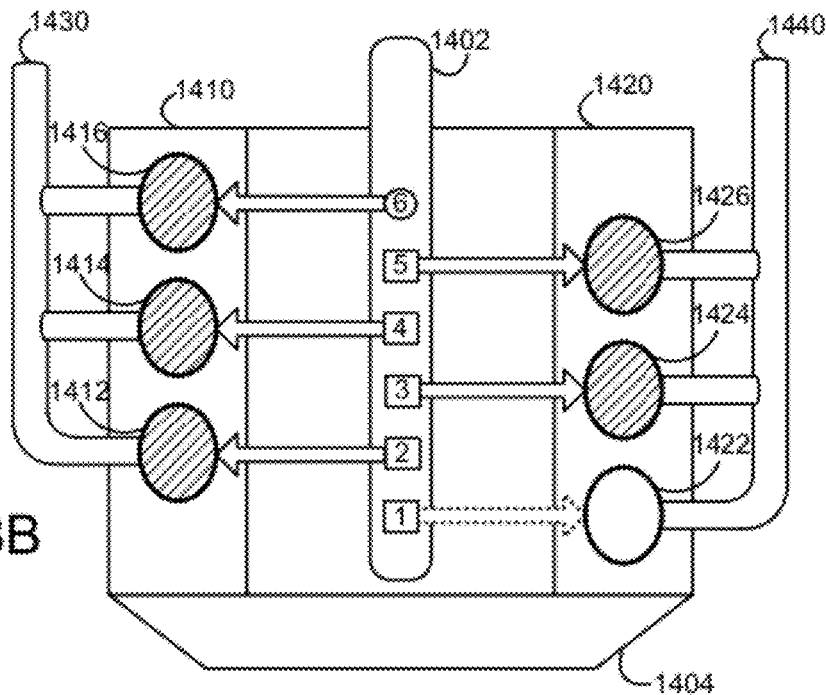

At FIG. 18B, illustrated at 1800B, Chamber Two 1412, Chamber Three 1424, Chamber Four 1414, Chamber Five 1426 and Chamber Six 1416 are operational (indicated by diagonal shading). Chamber One 1422 is effectively shut down (indicated by no shading).

Figure 18C:
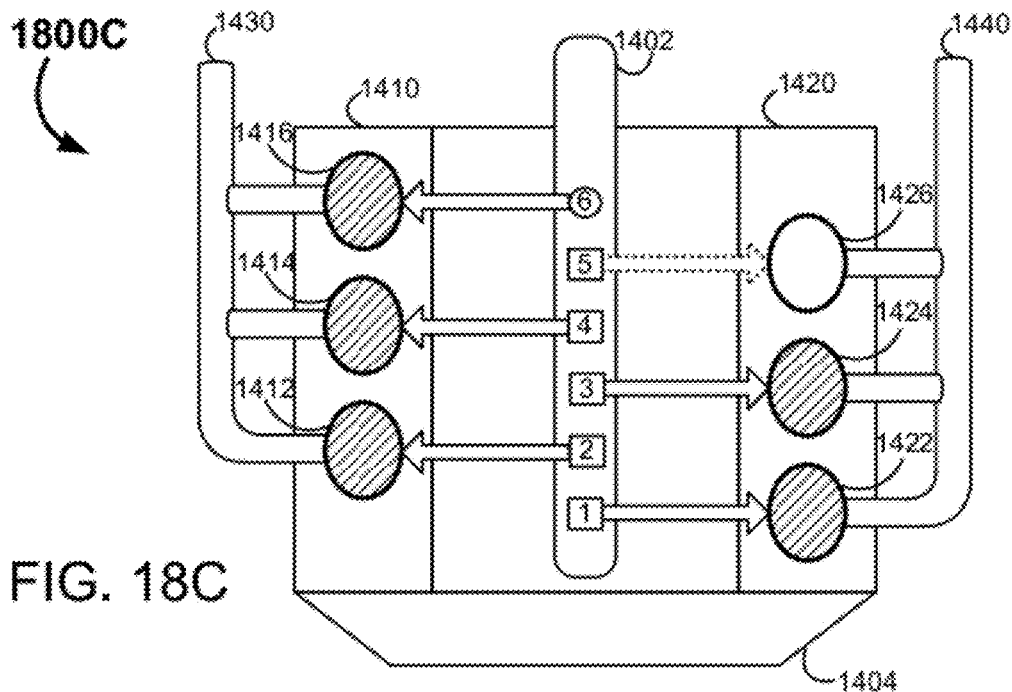

At FIG. 18C, illustrated at 1800C, Chamber One 1422, Chamber Two 1412, Chamber Three 1424, Chamber Four 1414 and Chamber Six 1416 are operational (indicated by diagonal shading). Chamber Five 1426 is effectively shut down (indicated by no shading).

Figure 18D:
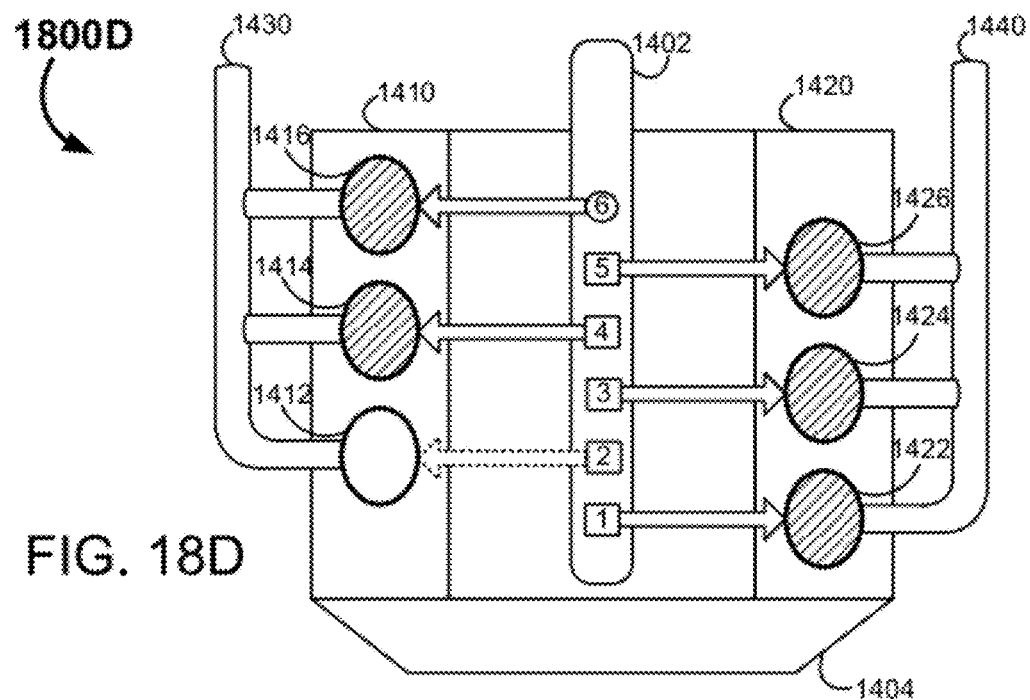

At FIG. 18D, illustrated at 1800D, Chamber One 1422, Chamber Three 1424, Chamber Four 1414, Chamber Five 1426 and Chamber Six 1416 are operational (indicated by diagonal shading). Chamber Two 1412 is effectively shut down (indicated by no shading).

Figure 18E:
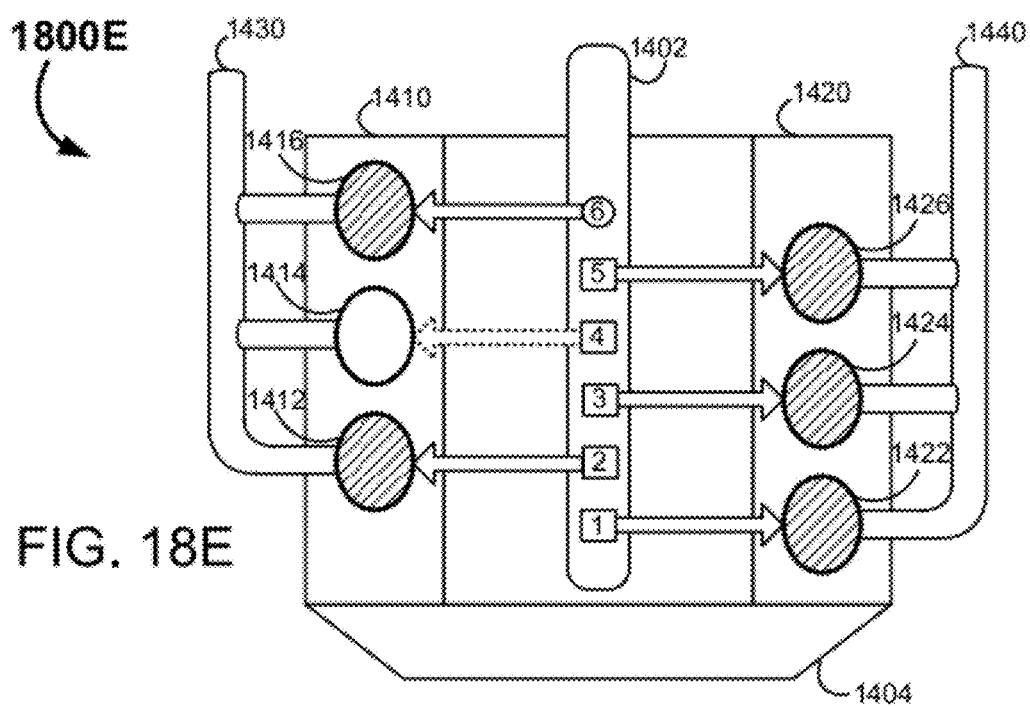

At FIG. 18E, illustrated at 1800E, Chamber One 1422, Chamber Two 1412, Chamber Three 1424, Chamber Five 1426 and Chamber Six 1416 are operational (indicated by diagonal shading). Chamber Four 1414 is effectively shut down (indicated by no shading).

IV. Example Three

Five Chamber Engines

In addition to the present invention being of use with V type engines, there is considerable opportunity for a variable displacement system, as discussed in this application, to be utilized in conjunction with standard in line style engines. For the following examples, a 5-cylinder inline engine will be discussed.

The 5-cylinder engine's advantage over a comparable 4-cylinder engine is best understood by considering power strokes and their frequency. A 4-cycle engine fires all its cylinders every 720 degrees, the crankshaft makes two complete rotations. If an even firing engine is assumed, 720 degrees may be divided by the number of cylinders to determine how often a power stroke occurs. In regards to a four cylinder engine: 720 degrees÷4=180 degrees, so a 4-cylinder engine gets a power stroke every 180 degrees. Thus, a V8 engine gets a power stroke every 90 degrees, (720°÷8=90°).

A given power stroke may last no more than 180 degrees of crankshaft rotation, so the power strokes of a 4-cylinder engine are sequential, with no overlap. At the end of one cylinder's power stroke, another cylinder fires.

In a 1-, 2-, or 3-cylinder engine, there are times when no power stroke is occurring. In a 3-cylinder engine, a power stroke occurs every 240 degrees, (720°÷3=240°). Since a power stroke cannot last longer than 180 degrees, this means that a 3-cylinder engine has 60 degrees of "silence" when no power stroke takes place.

A 5-cylinder engine gets a power stroke every 144 degrees (720°÷5=144°. Since each power stroke lasts 180 degrees, this means that a power stroke is always in effect. Because of uneven levels of torque during the expansion strokes divided among the 5 cylinders, there is increased secondary-order vibrations. At higher engine speeds, there is an uneven third-order vibration from the crankshaft which occurs every 144 degrees. Because the power strokes have some overlap, a 5-cylinder engine may run more smoothly than a non-overlapping 4-cylinder engine, but only at limited mid-range speeds where second and third-order vibrations are lower.

Every cylinder added beyond five increases the overlap of firing strokes and makes for less primary order vibration. An inline-6 gets a power stroke every Right Bank 720 degrees. So there is more overlap (180°–Right Bank 720x°=60°) than in a 5-cylinder engine (180°–144°=36°). However, this increase in smoothness of a 6-cylinder engine over a 5-cylinder engine is not as pronounced as that of a 5-cylinder engine over a 4-cylinder engine. The inline-5 loses less power to friction as compared to an inline-6. It also uses fewer parts, and it is physically shorter, so it requires less room in the engine bay, allowing for transverse mounting.

A 5-cylinder engine is longer and more expensive to manufacture than a comparable 4-cylinder engine, but some manufacturers feel these costs are outweighed by its greater capacity in a smaller space than a 6-cylinder.

From the standpoint of driving experience, 5-cylinder engines are noted for combining the best aspects of four and six cylinder engines. They generate more power and torque than four cylinder engines, while maintaining the fuel economy and "pep" of smaller four cylinder engines. Five cylinder turbochargers have been used on more than one occasion in sport and racing applications for their balance of performance qualities. The Volvo S60 R (racing edition) has a 2.5 liter turbocharged inline 5-cylinder engine which is capable of generating 300 bhp and 295 lb-ft of torque across a large amount of its RPM ranges.

A disadvantage of a straight-5 over a straight-6 is that a straight-5 engine is not inherently balanced. A straight-5 design has free moments (vibrations) of the first and second order, while a straight-6 has zero free moments. This means that no additional balance shafts are needed in a straight-6. By comparison a straight-4 has no free moments of the first or second order, but it does have a large free force of the second order which contributes to the vibration found in unbalanced straight-4 designs.

Figure 19A:
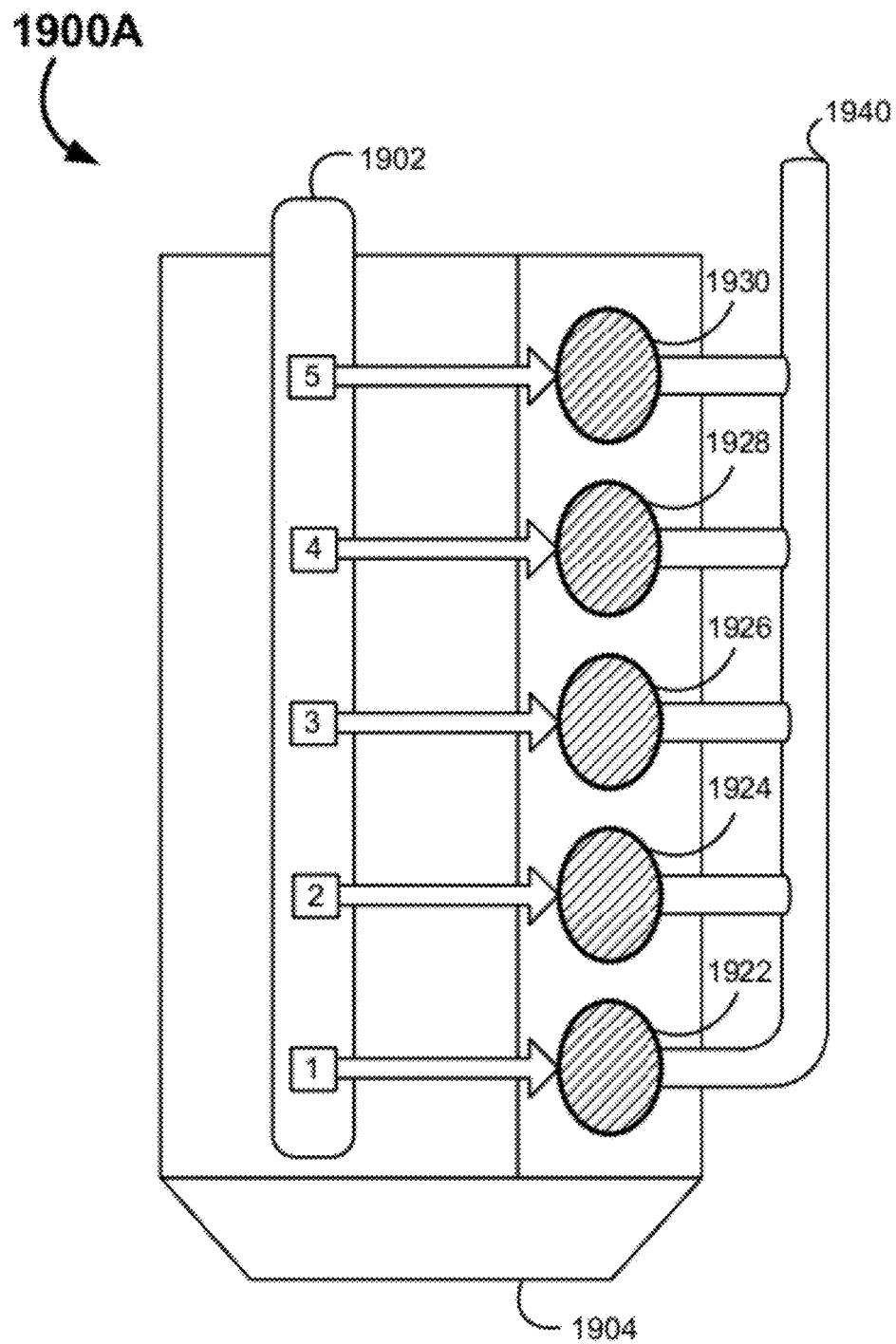
FIG. 19A is an illustrative diagram of an example inline five chamber internal combustion engine with one exhaust manifold in accordance with an embodiment of the present invention.

FIG. 19A is an illustrative diagram of an example inline five chamber internal combustion engine with one Exhaust Manifold 1940, shown generally at 1900A. The 1904 may be seen having five in line chambers labeled 1922, 1924, 1926, 1928 and 1930, respectively. The single manifold 1940 services all chambers in this embodiment.

Figure 19B:
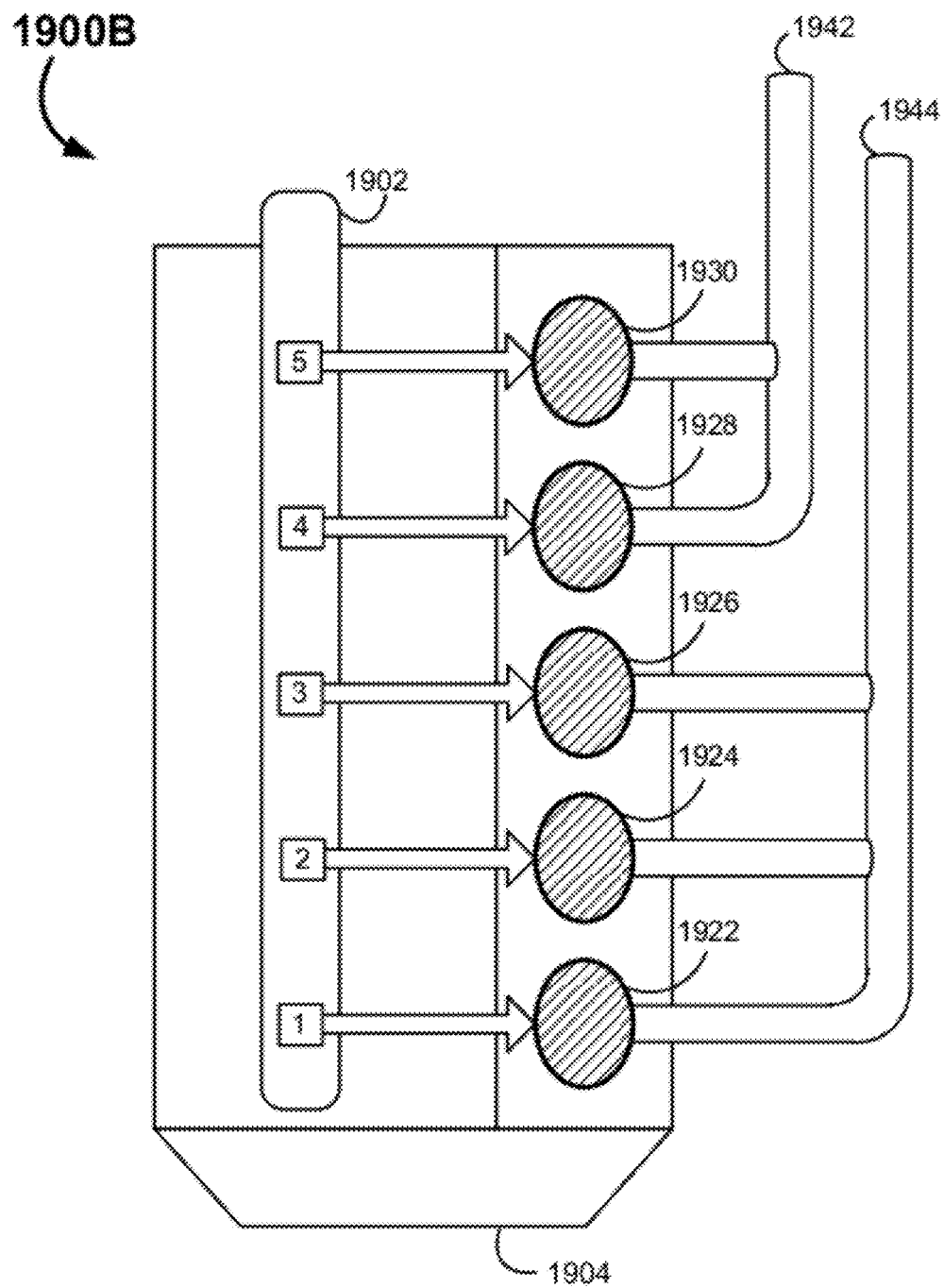
FIG. 19B is an illustrative diagram of an example inline five chamber internal combustion engine with two exhaust manifolds in accordance with an embodiment of the present invention.
Figure 19C:
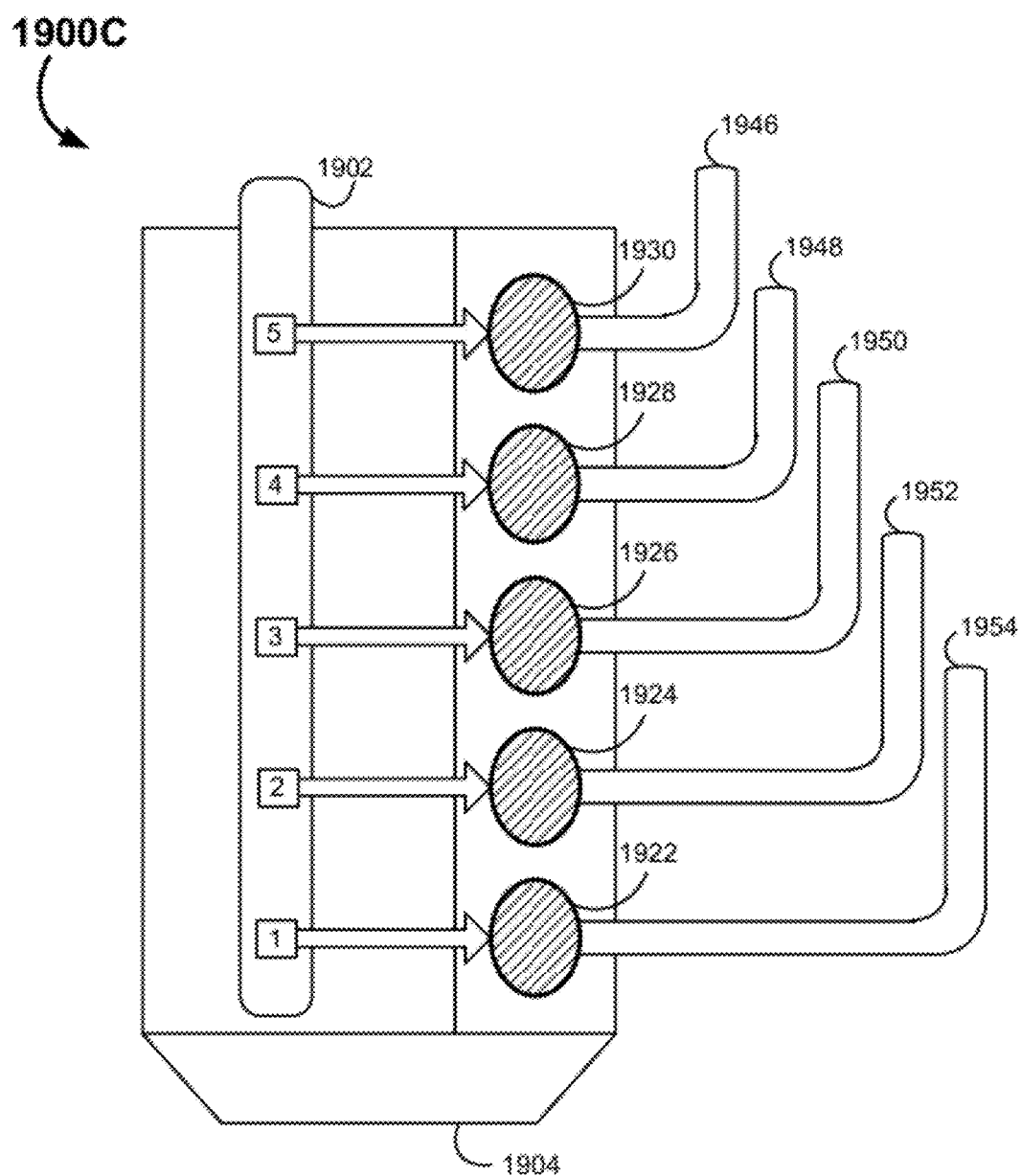
FIG. 19C is an illustrative diagram of an example inline five chamber internal combustion engine with a plurality of exhaust manifolds in accordance with an embodiment of the present invention.

In FIGS. 19B and 19C, however, multiple exhaust manifolds are illustrated. In a dual manifold type system the chambers are split unequally between the two manifolds. Thus, the First Manifold 1944 vents three chambers (1922, 1924 and 1926) and the Second Manifold 1942 vents the remaining two chambers (1928 and 1930). The example, five manifold system of FIG. 19C has a dedicated exhaust manifold for each chamber. Such multi manifold systems have gained some popularity among motorcycle engines in recent years.

Figure 20:
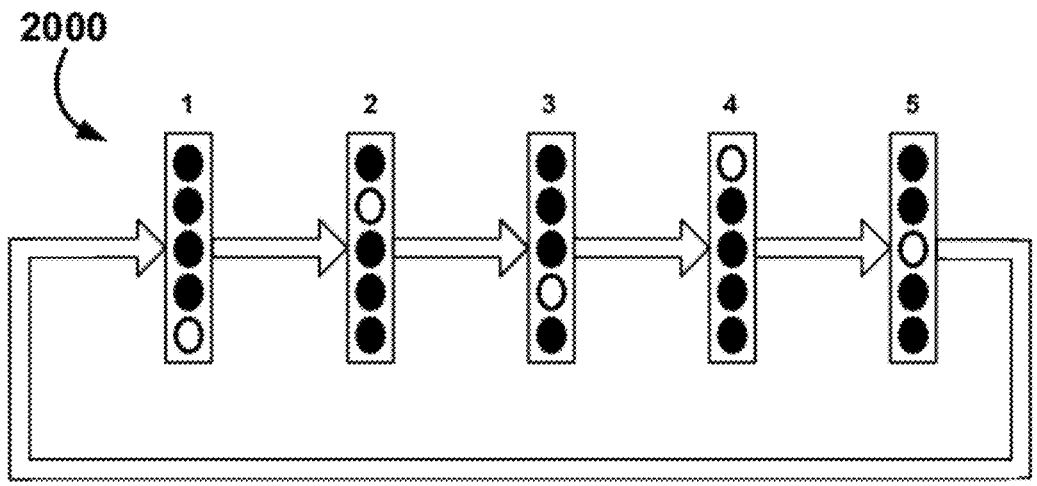
FIG. 20 is an illustrative diagram of an example firing sequence for an inline five chamber internal combustion engine with four working chambers in accordance with an embodiment of the present invention.

Now with reference to FIGS. 20 to 23 when engaged in variable displacement modes, it is possible to deactivate different cylinders on different working cycles to help minimize secondary vibrations. For example, FIG. 20 is an illustrative diagram of an example firing sequence for an inline five chamber internal combustion engine with four working chambers, shown generally at 2000. Here one chamber is deactivated (white) per working cycle. The remaining four cylinders are active (black). On subsequent working cycles the system may alter which chamber is deactivated. By changing the non-operable chamber two things may be achieved: 1) secondary vibrations may be reduced, and 2) uneven cooling of the engine block may be reduced.

Figure 21:
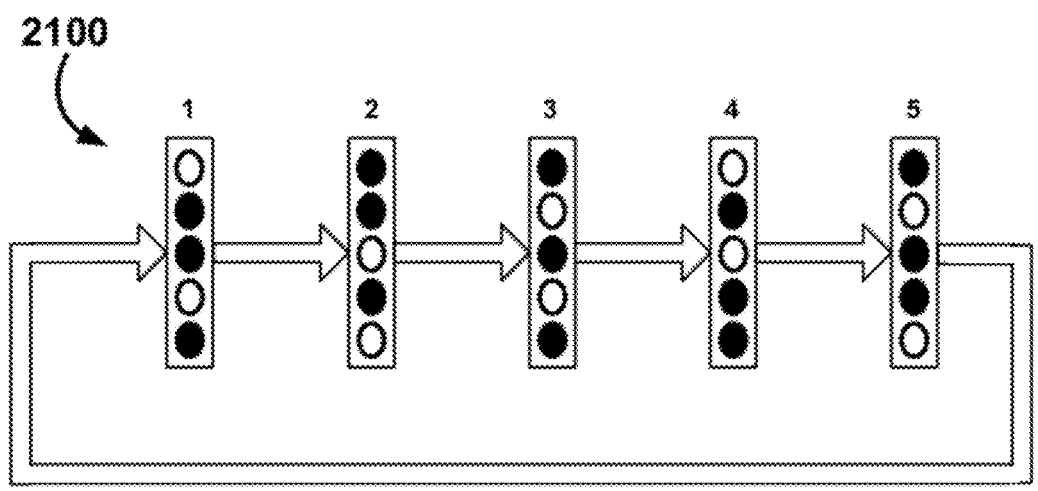
FIG. 21 is an illustrative diagram of an example firing sequence for an inline five chamber internal combustion engine with three working chambers in accordance with an embodiment of the present invention.
Figure 22:
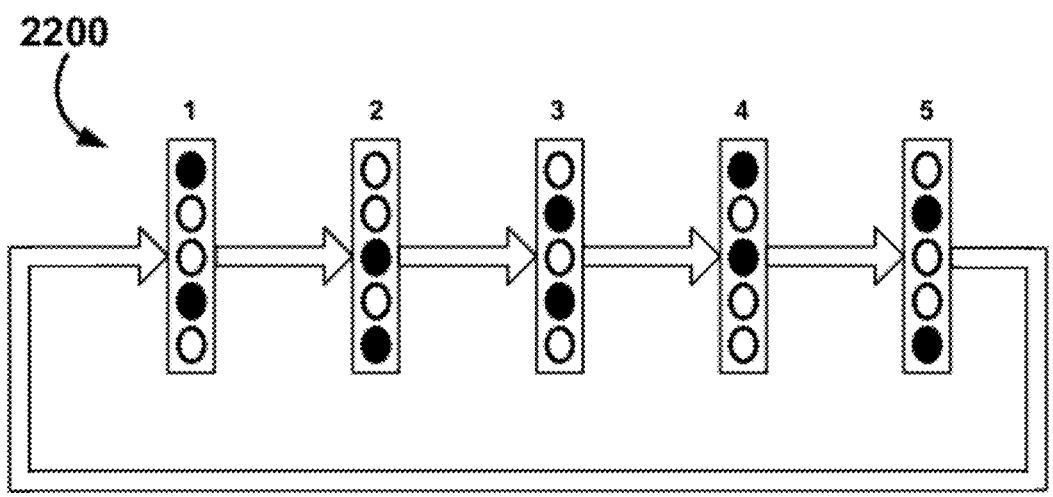
FIG. 22 is an illustrative diagram of an example firing sequence for an inline five chamber internal combustion engine with two working chambers in accordance with an embodiment of the present invention.
Figure 23:
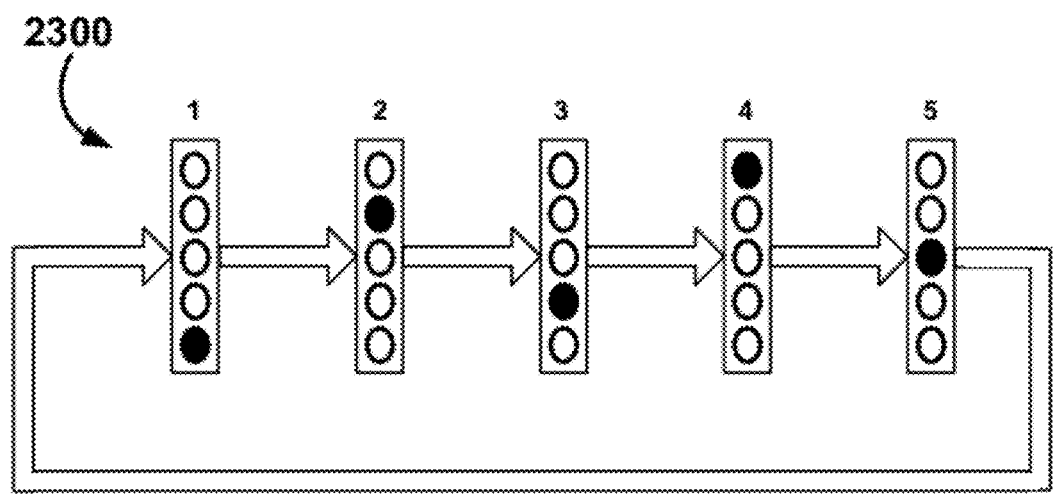
FIG. 23 is an illustrative diagram of an example firing sequence for an inline five chamber internal combustion engine with one working chamber in accordance with an embodiment of the present invention.

Likewise, FIG. 21 is an illustrative diagram of an example firing sequence for an inline five chamber internal combustion engine with three working chambers, shown generally at 2100. Here two chambers are deactivated (white) per working cycle. The remaining three cylinders are active (black). In FIG. 22, shown at 2200, three chambers are deactivated (white) per working cycle. The remaining two cylinders are active (black). And lastly, at FIG. 23, shown generally at 2300, four chambers are deactivated per working cycle and only one chamber is operational.

In sum, systems and methods for improving fuel efficiency for internal combustion engines are provided. While a number of specific examples have been provided to aid in the explanation of the present invention, it is intended that the given examples expand, rather than limit the scope of the invention. Although sub-section titles have been provided to aid in the description of the invention, these titles are merely illustrative and are not intended to limit the scope of the present invention.

While the system and methods have been described in functional terms, embodiments of the present invention may include entirely hardware, entirely software or some combination of the two. Additionally, manual performance of any of the methods disclosed is considered as disclosed by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A system for improving efficiency of an internal combustion engine having a plurality of cylinders, each cylinder being capable of operating in a succession of combustion cycles, wherein at least one of the plurality of cylinders is a controllable cylinder, and wherein the at least one controllable cylinder can be deactivated to selectively shut intake and exhaust valves, the system for improving efficiency of an internal combustion engine comprising:
a fuel processor configured to receive instructions for a first desired engine output, and generate, based upon the first desired engine output, at least one of a cylinder firing pattern and an operational state, wherein the fuel processor is further configured to:
substantially disable fuel flow to and air flow to a subset of deactivated cylinders while the engine is in the first operational state corresponding to the first desired output, wherein disabling air flow includes shutting the intake and exhaust valves of the deactivated cylinders;
substantially disable fuel flow to and firing of to a subset of passive cylinders while the engine is in the first operational state corresponding to the first desired output;
substantially regulate fuel flow to, air flow to and firing of a subset of working cylinders during each of their respective combustion cycles while the engine is in the first operational state corresponding to the first desired output; and
substantially modulate the regulation of fuel flow to, air flow to and firing of at least one of the subset of working cylinders during some of the at least one of the subset of working cylinder's combustion cycles while the engine is in the first operational state corresponding to the first desired output, wherein the modulated regulation of fuel flow to and firing of the at least one of the subset of working cylinders is dynamically determined during operation of the engine on a combustion cycle by combustion cycle basis, of the at least one of the subset of working cylinders, to provide the first desired output for the engine while the engine is in the first operational state corresponding to the first desired output.

2. The system for improving the efficiency of an internal combustion engine, as recited in claim 1, wherein the engine includes more than one segregated exhaust manifold.

3. The system for improving the operation efficiency of an internal combustion engine, as recited in claim 2, further wherein cylinders assigned to the subset of working cylinders vent to some of the more than one segregated exhaust manifolds and cylinders assigned to the subset of passive cylinders vent to others of the more than one segregated exhaust manifolds, such that exhaust output from the subset of the activated cylinders does not combine with airflow from the subset of passive cylinders.

4. The system for improving the efficiency of an internal combustion engine, as recited in claim 1, wherein the fuel processor further calculates the number of working cylinders, wherein the calculating the number of working cylinders comprises:
dividing the desired output by the power provided by one cylinder operating at substantially optimal efficiency to generate a target cylinder number;
if the target cylinder number is substantially an integer value, setting the number of working cylinders to the target cylinder number; and
else, if the target cylinder number is between two integer values, setting the number of working cylinders to the target cylinder number rounded up to the next integer and setting the frequency of firing of the modulated at least one of the working cylinders according to the decimal value of the target cylinder number.

5. The system for improving the efficiency of an internal combustion engine, as recited in claim 1, wherein the fuel processor is further configured to:
receive an update of the instructions for a second desired engine output;
substantially disable fuel flow to and air flow to a second subset of deactivated cylinders while the engine is in a second operational state corresponding to the second desired output;
substantially disable fuel flow to and firing of to a second subset of passive cylinders while the engine is in the second operational state corresponding to the second desired output;
substantially regulate fuel flow to, air flow to and firing of a second subset of working cylinders during each of their respective combustion cycles while the engine is in the second operational state corresponding to the second desired output; and
substantially modulate the regulation of fuel flow to, air flow to and firing of at least one of the second subset of working cylinders during some of the at least one of the second subset of working cylinders' combustion cycles while the engine is in the second operational state corresponding to the second desired output, wherein the modulated regulation of fuel flow to and firing of the at least one of the second subset of working cylinders is dynamically determined during operation of the engine on a combustion cycle by combustion cycle basis, of the at least one of the second subset of working cylinders, to provide the desired output for the engine while the engine is in the second operational state corresponding to the second desired output.

6. The system for improving the efficiency of an internal combustion engine, as recited in claim 5, wherein the fuel processor monitors the indication of desired output and adaptively changes the number of working cylinders in the first and second sets of working cylinders and adaptively varies the firings of the modulated working cylinders in order to deliver the desired output in accordance with variations between the first desired output and the second desired output.

7. The system for improving the efficiency of an internal combustion engine, as recited in claim 1, wherein the fuel processor further receives at least one current operating condition including at least one of engine speed, current activated cylinders, vehicle weight, slope the vehicle is on, and movement resistance.

8. The system for improving the efficiency of an internal combustion engine, as recited in claim 7, wherein the fuel processor calculates the number of working cylinders by referencing the at least one current operating condition.

9. The system for improving the efficiency of an internal combustion engine, as recited in claim 8, wherein the calculating the number of working cylinders includes applying adaptive predictive programming.

10. The system for improving the efficiency of an internal combustion engine, as recited in claim 7, wherein the fuel processor includes a synchronizer configured to synchronize firing of the subset of working cylinders with the engine speed.

11. The system for improving the efficiency of an internal combustion engine, as recited in claim 1, wherein at least one of the plurality of cylinders is always in operation.

12. The system for improving the efficiency of an internal combustion engine, as recited in claim 1, wherein the fuel processor generates throttle and fuel injection instructions, and wherein the throttle and fuel injection instructions drives delivering fuel to and firing the subset of working cylinders.

13. The system for improving the efficiency of an internal combustion engine, as recited in claim 1, wherein the instructions for the desired engine output includes an accelerator pedal position.

14. A method for improving efficiency of an internal combustion engine having a plurality of cylinders, each cylinder being capable of operating in a succession of combustion cycles, wherein at least one of the plurality of cylinders is a controllable cylinder, and wherein the at least one controllable cylinder can be deactivated to selectively shut intake and exhaust valves, the method comprising:
receiving instructions for a first desired engine output;
substantially disabling fuel flow to and air flow to a subset of deactivated cylinders while the engine is in a first operational state corresponding to the first desired output, wherein disabling air flow includes shutting the intake and exhaust valves of the deactivated cylinders;
substantially disabling fuel flow to and firing of to a subset of passive cylinders while the engine is in the first operational state corresponding to the first desired output;
substantially regulating fuel flow to, air flow to and firing of a subset of working cylinders during each of their respective combustion cycles while the engine is in the first operational state corresponding to the first desired output; and
substantially modulating the regulation of fuel flow to, air flow to and firing of at least one of the subset of working cylinders during some of the at least one of the subset of working cylinder's combustion cycles while the engine is in the first operational state corresponding to the first desired output, wherein the modulated regulation of fuel flow to and firing of the at least one of the subset of working cylinders is dynamically determined during operation of the engine on a combustion cycle by combustion cycle basis, of the at least one of the subset of working cylinders, to provide the first desired output for the engine while the engine is in the first operational state corresponding to the first desired output.

15. The method for improving the efficiency of an internal combustion engine, as recited in claim 14, wherein the engine includes more than one segregated exhaust manifold.

16. The method for improving the operation efficiency of an internal combustion engine, as recited in claim 15, further wherein cylinders assigned to the subset of working cylinders vent to some of the more than one segregated exhaust manifolds and cylinders assigned to the subset of passive cylinders vent to others of the more than one segregated exhaust manifolds, such that exhaust output from the subset of the activated cylinders does not combine with airflow from the subset of passive cylinders.

17. The method for improving the efficiency of an internal combustion engine, as recited in claim 14, further comprising calculating the number of working cylinders, wherein the calculating the number of working cylinders comprises:
dividing the desired output by the power provided by one cylinder operating at substantially optimal efficiency to generate a target cylinder number;
if the target cylinder number is substantially an integer value, setting the number of working cylinders to the target cylinder number; and
else, if the target cylinder number is between two integer values, setting the number of working cylinders to the target cylinder number rounded up to the next integer and setting the frequency of firing of the modulated at least one of the working cylinders according to the decimal value of the target cylinder number.

18. The method for improving the efficiency of an internal combustion engine, as recited in claim 14, further comprising:
receiving an update of the instructions for a second desired engine output;
substantially disabling fuel flow to and air flow to a second subset of deactivated cylinders while the engine is in a second operational state corresponding to the second desired output;
substantially disabling fuel flow to and firing of to a second subset of passive cylinders while the engine is in the second operational state corresponding to the second desired output;
substantially regulating fuel flow to, air flow to and firing of a second subset of working cylinders during each of their respective combustion cycles while the engine is in the second operational state corresponding to the second desired output; and
substantially modulating the regulation of fuel flow to, air flow to and firing of at least one of the second subset of working cylinders during some of the at least one of the second subset of working cylinders' combustion cycles while the engine is in the second operational state corresponding to the second desired output, wherein the modulated regulation of fuel flow to and firing of the at least one of the second subset of working cylinders is dynamically determined during operation of the engine on a combustion cycle by combustion cycle basis, of the at least one of the second subset of working cylinders, to provide the desired output for the engine while the engine is in the second operational state corresponding to the second desired output.

19. The method for improving the efficiency of an internal combustion engine, as recited in claim 18, further comprising:
monitoring the indication of desired output and adaptively changing the number of working cylinders in the first and second sets of working cylinders and adaptively varying the firings of the modulated working cylinders in order to deliver the desired output in accordance with variations between the first desired output and the second desired output.

20. The method for improving the efficiency of an internal combustion engine, as recited in claim 14, further comprising receiving at least one current operating condition including at least one of engine speed, current activated cylinders, vehicle weight, slope the vehicle is on, and movement resistance.

21. The method for improving the efficiency of an internal combustion engine, as recited in claim 20, wherein further comprising calculating the number of working cylinders by referencing the at least one current operating condition.

22. The method for improving the efficiency of an internal combustion engine, as recited in claim 21, wherein the calculating the number of working cylinders includes applying adaptive predictive programming.

23. The method for improving the efficiency of an internal combustion engine, as recited in claim 20, further comprising synchronizing firing of the subset of working cylinders with the engine speed.

24. The method for improving the efficiency of an internal combustion engine, as recited in claim 14, wherein at least one of the plurality of cylinders is always in operation.

25. The method for improving the efficiency of an internal combustion engine, as recited in claim 14, further comprising generating throttle and fuel injection instructions, and wherein the throttle and fuel injection instructions drives delivering fuel to and firing the subset of working cylinders.

26. The method for improving the efficiency of an internal combustion engine, as recited in claim 14, wherein the instructions for the desired engine output includes an accelerator pedal position.

27. A system for improving efficiency of an internal combustion engine having a plurality of cylinders and more than one segregated exhaust manifold, each cylinder being capable of operating in a succession of combustion cycles, the system comprising:
   a fuel processor configured to perform the steps of:
      receiving instructions for a desired engine output;
      calculating a number of required cylinders between one and all of the plurality of cylinders, wherein the number of required cylinders, when operating at substantially optimal efficiency, provide the desired output;
      selecting an operational state, wherein the operational state includes assigning each of the plurality of cylinders to one of a subset of working cylinders, a subset of deactivated cylinders and a subset of passive cylinders, wherein the operational state corresponds to the desired output, and wherein:
         the number of cylinders assigned to the subset of working cylinders is equal to the calculated number of required cylinders;
         cylinders assigned to the subset of working cylinders vent to some of the more than one segregated exhaust manifolds and cylinders assigned to the subset of passive cylinders vent to others of the more than one segregated exhaust manifolds, such that exhaust output from the subset of the working cylinders does not combine with airflow from the subset of passive cylinders;
      substantially regulating fuel flow to, air flow to and firing of the subset of the working cylinders while the engine is in the operational state corresponding to the desired output;
      substantially disabling fuel flow to the subset of passive cylinders while the engine is in the operational state corresponding to the desired output, wherein air flow is continually provided to the subset of passive cylinders; and
      substantially disabling fuel flow to and air flow to the subset of deactivated cylinders while the engine is in the operational state corresponding to the desired output.

28. A method for improving efficiency of an internal combustion engine having a plurality of cylinders and more than one segregated exhaust manifold, each cylinder being capable of operating in a succession of combustion cycles, the method comprising:
   receiving instructions for a desired engine output;
   calculating a number of required cylinders between one and all of the plurality of cylinders, wherein the number of required cylinders, when operating at substantially optimal efficiency, provide the desired output;
   selecting an operational state, wherein the operational state includes assigning each of the plurality of cylinders to one of a subset of working cylinders, a subset of deactivated cylinders and a subset of passive cylinders, wherein the operational state corresponds to the desired output, and wherein:
      the number of cylinders assigned to the subset of working cylinders is equal to the calculated number of required cylinders;
      cylinders assigned to the subset of working cylinders vent to some of the more than one segregated exhaust manifolds and cylinders assigned to the subset of passive cylinders vent to others of the more than one segregated exhaust manifolds, such that exhaust output from the subset of the working cylinders does not combine with airflow from the subset of passive cylinders;
   substantially regulating fuel flow to, air flow to and firing of the subset of the working cylinders while the engine is in the operational state corresponding to the desired output;
   substantially disabling fuel flow to the subset of passive cylinders while the engine is in the operational state corresponding to the desired output, wherein air flow is continually provided to the subset of passive cylinders; and
   substantially disabling fuel flow to and air flow to the subset of deactivated cylinders while the engine is in the operational state corresponding to the desired output.

* * * * *